US012138209B2

(12) United States Patent
Janzen et al.

(10) Patent No.: US 12,138,209 B2
(45) Date of Patent: Nov. 12, 2024

(54) DEVICE FOR RELEASING SPINAL CONTRACTURES AND ASSOCIATED METHODS

(71) Applicant: ScoliWRx Inc., Campbell, CA (US)

(72) Inventors: Matthew I. Janzen, Campbell, CA (US); Michael E. Janzen, Campbell, CA (US)

(73) Assignee: ScoliWRx Inc., Campbell, CA (US)

( * ) Notice: Subject to any disclaimer, the term of this patent is extended or adjusted under 35 U.S.C. 154(b) by 111 days.

(21) Appl. No.: 16/736,737

(22) Filed: Jan. 7, 2020

(65) Prior Publication Data

US 2020/0214923 A1 Jul. 9, 2020

Related U.S. Application Data

(60) Provisional application No. 62/789,464, filed on Jan. 7, 2019.

(51) Int. Cl.
*A61H 1/02* (2006.01)

(52) U.S. Cl.
CPC ... *A61H 1/0292* (2013.01); *A61H 2201/0149* (2013.01); *A61H 2201/0192* (2013.01); *A61H 2201/1215* (2013.01); *A61H 2201/149* (2013.01)

(58) Field of Classification Search
CPC .... A61H 1/0292; A61H 1/008; A61H 1/0218; A61H 1/00; A61H 2201/0149; A61H 2201/0192; A61H 2201/1215; A61H 2201/149; A61H 2201/12; A61H 2201/1604; A61H 2201/1621; A61H 2201/163; A61H 2001/1633; A61H 2201/1623; A61H 2201/1635; A61H 2203/0431; A61H 2205/081
See application file for complete search history.

(56) References Cited

U.S. PATENT DOCUMENTS 1,356,365 A * 10/1920 Edward ................ A61H 1/0218
602/32
1,984,520 A * 12/1934 Curtis .................... A61H 39/06
606/240
3,604,750 A * 9/1971 Doering ............... A47D 15/006
297/467

(Continued)

OTHER PUBLICATIONS

Elena; Scoliosis-OurJourneywithClearInstitute;2010;Website:scoliosisjourneyclear.blogspot.com (Year: 2010).*

*Primary Examiner* — Tu A Vo
*Assistant Examiner* — Kelsey E Baller
(74) *Attorney, Agent, or Firm* — Penilla IP, APC

(57) ABSTRACT

A pelvis of a person is anchored to a chair structure. A lumbar belt is connected to the chair structure. The lumbar belt wraps around a lower abdominal region of the person to pull into a side of the person in a lateral-to-medial direction so as to move a scoliotic curve in a lumbar or thoracolumbar spinal region of the person toward a non-scoliotic spinal configuration. A lumbar derotator driver is connected to the chair structure. The lumbar derotator driver applies a therapeutic force to a prescribed posterior/lateral side of vertebrae in the lumbar or thoracolumbar spinal region when the lumbar belt is pulled in the lateral-to-medial direction, so as to derotate a scoliotic curve in the lumbar or thoracolumbar spinal region.

38 Claims, 143 Drawing Sheets

(56) References Cited

U.S. PATENT DOCUMENTS

| | | | | | |
|---|---|---|---|---|---|
| 5,088,476 | A * | 2/1992 | Burton | A61H 1/0229 | 606/241 |
| 5,776,084 | A * | 7/1998 | Wolan | A61H 1/0292 | 482/111 |
| 5,810,875 | A * | 9/1998 | Meilus | A61F 5/01 | 606/237 |
| 6,394,547 | B1 * | 5/2002 | Vik | A47C 7/46 | 297/298 |
| 8,864,230 | B2 * | 10/2014 | Augustat | A47C 1/0246 | 297/300.2 |
| 9,144,317 | B2 * | 9/2015 | Yang | A47C 9/002 | |
| 2005/0147515 | A1 * | 7/2005 | Cusak | A63B 23/0233 | 417/572 |
| 2005/0216061 | A1 * | 9/2005 | Kim | A61H 1/008 | 606/237 |
| 2006/0238006 | A1 * | 10/2006 | Baranov | A61H 1/0292 | 297/284.3 |
| 2018/0207048 | A1 * | 7/2018 | Janzen | A61H 1/0292 | |
| 2020/0323725 | A1 * | 10/2020 | Kao | A61H 1/005 | |

* cited by examiner

| Curve Type | Proximal Thoracic | Main Thoracic | Thoracolumbar/ Lumbar | Description |
|---|---|---|---|---|
| 1 | Nonstructural | Structural [1] | Nonstructural | Main Thoracic (MT) |
| 2 | Structural [2] | Structural [1] | Nonstructural | Double Thoracic (DT) |
| 3 | Nonstructural | Structural [1] | Structural [2] | Double Major (DM) |
| 4 | Structural [2] | Structural [3] | Structural [3] | Triple Major (TM) |
| 5 | Nonstructural | Nonstructural | Structural [1] | Thoracolumbar/Lumbar (TL/L) |
| 6 | Nonstructural | Structural [2] | Structural [1] | Thoracolumbar/Lumbar-Main Thoracic (TL/L-MT) |

[1] Major Curve: Largest Cobb measurement, always structural.
[2] Minor Curve: Remaining structural curves.
[3] Type 4 - MT or TL/L can be the major curve.

Structural Criteria (Minor Curves)
Proximal Thoracic: Side Bending Cobb ≥ 25°; T2-T5 Kyphosis ≥ +20°
Main Thoracic: Side Bending Cobb ≥ 25°; T10-L2 Kyphosis ≥ +20°
Thoracolumbar/Lumbar: Side Bending Cobb ≥ 25°; T10-L2 Kyphosis ≥ +20°

Location of Apex (SRS Definition)
Thoracic Curve: T2 to T11/12 Disc
Thoracolumbar Curve: T12/L1
Lumbar Curve: L1/2 Disc to L4

Modifiers

| Lumbar Coronal Modifier | Center Sacral Vertical Line to Lumbar Apex |
|---|---|
| A | Between Pedicles |
| B | Touches Apical Body(ies) |
| C | Completely Medial |

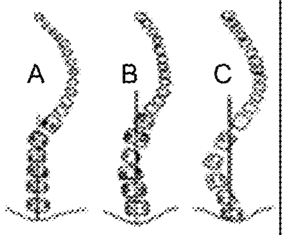

| Thoracic Sagittal Profile T5-T12 | |
|---|---|
| Modifier | Cobb Angle |
| "-" (Hypo) | < 10° |
| "N" (Normal) | 10° - 40° |
| "+" (Hyper) | > 40° |

Curve Classification = Curve Type (1-6) + Lumbar Coronal Modifer (A, B, C) + Thoracic Sagittal Profile Modifier (-, N, +)

FIG. 1V

DEVICE FOR RELEASING SPINAL CONTRACTURES AND ASSOCIATED METHODS

CLAIM OF PRIORITY

This application claims priority under 35 U.S.C. 119(e) to U.S. Provisional Patent Application No. 62/789,464, filed Jan. 7, 2019, the disclosure of which is incorporated herein by reference in its entirety for all purposes.

BACKGROUND

1. Field of the Invention

The present invention relates to treatment of human scoliosis.

2. Description of the Related Art

FIG. 1A shows an anterior view of a normal human spinal column. The anterior view is toward the front of the person. A cervical region 101 of the spinal column includes seven cervical vertebrae C1-C7. The first cervical vertebra C1 is referred to as the Atlas vertebra. The second cervical vertebra C2 is referred to as the Axis vertebra. A thoracic region 103 of the spinal column is located below the cervical region 101. The thoracic region 103 includes twelve thoracic vertebrae T1-T12. A lumbar region 105 is located below the thoracic region 103. The lumbar region 105 of the spinal column includes five lumbar vertebrae L1-L5. A sacrum region 107 is located below the lumbar region 105. And, a coccyx (tailbone) region 109 is located below the sacrum region 107. FIG. 1B shows a posterior view of the normal human spinal column. The posterior view is toward the back of the person. FIG. 1C shows a left lateral view of the normal human spinal column. The lateral view is toward the left side of the person.

While each of the first cervical vertebra C1 and the second cervical vertebra C2 is uniquely configured, the cervical vertebrae C3-C7 have a similar structure to one another and include essentially the same structural elements. Therefore, to describe the structure of the cervical vertebrae C3-C7, attention is drawn to the fourth cervical vertebra C4 and the seventh cervical vertebra C7. FIG. 1D shows a superior view of the fourth cervical vertebra C4. The superior view is a view from above looking down. FIG. 1E shows an inferior view of the fourth cervical vertebra C4. The inferior view is a view from below looking up. The fourth cervical vertebra C4 includes a body structure 111. A right transverse process 112R extends laterally away from the body structure 111 toward the right side of the person. And, a left transverse process 112L extends laterally away from the body structure 111 toward the left side of the person. The right transverse process 112R includes a right anterior tubercle 121R and a right posterior tubercle 122R between which pass a spinal nerve. The left transverse process 112L includes a left anterior tubercle 121L and a left posterior tubercle 122L between which pass a spinal nerve. The right transverse process 112R includes a right transverse foramen 113R. The left transverse process 112L includes a left transverse foramen 113L. Each of the right and left transverse foramen 113R, 113L give passage to vertebral arteries and veins, and to a plexus of sympathetic nerves. A right pedicle 114R extends from the body structure 111 to a right inferior articular process 115R. A left pedicle 114L extends from the body structure 111 to a left inferior articular process 115L. A right lamina 116R extends from the right inferior articular process 115R to a spinous process 117. A left lamina 116L extends from the left inferior articular process 115L to the spinous process 117. The spinous process 117 extends toward the back of the person in a direction generally away from the body structure 111. Collectively, the body structure 111, the right inferior articular process 115R, the right lamina 116R, the left inferior articular process 115L, the left lamina 116L, and the spinous process 117 circumscribe a vertebral foramen (vertebral canal) 118, which is a passage through which the spinal cord passes through the vertebra. The fourth cervical vertebra C4 also includes several facets corresponding to joints between adjacent vertebrae. These facets include a right superior articular facet 119R and a left superior articular facet 119L which respectively form joints with respective inferior articular facets of the third cervical vertebra C3. Also, a right inferior articular facet 120R and a left inferior articular facet 120L respectively form joints with respective superior articular facets of the fifth cervical vertebra C5.

FIG. 1F shows a superior view of the seventh cervical vertebra C7. FIG. 1G shows an inferior view of the seventh cervical vertebra C7. Although the seventh cervical vertebra C7 is shaped differently from the fourth cervical vertebra C4, they include essentially the same elements. The seventh cervical vertebra C7 includes the body structure 111, with the right transverse process 112R extending laterally away from the body structure 111 toward the right side of the person, and with the left transverse process 112L extending laterally away from the body structure 111 toward the left side of the person. The right transverse process 112R includes the right anterior tubercle 121R and the right posterior tubercle 122R between which pass the spinal nerve. The left transverse process 112L includes the left anterior tubercle 121L and the left posterior tubercle 122L between which pass the spinal nerve. The right transverse process 112R includes the right transverse foramen 113R. The left transverse process 112L includes the left transverse foramen 113L. Each of the right and left transverse foramen 113R, 113L give passage to vertebral arteries and veins, and to a plexus of sympathetic nerves. The right pedicle 114R extends from the body structure 111 to the right inferior articular process 115R. The left pedicle 114L extends from the body structure 111 to the left inferior articular process 115L. The right lamina 116R extends from the right inferior articular process 115R to the spinous process 117. The left lamina 116L extends from the left inferior articular process 115L to the spinous process 117. And, the spinous process 117 extends toward the back of the person in a direction generally away from the body structure 111. Collectively, the body structure 111, the right inferior articular process 115R, the right lamina 116R, the left inferior articular process 115L, the left lamina 116L, and the spinous process 117 circumscribe the vertebral foramen (vertebral canal) 118, through which the spinal cord passes. The seventh cervical vertebra C7 also includes the right superior articular facet 119R and the left superior articular facet 119L which form joints with respective inferior articular facets of the sixth cervical vertebra C6. Also, the right inferior articular facet 120R and the left inferior articular facet 120L form joints with respective superior articular facets of the first thoracic vertebra T1.

FIG. 1H shows a superior view of the fifth thoracic vertebra T5, which has a structure typical of thoracic vertebrae T1-T11. FIG. 1I shows an inferior view of the fifth thoracic vertebra T5. The thoracic vertebra includes a body structure 131. A right pedicle 132R extends from the body structure 131 to connect with a right transverse process 133R. A right lamina 134R extends from the right transverse process 133R to connect with a spinous process 135. Similarly, a left pedicle 132L extends from the body structure 131 to connect with a left transverse process 133L. And, a left lamina 134L extends from the left transverse process 133L to connect with the spinous process 135. Collectively, the body structure 131, right and left pedicles 132R, 132L, right and left transverse processes 133R, 133L, right and left lamina 134R, 134L, and spinous process 135 circumscribe a vertebral foramen (vertebral canal) 136, which is a passage through which the spinal cord passes through the vertebra. A right superior articular facet 137R and a left superior articular facet 137L form joints with a right inferior articular facet 138R and a left inferior articular facet 138L, respectively, of the vertebra above.

Each of thoracic vertebrae T1-T9 has a right costal facet 139R, a right superior costal demifacet 140R, and a right inferior costal demifacet 141R for forming joints with ribs. Each of thoracic vertebrae T1-T9 has a left costal facet 139L, a left superior costal demifacet 140L, and a left inferior costal demifacet 141L for forming joints with ribs. Specifically, each of ribs one through nine has a tubercle that interfaces and articulates with the costal facet 139R/139L of its numerically corresponding vertebra to form the costotransverse joint. And, each of ribs one through nine has two articular facets that respectively interface and articulate with the superior costal demifacet 140R/140L of its numerically corresponding vertebra and with the inferior costal demifacet 141R/141L of the vertebra above to form the costovertebral joint.

The twelfth thoracic vertebra T12 provides a transition from the thoracic region 103 to the lumbar region 105 and correspondingly has a somewhat unique configuration to relative to thoracic vertebrae T1-T11. FIG. 1J shows a superior view of the twelfth thoracic vertebra T12. FIG. 1K shows an inferior view of the twelfth thoracic vertebra T12. On the superior portion of the twelfth thoracic vertebra T12, the features are similar to those of thoracic vertebrae T1-T11. The twelfth thoracic vertebra T12 includes: the body structure 131, the right pedicle 132R extending from the body structure 131 to connect with the right transverse process 133R, the right lamina 134R extending from the right transverse process 133R to connect with the spinous process 135, the left pedicle 132L extending from the body structure 131 to connect with the left transverse process 133L, and the left lamina 134L extending from the left transverse process 133L to connect with the spinous process 135. Collectively, the body structure 131, right and left pedicles 132R, 132L, right and left transverse processes 133R, 133L, right and left lamina 134R, 134L, and spinous process 135 circumscribe the vertebral foramen (vertebral canal) 136, which provides passage for the spinal cord. The twelfth thoracic vertebra T12 also includes the right superior articular facet 137R and a left superior articular facet 137L to form joints with the right inferior articular facet 138R and a left inferior articular facet 138L of the eleventh thoracic vertebra T11. The right inferior articular facet 138R and the left inferior articular facet 138L of the twelfth thoracic vertebra T12 are uniquely configured to interface with respective superior articular facets of the first lumbar vertebra L1. The twelfth thoracic vertebra T12 also has a right costal facet 143R and a left costal facet 143L to which the twelfth ribs connect.

FIG. 1L shows a superior view of the third lumbar vertebra L3, which is representative of the other lumbar vertebrae L1-L2 and L4-L5. FIG. 1M shows a superior view of the third lumbar vertebra L3. The lumbar vertebra includes a body structure 151. A right pedicle 152R extends from the body structure 151 to connect with a right transverse process 153R. A right lamina 154R extends from the right transverse process 153R to connect with a spinous process 155. Similarly, a left pedicle 152L extends from the body structure 151 to connect with a left transverse process 153L. And, a left lamina 154L extends from the left transverse process 153L to connect with the spinous process 155. Collectively, the body structure 151, right and left pedicles 152R, 152L, right and left transverse processes 153R, 153L, right and left lamina 154R, 154L, and spinous process 155 circumscribe a vertebral foramen (vertebral canal) 156, through which the spinal cord passes. A right superior articular facet 157R and a left superior articular facet 157L form joints with a right inferior articular facet 158R and a left inferior articular facet 158L, respectively, of the vertebra above.

The twelve thoracic vertebrae T1-T12 that make up the thoracic region 103 of the spinal column are configured to connect with and support the rib cage (thoracic cage). FIG. 1N shows a right lateral view of the spinal column with the thoracic cage 160 shown attached to the thoracic vertebrae T1-T12. FIG. 1O shows a right lateral section view of the thoracic cage attached the thoracic vertebrae T1-T12. FIG. 1P shows an anterior view of the thoracic cage connected to the thoracic vertebrae T1-T12. FIG. 1Q shows a posterior view of the thoracic cage connected to the thoracic vertebrae T1-T12. The thoracic cage includes twelve right side ribs R1R, R2R, R3R, R4R, RSR, R6R, R7R, R8R, R9R, R10R, R11R, and R12R, and twelve left side ribs R1L, R2L, R3L, R4L, RSL, R6L, R7L, RBL, R9L, R10L, R11L, and R12L. Ribs one through seven, R1R-R7R and R1L-R7L, attach independently to the sternum 161 through costal cartilages C1R-C7R and C1L-C7L, respectively. Ribs eight through ten, R8R-R10R and R8L-R10L, attach to respective costal cartilages C8R-C10R and C8L-C10L, each of which attaches to its superior costal cartilage. Specifically, costal cartilages C8R and C8L attach to costal cartilages C7R and C7L, respectively, with costal cartilages C7R and C7L attaching to the sternum 161. And, costal cartilages C9R and C9L attach to costal cartilages C8R and C8L, respectively. And, costal cartilages C10R and C10L attach to costal cartilages C9R and C9L, respectively.

Ribs eleven and twelve, R11R-R12R and R11L-R12L, do not have an anterior attachment and terminate in the abdominal musculature and are thus referred to as floating ribs. Each rib has facet(s) for connecting to the thoracic vertebral column. Each of the first ribs R1R and R1L has one facet for articulation with the first thoracic vertebra T1. The posterior end of each of the second through tenth ribs, R2R-R10R and R2L-R10L, has an inferior articular facet for connection to its numerically corresponding thoracic vertebra and a superior articular facet for connection to the thoracic vertebra above its numerically corresponding thoracic vertebra. Also, each of the second through tenth ribs, R2R-R10R and R2L-R10L, has a tubercle that includes an articular portion for articulation with the costal facet of the transverse process of its numerically corresponding thoracic vertebra. Each of the eleventh and twelfth ribs R11R, R11L, R12R, R12L has one facet at its posterior end for articulation with its numerically corresponding thoracic vertebra.

FIG. 1R shows a superior view of an interface between thoracic vertebra T6 and each of ribs R6R and R6L. The posterior end of the rib R6R has its inferior articular facet connected to the superior costal demifacet 140R of thoracic vertebra T6 to form part of the costovertebral joint at that location. Similarly, the posterior end of the rib R6L has its inferior articular facet connected to the superior costal demifacet 140L of thoracic vertebra T6 to form part of the costovertebral joint at that location. Also, rib R6R has a tubercle that includes an articular portion for articulation with the costal facet 139R of the transverse process 133R of the thoracic vertebra T6. Similarly, rib R6L has a tubercle that includes an articular portion for articulation with the costal facet 139L of the transverse process 133L of the thoracic vertebra T6. FIG. 1S shows an isometric view of the interface between the sixth thoracic vertebra T6 and the seventh thoracic vertebra T7, including the ribs R7R and R7L. FIG. 1S shows the posterior end of the rib R7L having its superior articular facet connected to the inferior costal demifacet 141L of thoracic vertebra T6, and having its inferior articular facet connected to the superior costal demifacet 140L of thoracic vertebra T7 (hidden from view in FIG. 1S), to form the costovertebral joint at that location. Also, FIG. 1S shows the tubercle 171 of the rib R7L that includes the articular portion for articulation with the costal facet 139L of the transverse process 133L of the thoracic vertebra T7.

When viewed posteriorly, the spinal column should follow a straight line extending vertically upward from the vertical centerline of the sacrum 107, which is referred to as the sacral vertical line. However, a person can be afflicted with a condition known as scoliosis in which a three-dimensional torsional deformity manifests in the spine and trunk of the person. With scoliosis, the spinal column assumes (develops into) a configuration having one or more lateral curves (side-to-side curves) relative to the sagittal plane that divides the human body into left and right halves. Also, scoliosis often includes rotation of vertebrae in a direction transverse direction relative to the vertebral foramen. FIG. 1T shows diagrams from a posterior perspective of the human spinal column having a normal configuration 173, a scoliotic configuration 175 exhibiting a generalized "C-shaped" curvature, and a scoliotic configuration 177 exhibiting a generalized "S-shaped" curvature. The "C-shaped" curvature of the scoliotic configuration 175 includes a single curve 179 relative to the sacral vertical line 172. The "S-shaped" curvature of the scoliotic configuration 177 includes an upper curve 181 relative to the sacral vertical line 172 and a lower curve 183 relative to the sacral vertical line 172. It should be understood that the "C-shaped" curvature of the scoliotic configuration 175 and the "S-shaped" curvature of the scoliotic configuration 177 are simplified representations of the actual scoliotic condition provided for purposes of description. In reality, actual scoliotic configurations of the human spinal column can include more than two curves and can include substantial vertebral rotations that "twist" the thoracic cage causing noticeable physical deformities and in some cases significant pain and suffering.

Additionally, scoliosis is not to be confused with the normal coronal curvature (front-to-back curvature) of the spinal column relative to the coronal plane that divides the human body into anterior and posterior halves. FIG. 1U shows diagrams from a right-lateral perspective of the human spinal column having a normal coronal configuration 185, a kyphosis coronal configuration 186, and a lordosis coronal configuration 187. The normal coronal configuration 185 includes a cervical coronal curvature 188 along the cervical region 101, a thoracic coronal curvature 189 along the thoracic region 103, and a lumbar coronal curvature 190 along the lumbar region 105. In the kyphosis coronal configuration 186, the thoracic coronal curvature 189 is greater than normal, which can manifest as a persistent downward bend or hunch in the human's posture. In the lordosis coronal configuration 187, the lumbar coronal curvature 190 is greater than normal, which can manifest as backward lean in the human's posture. Scoliotic configurations of the human spinal column may contribute to or worsen the kyphosis coronal configuration 186 and/or the lordosis coronal configuration 187 when present.

About 10% of adolescents have some amount of scoliosis. And, about 1% of adolescents have scoliotic curvatures that require significant medical attention. However, as the 10% of the adolescents that have some amount of scoliosis reach older age, the effects of their scoliosis can become more significant, and possibly lead to struggles with pain and other forms of spinal degeneration. Four out of five cases of scoliosis are considered idiopathic, which means that the cause of scoliosis in those cases is unknown. Also, a person with scoliosis can be otherwise healthy.

Idiopathic scoliosis can be typed according to age of onset. For infantile idiopathic scoliosis, scoliotic spinal curvature appears before age three. For juvenile idiopathic scoliosis, scoliotic spinal curvature appears between ages three and ten. For adolescent idiopathic scoliosis (AIS), scoliotic spinal curvature appears between ages ten and thirteen, near the beginning of puberty. Except for the age of onset, AIS and juvenile idiopathic scoliosis can be considered essentially equivalent to each other. AIS is the most common type of scoliosis. For adult idiopathic scoliosis, scoliotic spinal curvature appears after physical maturation is complete.

Scoliosis can cause noticeable asymmetry in the human torso region. In some cases, a person having scoliosis may appear to be standing with one shoulder higher than the other, or with a tilt in their waistline. In some cases, a shoulder blade of a person having scoliosis may appear more prominent than the other shoulder blade due to transverse rotation of the spinal column. Scoliotic curvatures tend to increase more rapidly near the adolescent growth spurt. Also, scoliosis that begins at an earlier age is more likely to progress to a significant condition as compared with scoliosis that begins later in puberty.

Although idiopathic scoliosis is considered to have an unknown cause, some theories exist as to the root cause. A theory that a tight spinal cord could be the cause of adolescent scoliosis was first proposed by a neuroradiologist named Dr. Roth in 1968. The theory was further expounded upon by Dr. Porter in 2001, and has become known as the Roth-Porter Hypothesis. To understand how a tight spinal cord can cause scoliosis, Roth and Porter used the analogy of a string that runs through the middle of a spring. The spring represents the spinal bones, and the string represents the spinal cord. As the string is pulled tight, the spring coils down into a scoliotic shape. Most commonly, nerve tension will be due to a problem called "Uncoupled Neuro-Osseous Development," which means that the bones are growing faster than the nerves, creating a spinal cord or meningeal tension. This relatively short spinal cord results in a tugging force on the posterior parts of the vertebral column, causing the column to compress down. Just like tension on a string will cause the spring to coil down, so tension on the spinal cord will cause the spine to coil down. This coiled-down scoliotic position actually relieves the tension on a tight spinal cord. Under the Roth-Porter Hypothesis, scoliosis is an adaptive position in response to nerve tension.

With the Roth-Porter Hypothesis in mind, a nerve tension scoliosis case is a situation where there is either a tight, inelastic, or tethered spinal cord. The nerve root or meninges create the main driving force causing the spine to coil down into scoliosis. Nerve tension is likely the most common root cause of scoliosis. If a scoliosis is progressing rapidly, and has been diagnosed as "idiopathic," the scoliosis likely has a nerve tension root cause. Examples of nerve tension pathologies that can cause scoliosis include: tumors or cysts, intraspinal anomalies, tethered cord syndrome, and uncoupled neuro-osseous development. Tumors or cysts can bind the meninges or cord and cause a tension on the nerves, leading to scoliosis. Tumors or cysts can also cause neuromuscular dysfunction. With intraspinal anomalies, the spinal cord or nerves develop embryologically in a way such that one side or one part of the cord is pulled tight at birth. Even though the problem happens at birth, it may not appear until the child begins to have growth spurts. Tethered cord syndrome is a condition that exists from birth and causes the entire spinal cord to be pulled noticeably lower towards the sacrum, placing tension on the spinal cord. Uncoupled neuro-osseous development means that the spinal cord (neuro) is not growing as fast or as long as the bones of the spine (osseous). Some physicians believe that uncoupled neuro-osseous development is likely to become recognized as the most common cause of adolescent scoliosis.

Beyond idiopathic scoliosis, causes are known for some types of scoliosis, including congenital scoliosis, neuromuscular scoliosis, and degenerative scoliosis. Congenital scoliosis is caused by congenital abnormal formation of the bones of the spine and is often associated with other organ defects. Neuromuscular scoliosis is caused by loss of control of the nerves and/or muscles that support the spinal column. Some causes of neuromuscular scoliosis include cerebral palsy, poliomyelitis, muscular dystrophy, severe chiari and syringomyelia, and functional neurologic deficits. Degenerative scoliosis is caused by degeneration of intervertebral discs and/or arthritis in vertebral joints.

In some cases, there may be structural or biomechanical root causes of scoliosis. "Structural" root causes may refer to bones that are asymmetric or incorrectly shaped. For example, a half-formed vertebra at birth, known as a hemivertebra, may also create a scoliosis. Another example of structural-biomechanical scoliosis is when one leg grows a little longer than the other, causing the sacrum to not be level. The sacrum is the base of the spine, so when the sacrum tilts, the spine tilts, and there can be a mild (and sometimes moderate) scoliosis as a result. "Structural causes" may also apply to ligament damage from trauma or from degeneration of discs. If key stabilizing ligaments of the spine are damaged or torn, the vertebra may tilt in response, creating a scoliotic curve. Structural or biomechanical conditions that lead to scoliosis are common and usually cause mild to moderate non-progressive scoliosis.

In the case of scoliosis caused by neuro-muscular pathology, there is a breakdown in either the body's control system (the brain) or the nerves that connect the brain to the muscles, or the muscles themselves cannot work correctly. For example, in cerebral palsy, there is a lack of proper central nervous system control within the brain. In poliomyelitis, the peripheral nerves that carry signals from the brain to the muscles are damaged. In muscular dystrophy, there is weakness of the muscles, rendering the muscles unable to support a straight spine. Neuro-muscular pathology cases tend to be more aggressive. Progression of the scoliosis, i.e., the tendency for the curve to grow large, is often quite high for neuro-muscular pathology cases.

Whatever the root cause of a scoliosis, it will usually begin as a small, flexible scoliosis. At this stage, the spine is still capable of going through its normal range of motion (more or less). In a small, flexible, or "functional" scoliosis, lateral bending X-rays would show an easy correction of the curve when bending the spine sideways to the left and right. As a scoliosis grows, increasing distortion occurs in the soft tissues of the spine, which leads to loss of normal range of motion. When normal range of motion is lost, severe stiffness can set in.

As a scoliotic curve size increases, the ability to exercise the spine throughout its full range of motion is lost. As a result, the scoliosis becomes rigid and stiff primarily due to changes in soft tissue. Secondary stiffness comes from small changes in the shapes of the bones. "Structural scoliosis" is a term applied when the scoliotic curve has become stiff, inflexible, and rigid. Calling a scoliosis "structural" does not mean the curve was caused by a structural asymmetry, such as a wedge-shaped vertebra. It may be more accurate to simply call the scoliosis "rigid" instead of "structural." Some physicians prefer to use the term "structural" in order to divide scoliosis into two categories: 1) functional (flexible) scoliosis, and 2) structural (rigid) scoliosis. This may be considered a false dichotomy, as most scoliotic curves have both some functional and some structural qualities. While bone deformity does occur in structural scoliosis, there exists also significant rigidity due to soft-tissue deformity of the muscles, discs, and ligaments. The rigidity of a "structural" scoliosis that is due to deformity of discs, ligaments, and muscles is called a contracture. The term "structural" is often used to communicate to the person that nothing at this point could straighten their spine, except surgery. However, this is not always true, as non-surgical treatment of contractures is successfully employed in physiotherapeutic practices for joints such as the elbow, knee, or shoulder. While non-surgical treatments exist for contractures of the extremities, no such device exists for non-surgical treatment of contractures of the spine in three dimensions.

In child and adolescent scoliosis, a small flexible scoliotic curve can quickly become a large, stiff, and rigid. During growth of the spinal bones, the tightness of the spinal cord causes the vertebrae to "coil down" like a spring that has a tight string run through it, such as according to the Roth-Porter Hypothesis. The spine is now constantly postured in a scoliotic pattern, unable to straighten even when the person tries to bend out of it. This means that the ligaments, muscles, and discs are no longer being exercised through their normal range of motion. Failure to move muscles and joints always results in stiff "contractures" of the joints. These "contractured" joints are so stiff, that it can feel like bone running into bone, when in reality, it is really just soft tissue that has become stiff, shortened, and tough. This is good and bad news. Good news because soft tissue contractures can be loosened up with proper mobilization. Bad news, because it is a difficult and arduous process to loosen up contractured soft tissue around the joints.

A typical progression of AIS begins with an early stage flexible and functional scoliosis. Then, the scoliotic curve size progresses, which lead to a loss of range of motion of the spinal column. This loss of range of motion in turn leads to joint contractures of within the spinal column. With the joint contractures, the scoliotic portions of spinal column are no longer being exercised, which causes stiffer, rigid, "structural" scoliosis. Ultimately, the bones of the spine can change shape in response to the mechanical stresses placed on them by the scoliosis, causing wedge-shaped vertebra, asymmetric pedicles, and thoracic cage deformity.

Early stage spinal bone changes in a small scoliosis have been observed. These early stage changes are most noticeable in the front part of the thoracic vertebral bodies. It has been observed that the front part of the vertebral body can grow taller than what is normal. This is called Relative Anterior Spinal Overgrowth (RASO). In other words, with RASO, the front of the vertebra is growing taller than it should. This can lead to a lordosis condition in which there is a loss of the normal thoracic coronal curvature. The existence of RASO and a loss of the normal thoracic coronal curvature is most likely in response to nerve tension. Nerve tension will cause the thoracic region of the spine to flatten out its normally curved shape (see the normal thoracic coronal curvature 189 of FIG. 1U). The loss of thoracic coronal curvature, or "flat back," is a position that relieves tension on the spinal cord. The "flat back" posture is an early adaptive position in response to a tight spinal cord. It is suspected that nerve tension occurs first, followed by the "flat back" in response to the nerve tension.

As a scoliotic curve becomes larger, the thoracic cage distorts to adapt to the growing scoliosis. Also, a scoliotic curve becomes larger, the pedicles of the spine may grow asymmetric in length and thickness. Further, a scoliotic curve becomes larger, the normally rectangular vertebrae may develop a slight rhomboid-wedge shape at the apex of the scoliotic curve.

A system for classifying AIS has been developed by Lawrence G. Lenke, MD, and was published in the "Journal of Bone and Joint Surgery" in 2001. This system is commonly referred to as the "Lenke Classification System for AIS." FIG. 1V shows a chart of the Lenke Classification System for AIS. FIG. 1W shows a chart of scoliotic spinal diagrams corresponding to scoliosis curve classifications within the Lenke Classification System for AIS. To use the Lenke Classification System for AIS, it is necessary to measure the Cobb angle(s) of the scoliotic curve(s) along the spinal column. FIG. 1X shows a diagram illustrating how to measure the Cobb angle of scoliotic curve. In the example of FIG. 1X, the scoliotic curve extends from vertebra V2 to vertebra V8, with the apex of the curve occurring at vertebra V5. The most significantly angled vertebra within the curve above the apex is vertebra V3. The most significantly angled vertebra within the curve below the apex is vertebra V7. To measure the Cobb angle, an upper line is drawn parallel to the upper border of the most significantly angled vertebra within the curve above the apex. Therefore, in the example of FIG. 1X, an upper line 191 is drawn parallel to the upper border of vertebra V3. Further, a lower line is drawn parallel to the lower border of the most significantly angled vertebra within the curve below the apex. In the example of FIG. 1X, a lower line 192 is drawn parallel to the lower border of vertebra V7. An upper perpendicular line is drawn to extend downward in a direction perpendicular to the upper line that is drawn parallel to the upper border of the most significantly angled vertebra within the curve above the apex. In the example of FIG. 1X, an upper perpendicular line 193 is drawn to extend downward in a direction perpendicular to the upper line 191. A lower perpendicular line is drawn to extend upward in a direction perpendicular to the lower line that is drawn parallel to the lower border of the most significantly angled vertebra within the curve below the apex. In the example of FIG. 1X, an lower perpendicular line 194 is drawn to extend upward in a direction perpendicular to the lower line 192. The angle formed between the upper perpendicular line and the lower perpendicular line at their point of crossing is the Cobb angle, or the angle of curvature of the scoliotic curve.

Given the foregoing, it is of interest to determine new and effective ways for mitigating and reversing scoliosis, and particularly AIS, for the benefit of humanity. It is within this context that the present invention arises.

SUMMARY

In an example embodiment, an apparatus for release of spinal contractures associated with scoliosis of the human spine is disclosed. The apparatus includes a chair structure having a front side, a back side, a left side, and a right side. The apparatus also includes a lumbar belt connected to the chair structure. The lumbar belt is configured to wrap around a lower abdominal region of the person when the person is fitted into the apparatus. The lumbar belt is configured to pull into a side of the person in a lateral-to-medial direction so as to move a scoliotic curve in a lumbar or thoracolumbar spinal region of the person toward a non-scoliotic lumbar spinal configuration. The apparatus also includes a lumbar derotator driver connected to the chair structure. The lumbar derotator driver is configured to apply a therapeutic force to a prescribed posterior/lateral side of vertebrae in the lumbar spinal region of the person when the person is fitted into the apparatus and when the lumbar belt is pulled into the side of the person in the lateral-to-medial direction.

In an example embodiment, a method is disclosed for fitting a person into an apparatus for release of spinal contractures associated with scoliosis of the spine of the person. The method includes seating a person on a chair structure of the apparatus. The method also includes securing a pelvis of the person to the chair structure. The method also includes positioning and securing pelvic side restraints to the chair structure on each side of hips of the person. The method also includes wrapping a lumbar belt around a side of the person so as to contact the side of the person at or below a convexity of a scoliotic lumbar or thoracolumbar spinal curve of the person. The method also includes tightening the lumbar belt to apply a therapeutic force to the lumbar spinal region of the person that serves to move the lumbar spinal region of the person in a direction of correction of the scoliotic lumbar spinal curve of the person. The method also includes positioning a lumbar derotator driver to engage with the lumbar or thoracolumbar spinal region of the person. The method also includes moving the lumbar derotator driver in an posterior-to-anterior direction to apply a therapeutic force to a posterior-lateral portion of the lumbar or thoracolumbar spinal region of the person that serves to derotate the lumbar or thoracolumbar spinal region of the person in a direction of correction of the scoliotic lumbar spinal curve of the person.

In an example embodiment, a method is disclosed for treating a person having a scoliotic spinal configuration. The method includes anchoring a pelvis of the person to a chair structure. The method also includes applying a first therapeutic force to a lumbar spinal region of the person to move the lumbar spinal region of the person in a lateral-to-medial direction of correction of a scoliotic lumbar spinal curve of the person. The method also includes applying a second therapeutic force in a posterior-to-anterior direction to a posterior-lateral portion of the lumbar spinal region of the person to derotate the lumbar spinal region of the person in a direction of correction of the scoliotic lumbar spinal curve of the person.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 1V shows a chart of the Lenke Classification System for AIS.

FIG. 73H shows the lumbar derotator driver applied to the left, posterior side of the lumbar spinal region of the person, from a point of view looking toward the outer lateral side of the lumbar derotator driver, in accordance with some embodiments of the present invention.

FIG. 74A shows a view of a lumbar derotator driver from a point of view looking toward a medial side of the lumbar derotator driver, where the lumbar derotator driver has a laterally mirrored configuration relative to the lumbar derotator driver of FIG. 73A, in accordance with some embodiments of the present invention.

FIG. 74B shows a view of the lumbar derotator driver of FIG. 74A from a point of view looking toward an outer lateral side of the lumbar derotator driver, in accordance with some embodiments of the present invention.

FIG. 74C shows a view of the lumbar derotator driver of FIG. 74A from a point of view looking directly toward the front surface region of the lumbar derotator driver, in accordance with some embodiments of the present invention.

FIG. 74D shows a view of the lumbar derotator driver of FIG. 74A from a point of view looking downward toward the top surface region of the lumbar derotator driver, in accordance with some embodiments of the present invention.

FIG. 74E shows a view of the lumbar derotator driver of FIG. 74A from a point of view looking downward toward both the top surface region and the back surface region of the lumbar derotator driver, in accordance with some embodiments of the present invention.

FIG. 74F shows another view of the lumbar derotator driver of FIG. 74A from a point of view looking directly toward the front surface region of the lumbar derotator driver, in accordance with some embodiments of the present invention.

FIG. 74G shows a back view of the lumbar derotator driver of FIG. 74A applied to the right, posterior side of the lumbar spinal region of the person, in accordance with some embodiments of the present invention.

FIG. 74H shows the lumbar derotator driver of FIG. 74A applied to the right, posterior side of the lumbar spinal region of the person, from a point of view looking toward the outer lateral side of the lumbar derotator driver, in accordance with some embodiments of the present invention.

FIG. 75A shows a perspective view of the primary thoracic driver from a point of view looking toward a contact surface of the primary thoracic driver, in accordance with some embodiments of the present invention.

FIG. 75B shows a view of the primary thoracic driver from a point of view looking downward toward the top surface region of the primary thoracic driver, in accordance with some embodiments of the present invention.

FIG. 75C shows another view of the primary thoracic driver from a point of view looking toward the contact surface of the primary thoracic driver, in accordance with some embodiments of the present invention.

Figure 75A:
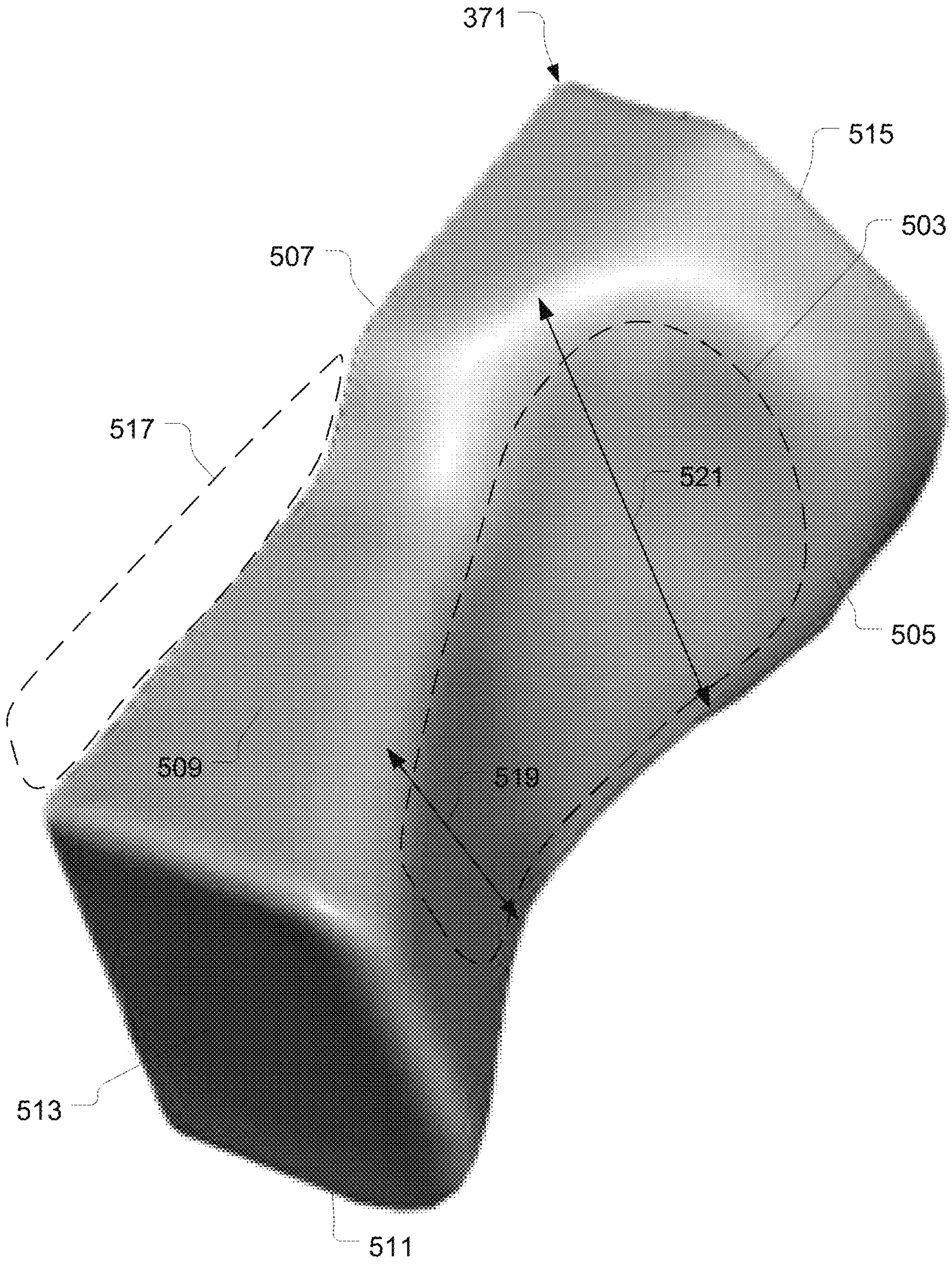
Figure 75B:
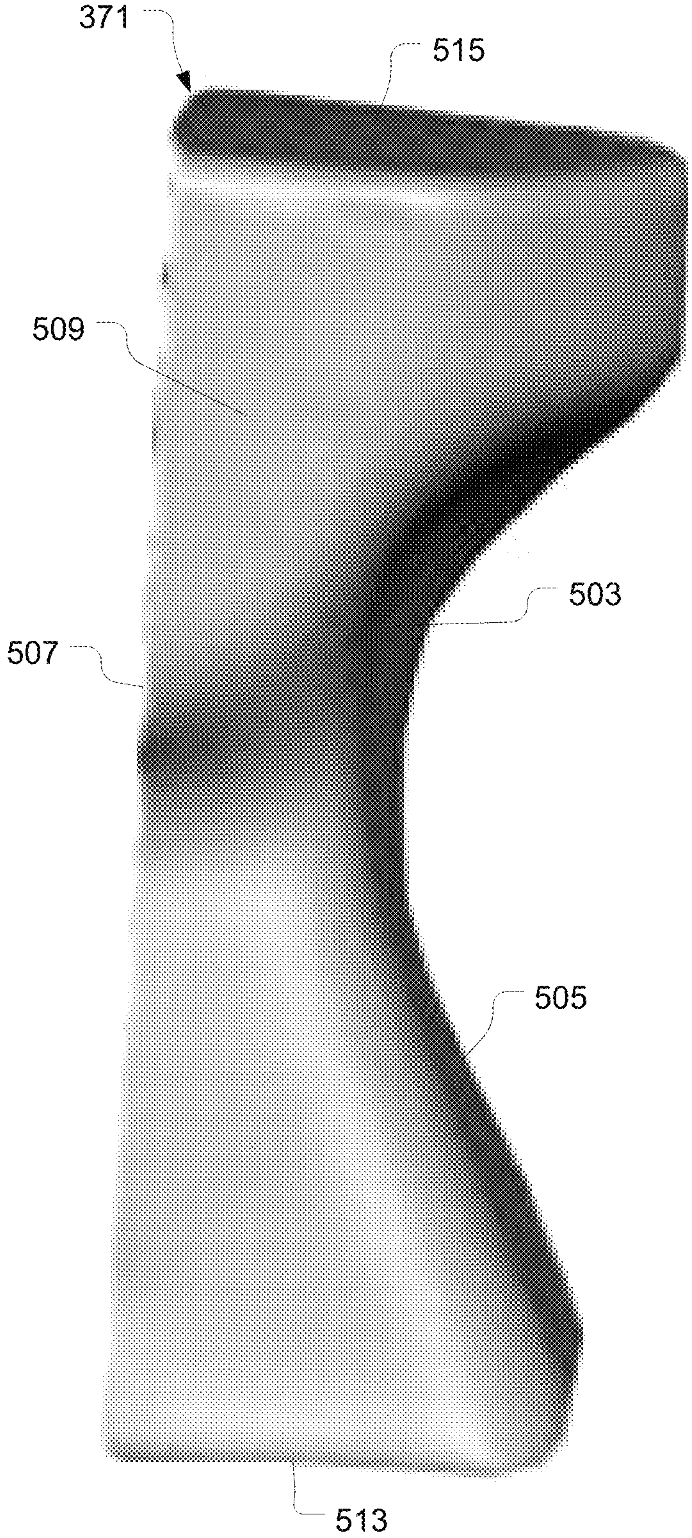
Figure 75C:
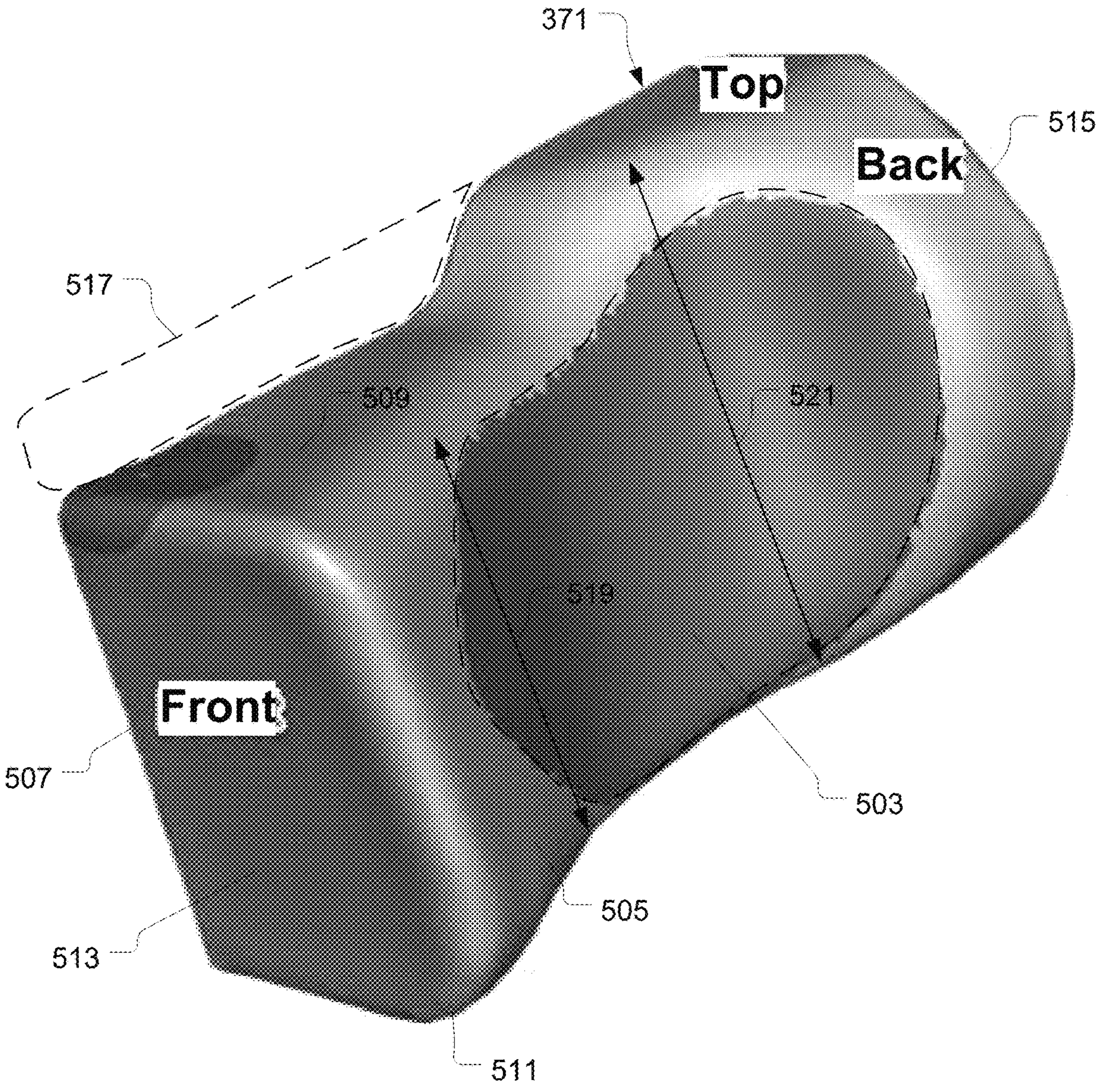
Figure 75D:
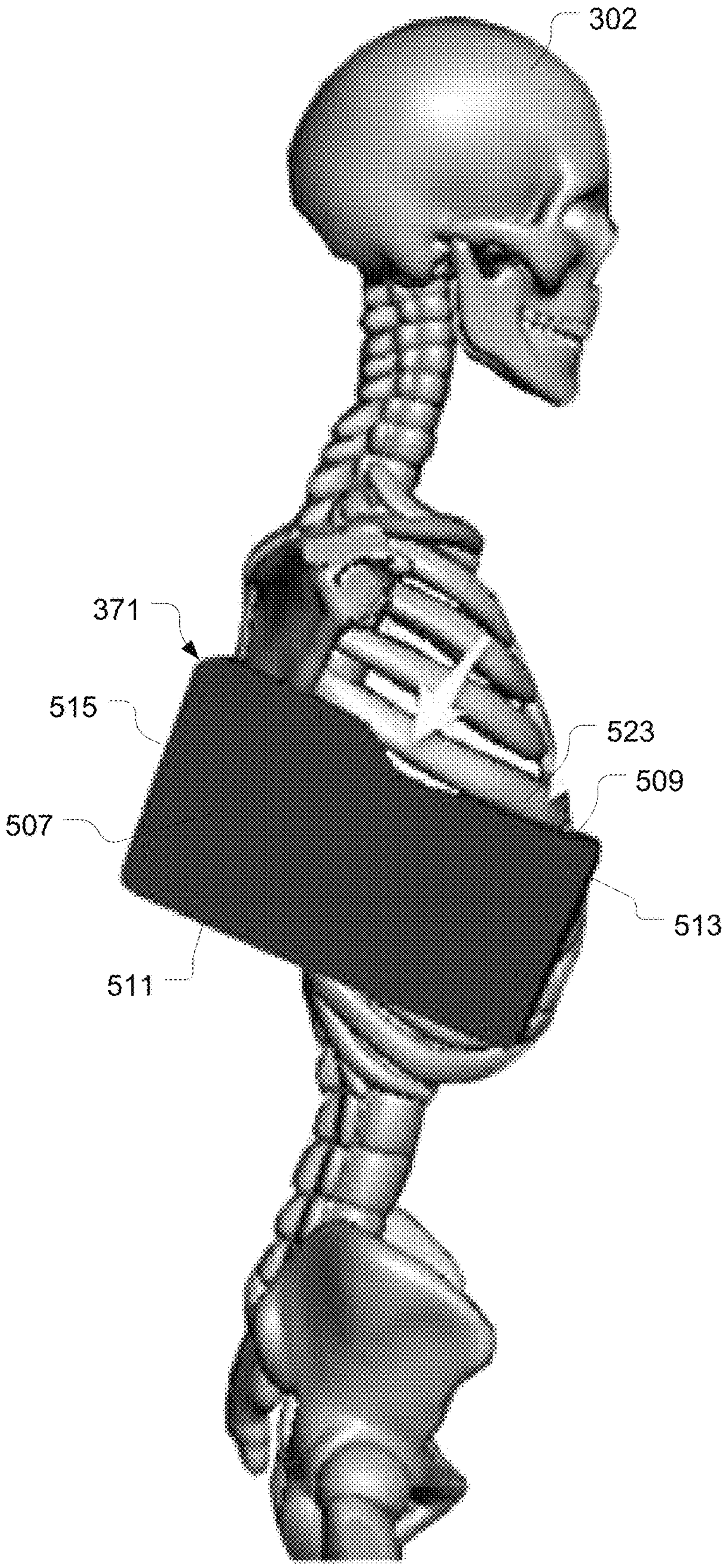

FIG. 75D shows a position and orientation of the primary thoracic driver relative to the rib cage of the person, from a point of view looking toward the right side of the person, in accordance with some embodiments of the present invention.

Figure 75E:
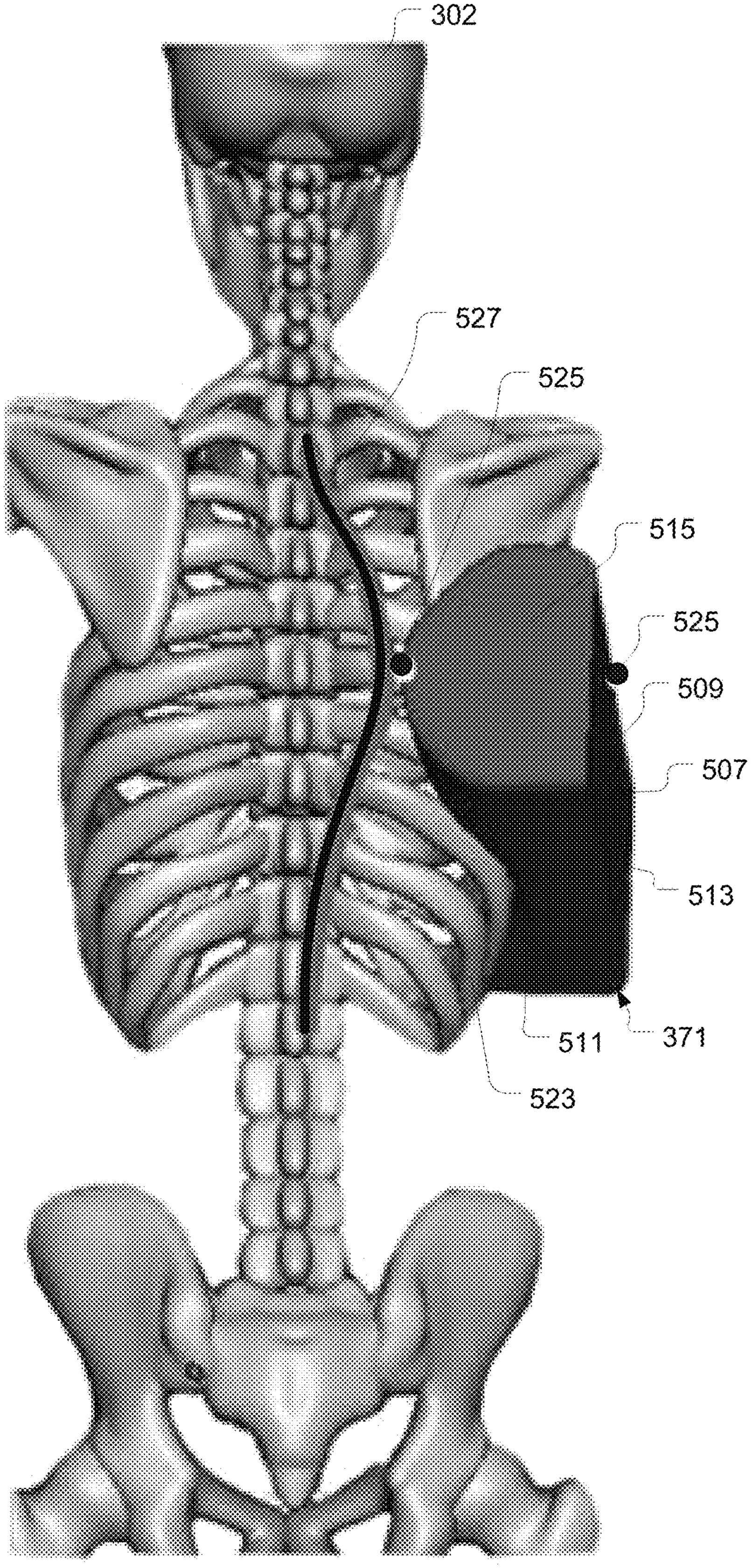

FIG. 75E shows a position and orientation of the primary thoracic driver relative to the rib cage of the person, from a point of view looking toward the back of the person, in accordance with some embodiments of the present invention.

Figure 75F:
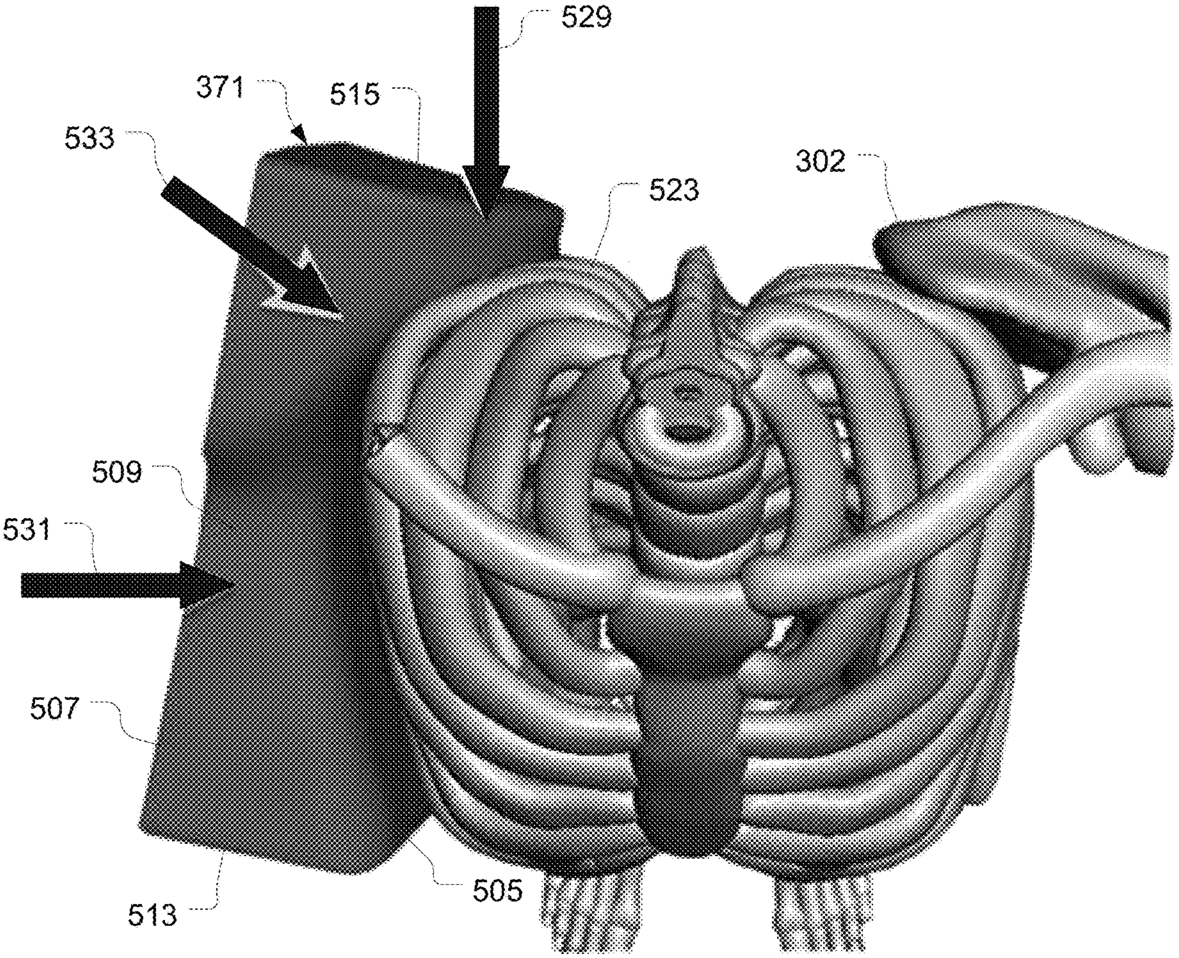

FIG. 75F shows a position and orientation of the primary thoracic driver relative to the rib cage of the person, from a point of view looking downward from a location above the person, in accordance with some embodiments of the present invention.

Figure 75G:
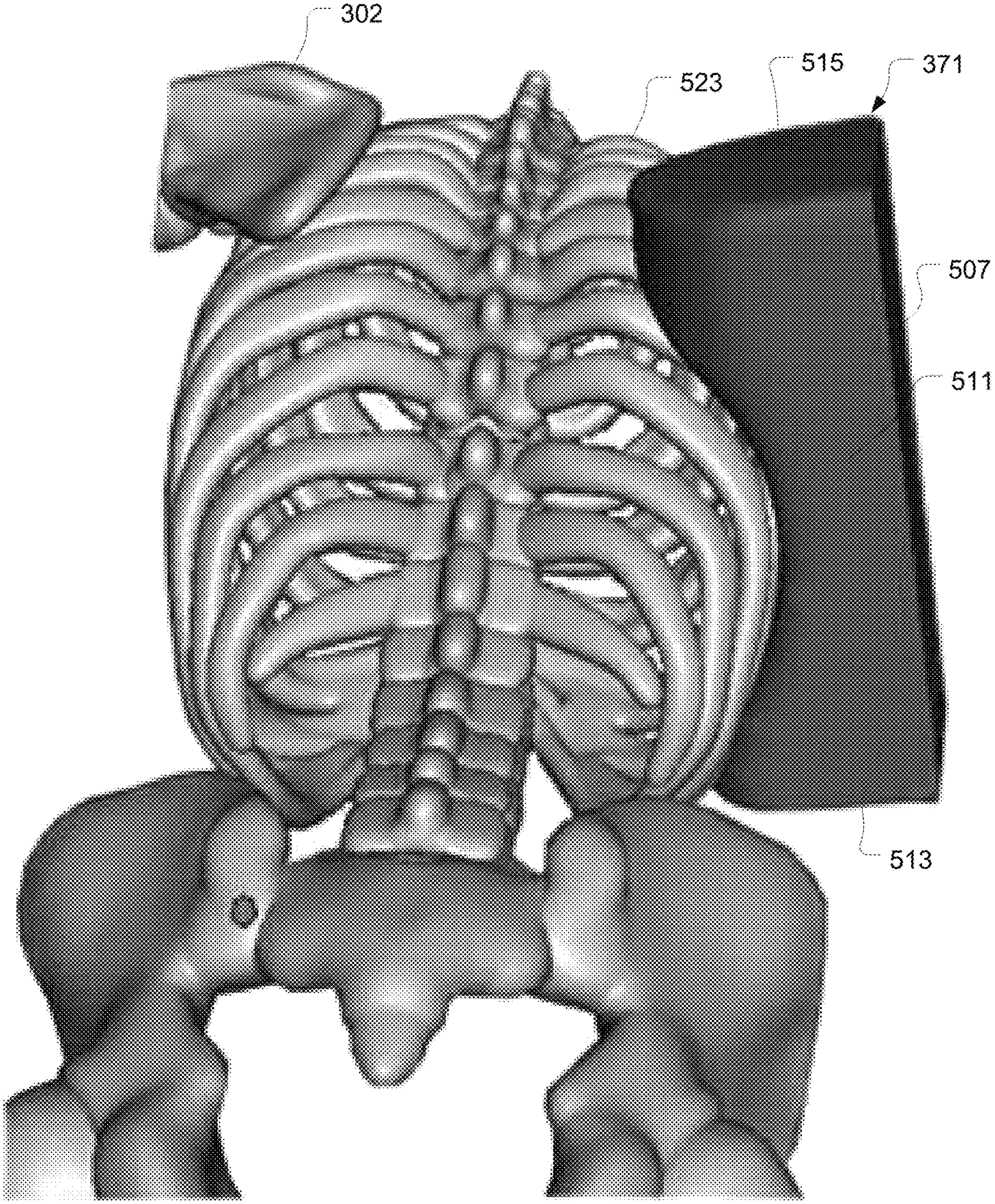

FIG. 75G shows a position and orientation of the primary thoracic driver relative to the rib cage of the person, from a point of view looking upward from a location below the person, in accordance with some embodiments of the present invention.

Figure 75H:
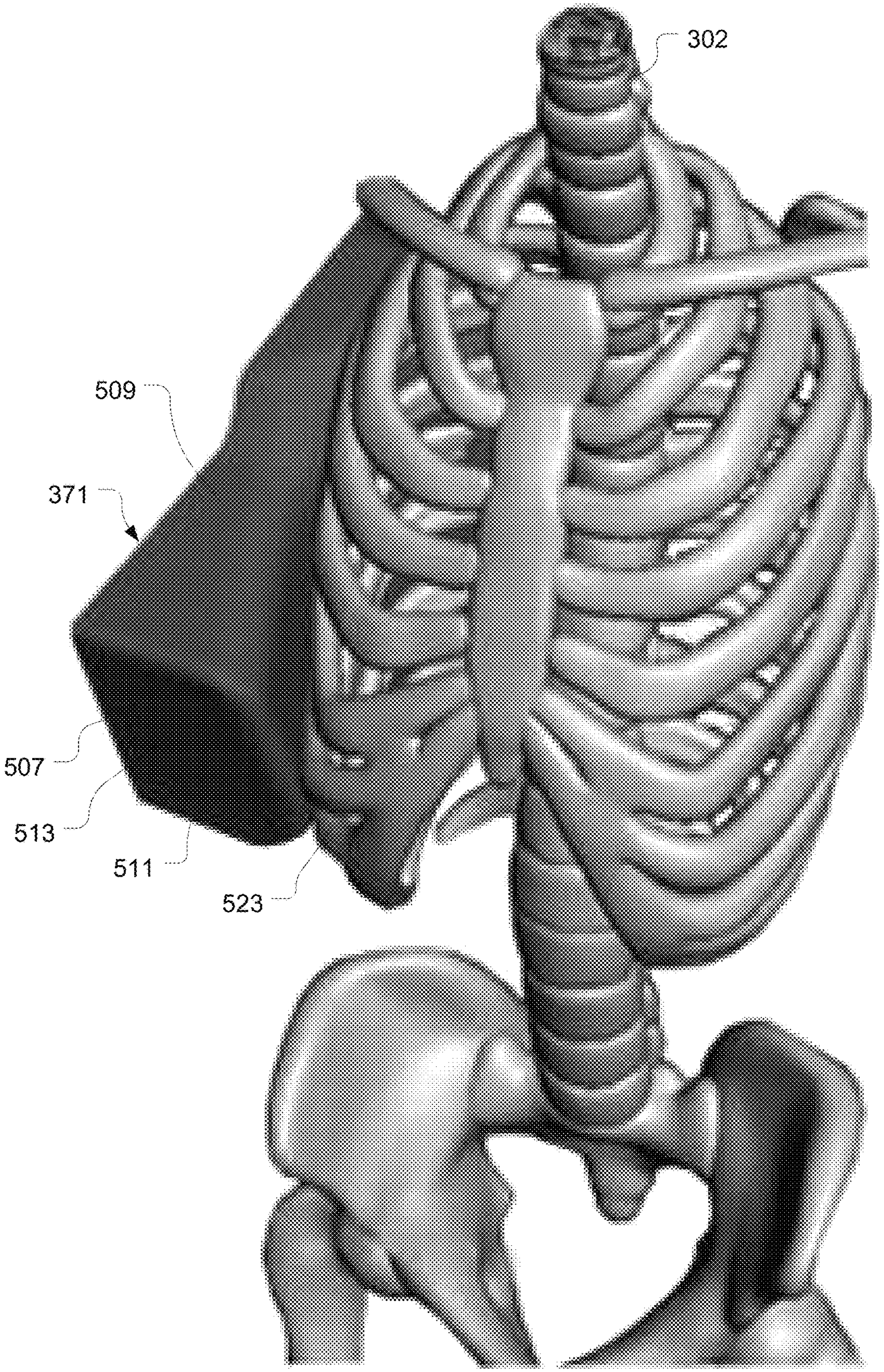

FIG. 75H shows a position and orientation of the primary thoracic driver relative to the rib cage of the person, from a point of view looking toward a left-front side of the person, in accordance with some embodiments of the present invention.

Figure 76A:
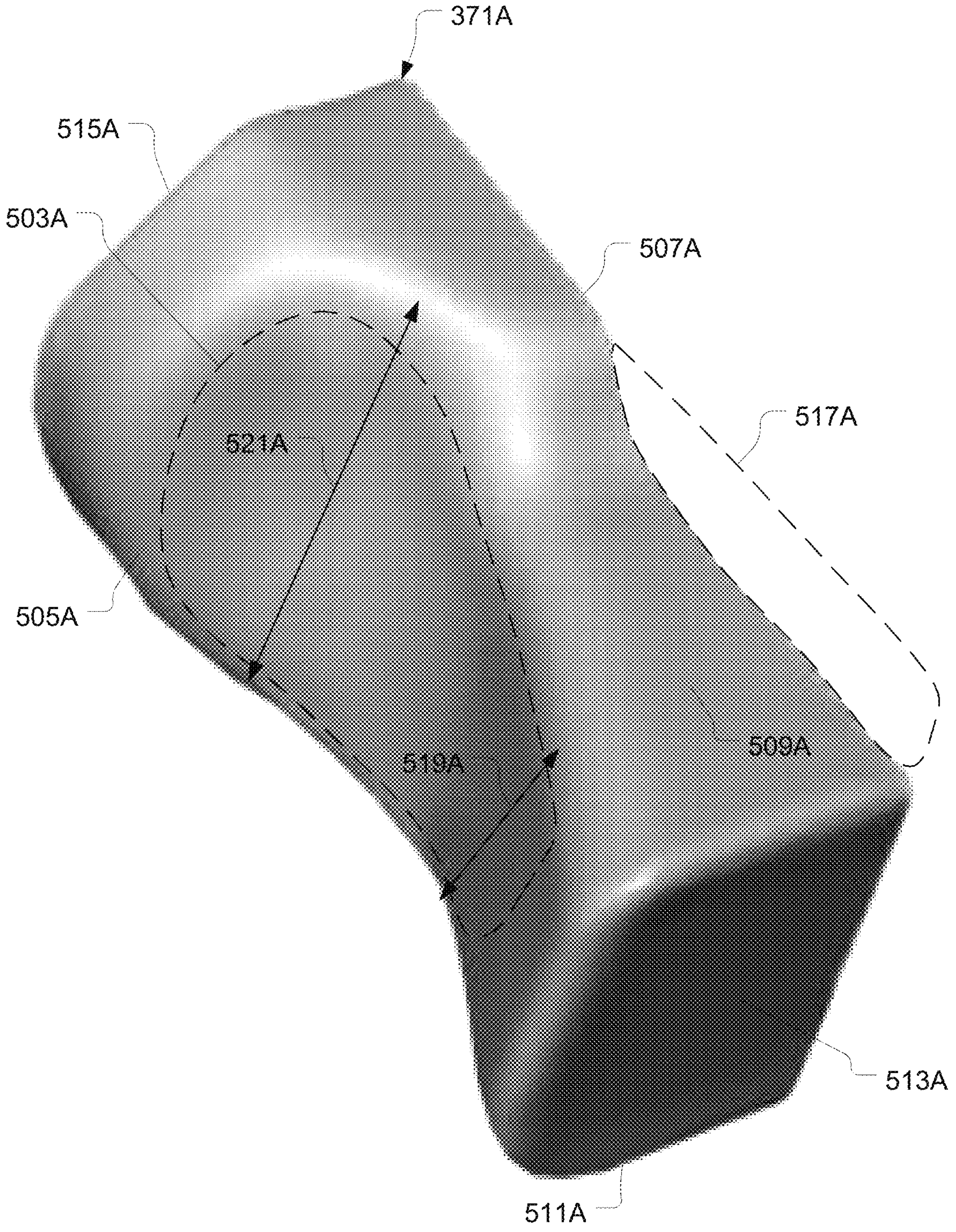

FIG. 76A shows a perspective view of a primary thoracic driver from a point of view looking toward a contact surface of the primary thoracic driver, where the primary thoracic driver has a laterally mirrored configuration relative to the primary thoracic driver of FIG. 75A, in accordance with some embodiments of the present invention.

Figure 76B:
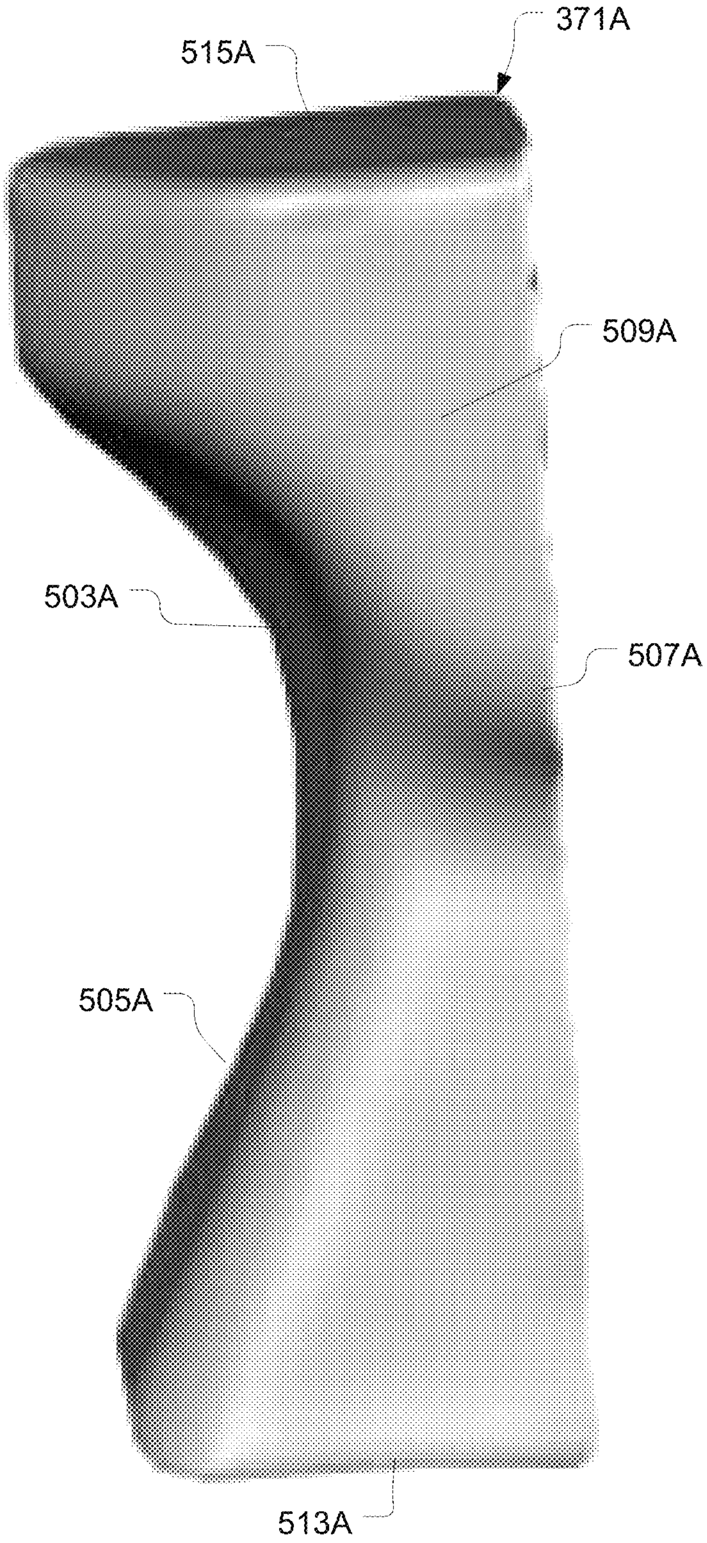

FIG. 76B shows a view of the primary thoracic driver of FIG. 76A from a point of view looking downward toward the top surface region of the primary thoracic driver, in accordance with some embodiments of the present invention.

Figure 76C:
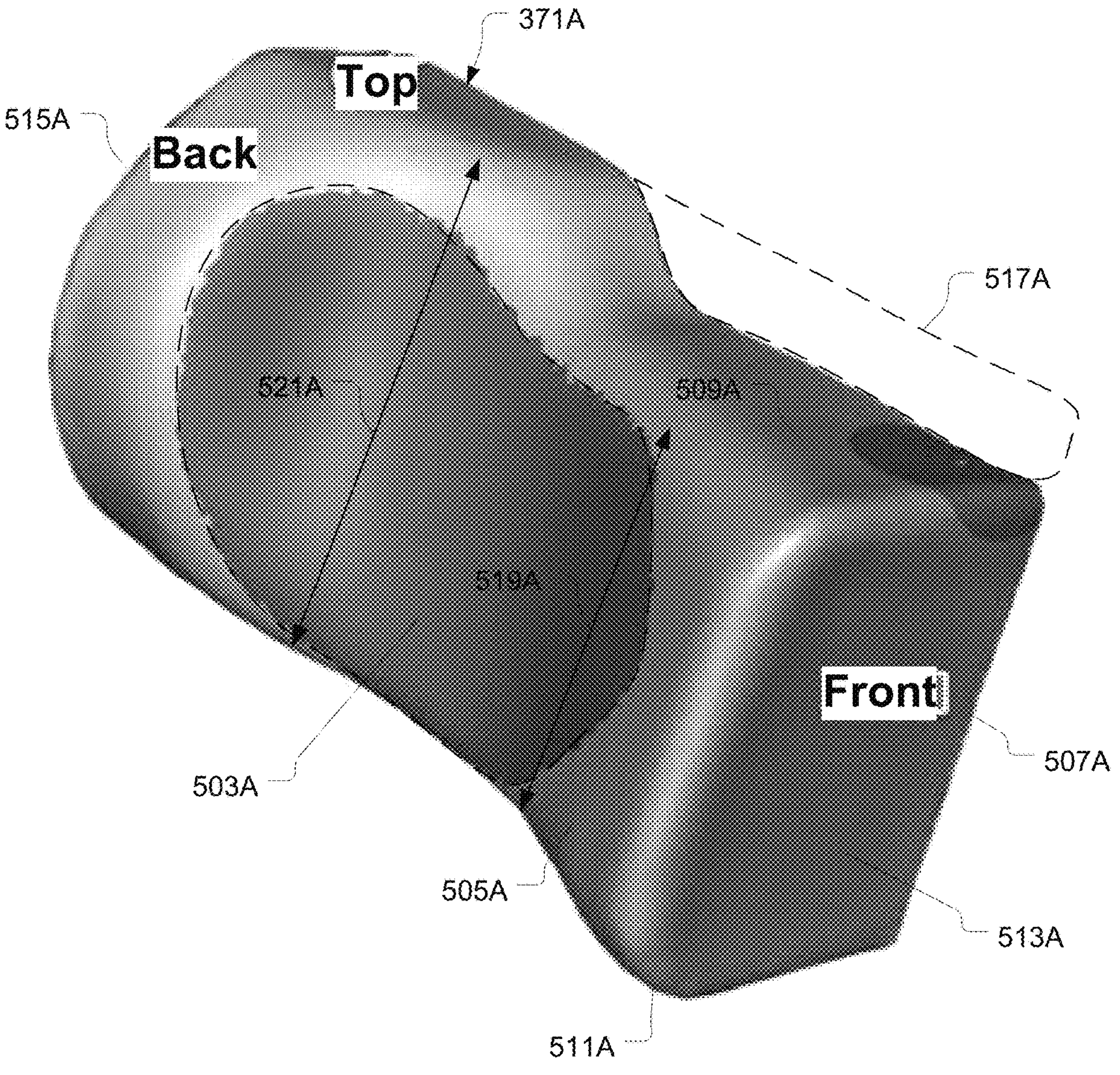

FIG. 76C shows another view of the primary thoracic driver of FIG. 76A from a point of view looking toward the contact surface of the primary thoracic driver, in accordance with some embodiments of the present invention.

Figure 76D:
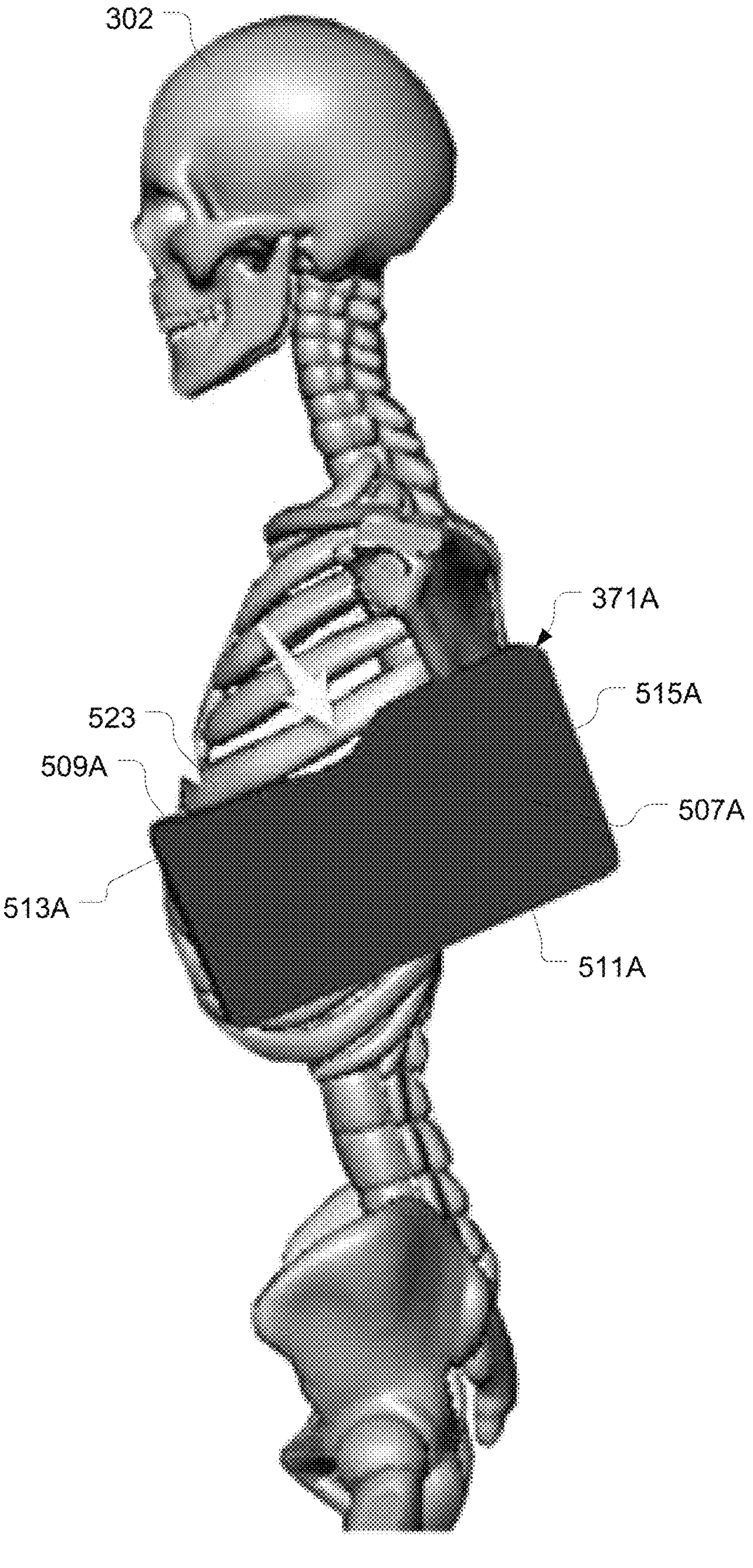

FIG. 76D shows a position and orientation of the primary thoracic driver of FIG. 76A relative to the rib cage of the person, from a point of view looking toward the left side of the person, in accordance with some embodiments of the present invention.

Figure 76E:
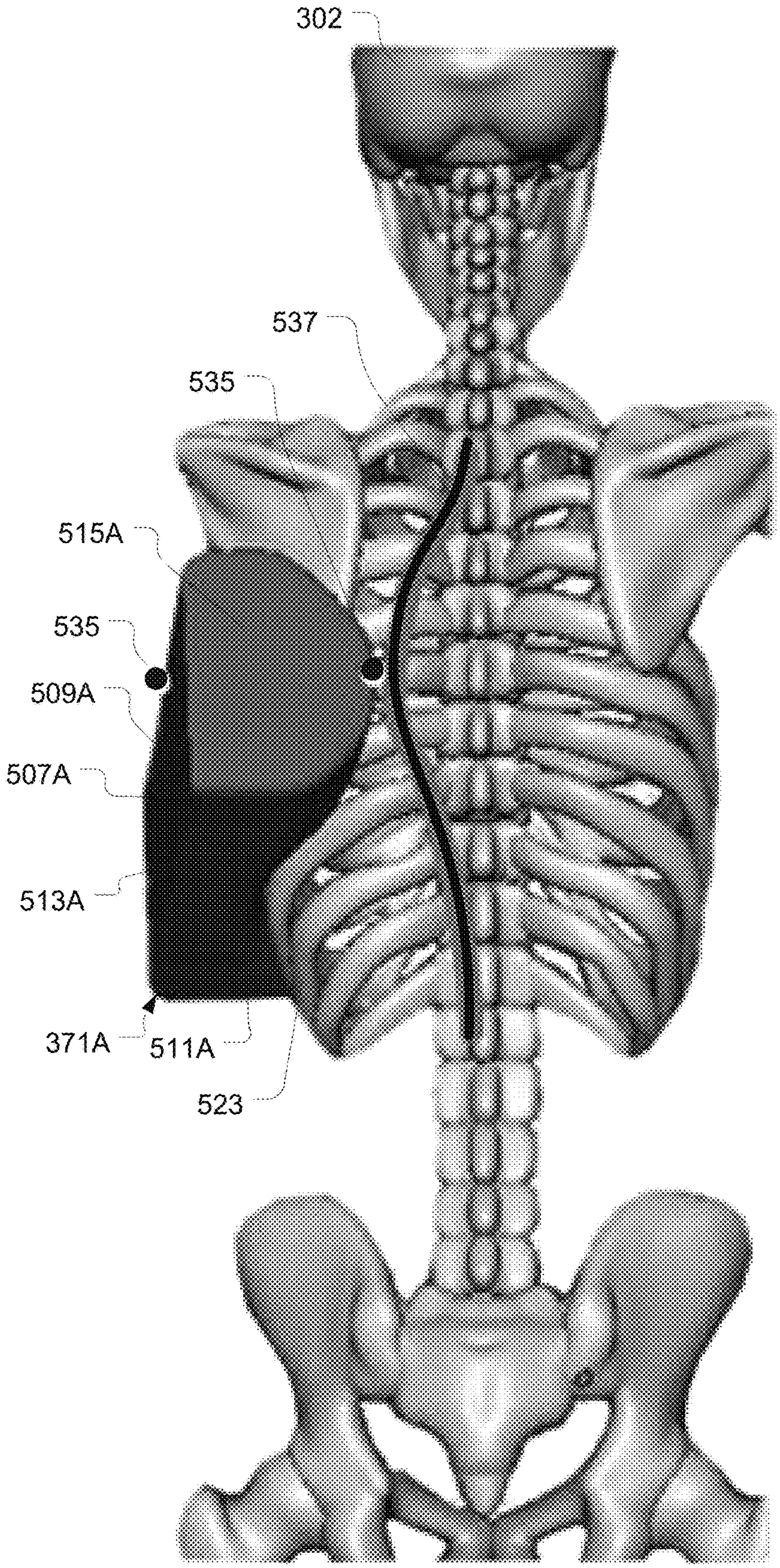

FIG. 76E shows a position and orientation of the primary thoracic driver of FIG. 76A relative to the rib cage of the person, from a point of view looking toward the back of the person, in accordance with some embodiments of the present invention.

Figure 76F:
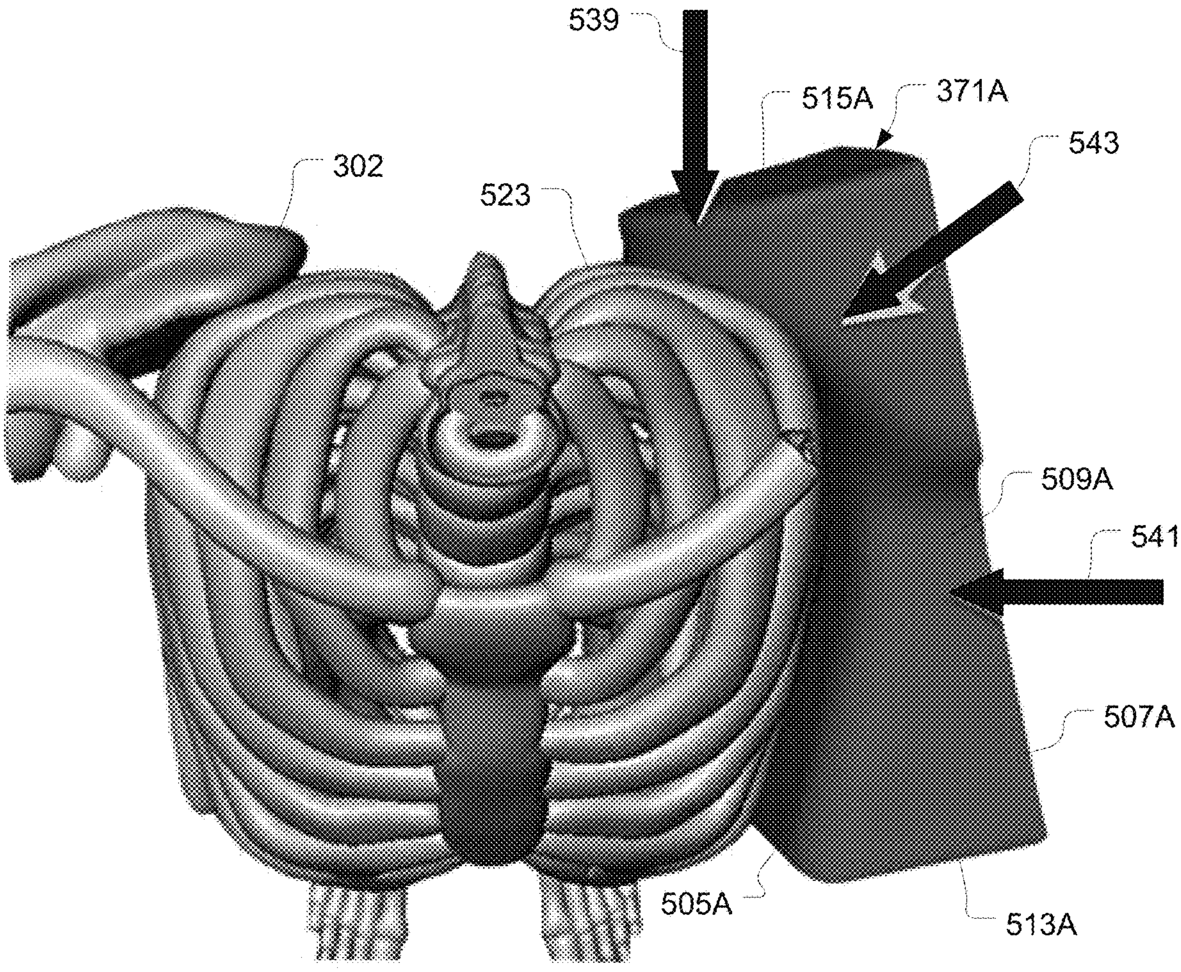

FIG. 76F shows a position and orientation of the primary thoracic driver of FIG. 76A relative to the rib cage of the person, from a point of view looking downward from a location above the person, in accordance with some embodiments of the present invention.

Figure 76G:
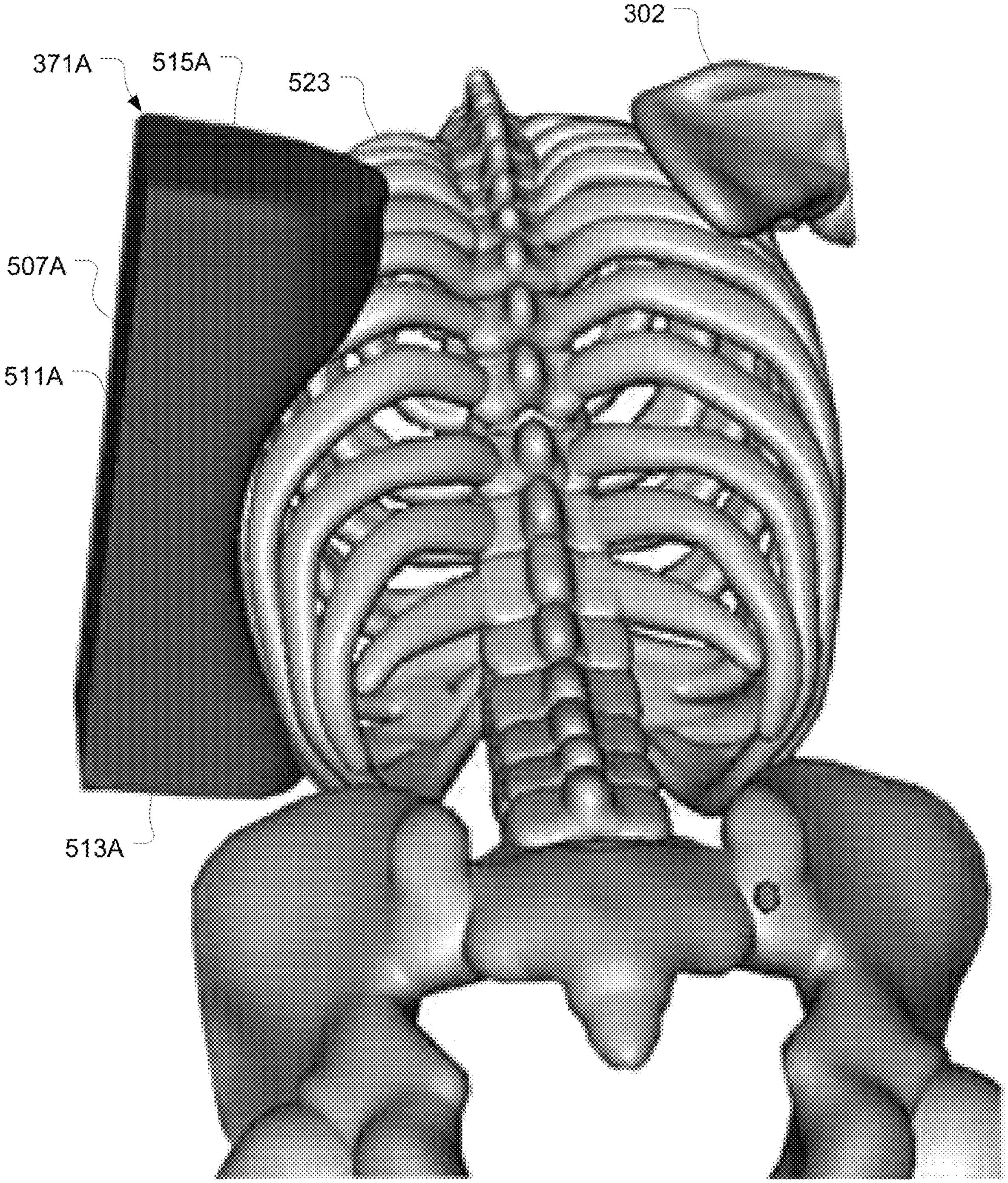

FIG. 76G shows a position and orientation of the primary thoracic driver of FIG. 76A relative to the rib cage of the person, from a point of view looking upward from a location below the person, in accordance with some embodiments of the present invention.

Figure 76H:
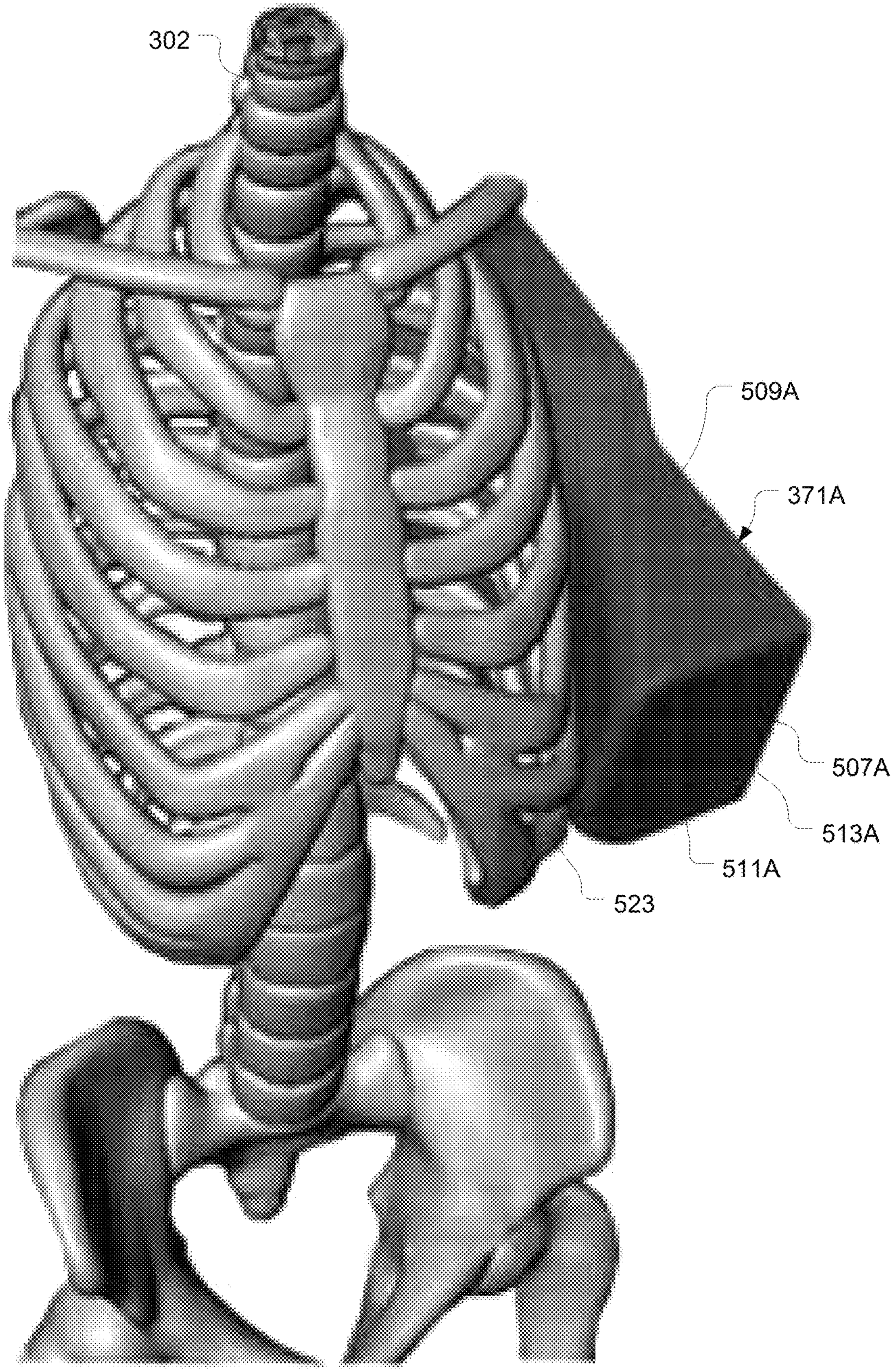

FIG. 76H shows a position and orientation of the primary thoracic driver of FIG. 76A relative to the rib cage of the person, from a point of view looking toward a right-front side of the person, in accordance with some embodiments of the present invention.

Figure 77A:
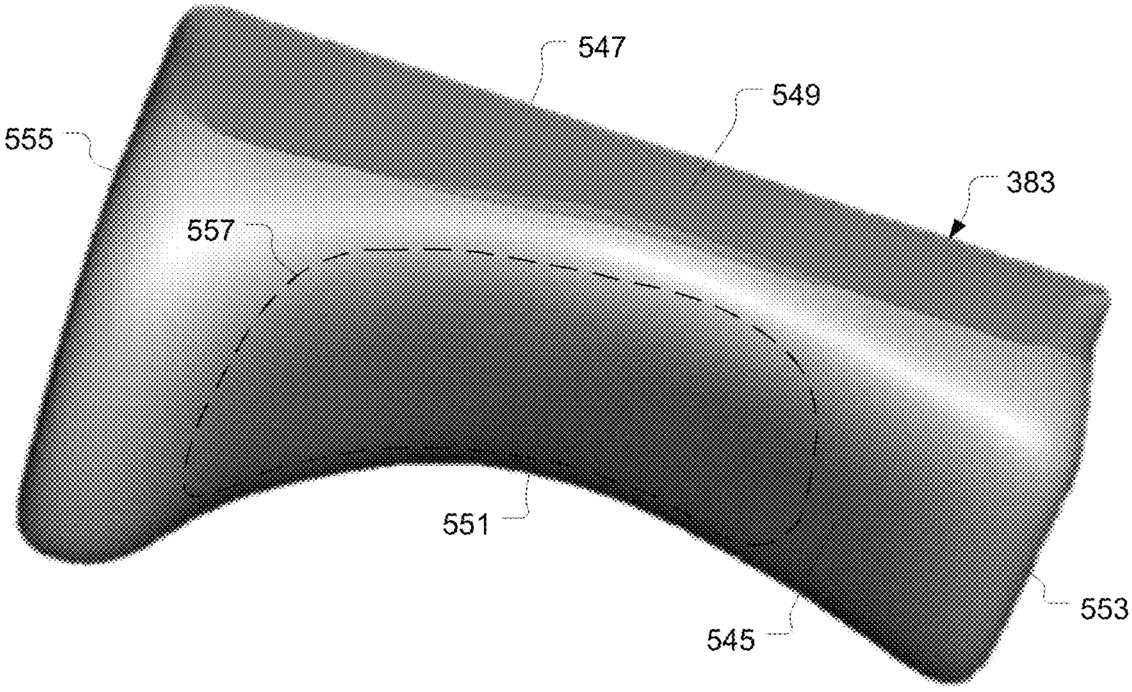

FIG. 77A shows a perspective view of the proximal thoracic driver from a point of view looking downward toward an inner side of the proximal thoracic driver, in accordance with some embodiments of the present invention.

Figure 77B:
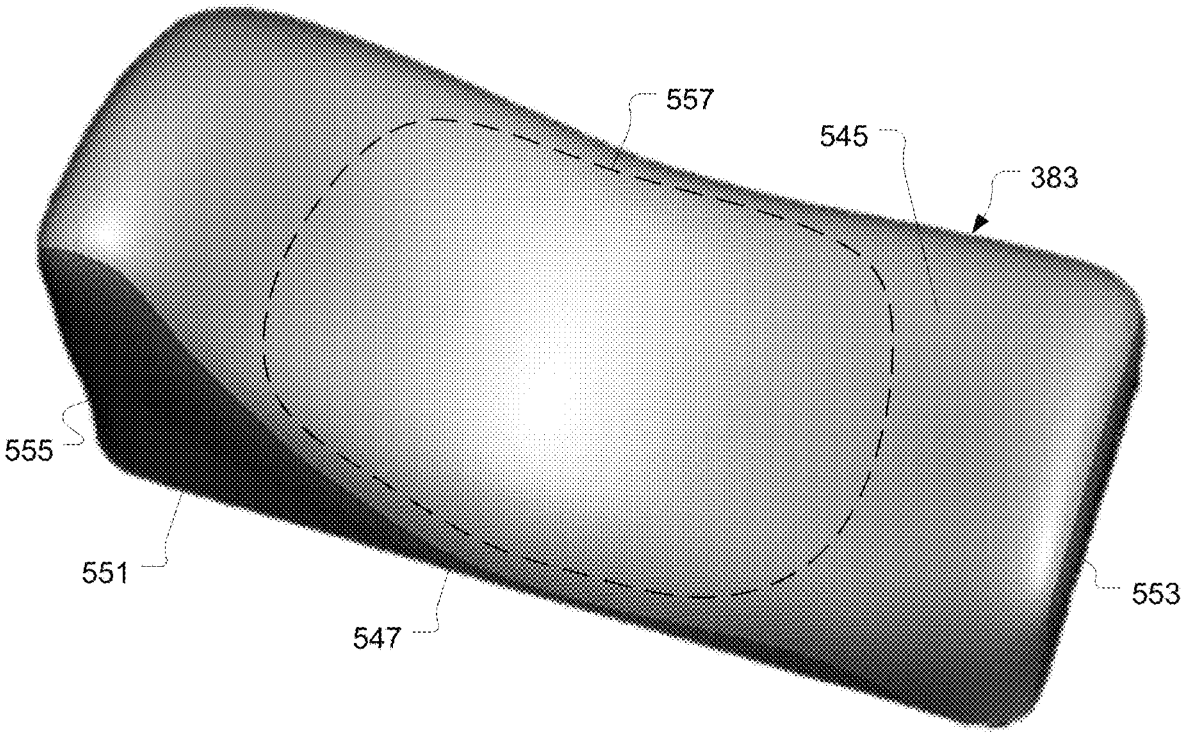

FIG. 77B shows a perspective view of the proximal thoracic driver from a point of view looking upward toward the inner side of the proximal thoracic driver, in accordance with some embodiments of the present invention.

Figure 77C:
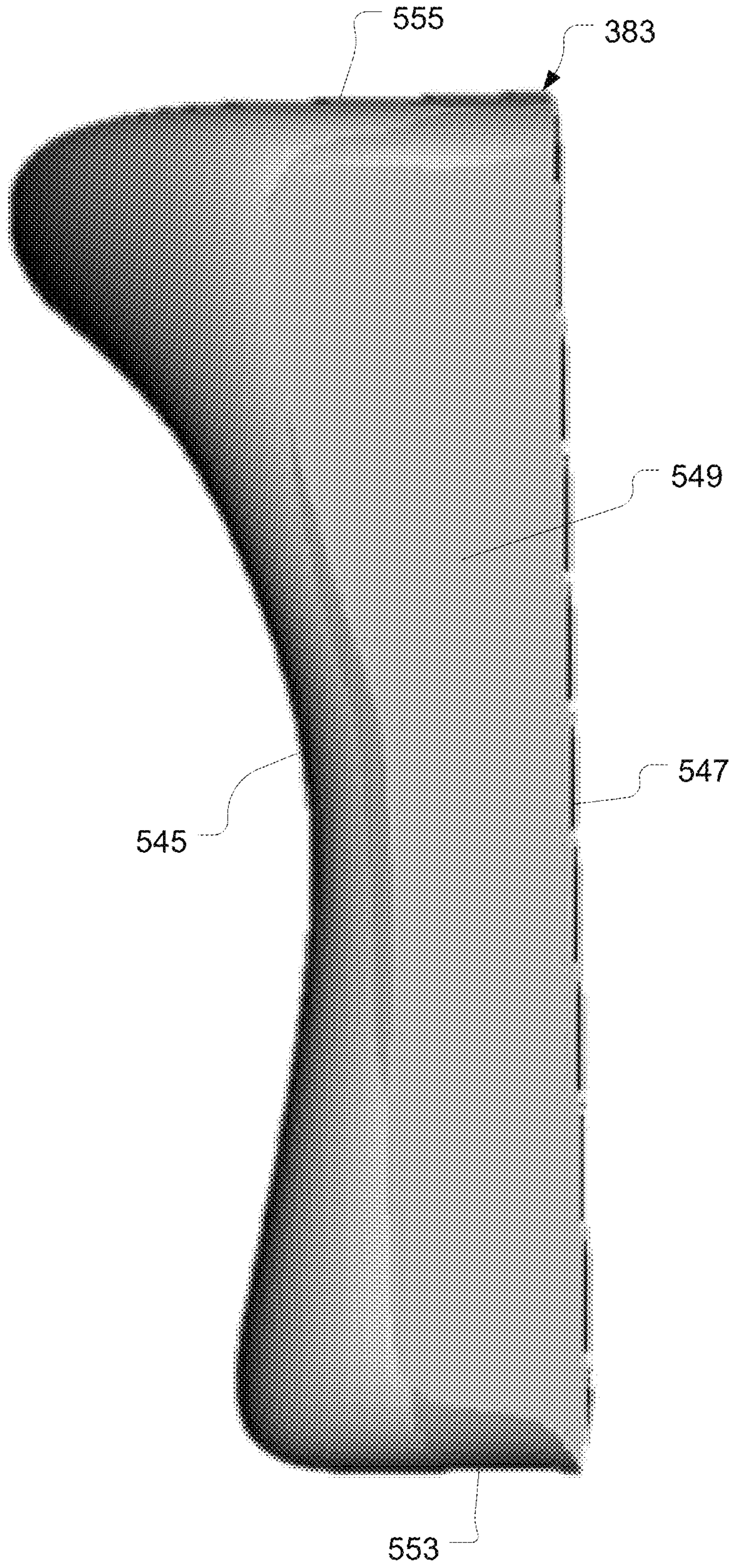

FIG. 77C shows a top view of the proximal thoracic driver, in accordance with some embodiments of the present invention.

Figure 77D:
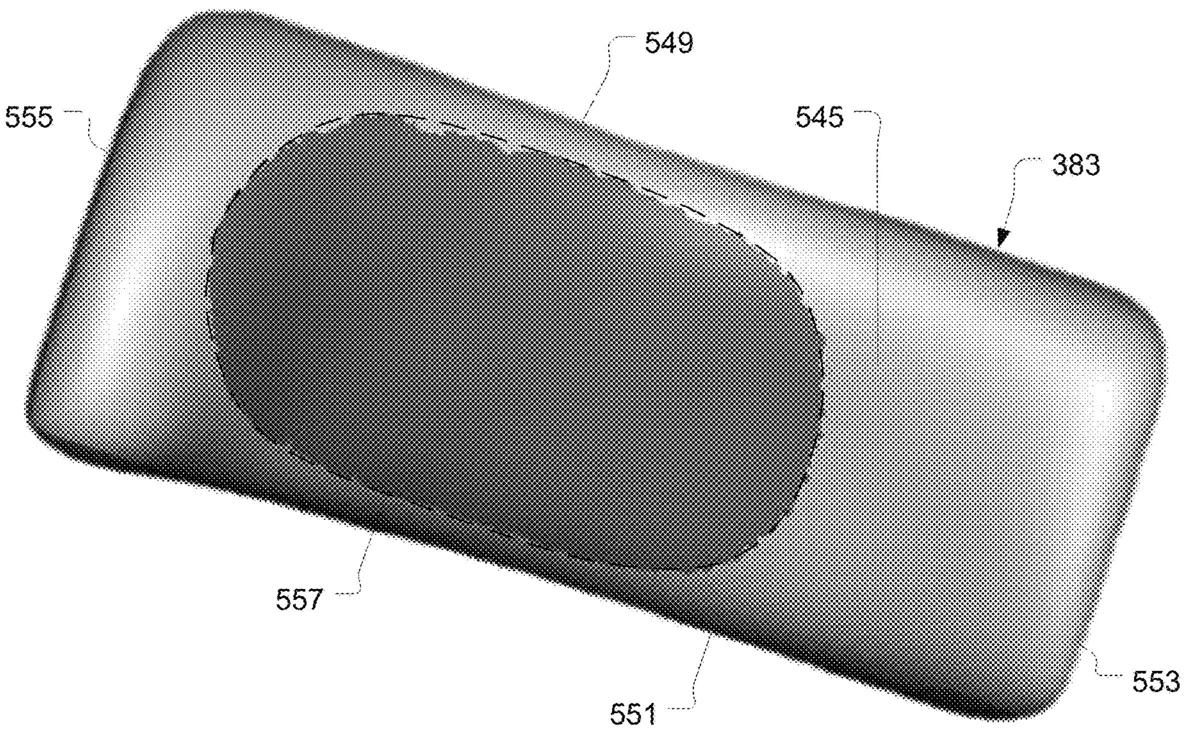

FIG. 77D shows a view of the proximal thoracic driver from a point of view looking toward the inner side of the proximal thoracic driver, in accordance with some embodiments of the present invention.

Figure 77E:
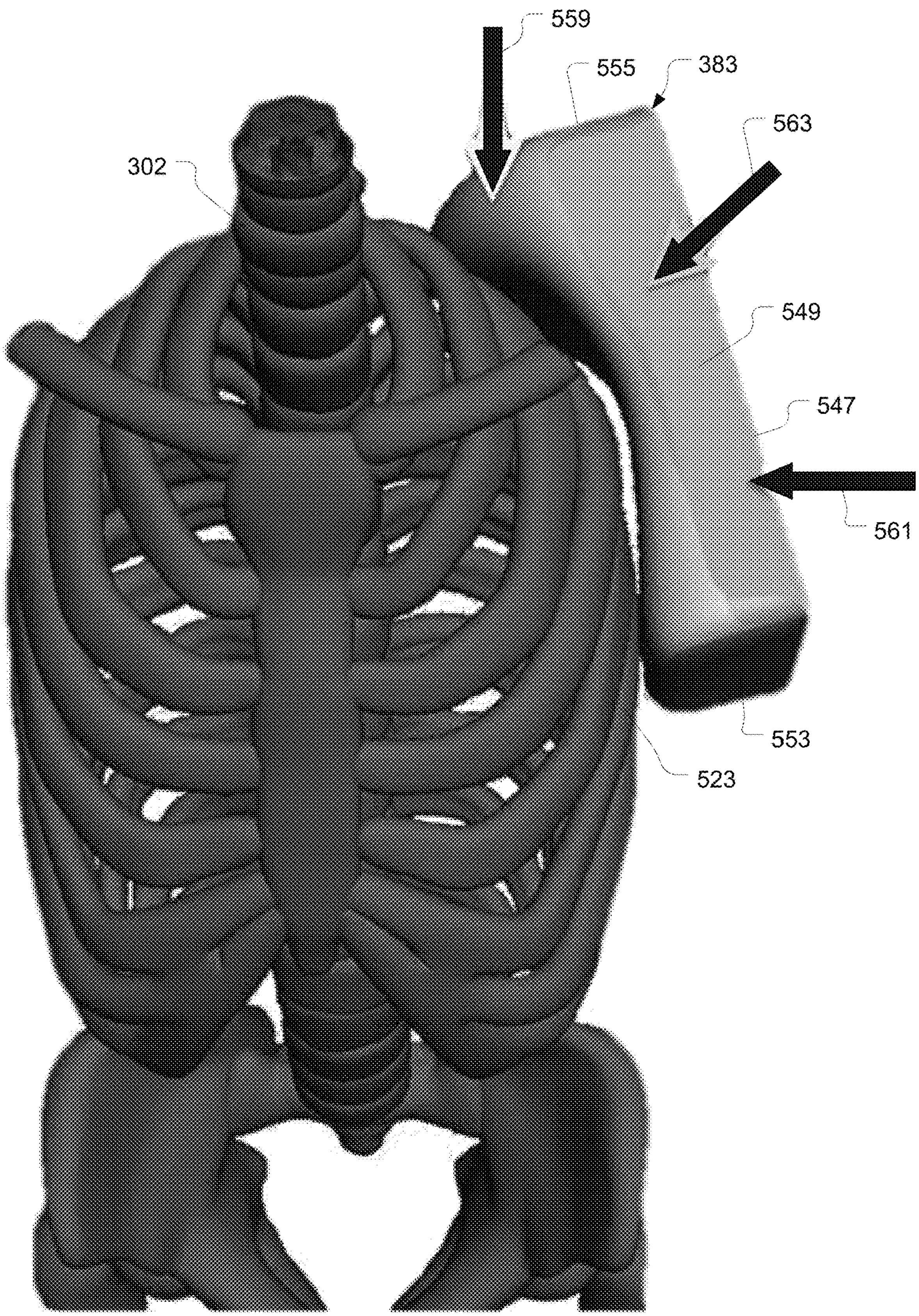

FIG. 77E shows an example position and orientation of the proximal thoracic driver when applied to the upper rib cage of the person, from a point of view looking toward the front of the person, in accordance with some embodiments of the present invention.

Figure 77F:
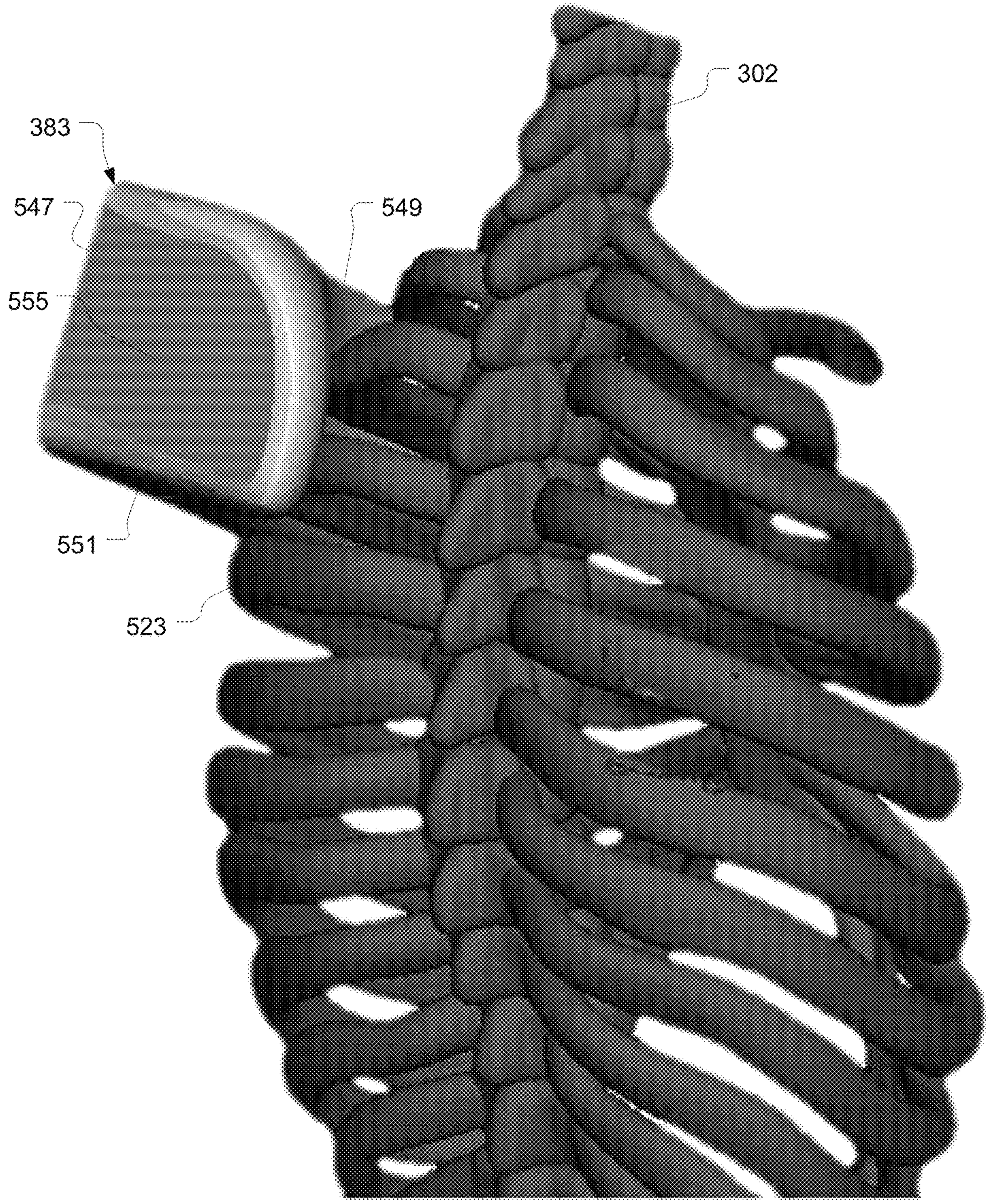

FIG. 77F shows an example position and orientation of the proximal thoracic driver when applied to the upper rib cage of the person, from a point of view looking toward the back of the person, in accordance with some embodiments of the present invention.

Figure 78A:
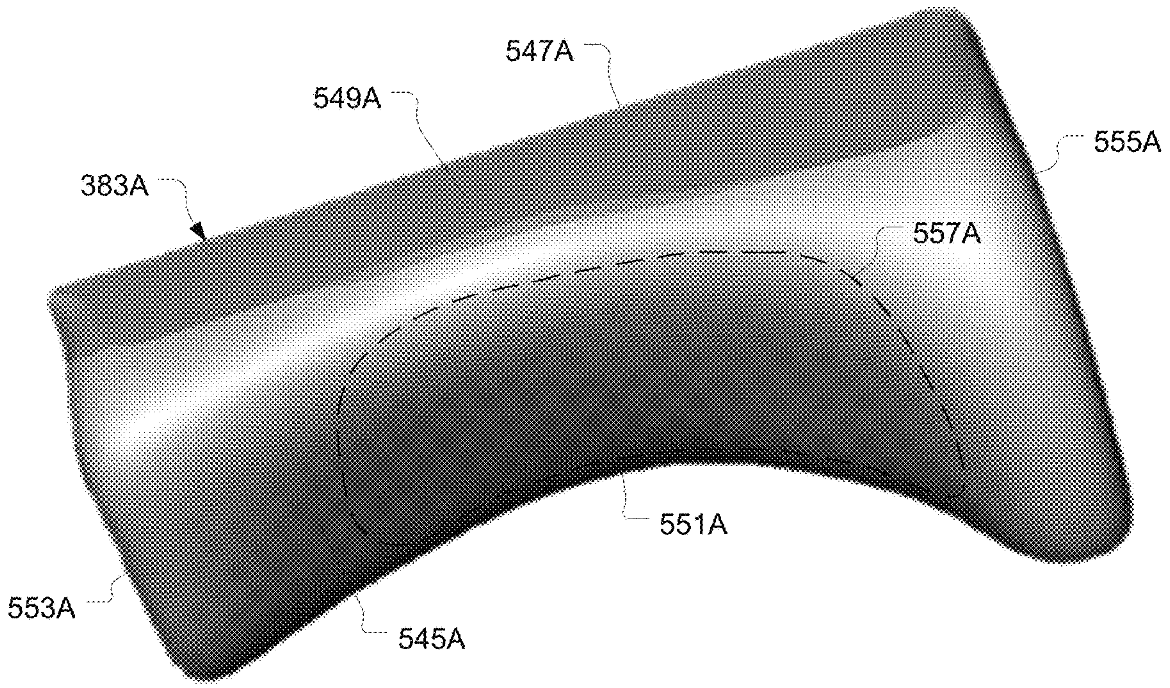

FIG. 78A shows a perspective view of a proximal thoracic driver from a point of view looking downward toward an inner side of the proximal thoracic driver, where the proximal thoracic driver has a laterally mirrored configuration relative to the proximal thoracic driver of FIG. 77A, in accordance with some embodiments of the present invention.

Figure 78B:
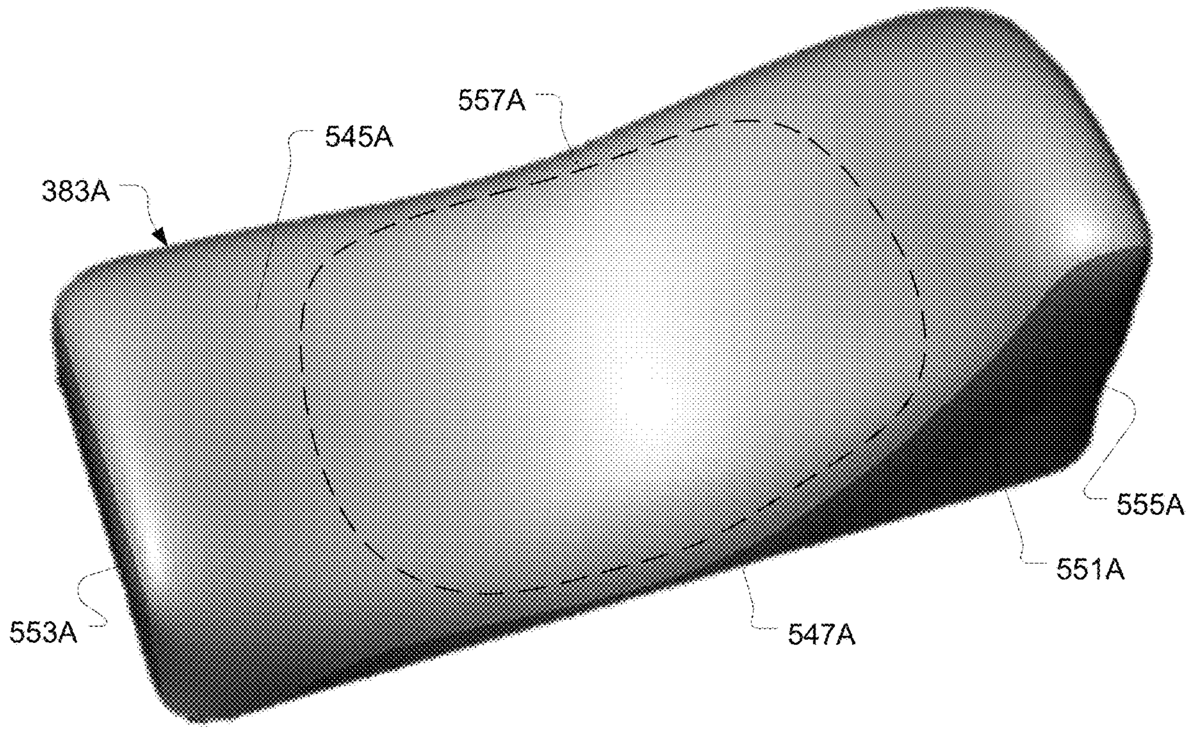

FIG. 78B shows a perspective view of the proximal thoracic driver of FIG. 78A from a point of view looking upward toward the inner side of the proximal thoracic driver, in accordance with some embodiments of the present invention.

Figure 78C:
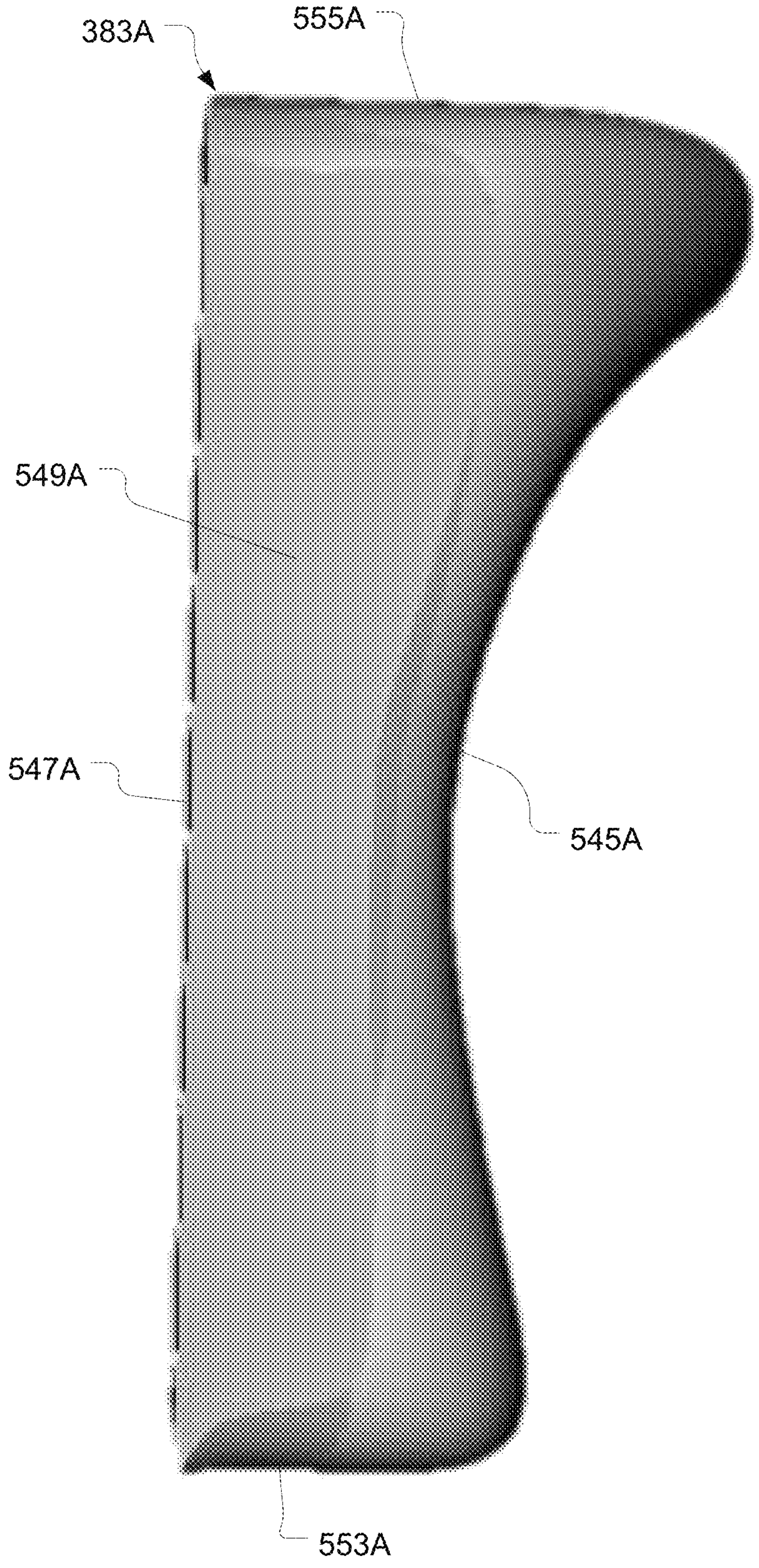

FIG. 78C shows a top view of the proximal thoracic driver of FIG. 78A, in accordance with some embodiments of the present invention.

Figure 78D:
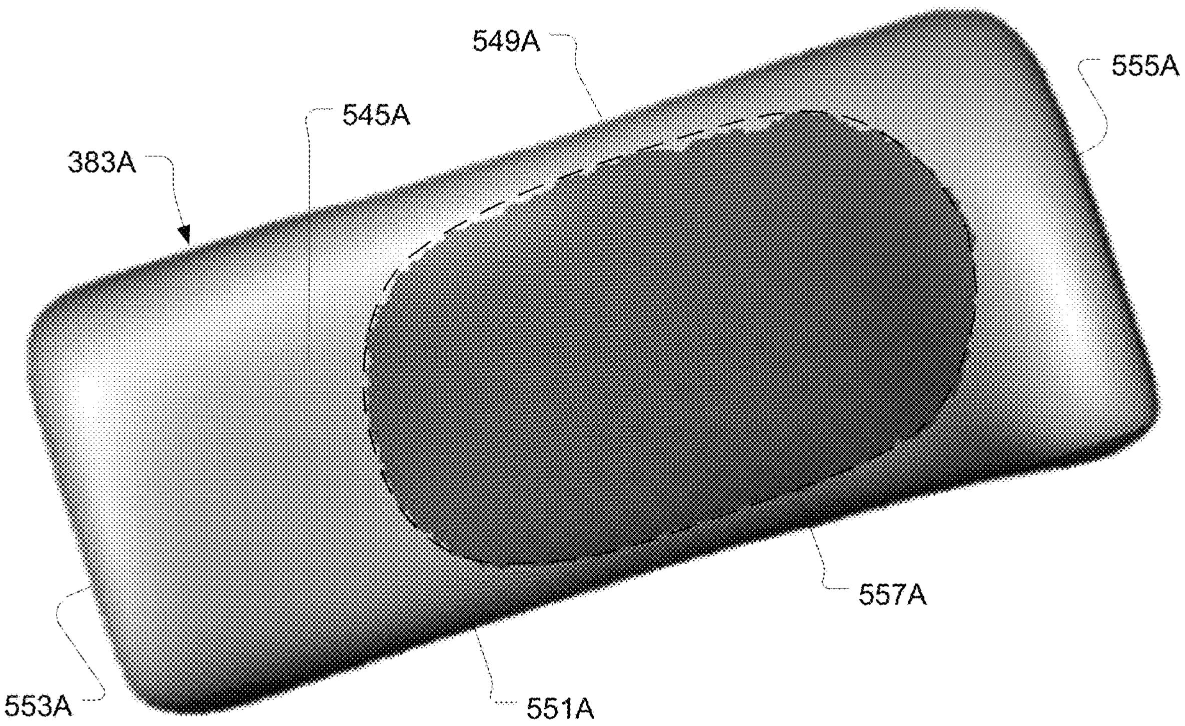

FIG. 78D shows a view of the proximal thoracic driver of FIG. 78A from a point of view looking toward the inner side of the proximal thoracic driver, in accordance with some embodiments of the present invention.

Figure 78E:
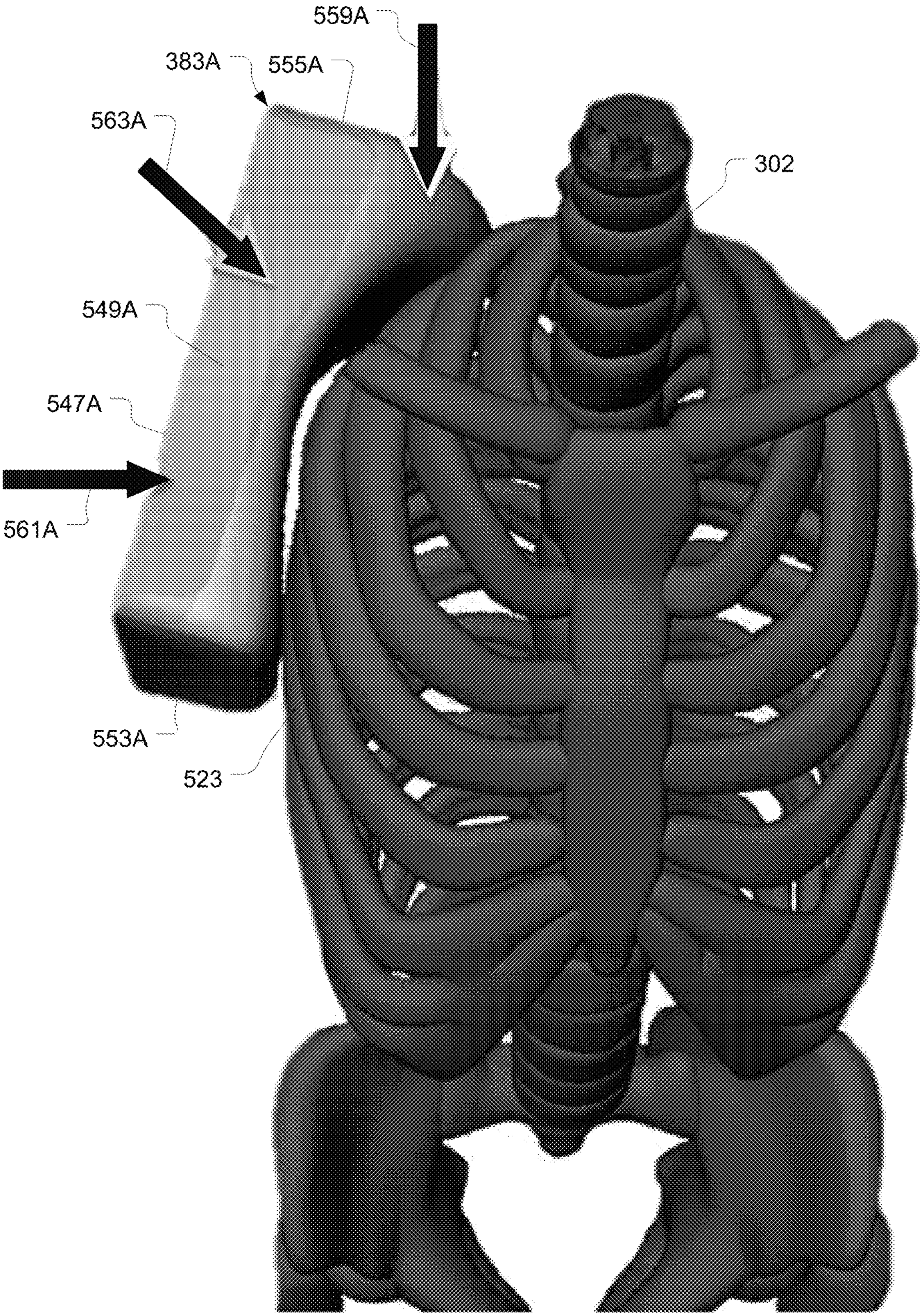

FIG. 78E shows an example position and orientation of the proximal thoracic driver of FIG. 78A when applied to the upper rib cage of the person, from a point of view looking toward the front of the person, in accordance with some embodiments of the present invention.

Figure 78F:
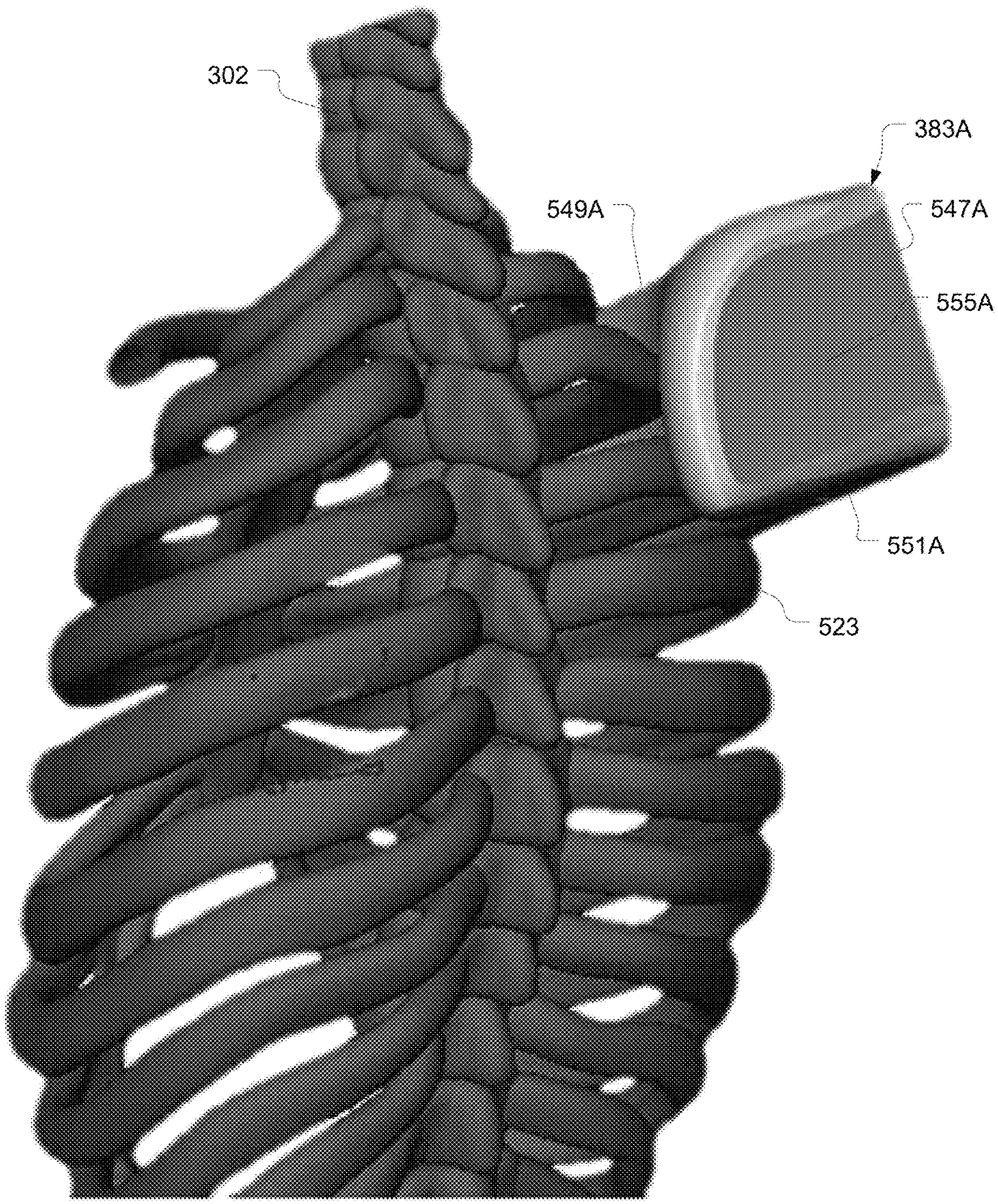

FIG. 78F shows an example position and orientation of the proximal thoracic driver of FIG. 78A when applied to the upper rib cage of the person, from a point of view looking toward the back of the person, in accordance with some embodiments of the present invention.

Figure 79A:
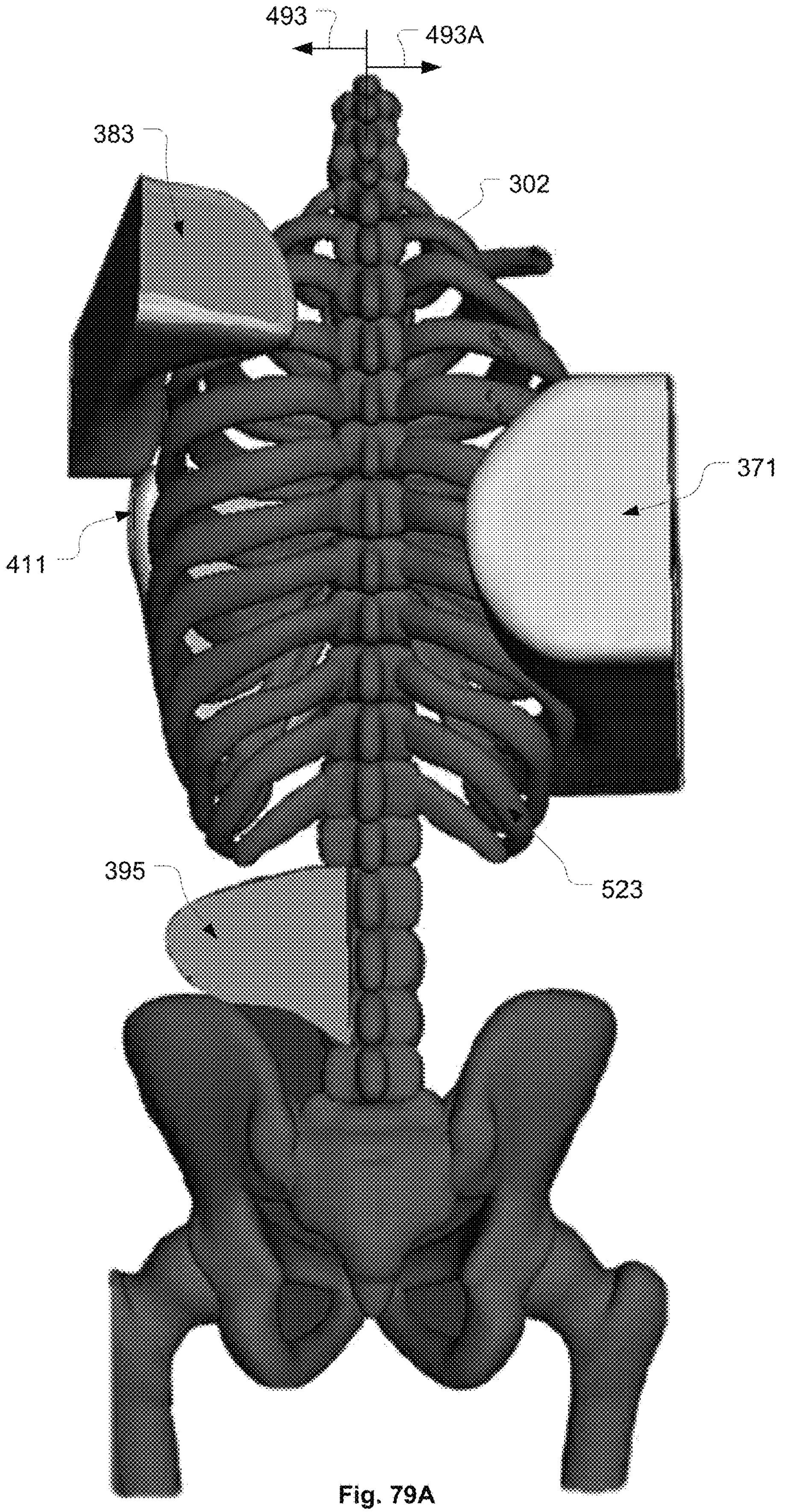

FIG. 79A shows a back view of the person with a combination of the lumbar derotator driver, the primary thoracic driver, the anterior thoracic driver, and the proximal thoracic driver applied to the person, in accordance with some embodiments of the present invention.

Figure 79B:
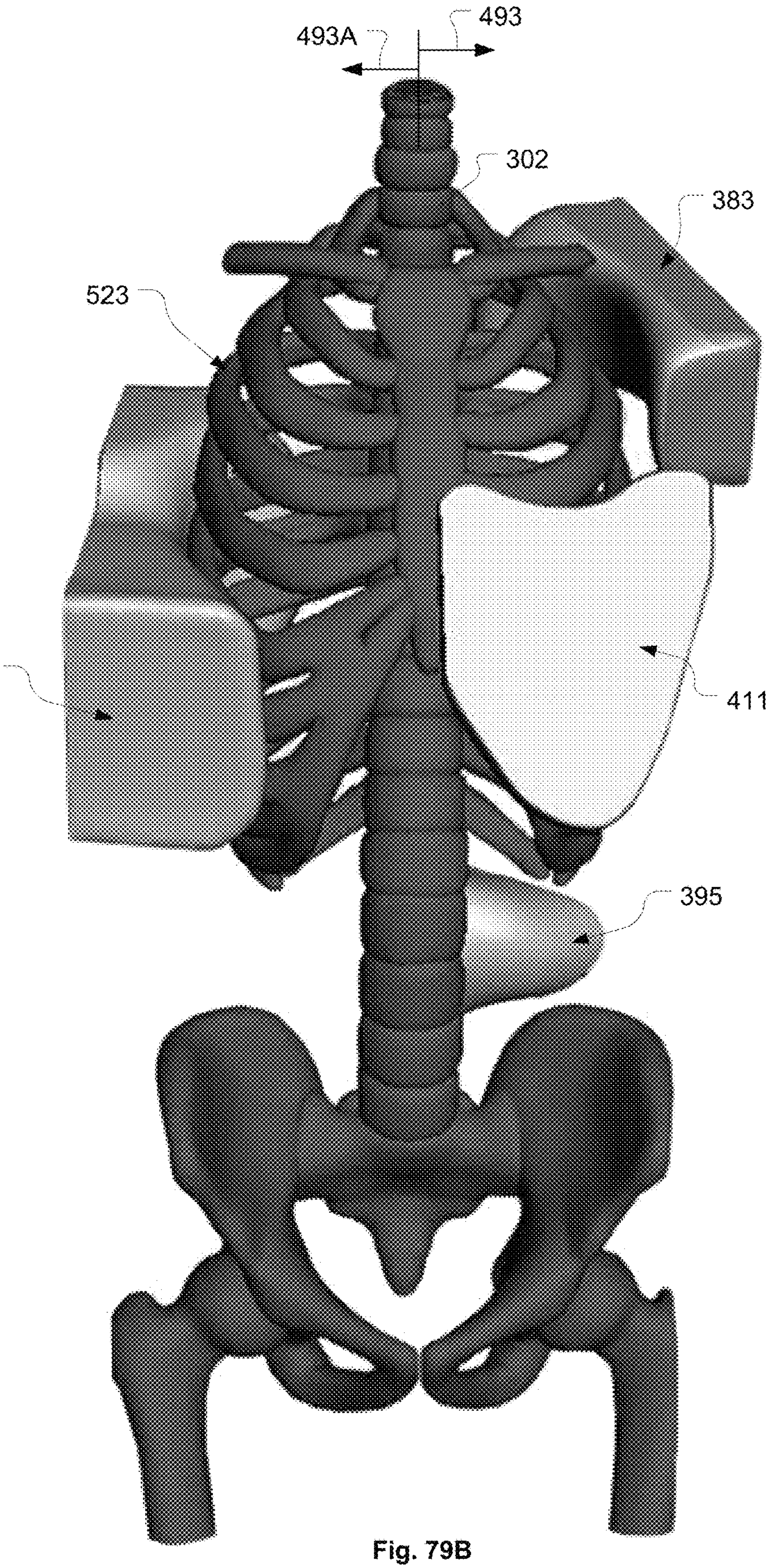

FIG. 79B shows a front view of the person with the combination of the lumbar derotator driver, the primary thoracic driver, the anterior thoracic driver, and the proximal thoracic driver applied to the person, in accordance with some embodiments of the present invention.

Figure 79C:
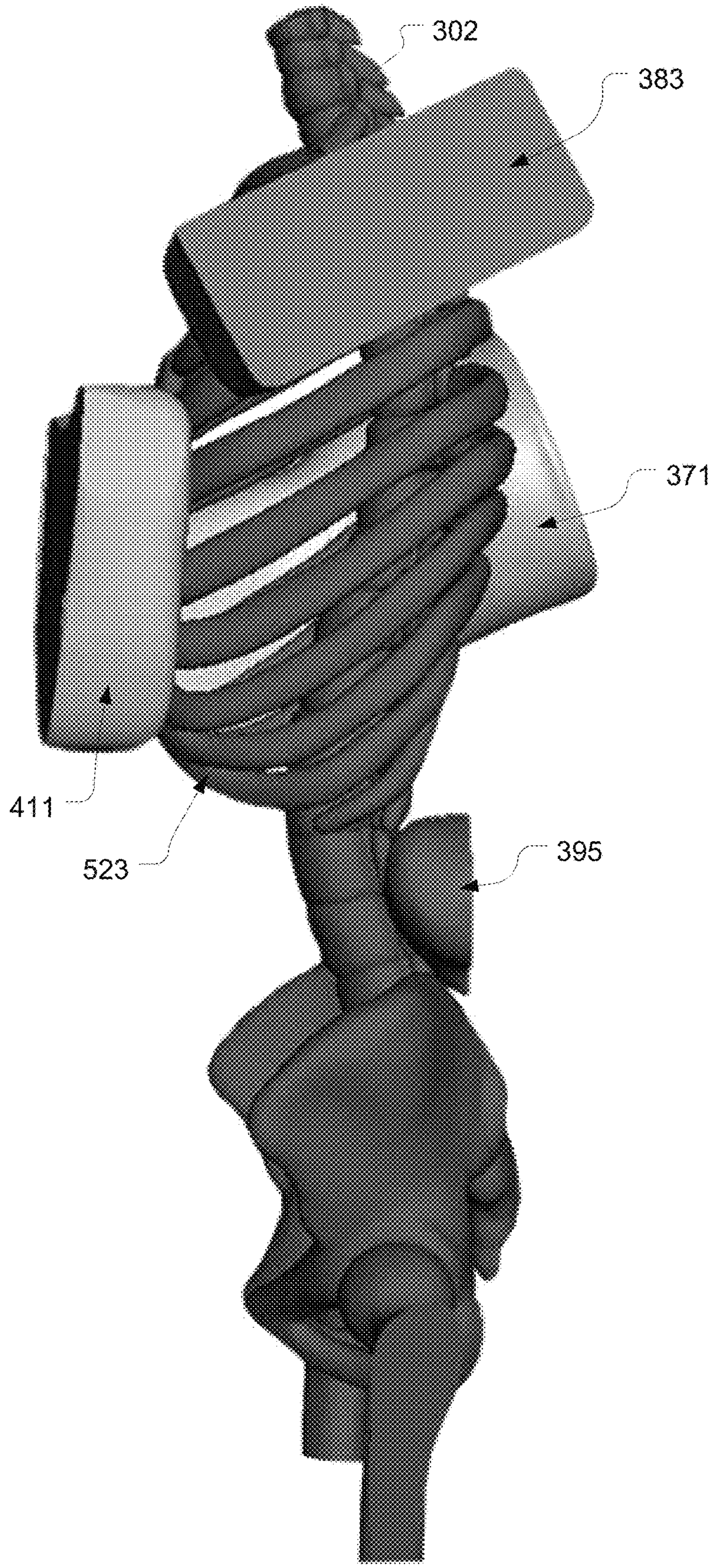

FIG. 79C shows a left side view of the person with the combination of the lumbar derotator driver, the primary thoracic driver, the anterior thoracic driver, and the proximal thoracic driver applied to the person, in accordance with some embodiments of the present invention.

Figure 80A:
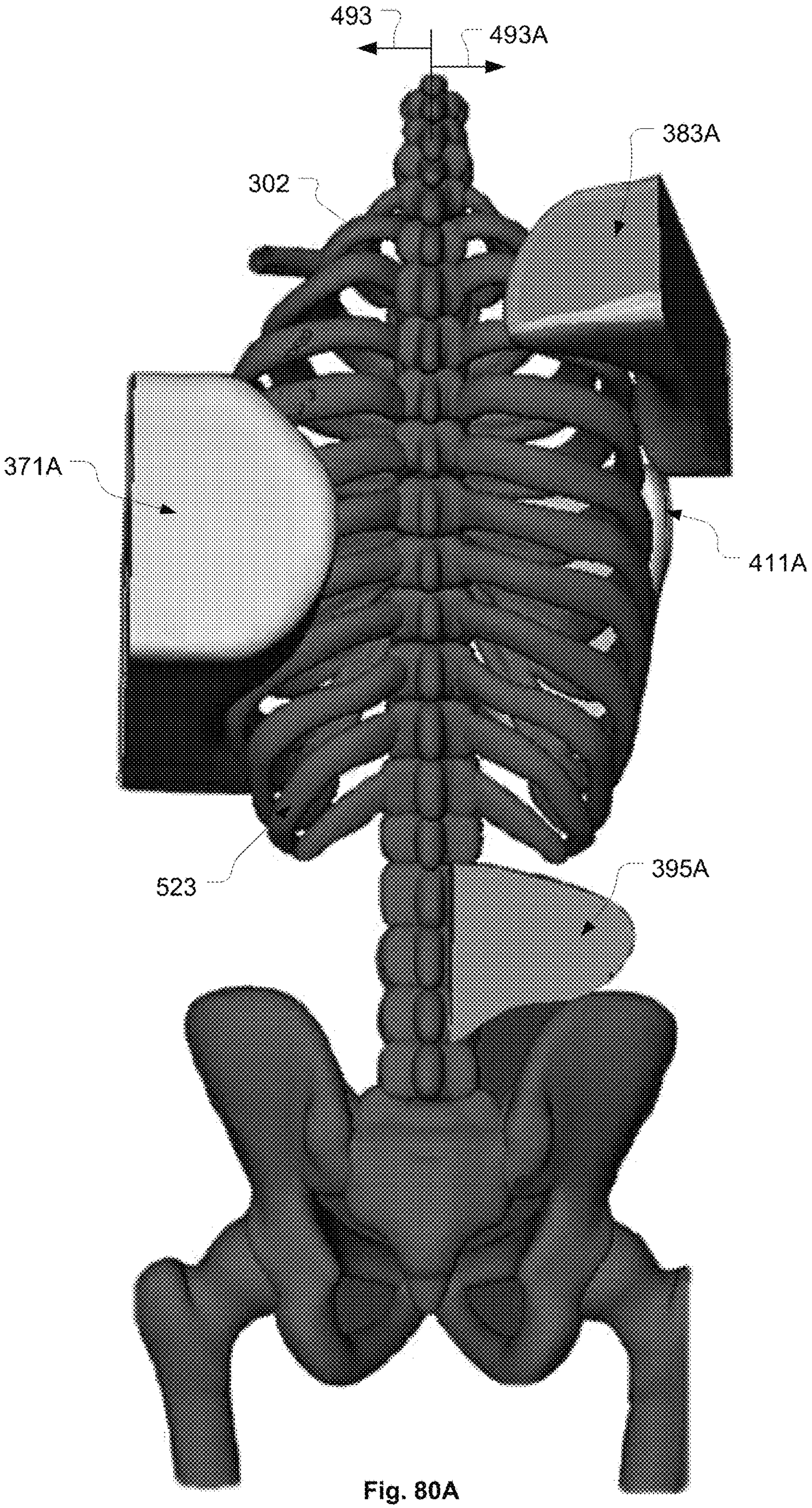

FIG. 80A shows a back view of the person with a combination of the lumbar derotator driver, the primary thoracic driver, the anterior thoracic driver, and the proximal thoracic driver applied to the person, in accordance with some embodiments of the present invention.

Figure 80B:
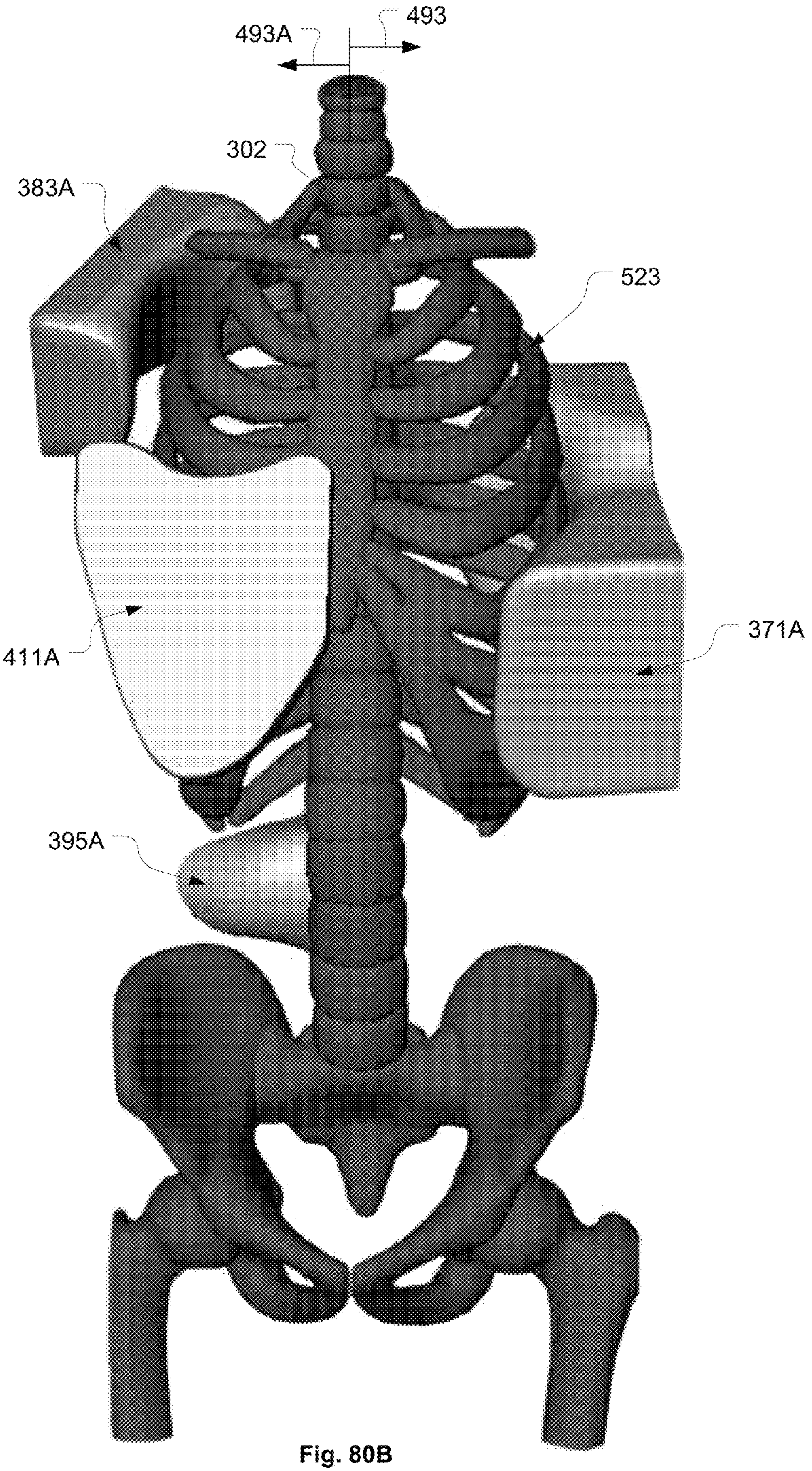

FIG. 80B shows a front view of the person with the combination of the lumbar derotator driver, the primary thoracic driver, the anterior thoracic driver, and the proximal thoracic driver applied to the person, in accordance with some embodiments of the present invention.

Figure 80C:
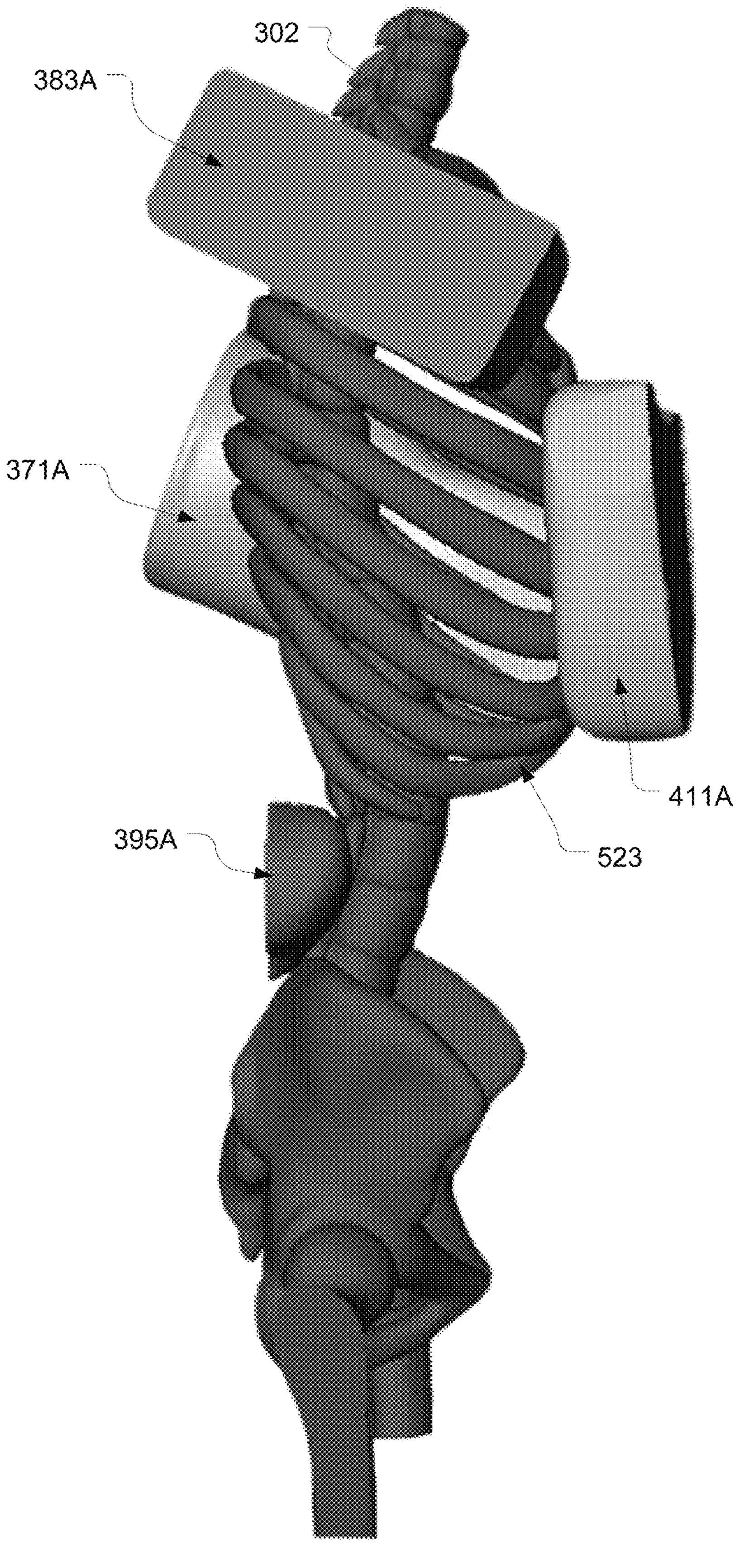

FIG. 80C shows a right side view of the person with the combination of the lumbar derotator driver, the primary thoracic driver, the anterior thoracic driver, and the proximal thoracic driver applied to the person, in accordance with some embodiments of the present invention.

Figure 81:
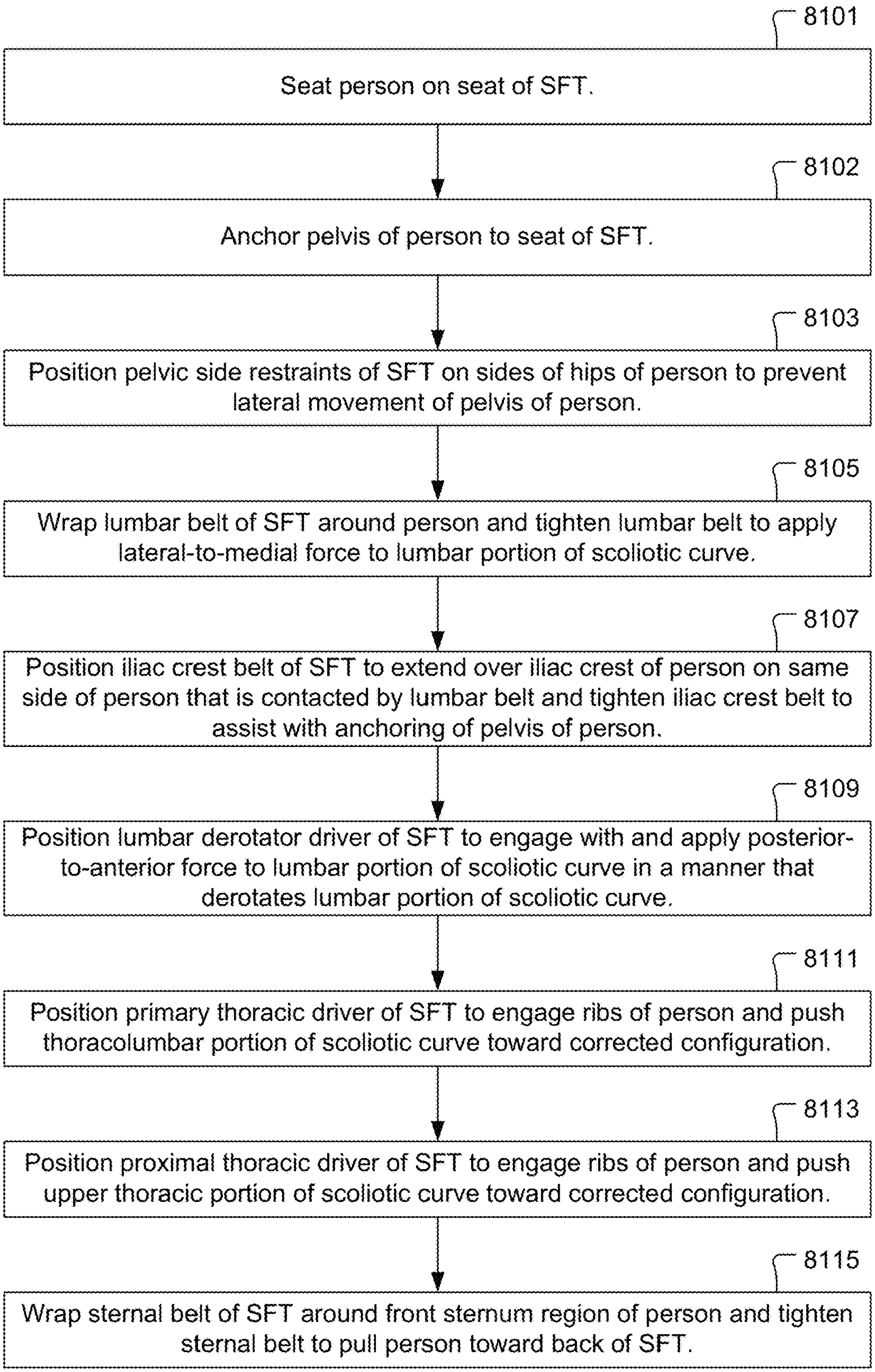

FIG. 81 shows a flowchart of a method for fitting the person into the SFT, in accordance with some embodiments of the present invention.

Figure 82:
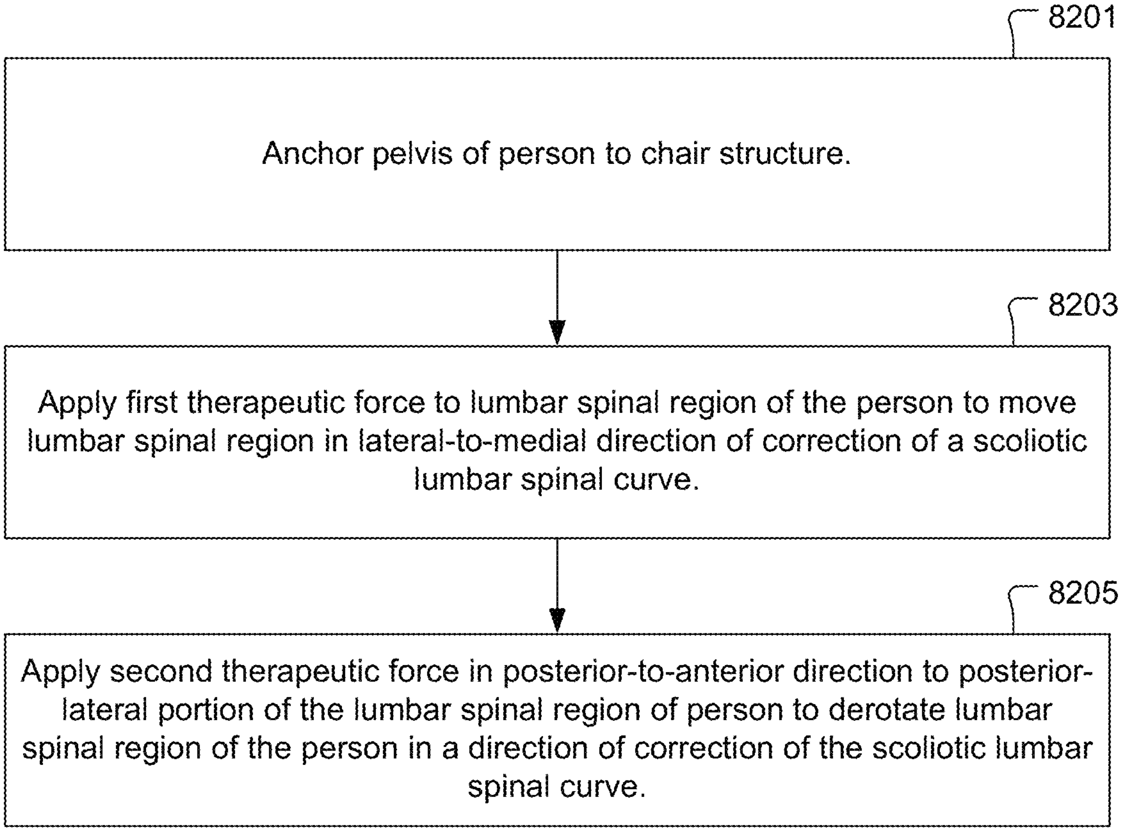

FIG. 82 shows a flowchart of a method for treating a person having a scoliotic spinal configuration, in accordance with some embodiments of the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Inflexibility of the human spine, caused by contractures, is one of the main limiting factors when trying to straighten a scoliotic curve of the human spine. Contractures occur when the spine remains in the scoliotic posture and does not get a chance to exercise its full normal range of motion. If the joints of the spine are not exercised through their full normal range of motion, the ligaments and muscles associated with the joints become short and stiff. More specifically, muscles, ligaments, and discs become short on the short concave side of the scoliotic curve and grow long on the long convex side of the scoliotic curve. The term contracture (or spinal contracture) describes the change in soft tissue (muscles, ligaments, discs) that binds the human spine into a scoliotic posture.

Figure 2A:
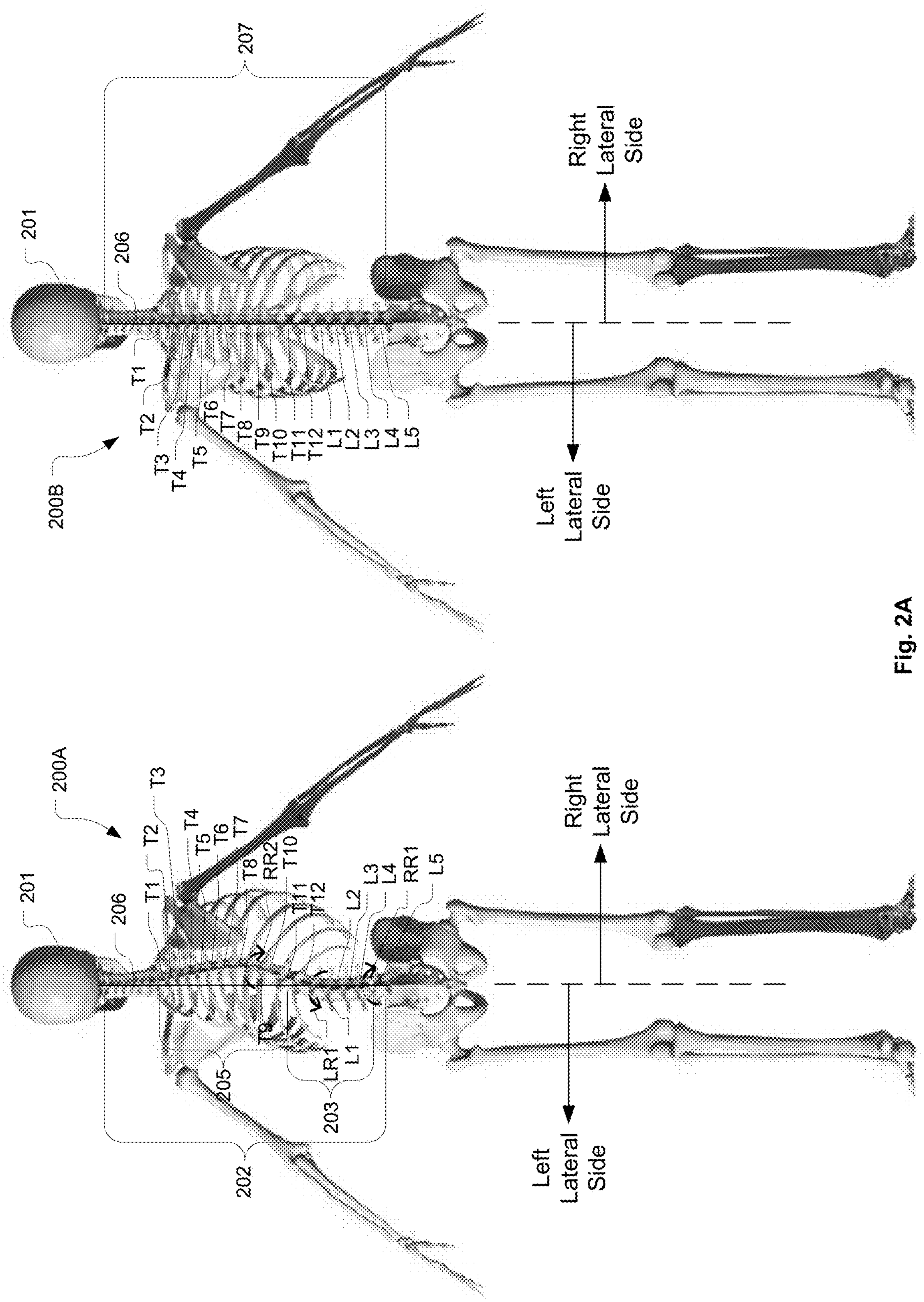
FIG. 2A shows a posterior view of a skeleton of a human exhibiting an example scoliotic spinal configuration that includes a lumbar curve and a thoracic curve relative to a sacral vertical line.

FIG. 2A shows a posterior view 200A of a skeleton of a human 201 exhibiting an example of a scoliotic spinal column 202 that includes a lumbar curve 203 and a thoracic curve 205 relative to a sacral vertical line 206. In the example of FIG. 2A, the lumbar curve 203 extends from the T11 vertebra to the L5 vertebra with an apex between vertebrae L1 and L2. And, the thoracic curve 205 extends from the T1 vertebra to the T12 vertebra with an apex between T8 and T9. FIG. 2A also shows a posterior view 200B of the human 201 having a normal, non-scoliotic spinal column 207 relative to the sacral vertical line 206.

A normal and healthy spine standing in the neutral erect position, such as shown in the posterior view 200B, should have no significant vertebral rotation in the transverse plane. However, in a scoliotic spinal column, such as the scoliotic spinal column 202 shown in the posterior view 200A, the vertebrae must rotate in the transverse plane in conjunction with the bending of the spine to the left and right. When the spine is bent in a scoliotic curve to the left or the right, the vertebrae associated with the scoliotic curve must also concomitantly rotate to allow for the bending. For example, in the lumbar region of the spinal column, a left bending scoliotic curve is typically coupled with right rotation of the vertebrae associated with the left bending scoliotic curve. This right rotation is exemplified by the arrow RR1 in the posterior view 200A. Conversely, in the lumbar region of the spinal column, a right bending scoliotic curve is typically coupled with left rotation of the vertebrae associated with the right bending scoliotic curve. It should be understood that right rotation of a given vertebra corresponds to clockwise rotation of the given vertebra when viewing the top of the given vertebra, i.e., when viewing the given vertebra in a superior-to-inferior direction. Correspondingly, it should be understood that left rotation of a given vertebra corresponds to counterclockwise rotation of the given vertebra when viewing the top of the given vertebra, i.e., when viewing the given vertebra in a superior-to-inferior direction.

Also, in the thoracolumbar region of the spinal column, a right bending scoliotic curve is typically coupled with left rotation of the vertebrae associated with the right bending scoliotic curve. This left rotation is exemplified by the arrow LR1 in the posterior view 200A. Conversely, in the thoracolumbar region of the spinal column, a left bending scoliotic curve is typically coupled with right rotation of the vertebrae associated with the left bending scoliotic curve. Also, in the thoracic region of the spine, a left bending scoliotic curve is typically coupled with either neutral or right rotation of the vertebrae associated with the left bending scoliotic curve, depending on where the bend of the spine occurs in the thoracic region and on how much lordotic or kyphotic bend exists at that location in the thoracic region. This right rotation is exemplified by the arrow RR2 in the posterior view 200A. Conversely, in the thoracic region of the spine, a right bending scoliotic curve is typically coupled with either neutral or left rotation of the vertebrae associated with the right bending scoliotic curve, depending on where the bend of the spine occurs in the thoracic region and on how much lordotic or kyphotic bend exists at that location in the thoracic region.

Therefore, it should be understood that the direction of rotation of vertebrae (within the transverse plane) within a laterally bending section of the spinal column is opposite of the direction of the lateral bending of the section of the spinal column. So, if the section of the spinal column is laterally bending to the right, the direction of rotation of the vertebrae (within the transverse plane) within that right-bending section of the spinal column will be to the left or counterclockwise when viewing the top of the vertebrae in the superior-to-inferior direction. And, if the section of the spinal column is laterally bending to the left, the direction of rotation of the vertebrae (within the transverse plane) within that left-bending section of the spinal column will be to the right or clockwise when viewing the top of the vertebrae in the superior-to-inferior direction.

Figure 1A:
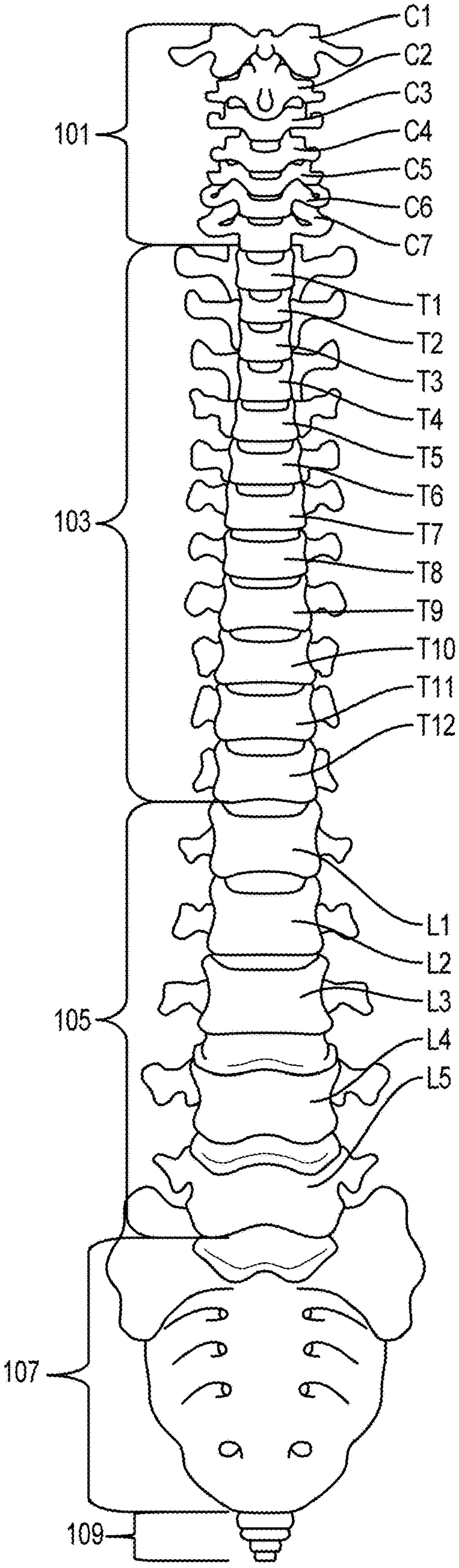
FIG. 1A shows an anterior view of a normal human spinal column.
Figure 1B:
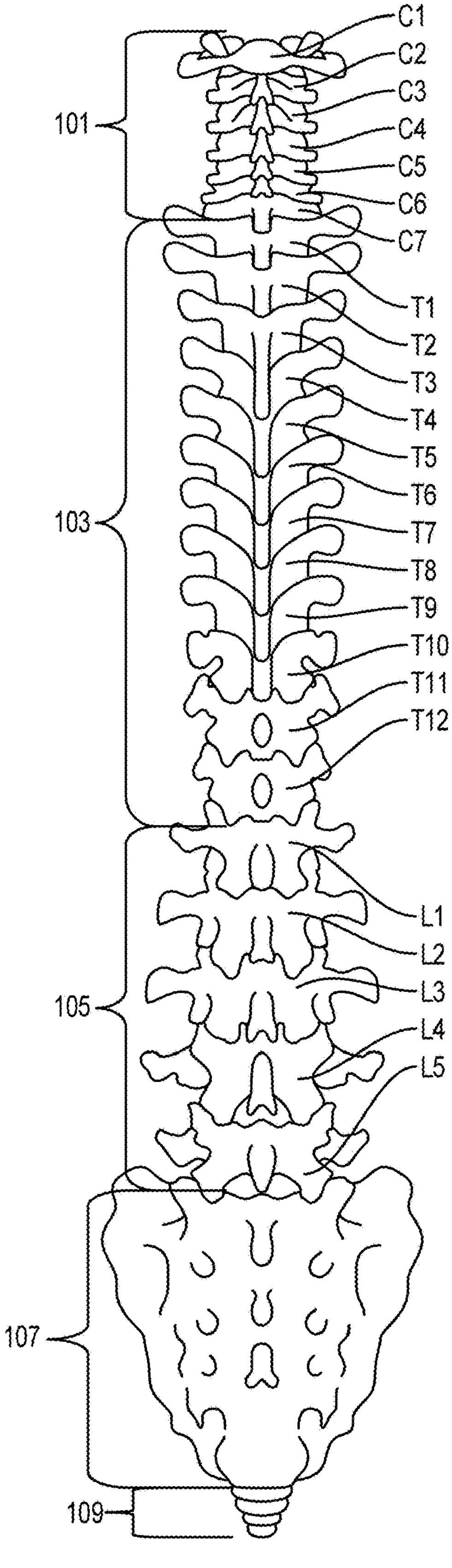
FIG. 1B shows a posterior view of the normal human spinal column.
Figure 1C:
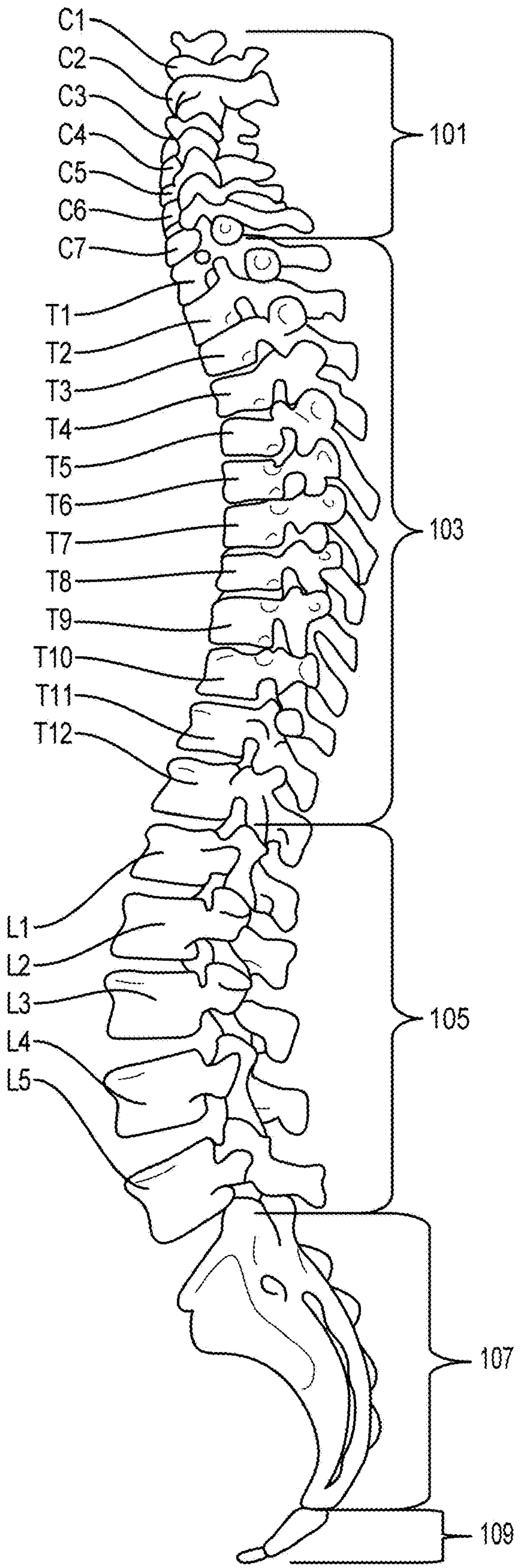
FIG. 1C shows a left lateral view of the normal human spinal column.
Figure 1D:
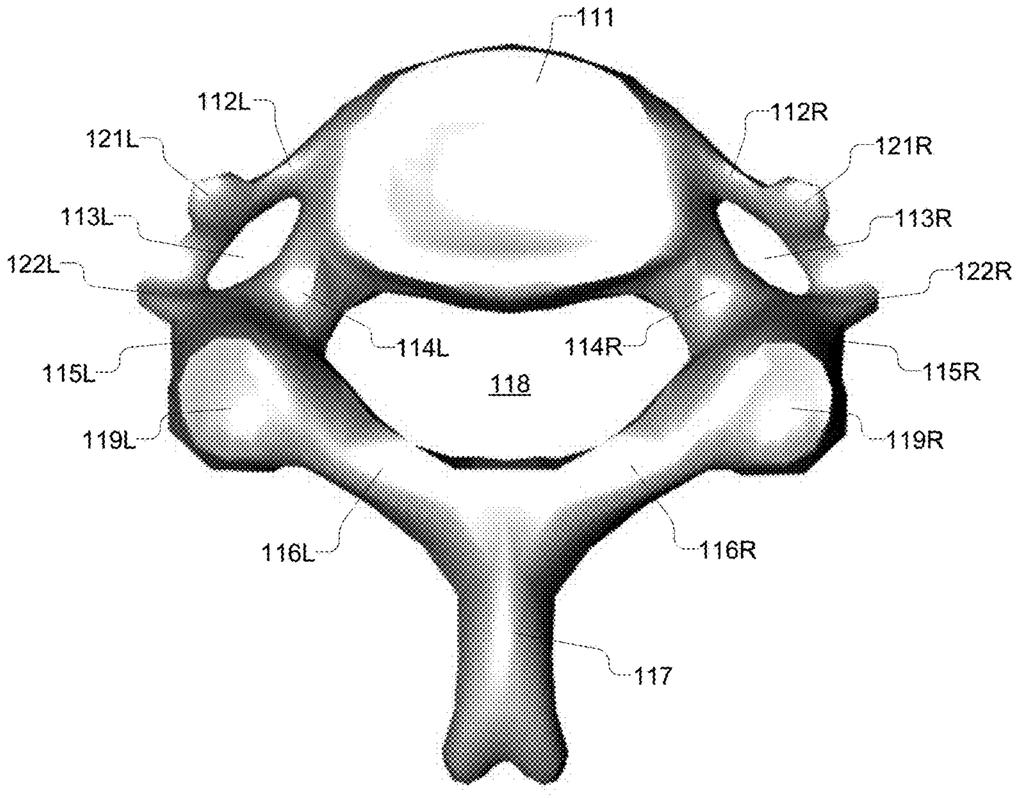
FIG. 1D shows a superior view of the fourth cervical vertebra C4.
Figure 1E:
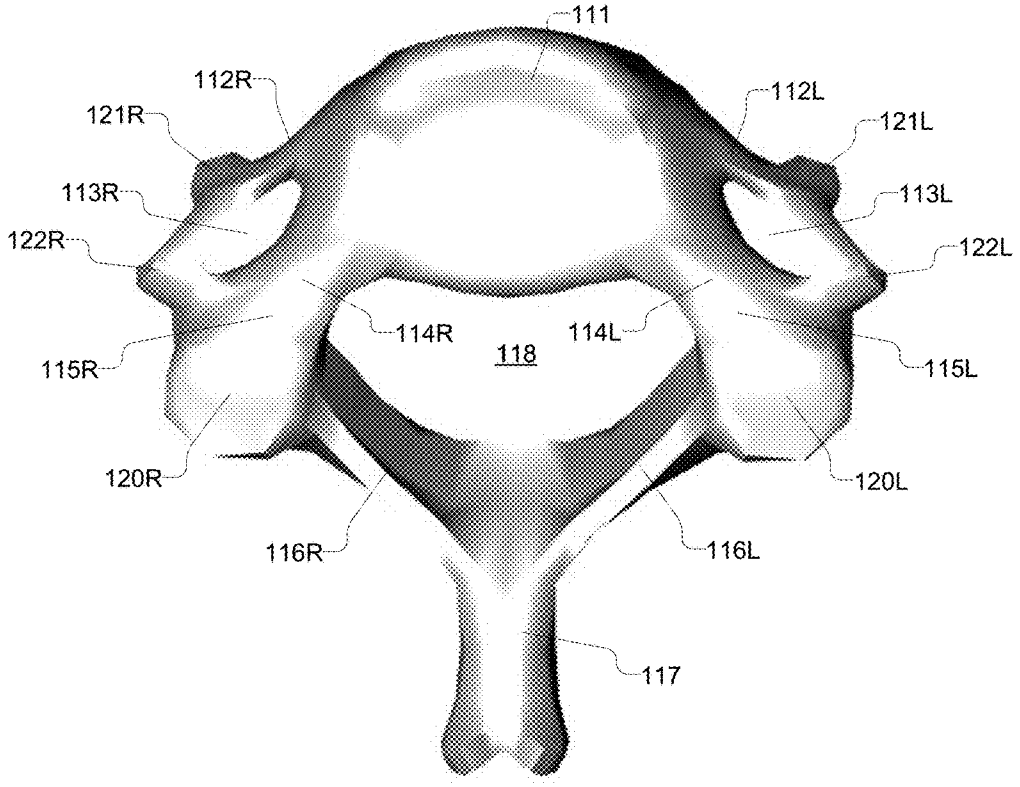
FIG. 1E shows an inferior view of the fourth cervical vertebra C4.
Figure 1F:
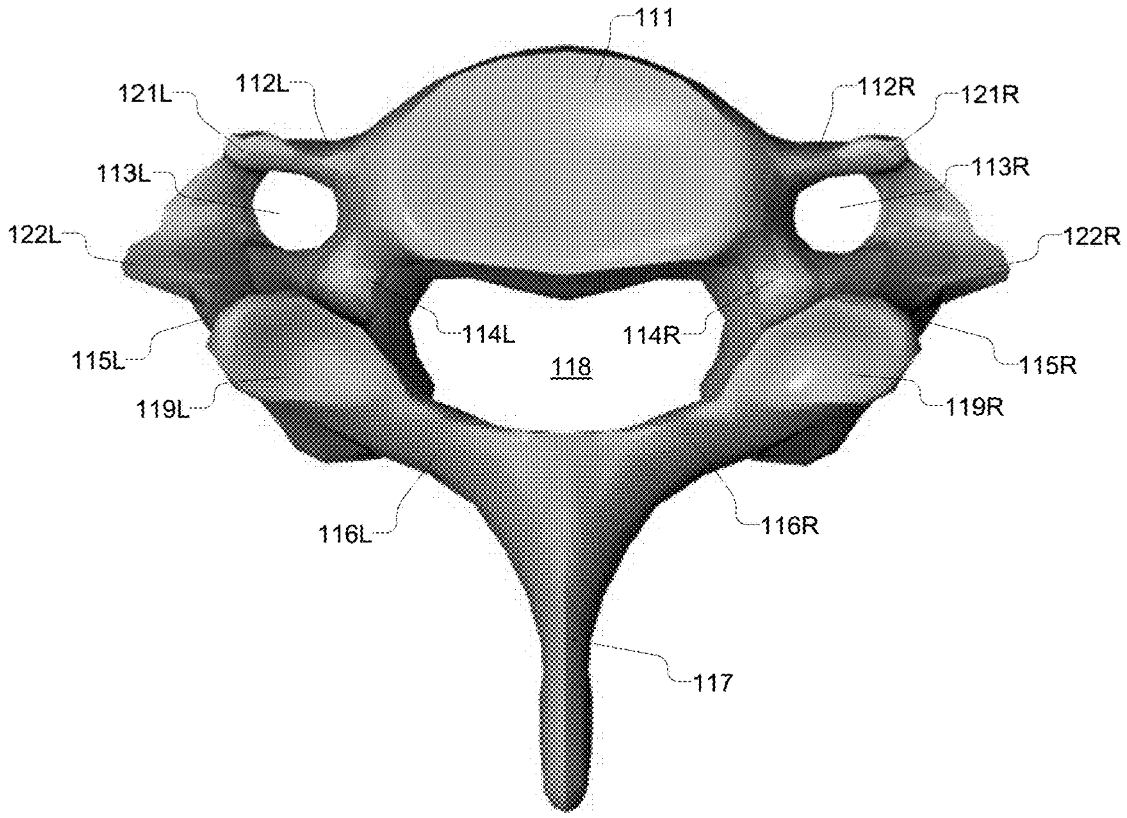
FIG. 1F shows a superior view of the seventh cervical vertebra C7.
Figure 1G:
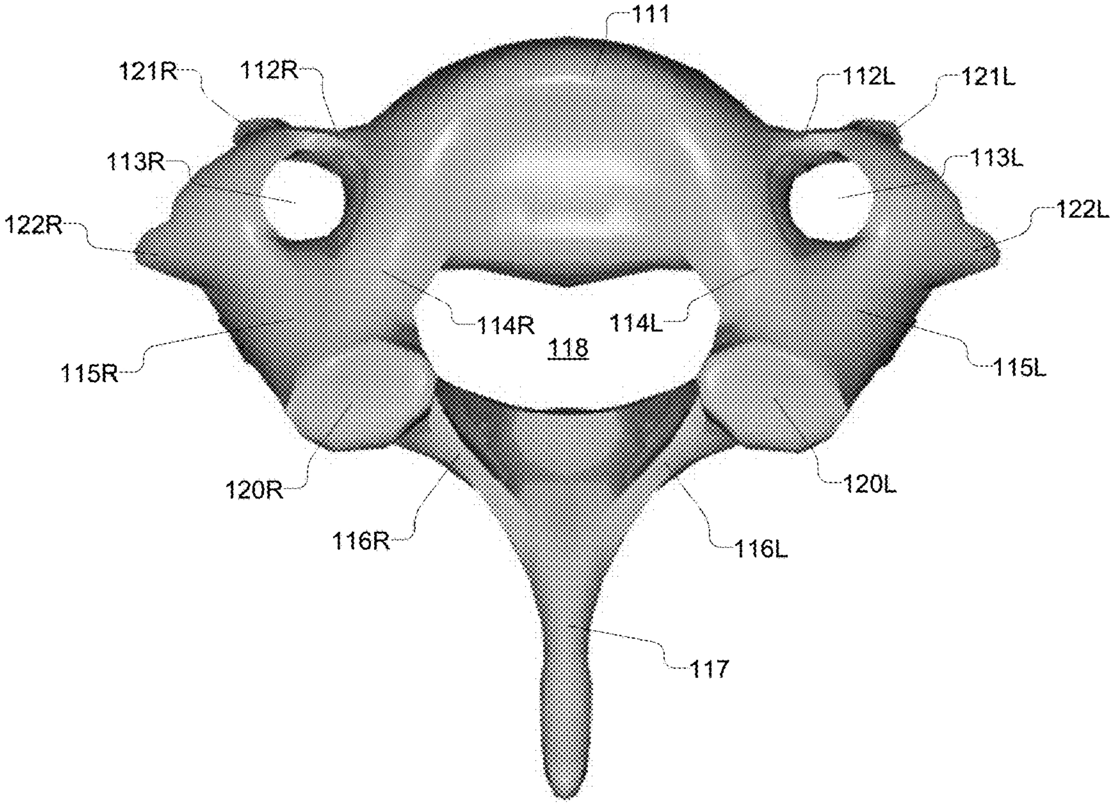
FIG. 1G shows an inferior view of the seventh cervical vertebra C7.
Figure 1H:
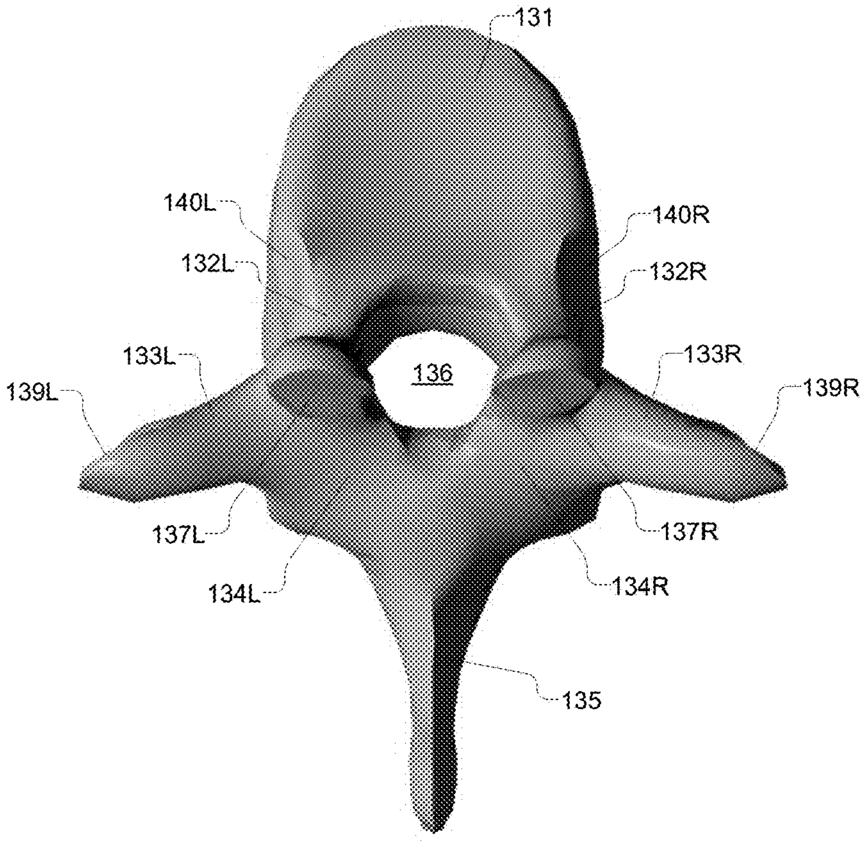
FIG. 1H shows a superior view of the fifth thoracic vertebra T5, which has a structure typical of thoracic vertebrae T1-T11.
Figure 1I:
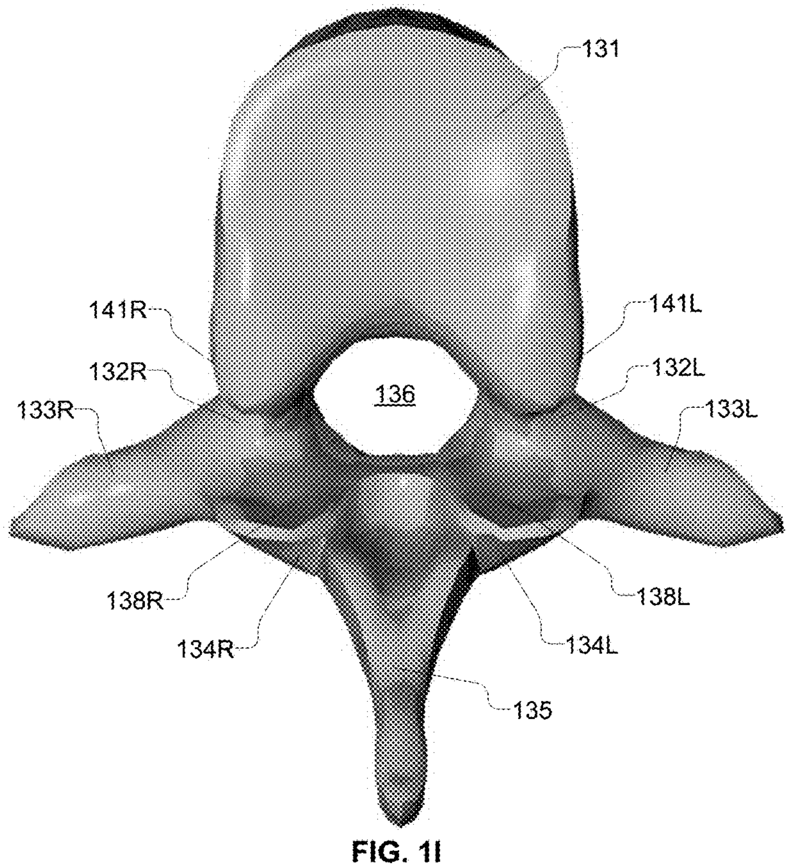
FIG. 1I shows an inferior view of the fifth thoracic vertebra T5.
Figure 1J:
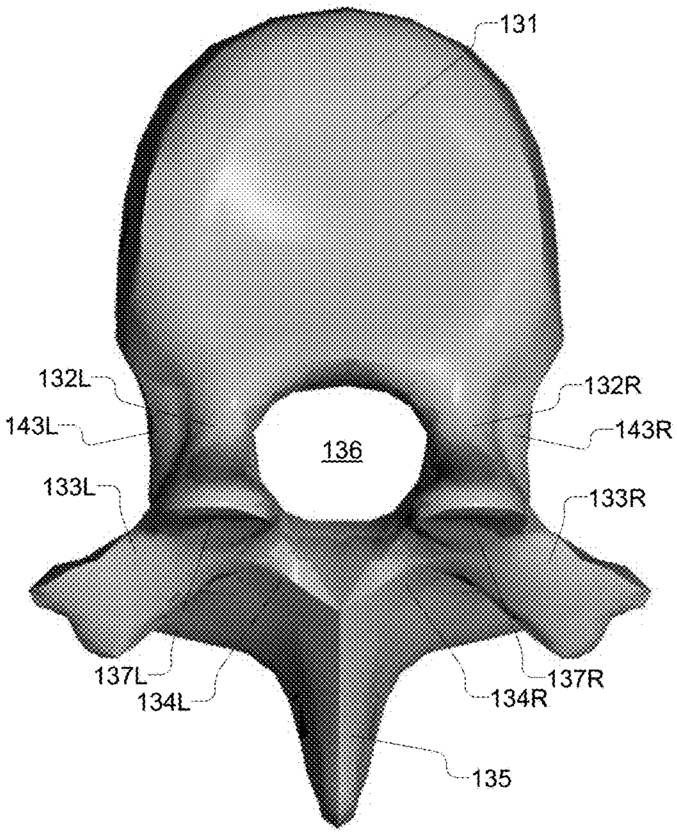
FIG. 1J shows a superior view of the twelfth thoracic vertebra T12.
Figure 1K:
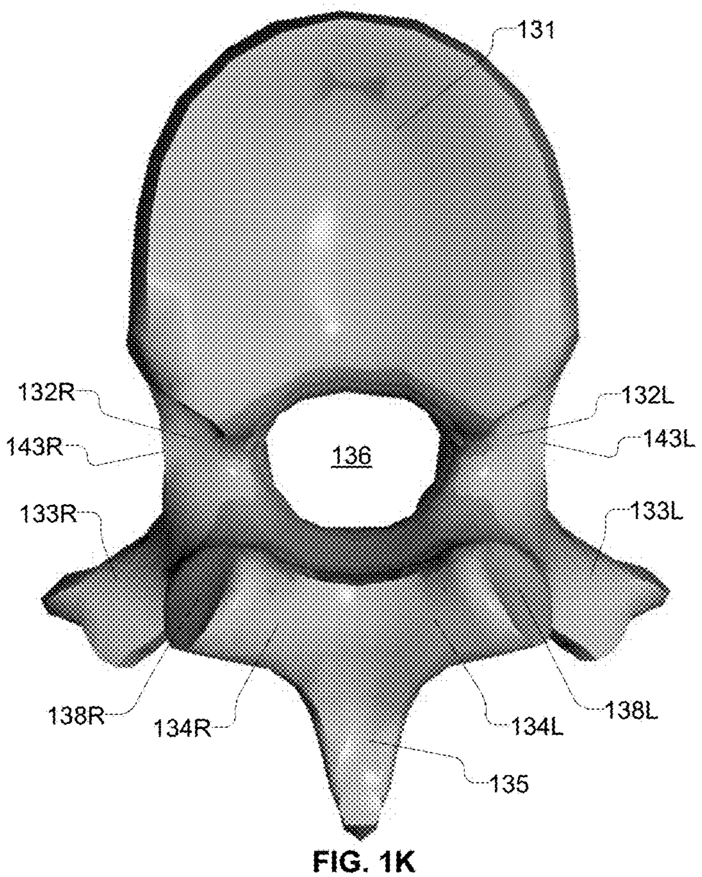
FIG. 1K shows an inferior view of the twelfth thoracic vertebra T12.
Figure 1L:
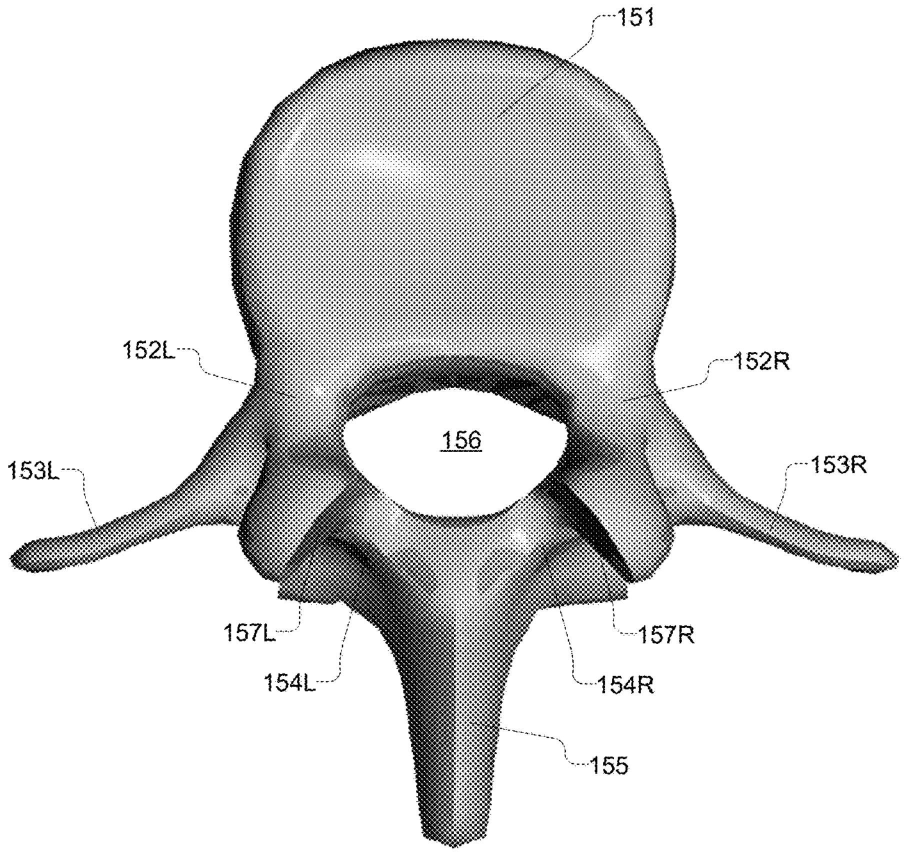
FIG. 1L shows a superior view of the third lumbar vertebra L3, which is representative of the other lumbar vertebrae L1-L2 and L4-L5.
Figure 1M:
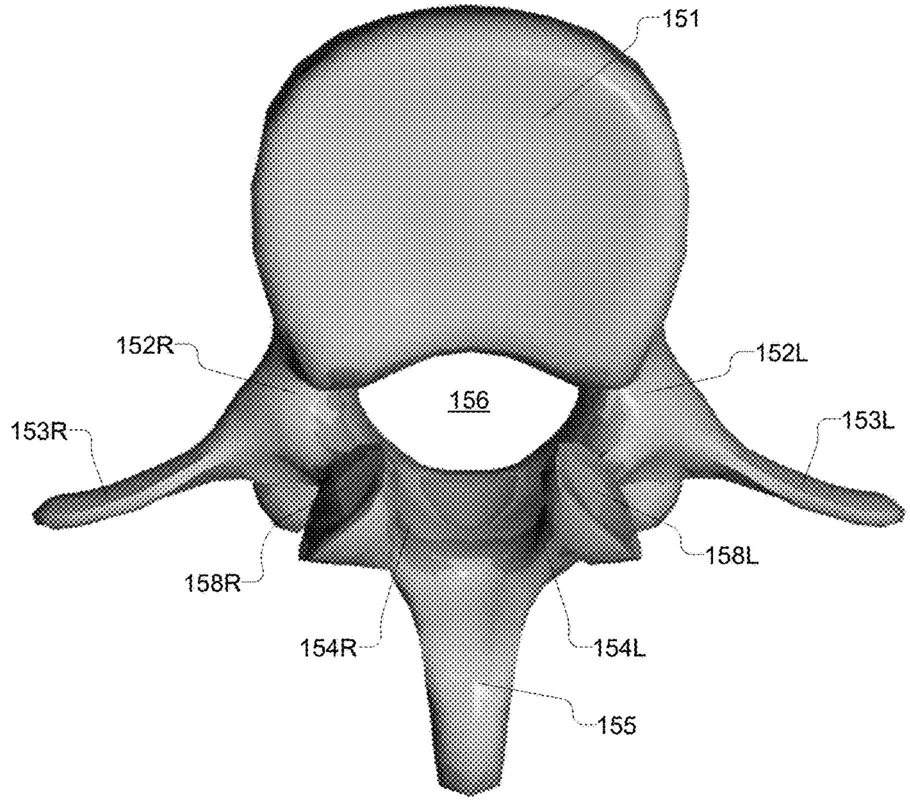
FIG. 1M shows a superior view of the third lumbar vertebra L3.
Figure 1N:
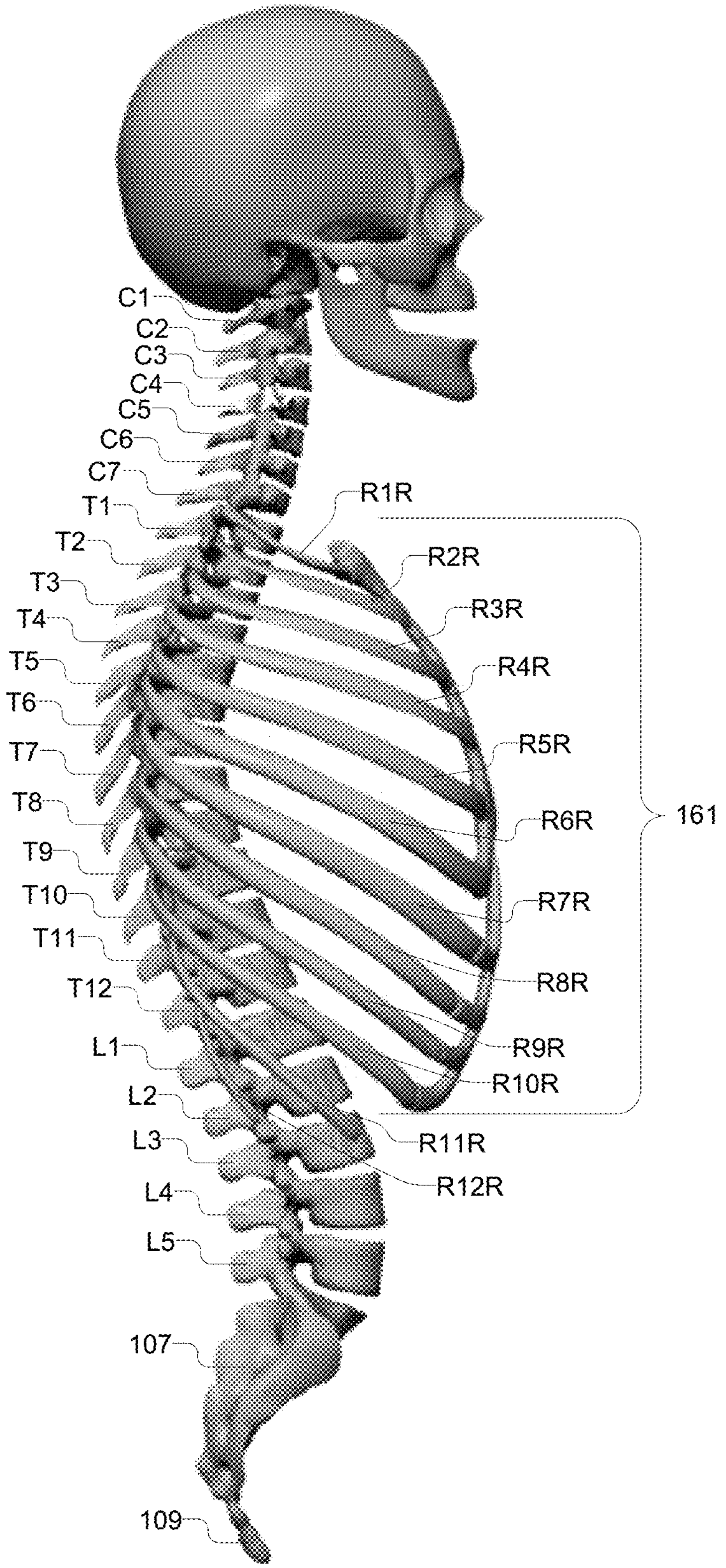
FIG. 1N shows a right lateral view of the spinal column with the thoracic cage 160 shown attached to the thoracic vertebrae T1-T12.
Figure 1O:
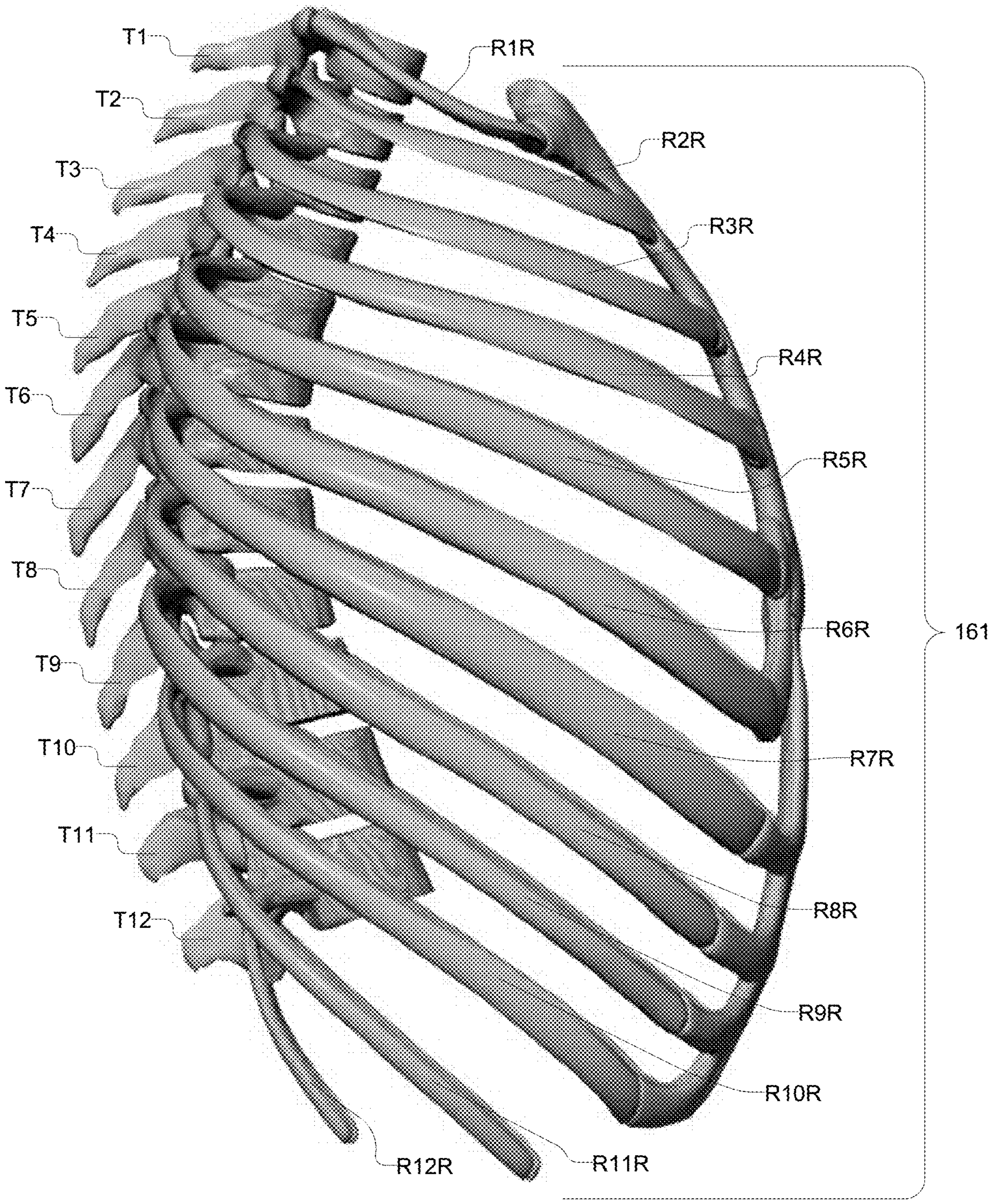
FIG. 1O shows a right lateral section view of the thoracic cage attached the thoracic vertebrae T1-T12.
Figure 1P:
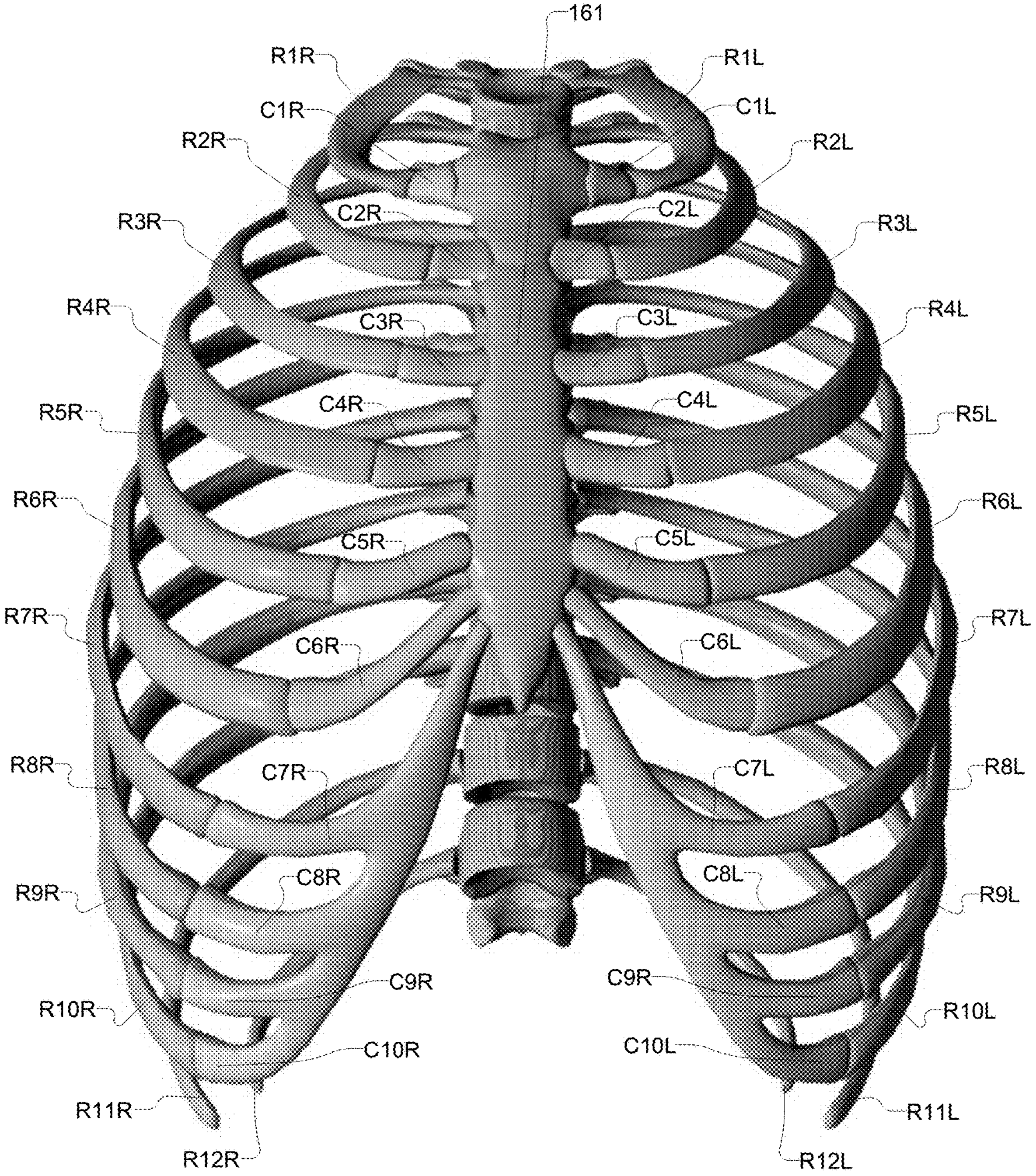
FIG. 1P shows an anterior view of the thoracic cage connected to the thoracic vertebrae T1-T12.
Figure 1Q:
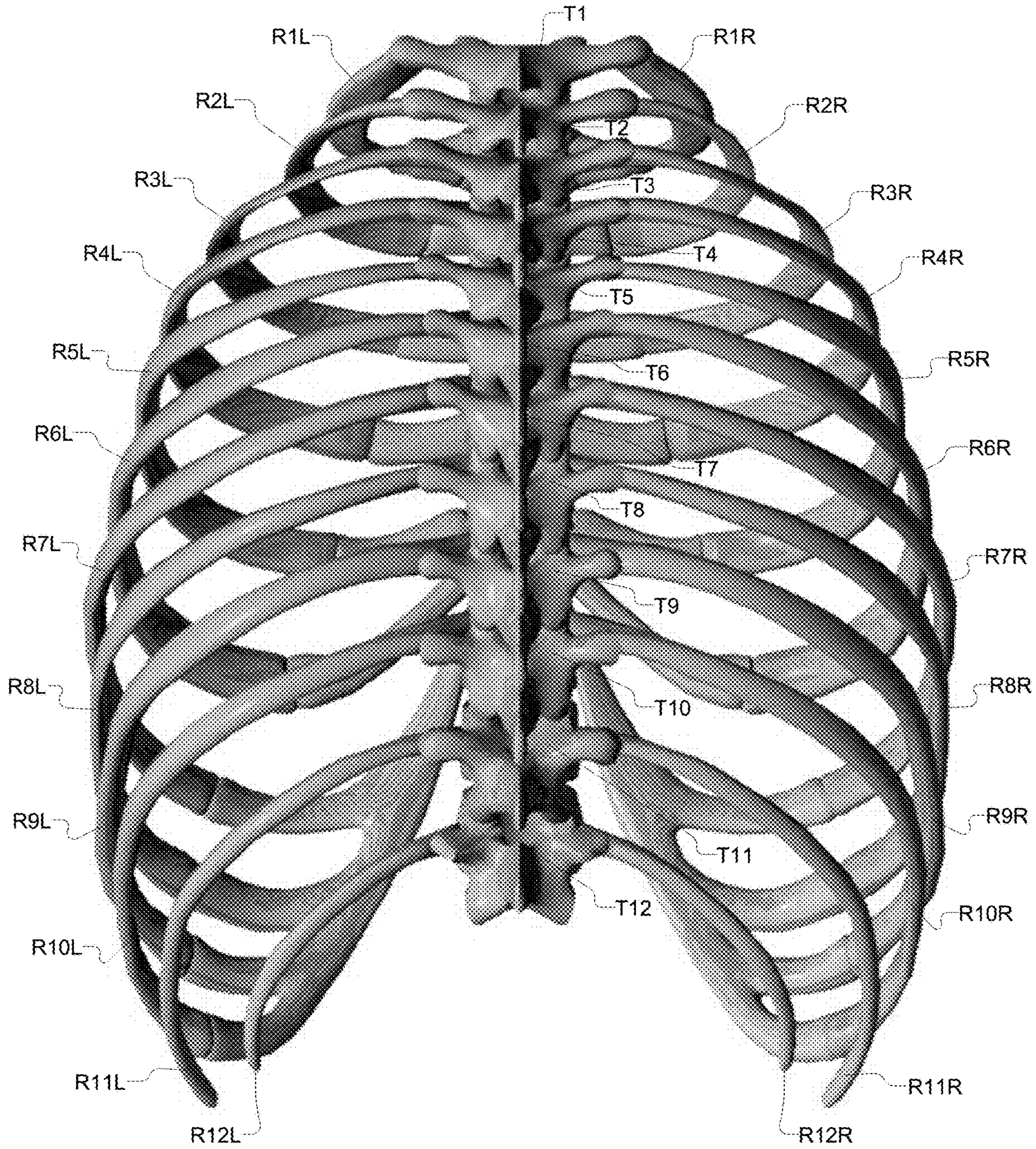
FIG. 1Q shows a posterior view of the thoracic cage connected to the thoracic vertebrae T1-T12.
Figure 1R:
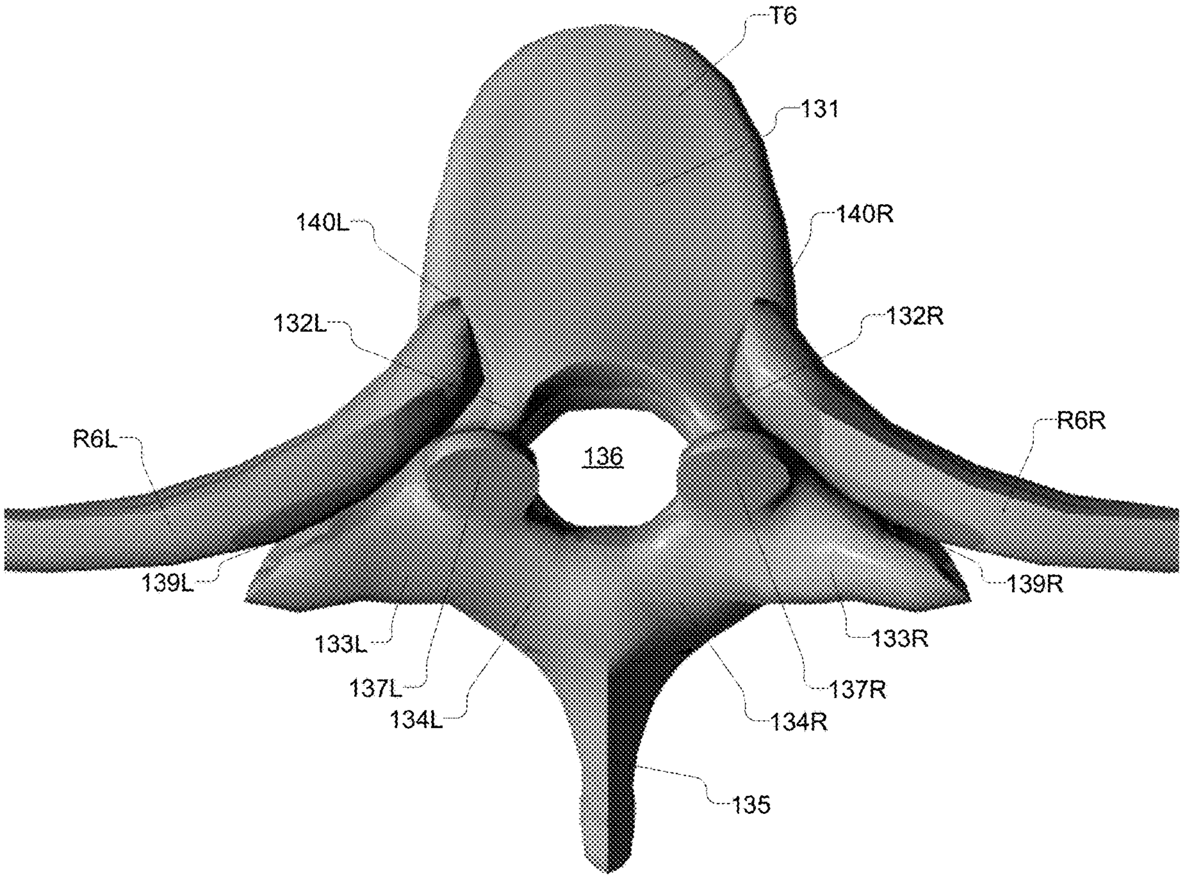
FIG. 1R shows a superior view of an interface between thoracic vertebra T6 and each of ribs R6R and R6L.
Figure 1S:
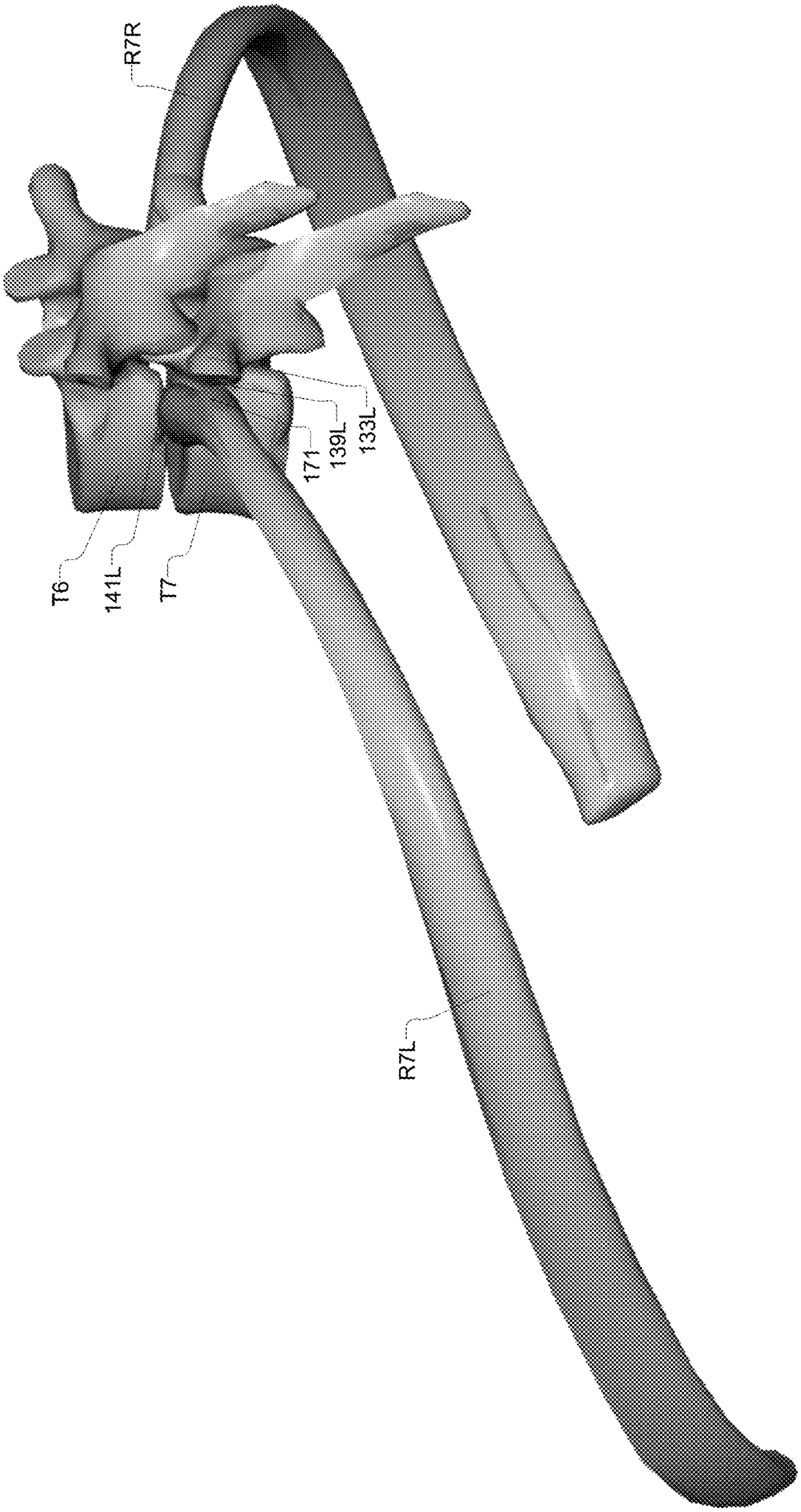
FIG. 1S shows an isometric view of the interface between the sixth thoracic vertebra T6 and the seventh thoracic vertebra T7, including the ribs R7R and R7L.
Figure 1T:
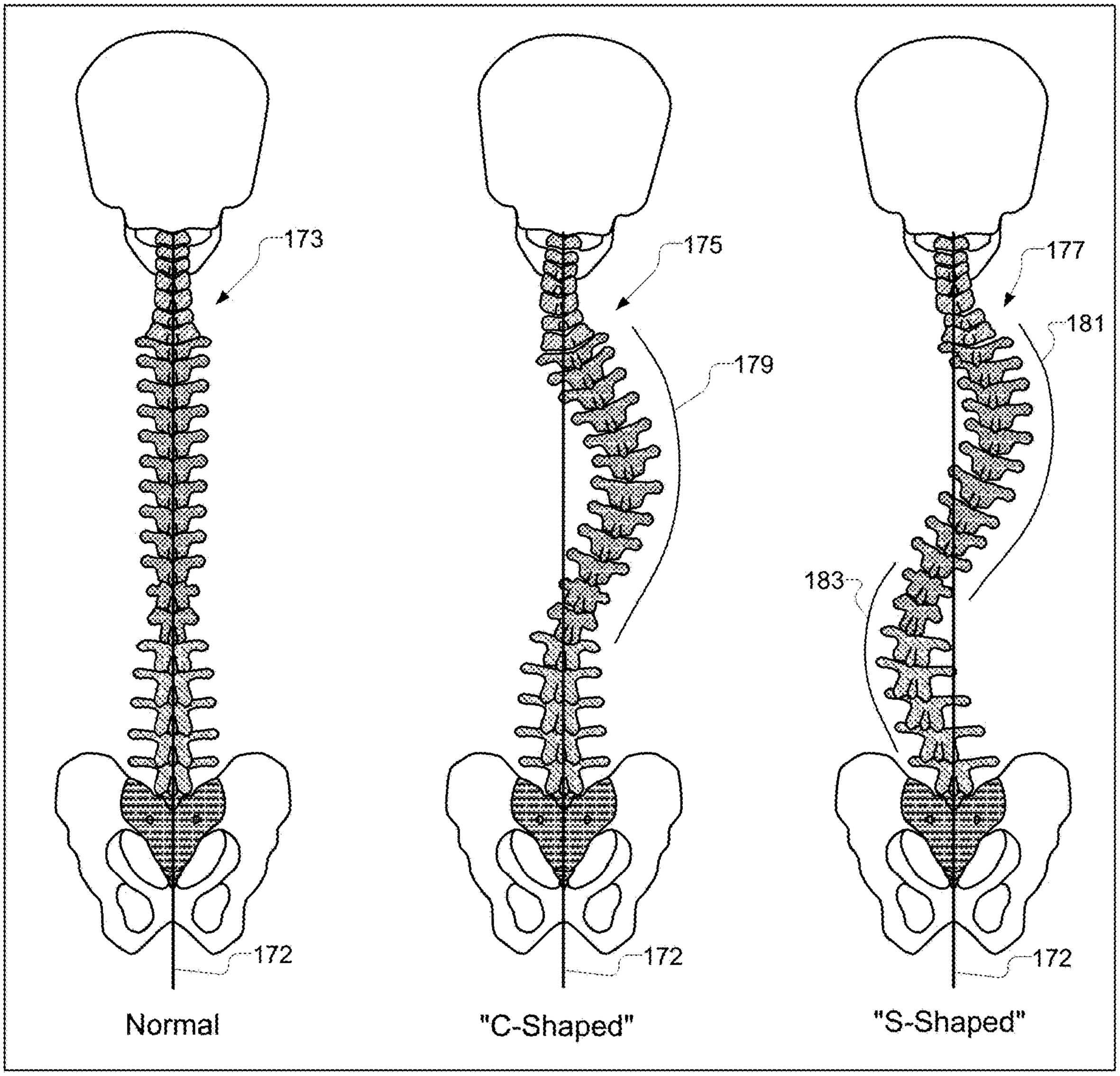
FIG. 1T shows diagrams from a posterior perspective of the human spinal column having a normal configuration, a scoliotic configuration exhibiting a generalized "C-shaped" curvature, and a scoliotic configuration exhibiting a generalized "S-shaped" curvature.
Figure 1U:
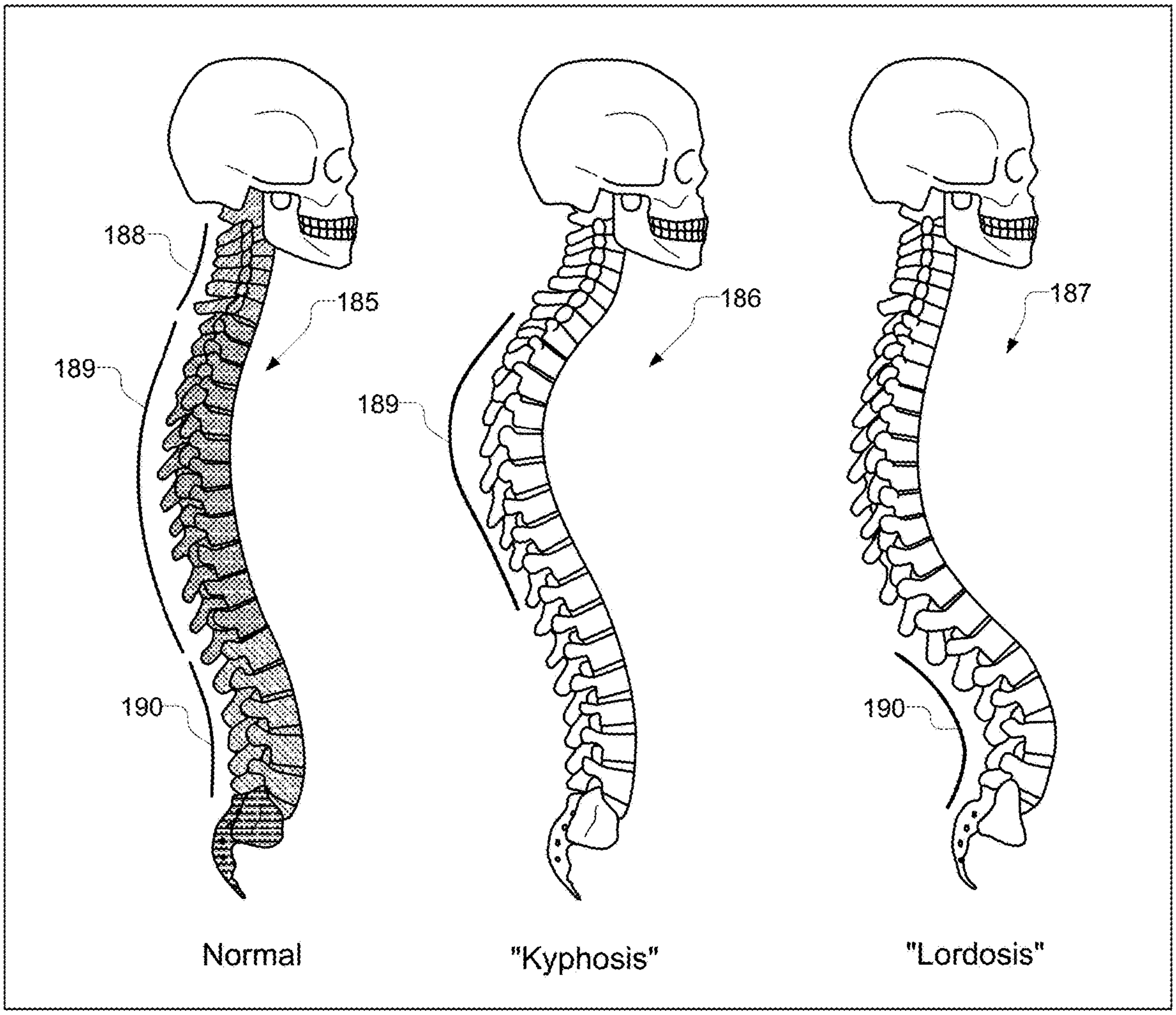
FIG. 1U shows diagrams from a right-lateral perspective of the human spinal column having a normal coronal configuration, a kyphosis coronal configuration, and a lordosis coronal configuration.
Figure 1W:
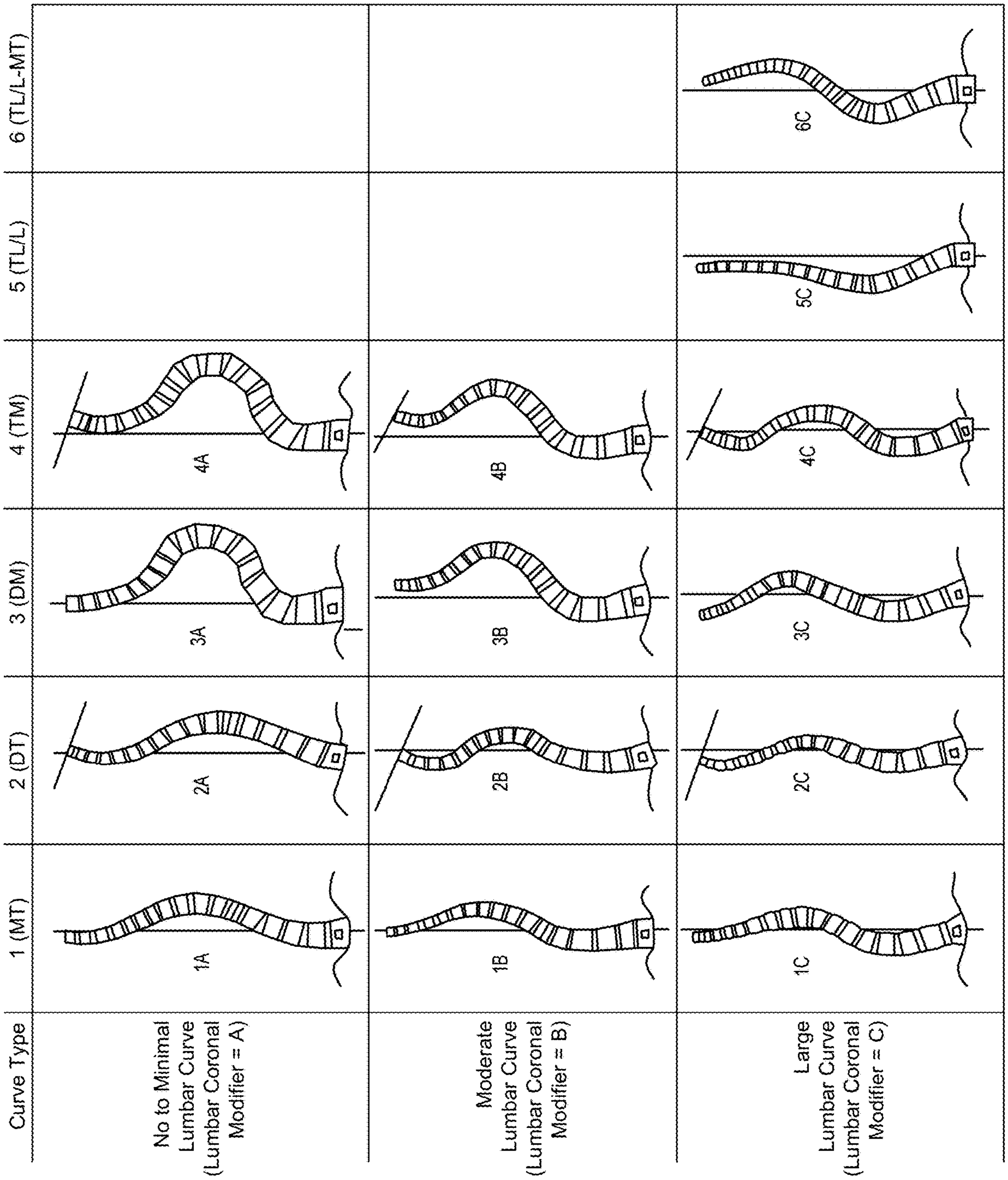
FIG. 1W shows a chart of scoliotic spinal diagrams corresponding to scoliosis curve classifications within the Lenke Classification System for AIS.
Figure 1X:
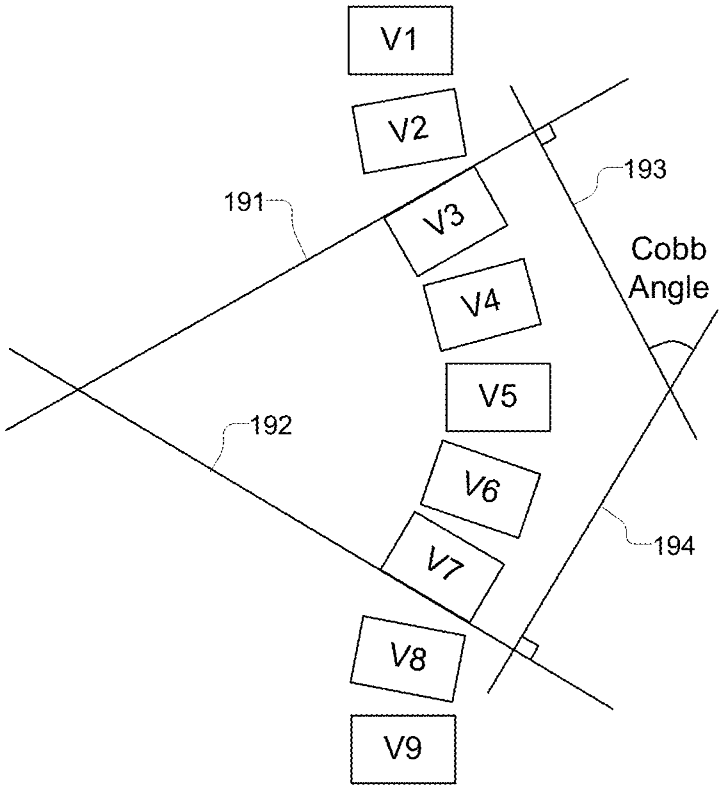
FIG. 1X shows a diagram illustrating how to measure the Cobb angle of scoliotic curve.

It should be understood that the scoliotic spinal column 202 of FIG. 2A is presented by way of example to facilitate description of the present invention and that the various apparatuses and methods disclosed herein can be used with equal effectiveness to also treat other scoliotic spinal column curvatures beyond the example scoliotic spinal column 202. For example, with reference to FIGS. 1V and 1W, it should be understood that the various apparatuses and methods disclosed herein are suited for treatment of scoliotic spinal column curvatures having a curve type of 1, 2, 3, 4, 5, or 6 with a lumbar coronal modifier of B or C, as classified by the Lenke Classification System for AIS. However, it should also be understood that the various apparatuses and methods disclosed herein may be used for other scoliotic curves, such as other curves shown in FIGS. 1V and 1W, when the physiology of the human subject permits and when the applied physics associated with the apparatuses and methods disclosed herein can provide benefit to the human subject.

Maximal rotation of a vertebra in a given direction, blocks lateral bending of the spine from fully occurring in the given direction. For example, in a right thoracic apex scoliosis, in which the thoracic spine is actually stuck in a left-bending posture, the thoracic vertebrae are rotated far to the right in the transverse plane, i.e., far in the clockwise direction when viewing the top of the vertebrae in the superior-to-inferior direction. This right rotation of the thoracic vertebrae blocks any right lateral bending of the thoracic spine from fully occurring and facilitates continued left-bending collapse of the thoracic spine into an even deeper concavity of scoliosis. Therefore, a right convex thoracic scoliosis will have right vertebral rotation (clockwise direction when viewing the top of the vertebrae in the superior-to-inferior direction), but the thoracic spine will be stuck in a left lateral bending posture. Vertebrae above the curve of the right convex thoracic scoliotic curve (within the proximal thoracic spinal region) will have left vertebral rotation (counter clockwise direction when viewing the top of the vertebrae in the superior-to-inferior direction) relative to the thoracic apex. Also, vertebrae below this right convex thoracic scoliotic curve will have left vertebral rotation (counter clockwise direction when viewing the top of the vertebrae in the superior-to-inferior direction) relative to the thoracic apex. Contracture forms to hold this rotational deformity of the right convex thoracic scoliotic curve.

For a person that has right thoracic scoliosis, as the person bends to the right, the right bending motion is prevented by the right rotation of the thoracic spine. Also, the left rotation of the segments above the thoracic curve (the left rotation of the proximal thoracic spine) facilitates easy right bending of the proximal thoracic spine. This creates a biomechanical stretch to the proximal thoracic spine. A spine that has vertebrae stuck in a rotational deformity must always biomechanically move in a scoliotic pattern. A scoliotic spine that has vertebrae de-rotated out of their rotational deformity can begin moving with a normal biomechanical pattern, even when the scoliosis is present. Therefore, de-rotation of vertebrae out of a scoliosis-induced rotational position is a physical key that unlocks the normal biomechanics of the spine. Various embodiments are disclosed herein that assist with using de-rotation of vertebrae out of a scoliosis-induced rotational position as a physical key to unlock the normal biomechanics of the spine, and correspondingly enable straightening of the spine out of the scoliotic configuration. Also, various embodiments disclosed herein include positioning of the person in a supine position to enable application of gravity-assisted powerful de-rotational pressure to the back of the person to cause de-rotation of targeted vertebrae out of the scoliosis-induced rotational position, and thereby enable straightening of the spine out of the scoliotic configuration. It should be understood that effective de-rotation of vertebrae out of their scoliosis-induced rotational configuration is key to unlocking the scoliosis biomechanics to enable a return to normal spinal bending biomechanics.

With reference to the scoliotic spinal column 202, it should be understood that spinal contractures can occur on the concave side of the lumbar curve 203 (on the right lateral side) and/or on the concave side of the thoracic curve 205 (on the left lateral side). These spinal contractures bind the vertebrae in the scoliotic spinal column 202, so as to prevent straightening of the spine into the configuration of the normal, non-scoliotic spinal column 207. Therefore, to enable straightening of the spine from the scoliotic spinal column 202 into the non-scoliotic spinal column 207, it is necessary to elongate the spinal contractures on the concave sides of the lumbar curve 203 and/or thoracic curve 205. The process of elongating the spinal contractures can be referred to as contracture releasing, contracture relaxing, contracture stretching, contracture flexing, contracture freeing, contracture liberating, and/or contracture eliminating, among others.

Figure 2B:
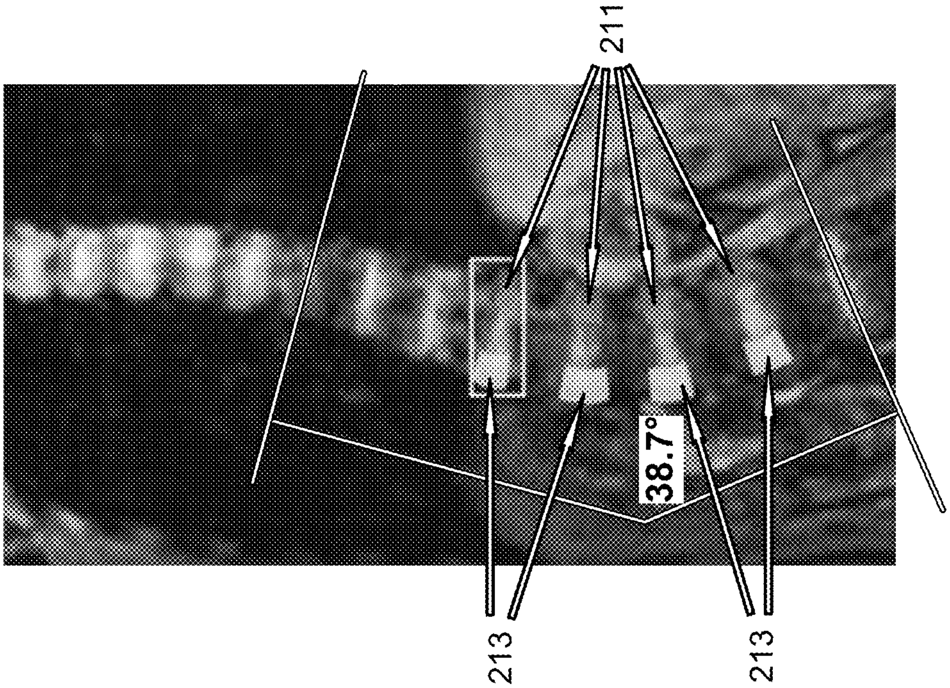
FIG. 2B shows a medical image of a structural scoliosis that includes a left convex lumbar curve.

FIG. 2B shows a medical image of a structural scoliosis that includes a left convex lumbar curve. The scoliotic lumbar curve has a Cobb angle of 38.7°. A structural scoliosis is a scoliotic spine that has grown stuck in a crooked position due to contractures and/or asymmetric vertebrae growth due to a long-term scoliotic condition. In the image of FIG. 2B, the regions 211 are spinal contractures where tissue (muscles, ligaments, and/or discs) has grown too short. And, regions 213 on the convex side of the lumbar curve represent tissue that has grown too long. With a structural scoliosis, such as shown in the example of FIG. 2B, attempts to stretch or bend out of the scoliotic curve are met with great resistance because of the contractures. As a result, the spine is not exercised throughout its entire range of motion, thereby exacerbating the contractures and preventing correction of the scoliotic spinal configuration.

A conventional approach for addressing structural scoliosis is to perform a surgical procedure in which the contractures that bind the spine are cut away. During such surgery, if a disc, muscle, and/or ligament is too short and prevents straightening and alignment of the spinal column, the disc, muscle, and/or ligament is simply cut out as needed to free the spine. This is one of the major reasons why a surgeon can make a scoliotic spine straighter with surgery. However, such surgery comes with significant and permanent adverse consequences to the person due to the removal of disc, muscle, and/or ligament tissue, and can cause significant pain and suffering. Therefore, it is of much interest to have a non-surgical approach for releasing spinal contractures associated with structural scoliosis. However, releasing spinal contractures is much more of a challenge than releasing contractures of other joints such as ankles or knees. For example, rather than having one or two joints affected by contractures, such as in the ankle or knee, a typical scoliotic spine can have up to 54 joints affected by contractures. Additionally, access to these spinal joints for treatment is blocked by the ribs, shoulders, abdomen, and pelvis.

Figure 2C:
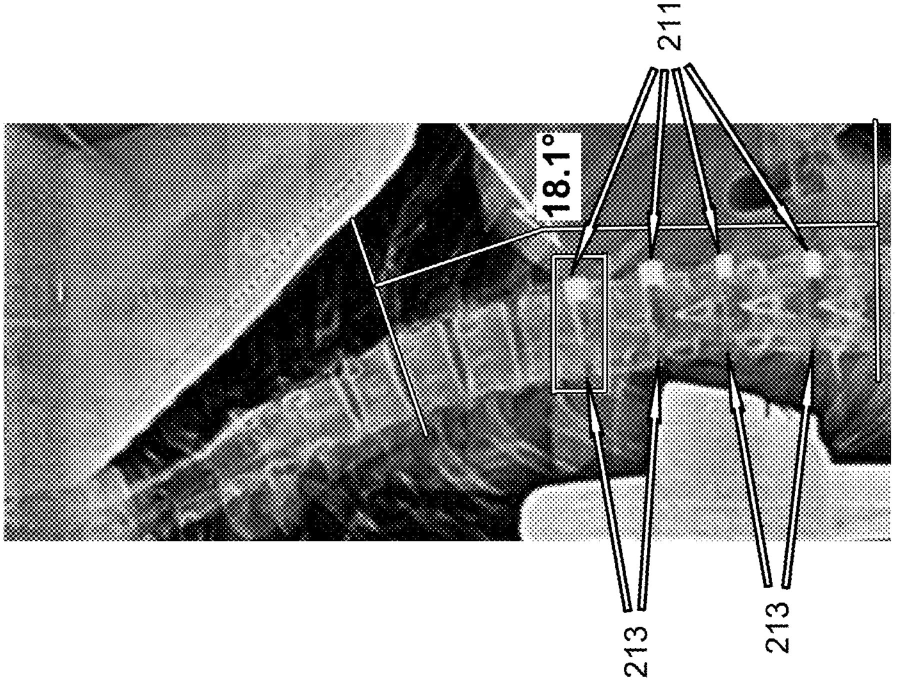
FIG. 2C shows a medical image of the spinal column of FIG. 2B with the person in a therapeutic position within the SFT, in accordance with some embodiments of the present invention.

Given the foregoing, a Scoliosis Flexibility Trainer (SFT) and associated methods are disclosed herein for providing non-surgical release of spinal contractures. The SFT is configured to simultaneously apply multiple force vectors to specific locations on a scoliotic spine in order to provide targeted stretching of spinal contractures, while simultaneously untwisting the scoliotic spine so as to release the spinal contractures and enable straightening of the scoliotic spine. The SFT provides an effective non-surgical solution for restoring lost spinal flexibility by releasing spinal contractures that bind the spine into the scoliotic posture. By way of example, FIG. 2C shows a medical image of the spinal column of FIG. 2B with the person in a therapeutic position within the SFT, in accordance with some embodiments of the present invention. In the therapeutic position corresponding to the image of FIG. 2C, the SFT simultaneously applies multiple force vectors to specific locations on the spine in order to provide targeted stretching of the spinal contractures in the regions 211, while simultaneously untwisting the scoliotic spine so as to release the spinal contractures in the regions 211 and enable straightening of the spine. In the therapeutic position corresponding to the image of FIG. 2C, the SFT is used to stretch the tissues in the regions 211 so that the spine bends 18.1° (Cobb angle) to the left in the direction opposite of the scoliosis, thereby enabling the spine to achieve a normal range of motion in the left-bending direction. In this example, the 18.1° (Cobb angle) bend to the left beyond the straightened configuration in the lumbar region represents a normal range of movement previously lost due to the scoliosis. With the SFT therapy represented by the image of FIG. 2C, the spine is liberated to move into a straighter alignment, which allows the person to be fitted into a brace in which the spine is held in a straightened configuration, and which further allows the person to ultimately undergo neuromuscular training of the muscles and ligaments of the spine to maintain a normal, non-scoliotic spinal posture. It should be appreciated that the non-surgical spinal contracture release provided by the SFT preserves intact the muscles, ligaments, and discs of the spine so that they can undergo subsequent neuromuscular training to achieve sufficient control and strength as needed to maintain a normal, non-scoliotic spinal posture.

Figure 3A:
FIG. 3A shows a perspective view of a person in a therapeutic position within an example SFT configuration, in accordance with some embodiments of the present invention.
Figure 3B:
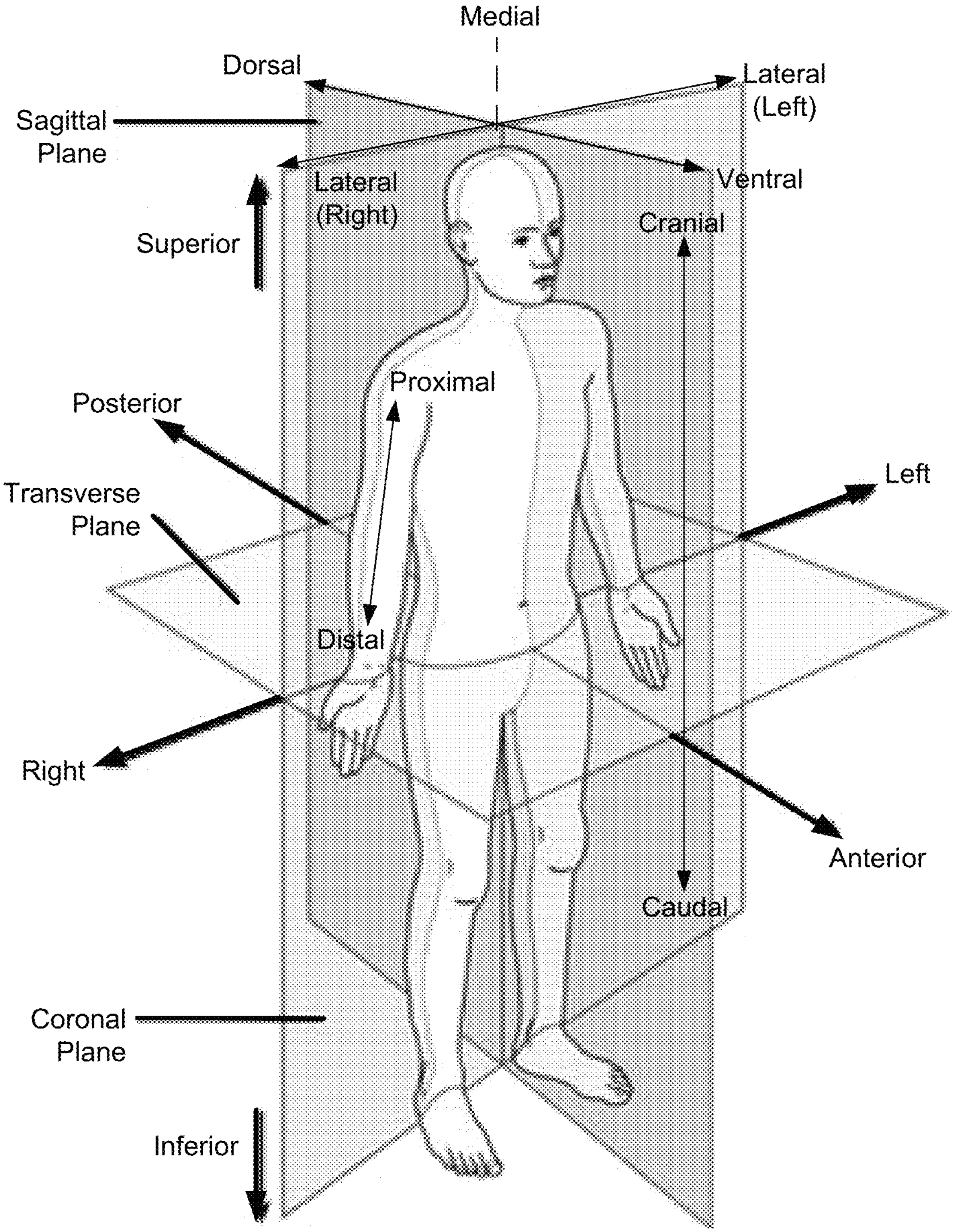
FIG. 3B shows a diagram of anatomical planes and reference directions relative to the human body that are used to facilitate description of the SFT and its components herein.

FIG. 3A shows a perspective view of a person 302 in a therapeutic position within an SFT 300, in accordance with some embodiments of the present invention. The various components and functionality of the SFT 300 are described herein below. FIG. 3B shows a diagram of anatomical planes and reference directions relative to the human body that are used to facilitate description of the SFT 300 and its components herein.

Figure 4:
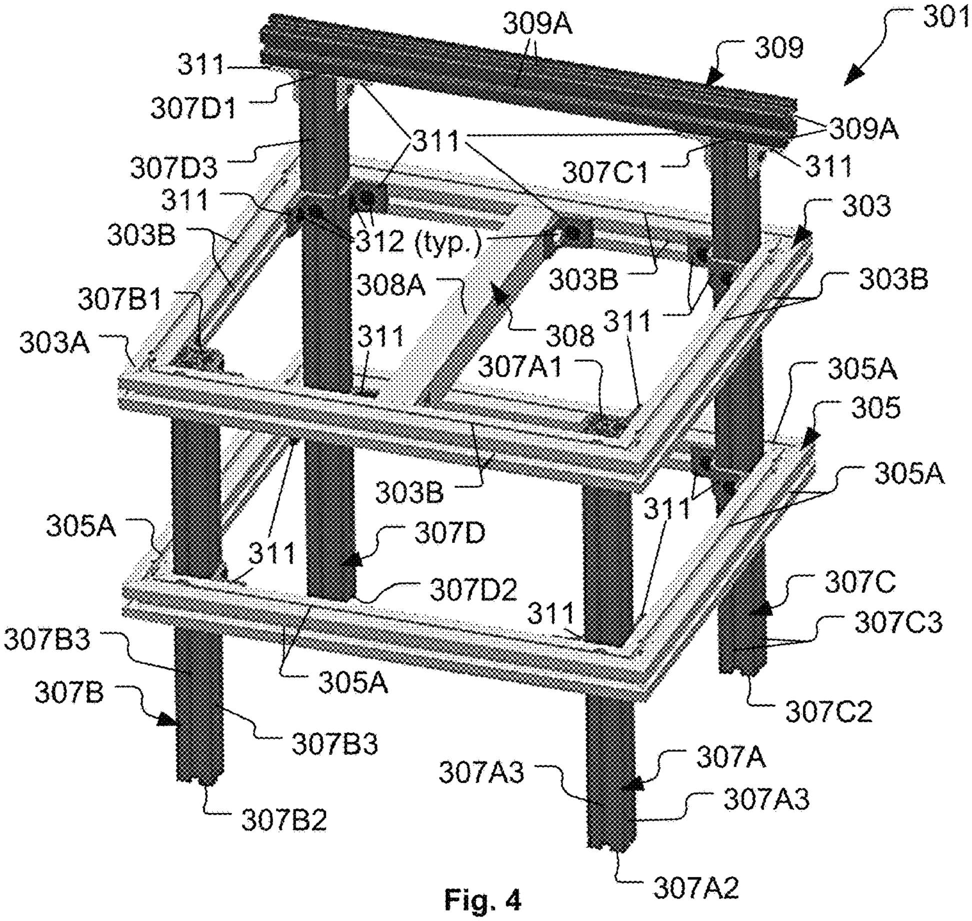
FIG. 4 shows a chair structure of the SFT, in accordance with some embodiments of the present invention.

FIG. 4 shows a chair structure 301 of the SFT 300, in accordance with some embodiments of the present invention. The chair structure 301 includes an upper frame 303 and a lower frame 305. Four leg structures 307A, 307B, 307C, 307D are positioned at respective interior corners of the upper frame 303 and the lower frame 305. Each leg structure 307A, 307B, 307C, 307D is rigidly secured to both the upper frame 303 and the lower frame 305. Top surfaces 307A1, 307B1 of the front leg structures 307A, 307B, respectively, are positioned below a top surface 303A of the upper frame 303. And, top surfaces 307C1, 307D1 of the back leg structures 307C, 307D, respectively, are positioned above the top surface 303A of the upper frame 303. In some embodiments, the lower frame 305 is vertically positioned at about a middle location along the portions of the leg structures 307A, 307B, 307C, 307D extending from the upper frame 303 to the bottoms 307A2, 307B2, 307C2, 307D2 of the leg structures 307A, 307B, 307C, 307D, respectively. However, in other embodiments, the lower frame 305 can be positioned at essentially any location along the portions of the leg structures 307A, 307B, 307C, 307D extending from the upper frame 303 to the bottoms 307A2, 307B2, 307C2, 307D2 of the leg structures 307A, 307B, 307C, 307D, respectively, so long as the position of the lower frame 305 relative to the upper frame 303 provides sufficient mechanical stability to the chair structure 301 to withstand forces applied to the chair structure 301 during use of the SFT 300.

In some embodiments, the upper frame 303 and the lower frame 305 are formed of tubing having a substantially rectangular cross-section, such that exterior surfaces of the upper frame 303 and the lower frame 305 are substantially flat to provide for stable and precise mounting of additional components to the chair structure 301. However, it should be understood that in other embodiments, the upper frame 303 and lower frame 305 can be formed to have a cross-sectional shape other than rectangular, such as circular, polygonal, or another geometrical shape or combination of geometrical shapes. Also, in some embodiments, the upper frame 303 and the lower frame 305 are formed to have longitudinal channels 303B and 305A, respectively, along their exterior surfaces, where the longitudinal channels 303B, 305A are configured to provide an engagement mechanism for fastening devices associated with mounting of components to the upper frame 303 and the lower frame 305. For example, the longitudinal channels 303B, 305A of the upper frame 303 and the lower frame 305 can be configured to receive fasteners associated with connection of the leg structures 307A, 307B, 307C, 307D to the upper frame 303 and the lower frame 305. Also, the longitudinal channels 303B, 305A of the upper frame 303 and the lower frame 305 can be configured to receive fasteners associated with mounting of other components, such as force application components, belts, buckles, ratchet mechanisms, rod mounts, among others. It should be understood, however, that in other embodiments, the upper frame 303 and the lower frame 305 can be formed without longitudinal channels 303B, 305A along their exterior surfaces. For example, in such embodiments, the upper frame 303 and the lower frame 305 can be drilled through as needed to provide engagement mechanisms for fastening devices associated with mounting of components to the chair structure 301.

In some embodiments, the leg structures 307A, 307B, 307C, 307D are formed from a same material (composition and/or geometry) as the upper frame 303 and the lower frame 305. Therefore, in some embodiments, the leg structures 307A, 307B, 307C, 307D are formed of tubing having a substantially rectangular cross-section, such that exterior surfaces of the leg structures 307A, 307B, 307C, 307D are substantially flat to provide for stable and precise mounting of the leg structures 307A, 307B, 307C, 307D to the upper frame 303 and the lower frame 305. However, it should be understood that in other embodiments, the leg structures 307A, 307B, 307C, 307D can be formed to have a cross-sectional shape other than rectangular, such as circular, polygonal, or another geometrical shape or combination of geometrical shapes. Also, in some embodiments, the leg structures 307A, 307B, 307C, 307D are formed to have longitudinal channels 307A3, 307B3, 307C3, 307D3 along their exterior surfaces, where the longitudinal channels 307A3, 307B3, 307C3, 307D3 are configured to provide an engagement mechanism for fastening devices associated with mounting of the leg structures 307A, 307B, 307C, 307D to the upper frame 303 and the lower frame 305, and/or associated with mounting of additional components to the leg structures 307A, 307B, 307C, 307D, such as force application components, belts, buckles, ratchet mechanisms, rod mounts, among others. It should be understood, however, that in other embodiments, the leg structures 307A, 307B, 307C, 307D can be formed without longitudinal channels 307A3, 307B3, 307C3, 307D3 along their exterior surfaces. For example, in such embodiments, the leg structures 307A, 307B, 307C, 307D can be drilled through as needed to provide engagement mechanisms for fastening devices associated with mounting of the leg structures 307A, 307B, 307C, 307D to the upper frame 303 and the lower frame 305, and/or associated with mounting of additional components to the leg structures 307A, 307B, 307C, 307D.

In the example embodiment of FIG. 4, the leg structures 307A, 307B, 307C, 307D are secured to the upper frame 303 and the lower frame 305 using corner brackets 311 and machine screws 312. In some embodiments, the machine screws 312 interface with respective threaded receptacles disposed within the upper frame 303 and the lower frame 305. And, in some embodiments, the threaded receptacles are slidable along the longitudinal channels 303B, 305A of the upper frame 303 and the lower frame 305 to enable positioning of the threaded receptacles as needed to receive the machine screws 312 associated with the corner brackets 311. It should be understood, however, that in other embodiments the leg structures 307A, 307B, 307C, 307D can be secured to the upper frame 303 and the lower frame 305 using essentially any attachment mechanism that provides a mechanically stable connection between each of the leg structures 307A, 307B, 307C, 307D and both the upper frame 303 and the lower frame 305. For example, in some embodiments, the leg structures 307A, 307B, 307C, 307D can be welded to the upper frame 303 and the lower frame 305. In some embodiments, the leg structures 307A, 307B, 307C, 307D can be secured to the upper frame 303 and the lower frame 305 using bolts and nuts.

The chair structure 301 also includes a seat support member 308 positioned within the upper frame 303 to span an interior region of the upper frame 303. In some embodiments, the seat support member 308 is positioned near a center of the interior region of the upper frame 303. In some embodiments, the seat support member 308 is formed of tubing having a substantially rectangular cross-section, such that exterior surfaces of the seat support member 308 are substantially flat. However, it should be understood that in other embodiments, the seat support member 308 can be formed to have a cross-sectional shape other than rectangular, such as circular, polygonal, L-shaped, U-shaped, or another geometrical shape or combination of geometrical shapes. In some embodiments, the seat support member 308 is configured to have a substantially flat upper surface 308A. In some embodiments, the seat support member 308 is secured to the upper frame 303 such that the substantially flat upper surface 308A of the seat support member 308 is flush with the top surface 303A of the upper frame 303. In the example embodiment of FIG. 4, the seat support member 308 is secured to the upper frame 303 using corner brackets 311 and machine screws 312. In some embodiments, the machine screws 312 interface with respective threaded receptacles disposed within the upper frame 303. And, in some embodiments, the threaded receptacles are slidable along the longitudinal channels 303B of the upper frame 303 to enable positioning of the threaded receptacles as needed to receive the machine screws 312 associated with the corner brackets 311. It should be understood, however, that in other embodiments the seat support member 308 can be secured to the upper frame 303 using essentially any attachment mechanism that provides a mechanically stable connection between the seat support member 308 and the upper frame 303. For example, in some embodiments, the seat support member 308 can be welded to the upper frame 303. In some embodiments, the seat support member 308 can be secured to the upper frame 303 using bolts and nuts.

The chair structure 301 also includes a back bar 309 secured to the back leg structures 307C and 307D. In the example embodiment of FIG. 4, the back bar 309 is positioned to extend across the top surfaces 307C1, 307D1 of the back leg structures 307C, 307D, respectively. However, in other embodiments, the back bar 309 can be positioned to extend across front surfaces of the back leg structures 307C and 307D. Or, in other embodiments, the back bar 309 can be positioned to extend across back surfaces of the back leg structures 307C and 307D.

In some embodiments, the back bar 309 is formed from a same material (composition and/or geometry) as the upper frame 303 and the lower frame 305. Therefore, in some embodiments, the back bar 309 is formed of tubing having a substantially rectangular cross-section, such that exterior surfaces of the back bar 309 are substantially flat to provide for stable and precise mounting of the back bar 309 to the back leg structures 307C, 307D, and to provide for stable and precise mounting of additional components to the back bar 309, such as force application components, belts, buckles, ratchet mechanisms, rod mounts, among others. However, it should be understood that in other embodiments, the back bar 309 can be formed to have a cross-sectional shape other than rectangular, such as circular, polygonal, or another geometrical shape or combination of geometrical shapes. Also, in some embodiments, the back bar 309 is formed to have longitudinal channels 309A along its exterior surfaces, where the longitudinal channels 309A are configured to provide an engagement mechanism for fastening devices associated with mounting of the back bar 309 to the back leg structures 307C, 307D, and/or for fastening devices associated with mounting of additional components to the back bar 309, such as force application components, belts, buckles, ratchet mechanisms, rod mounts, among others. It should be understood, however, that in other embodiments, the back bar 309 can be formed without longitudinal channels 309A along its exterior surfaces. For example, in such embodiments, the back bar 309 can be drilled through as needed to provide engagement mechanisms for fastening devices associated with mounting of the back bar 309 to the back leg structures 307C, 307D, and/or for fastening devices associated with mounting of additional components to the back bar 309, such as force application components, belts, buckles, ratchet mechanisms, rod mounts, among others.

In the example embodiment of FIG. 4, the back bar 309 is secured to the back leg structures 307C, 307D using corner brackets 311 and machine screws 312. In some embodiments, the machine screws 312 interface with respective threaded receptacles disposed within the back bar 309 and back leg structures 307C, 307D. And, in some embodiments, the threaded receptacles are slidable along the longitudinal channels 309A of the back bar 309 and the back leg structures 307C, 307D to enable positioning of the threaded receptacles as needed to receive the machine screws 312 associated with the corner brackets 311. It should be understood, however, that in other embodiments the back bar 309 can be secured to the back leg structures 307C, 307D using essentially any attachment mechanism that provides a mechanically stable connection between the back bar 309 and each of the back leg structures 307C, 307D. For example, in some embodiments, the back bar 309 can be welded to the back leg structures 307C, 307D. Or, in some embodiments, the back bar 309 can be secured to the back leg structures 307C, 307D using bolts and nuts.

The chair structure 301 provides a reference structural frame for forces applied to the person 302 treated within the SFT 300. Therefore, the components of the chair structure 301 are formed from one or more materials that can provide sufficient mechanical strength to avoid breakage when exposed to the forces associated with treating the person 302 within the SFT 300. Also, the one or more materials used to form the components of the chair structure 301 should provide sufficient rigidity to avoid bending and/or substantial flexing when exposed to the forces associated with treating the person 302 within the SFT 300. Also, in some embodiments, the materials used to form the components of the chair structure 301 are light-weight materials to enable easier transport and movement of the SFT 300. In some embodiments, the upper frame 303, the lower frame 305, the leg structures 307A, 307B, 307C, 307D, the seat support member 308, and the back bar 309 are formed of one or more of aluminum, aluminum alloy, steel, steel alloy, stainless steel, carbon-fiber, fiberglass, plastic, acrylic, polymer, PVC, wood, or other material of similar mechanical strength and rigidity. In some embodiments, the upper frame 303, the lower frame 305, the leg structures 307A, 307B, 307C, 307D, the seat support member 308, and the back bar 309 are formed of a same material. In some embodiments, different materials can be used to form any two or more of the upper frame 303, the lower frame 305, the leg structures 307A, 307B, 307C, 307D, the seat support member 308, and the back bar 309. Also, machine screws 312, corner brackets 311, threaded receptacles, bolts, nuts, and other fasteners used to assemble the chair structure 301 can be formed of essentially any material that is chemically compatible with other materials to which it interfaces and that is of sufficient mechanical strength. For example, in various embodiments, machine screws 312, corner brackets 311, threaded receptacles, bolts, nuts, and other fasteners used to assemble the chair structure 301 can be formed of one or more of aluminum, aluminum alloy, steel, steel alloy, stainless steel, brass, zinc, zinc alloy, metal, plastic, acrylic, polymer, PVC, or other material of similar mechanical strength and rigidity.

Figure 5:
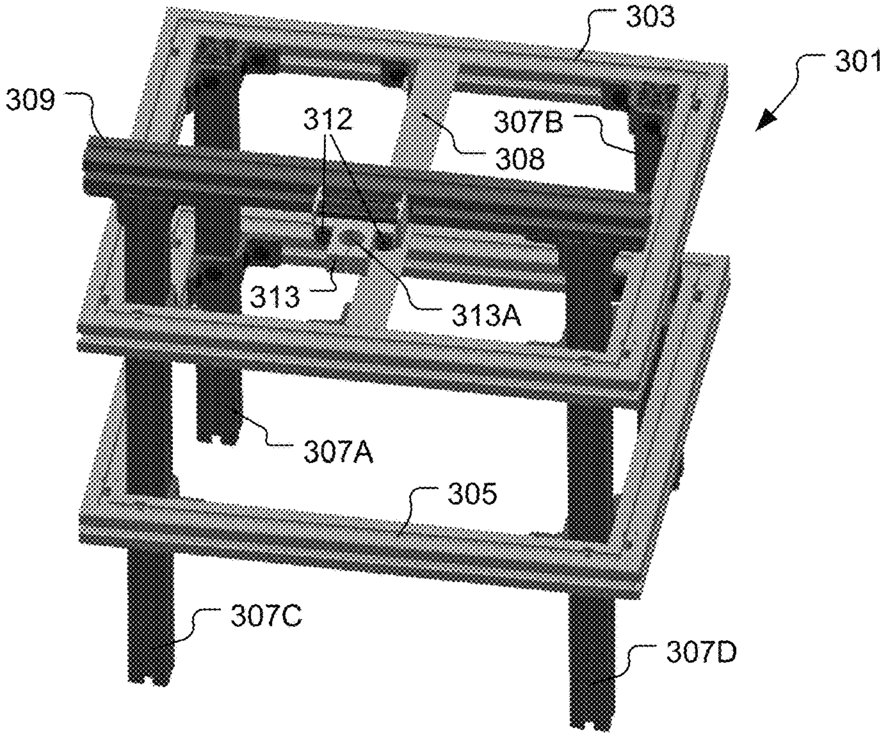
FIG. 5 shows the chair structure with a post base connected to the back bar 309, in accordance with some embodiments of the present invention.

FIG. 5 shows the chair structure 301 with a post base 313 connected to the back bar 309, in accordance with some embodiments of the present invention. The post base 313 is configured to have a receptacle 313A through which a vertical post can be positioned and secured. In some embodiments, the post base 313 is secured to the back bar 309 using machine screws 312. In some embodiments, the machine screws 312 interface with respective threaded receptacles disposed within the back bar 309. And, in some embodiments, the threaded receptacles are slidable along the longitudinal channels 309A of the back bar 309 to enable positioning of the threaded receptacles as needed to receive the machine screws 312 associated with post base 313, and to enable positioning of the post base 313 as needed along the length of the back bar 309. It should be understood, however, that in other embodiments the post base 313 can be secured to the back bar 309 using essentially any attachment mechanism that provides a mechanically stable connection between the post base 313 and back bar 309. For example, in some embodiments, the post base 313 can be secured to the back bar 309 using bolts and nuts. And, in some embodiments, the post base 313 can be welded to the back bar 309. In various embodiments, the post base 313 can be formed of one or more of aluminum, aluminum alloy, steel, steel alloy, stainless steel, brass, zinc, zinc alloy, metal, plastic, acrylic, polymer, PVC, or other material of similar mechanical strength and rigidity.

Figure 6:
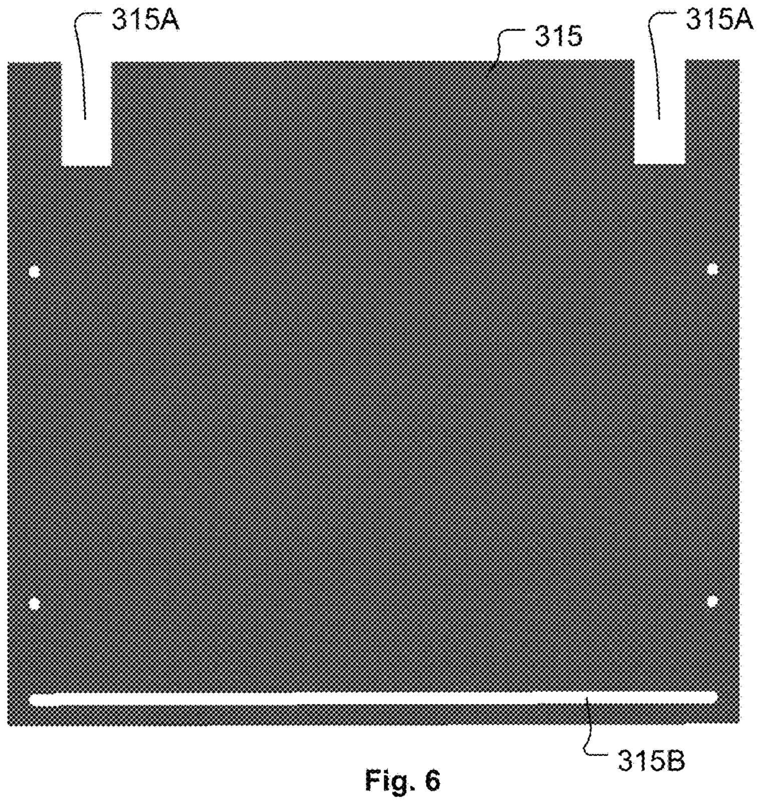
FIG. 6 shows a seat configured to secure to the top surface of the upper frame of the chair structure, in accordance with some embodiments of the present invention.
Figure 7:
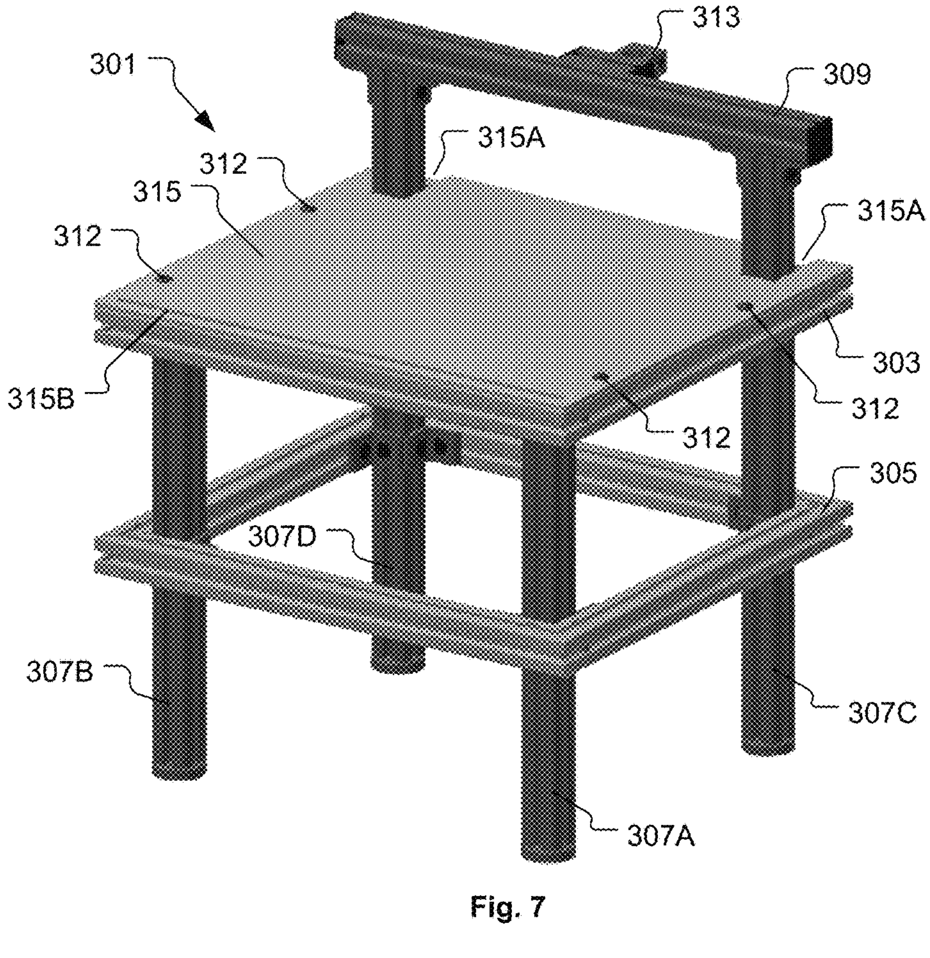
FIG. 7 shows the seat secured to the top surface of the upper frame of the chair structure, in accordance with some embodiments of the present invention.

FIG. 6 shows a seat 315 configured to secure to the top surface 303A of the upper frame 303 of the chair structure 301, in accordance with some embodiments of the present invention. FIG. 7 shows the seat 315 secured to the top surface 303A of the upper frame 303 of the chair structure 301, in accordance with some embodiments of the present invention. In some embodiments, the seat 315 includes back cut out regions 315A so that the seat 315 will fit around the back leg structures 307C, 307D. In some embodiments, the seat 315 is secured to the upper frame 303 using machine screws 312. In some embodiments, the machine screws 312 used to secure the seat 315 interface with respective threaded receptacles disposed within the upper frame 303. And, in some embodiments, the threaded receptacles are slidable along the longitudinal channels 303A of the upper frame 303 to enable positioning of the threaded receptacles as needed to receive the machine screws 312 associated with seat 315, and to enable positioning of the seat 315 as needed on the upper frame 303. It should be understood, however, that in other embodiments the seat 315 can be secured to the upper frame 303 using essentially any attachment mechanism that provides a mechanically stable connection between the seat 315 and the upper frame 303. For example, in some embodiments, the post base 313 can be secured to the back bar 309 using bolts and nuts. In some embodiments, the seat 315 is sized and shaped so that an outer peripheral edge of the seat 315 aligns with an outer peripheral edge of the upper frame 303 when the seat is positioned on the upper frame 303. Also, in some embodiments, the seat 315 includes a front groove 315B to enable access through the seat 315 to the longitudinal channel 303B present in the top surface 303A of the upper frame 303. In this manner, the front groove 315B enables use of fastening devices associated with mounting of additional components to the front of the upper frame 303, such as force application components, belts, buckles, ratchet mechanisms, rod mounts, among others. In various embodiments, the seat 315 can be formed of one or more of plastic, acrylic, polymer, PVC, wood, aluminum, aluminum alloy, steel, steel alloy, stainless steel, metal, or other material of similar mechanical strength and rigidity.

In some embodiments, the chair structure 301 is sized so that a person 302 can sit on the seat 315 with some amount of open space on the seat 315 next to each side of the person 302. Also, in some embodiments, the chair structure 301 is sized so that a vertical height of the seat 315 above the floor allows for the upper legs of the person 302 to fully rest on the seat 315. In some embodiments, the chair structure 301 is sized so that so that a vertical height of the seat 315 above the floor allows the feet of the person 302 to just touch the floor when the person 302 is seated on the seat 315. In some embodiments, the chair structure 301 is sized so that so that a vertical height of the seat 315 above the floor allows the toes of the person 302 to just touch the floor when the person 302 is seated on the seat 315. In some embodiments, the chair structure 301 has an overall width as measured along a front or back side of the upper frame 303 within a range extending from about 15 inches to about 30 inches. In some embodiments, the chair structure 301 has an overall width of about 21 inches as measured along a front or back side of the upper frame 303. In some embodiments, the chair structure 301 has an overall depth as measured along a left or right side of the upper frame 303 within a range extending from about 12 inches to about 25 inches. In some embodiments, the chair structure 301 has an overall depth of about 19 inches as measured along a left or right side of the upper frame 303. In some embodiments, the chair structure 301 has a seat 315 height above the floor within a range extending from about 12 inches to about 25 inches. In some embodiments, the chair structure 301 has a seat 315 height above the floor of about 18 inches. In some embodiments, the back leg structures 307C, 307D extend above the seat 315 by a distance within a range extending from about 2 inches to about 10 inches. In some embodiments, the back leg structures 307C, 307D extend above the seat 315 by a distance of about 4 inches. It should be understood that the dimensional ranges of the chair structure 301 provided herein are provided by way of example, and that in various embodiments the chair structure, or any component of the SFT, can have various dimensions other than the corresponding example dimensions provided herein.

Figure 8:
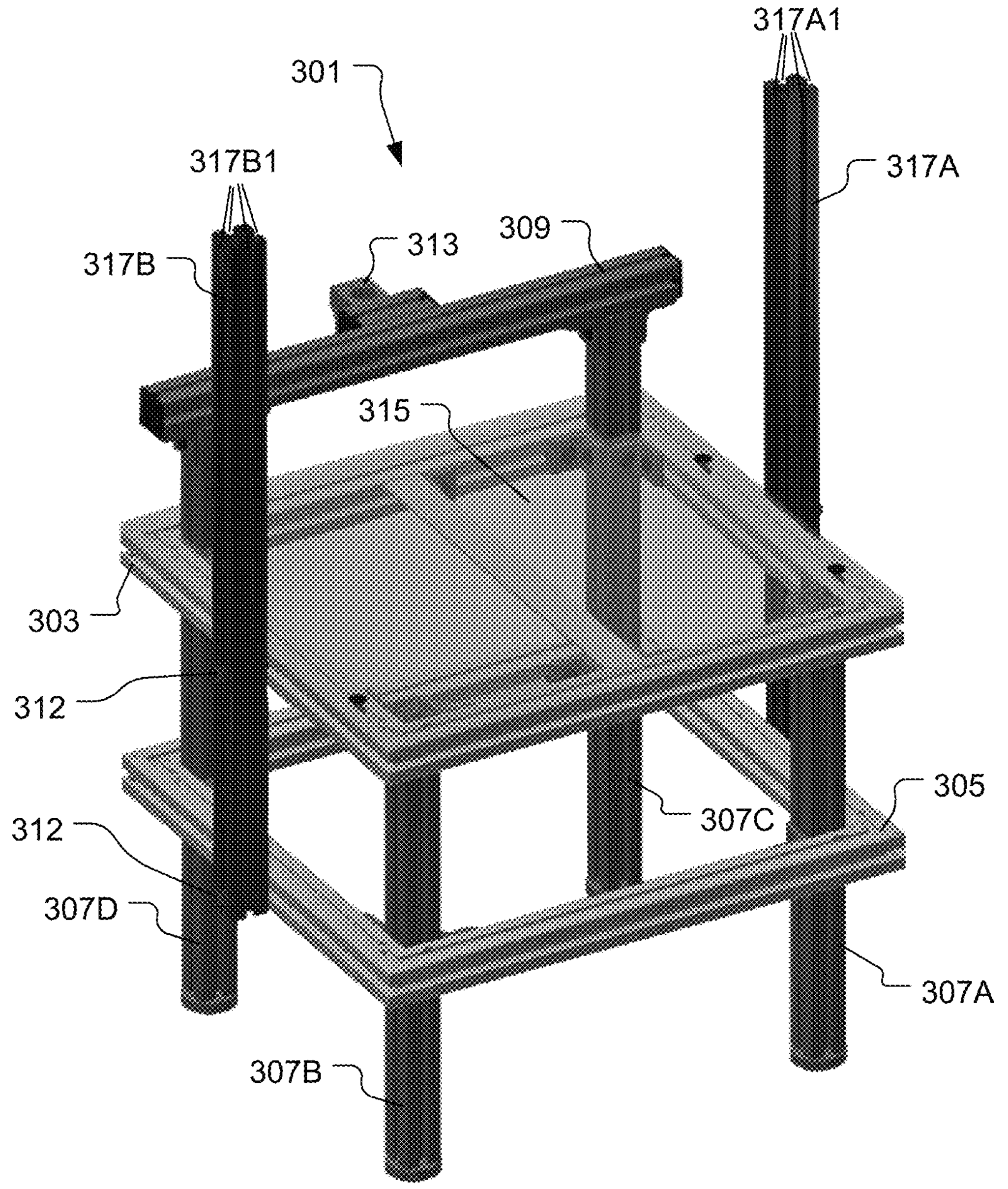
FIG. 8 shows the chair structure with arm rest bases connected to the upper frame and the lower frame, in accordance with some embodiments of the present invention.

FIG. 8 shows the chair structure 301 with arm rest bases 317A, 317B connected to the upper frame 303 and the lower frame 305, in accordance with some embodiments of the present invention. Specifically, the left arm rest base 317A is connected to the left sides of both the upper frame 303 and the lower frame 305, such that the left arm rest base 317A is in a substantially vertical orientation. Similarly, the right arm rest base 317B is connected to the right sides of both the upper frame 303 and the lower frame 305, such that the right arm rest base 317B is in a substantially vertical orientation. In some embodiments, each of the arm rest bases 317A, 317B is secured to the upper frame 303 and the lower frame 305 at a position about midway along the sides of the upper frame 303 and the lower frame 305. However, in other embodiments, the arm rest bases 317A, 317B can be secured to the upper frame 303 and the lower frame 305 at essentially any position along the sides of the upper frame 303 and the lower frame 305.

In some embodiments, the arm rest bases 317A, 317B are formed of tubing having a substantially rectangular cross-section, such that exterior surfaces of the arm rest bases 317A, 317B are substantially flat to provide for stable and precise mounting of the arm rest bases 317A, 317B to the upper frame 303 and the lower frame 305, and to provide for stable and precise mounting of additional components to the arm rest bases 317A, 317B, such as force application components, belts, buckles, ratchet mechanisms, rod mounts, among others. However, it should be understood that in other embodiments, the arm rest bases 317A, 317B can be formed to have a cross-sectional shape other than rectangular, such as circular, polygonal, or another geometrical shape or combination of geometrical shapes. Also, in some embodiments, the arm rest bases 317A, 317B are formed to have longitudinal channels 317A1, 317B1, respectively, along their exterior surfaces, where the longitudinal channels 317A1, 317B1 are configured to provide an engagement mechanism for fastening devices associated with mounting of the arm rest bases 317A, 317B to the upper frame 303 and the lower frame 305, and/or for fastening devices associated with mounting of additional components to the arm rest bases 317A, 317B, such as force application components, belts, buckles, ratchet mechanisms, rod mounts, among others. It should be understood, however, that in other embodiments, the arm rest bases 317A, 317B can be formed without longitudinal channels 317A1, 317B1 along their exterior surfaces. For example, in such embodiments, the arm rest bases 317A, 317B can be drilled through as needed to provide engagement mechanisms for fastening devices associated with mounting of the arm rest bases 317A, 317B to the upper frame 303 and the lower frame 305, and/or for fastening devices associated with mounting of additional components to the arm rest bases 317A, 317B, such as force application components, belts, buckles, ratchet mechanisms, rod mounts, among others. In some embodiments, the arm rest bases 317A, 317B have a length within a range extending from about 15 inches to about 35 inches. In some embodiments, the arm rest bases 317A, 317B have a length of about 27 inches.

In the example embodiment of FIG. 8, the arm rest bases 317A, 317B are secured to the upper frame 303 and the lower frame 305 using machine screws 312. In some embodiments, the machine screws 312 interface with respective threaded receptacles disposed within the upper frame 303 and the lower frame 305. And, in some embodiments, the threaded receptacles are slidable along the longitudinal channels 303B, 305A of the upper frame 303 and the lower frame 305 to enable positioning of the threaded receptacles as needed to receive the machine screws 312 associated with the arm rest bases 317A, 317B. It should be understood, however, that in other embodiments the arm rest bases 317A, 317B can be secured to the upper frame 303 and the lower frame 305 using essentially any attachment mechanism that provides a mechanically stable connection between the arm rest bases 317A, 317B and the upper frame 303 and the lower frame 305. For example, in some embodiments, the arm rest bases 317A, 317B can be welded to the upper frame 303 and the lower frame 305. Or, in some embodiments, the arm rest bases 317A, 317B can be secured to the upper frame 303 and the lower frame 305 using bolts and nuts. In some embodiments, the arm rest bases 317A, 317B are formed of one or more of aluminum, aluminum alloy, steel, steel alloy, stainless steel, carbon-fiber, fiberglass, plastic, acrylic, polymer, PVC, wood, or other material of similar mechanical strength and rigidity.

Figure 9:
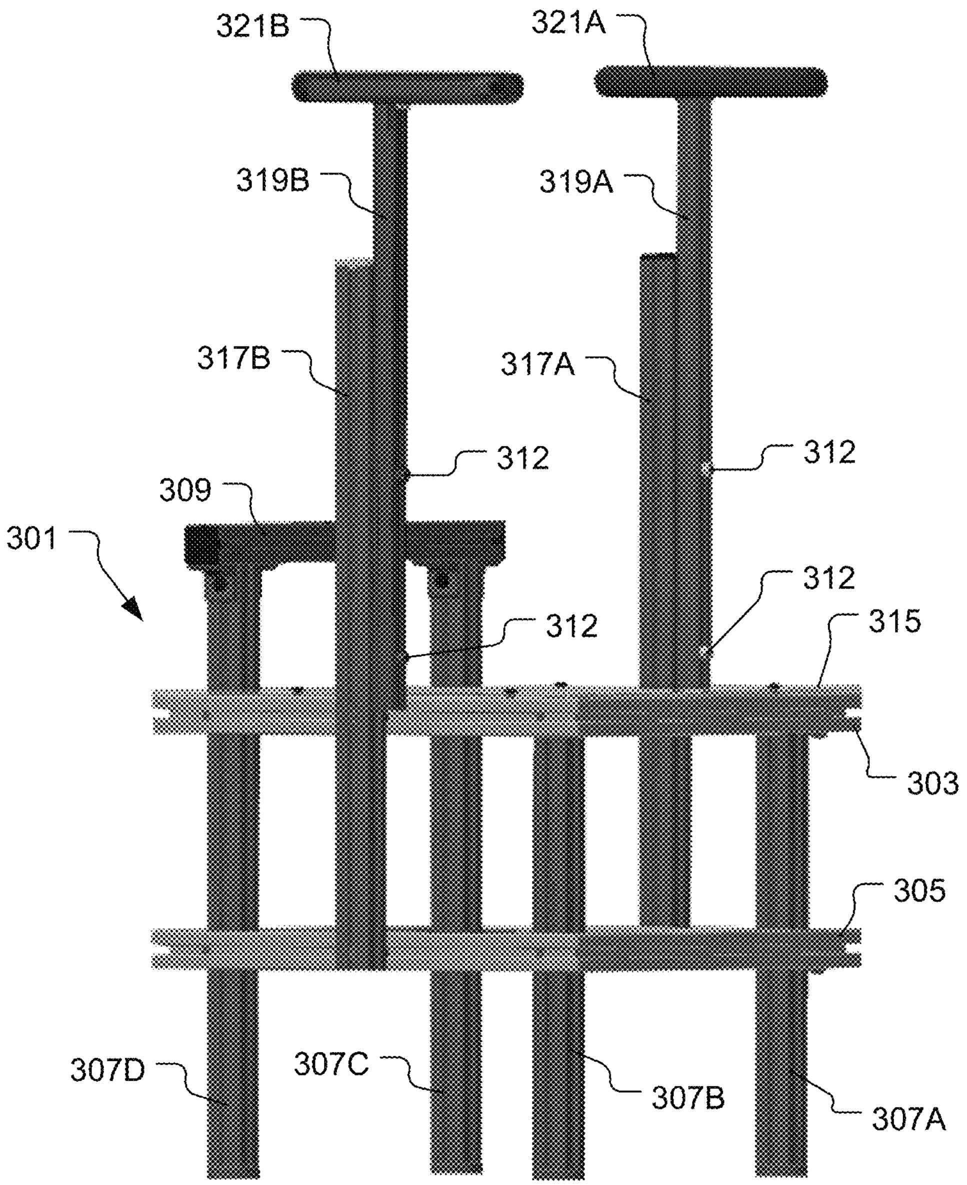
FIG. 9 shows the chair structure with arm rest supports attached to the arm rest bases, in accordance with some embodiments of the present invention.
Figure 10:
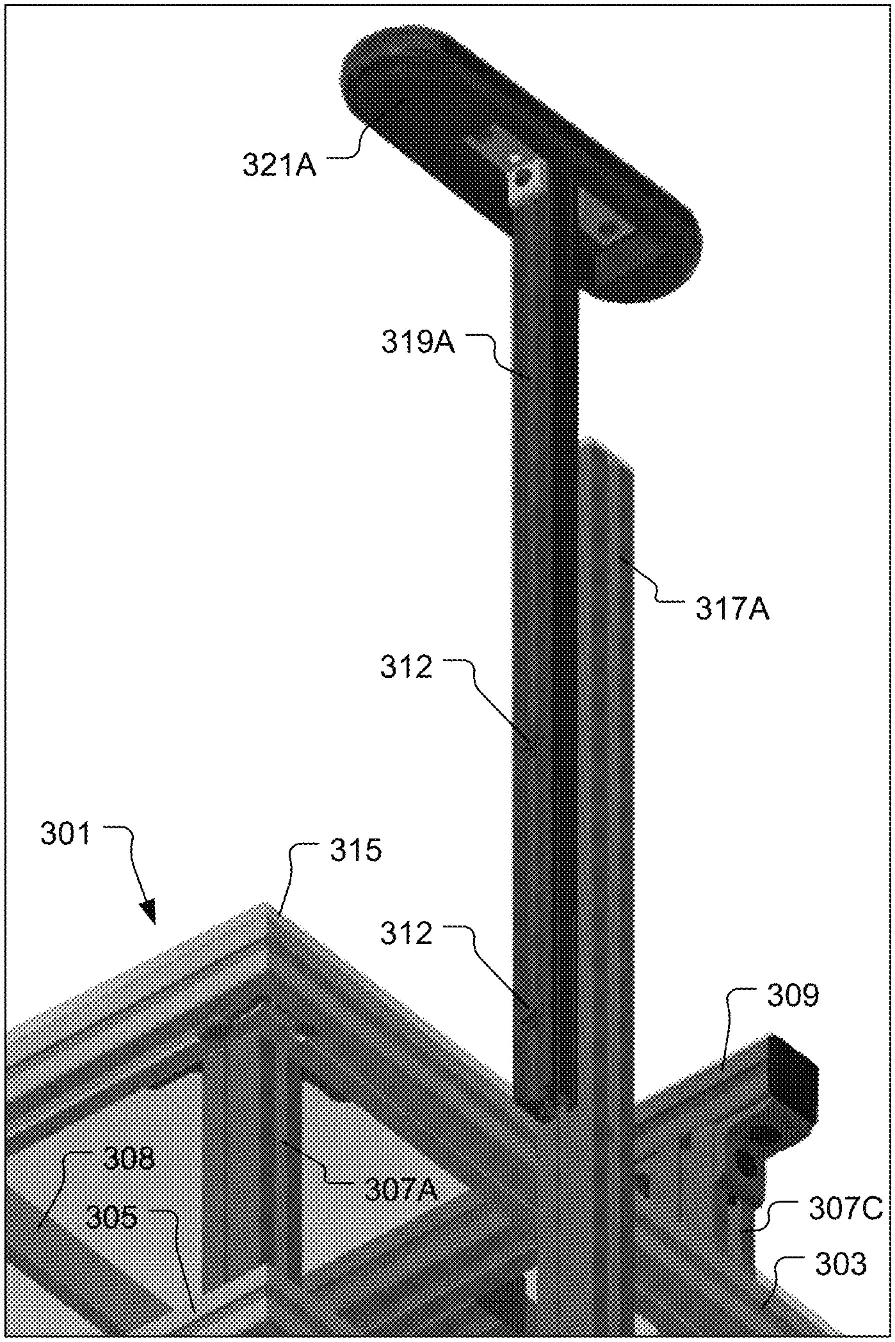
FIG. 10 shows a close-up view of the connection between the left arm rest pad and the left arm rest support, in accordance with some embodiments of the present invention.

FIG. 9 shows the chair structure 301 with arm rest supports 319A, 319B attached to the arm rest bases 317A, 317B, respectively, in accordance with some embodiments of the present invention. Arm rest pads 321A, 321B are secured to top ends of the arm rest supports 319A, 319B respectively. FIG. 10 shows a close up view of the connection between the left arm rest pad 321A and the left arm rest support 319A, in accordance with some embodiments of the present invention. The arm rest supports 319A, 319B and arm rest bases 317A, 317B are configured to enable vertical position adjustment of the arm rest pads 321A, 321B relative to the seat 315. Also, in some embodiments, the arm rest pads 321A, 321B are connected to the arm rest supports 319A, 319B such that the arm rest pads 321A, 321B can be rotated in a horizontal plane about axes of the arm rest supports 319A, 319B, respectively. In some embodiments, the arm rest supports 319A, 319B are formed of tubing having a substantially rectangular cross-section, such that exterior surfaces of the arm rest supports 319A, 319B are substantially flat to provide for stable and precise mounting of the arm rest supports 319A, 319B to the arm rest bases 317A, 317B. However, it should be understood that in other embodiments, the arm rest supports 319A, 319B can be formed to have a cross-sectional shape other than rectangular, such as circular, polygonal, or another geometrical shape or combination of geometrical shapes. In some embodiments, the arm rest supports 319A, 319B are drilled through as needed to provide holes for fastening devices associated with mounting of the arm rest supports 319A, 319B to the arm rest bases 317A, 317B, respectively. In some embodiments, the arm rest supports 319A, 319B have a length within a range extending from about 15 inches to about 35 inches. In some embodiments, the arm rest supports 319A, 319B have a length of about 24 inches.

In the example embodiment of FIG. 9, the arm rest supports 319A, 319B are secured to the arm rest bases 317A, 317B, respectively, using machine screws 312. In some embodiments, the machine screws 312 interface with respective threaded receptacles disposed within the arm rest bases 317A, 317B. And, in some embodiments, the threaded receptacles are slidable along the longitudinal channels 317A1, 317B1 of the arm rest bases 317A, 317B to enable positioning of the threaded receptacles as needed to receive the machine screws 312 associated with the arm rest supports 319A, 319B. It should be understood, however, that in other embodiments the arm rest supports 319A, 319B can be secured to the arm rest bases 317A, 317B using essentially any attachment mechanism that provides a mechanically stable connection between the arm rest supports 319A, 319B and the arm rest bases 317A, 317B, respectively. For example, in some embodiments, the arm rest supports 319A, 319B can be secured to the arm rest bases 317A, 317B, respectively, using bolts and nuts. In some embodiments, the arm rest supports 319A, 319B are formed of one or more of aluminum, aluminum alloy, steel, steel alloy, stainless steel, carbon-fiber, fiberglass, plastic, acrylic, polymer, PVC, wood, or other material of similar mechanical strength and rigidity.

Figure 11:
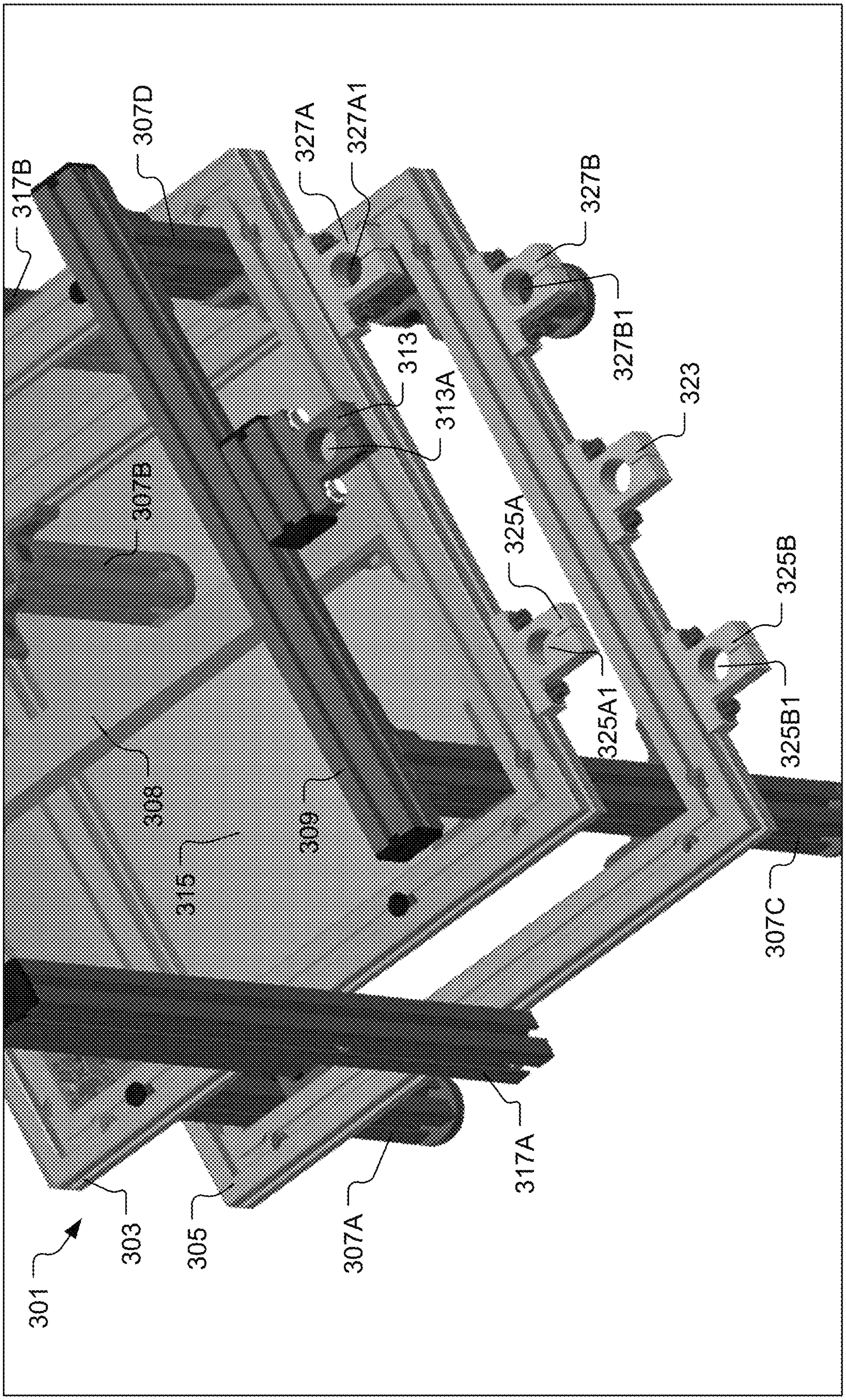
FIG. 11 shows backside post bases connected to the chair structure, in accordance with some embodiments of the present invention.

FIG. 11 shows backside post bases 323, 325A, 325B, 327A, 327B connected to the chair structure 301, in accordance with some embodiments of the present invention. The post bases 325A and 327A are secured to the upper frame 303. The post bases 323, 325B, and 327B are secured to the lower frame 305. The post base 323 is configured to have a receptacle 323A through which a vertical post can be positioned and secured. The receptacle 323A is vertically aligned with the receptacle 313A of the post base 313 so that a vertical post can be positioned to extend through both of the receptacles 313A and 323A. The post bases 325A and 325B are configured to have receptacle 325A1 and 325B1, respectively, through which a vertical post can be positioned and secured. Also, the receptacles 325A1 and 325B1 are vertically aligned with each other so that a vertical post can be positioned to extend through both of the receptacles 325A1 and 325B1. The post bases 327A and 327B are configured to have receptacles 327A1 and 327B1, respectively, through which a vertical post can be positioned and secured. And, the receptacles 327A1 and 327B1 are vertically aligned with each other so that a vertical post can be positioned to extend through both of the receptacles 327A1 and 327B1.

In some embodiments, the post bases 325A, and 327A are secured to the upper frame 303 using machine screws 312. In some embodiments, the machine screws 312 interface with respective threaded receptacles disposed within the upper frame 303. And, in some embodiments, the threaded receptacles are slidable along the longitudinal channels 303B of the upper frame 303 to enable positioning of the threaded receptacles as needed to receive the machine screws 312 associated with post bases 325A, 327A, and to enable positioning of the post bases 325A, 327A as needed along the upper frame 303. It should be understood, however, that in other embodiments the post bases 325A, 327A can be secured to the upper frame 303 using essentially any attachment mechanism that provides a mechanically stable connection between the post bases 325A, 327A and upper frame 303. For example, in some embodiments, the post bases 325A, 327A can be secured to the upper frame 303 using bolts and nuts. And, in some embodiments, the post bases 325A, 327A can be welded to the upper frame 303.

In some embodiments, the post bases 323, 325B, and 327B are secured to the lower frame 305 using machine screws 312. In some embodiments, the machine screws 312 interface with respective threaded receptacles disposed within the lower frame 305. And, in some embodiments, the threaded receptacles are slidable along the longitudinal channels 305A of the lower frame 305 to enable positioning of the threaded receptacles as needed to receive the machine screws 312 associated with post bases 323, 325B, 327B, and to enable positioning of the post bases 323, 325B, 327B as needed along the lower frame 305. It should be understood, however, that in other embodiments the post bases 323, 325B, 327B can be secured to the lower frame 305 using essentially any attachment mechanism that provides a mechanically stable connection between the post bases 323, 325B, 327B and lower frame 305. For example, in some embodiments, the post bases 323, 325B, 327B can be secured to the lower frame 305 using bolts and nuts. And, in some embodiments, the post bases 323, 325B, 327B can be welded to the lower frame 305. In various embodiments, the post bases 323, 325A, 325B, 327A, 327B can be formed of one or more of aluminum, aluminum alloy, steel, steel alloy, stainless steel, brass, zinc, zinc alloy, metal, plastic, acrylic, polymer, PVC, or other material of similar mechanical strength and rigidity.

Figure 12:
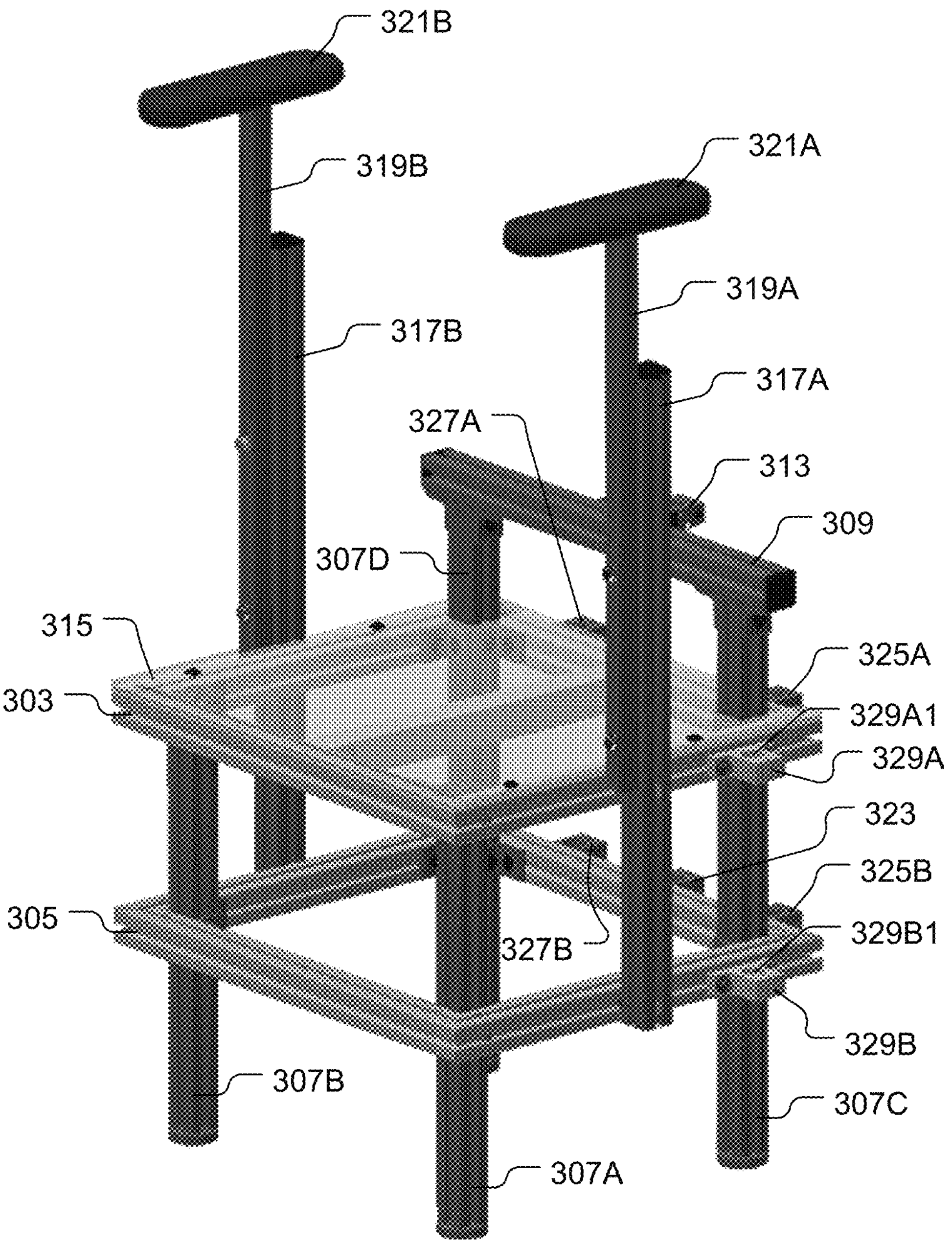
FIG. 12 shows left side post bases connected to the chair structure, in accordance with some embodiments of the present invention.

FIG. 12 shows left side post bases 329A, 329B connected to the chair structure 301, in accordance with some embodiments of the present invention. The post base 329A is secured to the upper frame 303, and the post base 329B is secured to the lower frame 305. The post bases 329A and 329B are configured to have receptacles 329A1 and 329B1, respectively, through which a vertical post can be positioned and secured. The receptacles 329A1 and 329B1 are vertically aligned with each other so that a vertical post can be positioned to extend through both of the receptacles 329A1 and 329B1. In some embodiments, the post bases 329A and 329B are secured to the upper frame 303 and the lower frame 305, respectively, using machine screws 312. In some embodiments, the machine screws 312 interface with respective threaded receptacles disposed within the upper frame 303 and the lower frame 305. And, in some embodiments, the threaded receptacles are slidable along the longitudinal channels 303B and 305A of the upper frame 303 and the lower frame 305, respectively, to enable positioning of the threaded receptacles as needed to receive the machine screws 312 associated with post bases 329A and 329B, and to enable positioning of the post bases 329A and 329B as needed along the upper frame 303 and the lower frame 305, respectively. It should be understood, however, that in other embodiments the post bases 329A and 329B can be secured to the upper frame 303 and the lower frame 305, respectively, using essentially any attachment mechanism that provides a mechanically stable connection between the post bases 329A and 329B and the upper frame 303 and the lower frame 305, respectively. For example, in some embodiments, the post bases 329A and 329B can be secured to the upper frame 303 and the lower frame 305, respectively, using bolts and nuts. And, in some embodiments, the post bases 329A and 329B can be welded to the upper frame 303 and the lower frame 305, respectively. In various embodiments, the post bases 329A and 329B can be formed of one or more of aluminum, aluminum alloy, steel, steel alloy, stainless steel, brass, zinc, zinc alloy, metal, plastic, acrylic, polymer, PVC, or other material of similar mechanical strength and rigidity.

Figure 13:
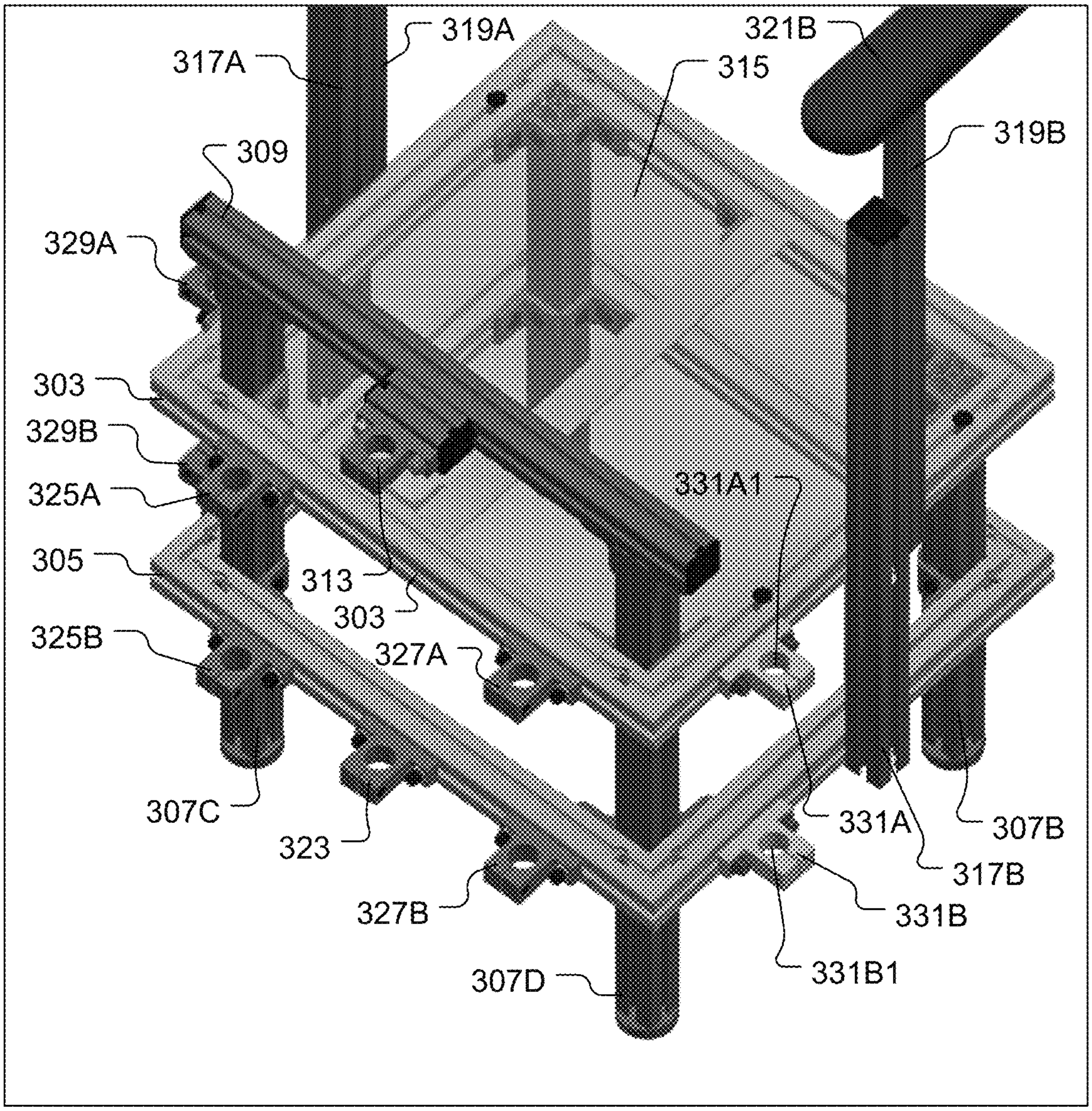
FIG. 13 shows right side post bases connected to the chair structure, in accordance with some embodiments of the present invention.

FIG. 13 shows right side post bases 331A, 331B connected to the chair structure 301, in accordance with some embodiments of the present invention. The post base 331A is secured to the upper frame 303, and the post base 331B is secured to the lower frame 305. The post bases 331A and 331B are configured to have receptacles 331A1 and 331B1, respectively, through which a vertical post can be positioned and secured. The receptacles 331A1 and 331B1 are vertically aligned with each other so that a vertical post can be positioned to extend through both of the receptacles 331A1 and 331B1. In some embodiments, the post bases 331A and 331B are secured to the upper frame 303 and the lower frame 305, respectively, using machine screws 312. In some embodiments, the machine screws 312 interface with respective threaded receptacles disposed within the upper frame 303 and the lower frame 305. And, in some embodiments, the threaded receptacles are slidable along the longitudinal channels 303B and 305A of the upper frame 303 and the lower frame 305, respectively, to enable positioning of the threaded receptacles as needed to receive the machine screws 312 associated with post bases 331A and 331B, and to enable positioning of the post bases 331A and 331B as needed along the upper frame 303 and the lower frame 305, respectively. It should be understood, however, that in other embodiments the post bases 331A and 331B can be secured to the upper frame 303 and the lower frame 305, respectively, using essentially any attachment mechanism that provides a mechanically stable connection between the post bases 331A and 331B and the upper frame 303 and the lower frame 305, respectively. For example, in some embodiments, the post bases 331A and 331B can be secured to the upper frame 303 and the lower frame 305, respectively, using bolts and nuts. And, in some embodiments, the post bases 331A and 331B can be welded to the upper frame 303 and the lower frame 305, respectively. In various embodiments, the post bases 331A and 331B can be formed of one or more of aluminum, aluminum alloy, steel, steel alloy, stainless steel, brass, zinc, zinc alloy, metal, plastic, acrylic, polymer, PVC, or other material of similar mechanical strength and rigidity.

Figure 14:
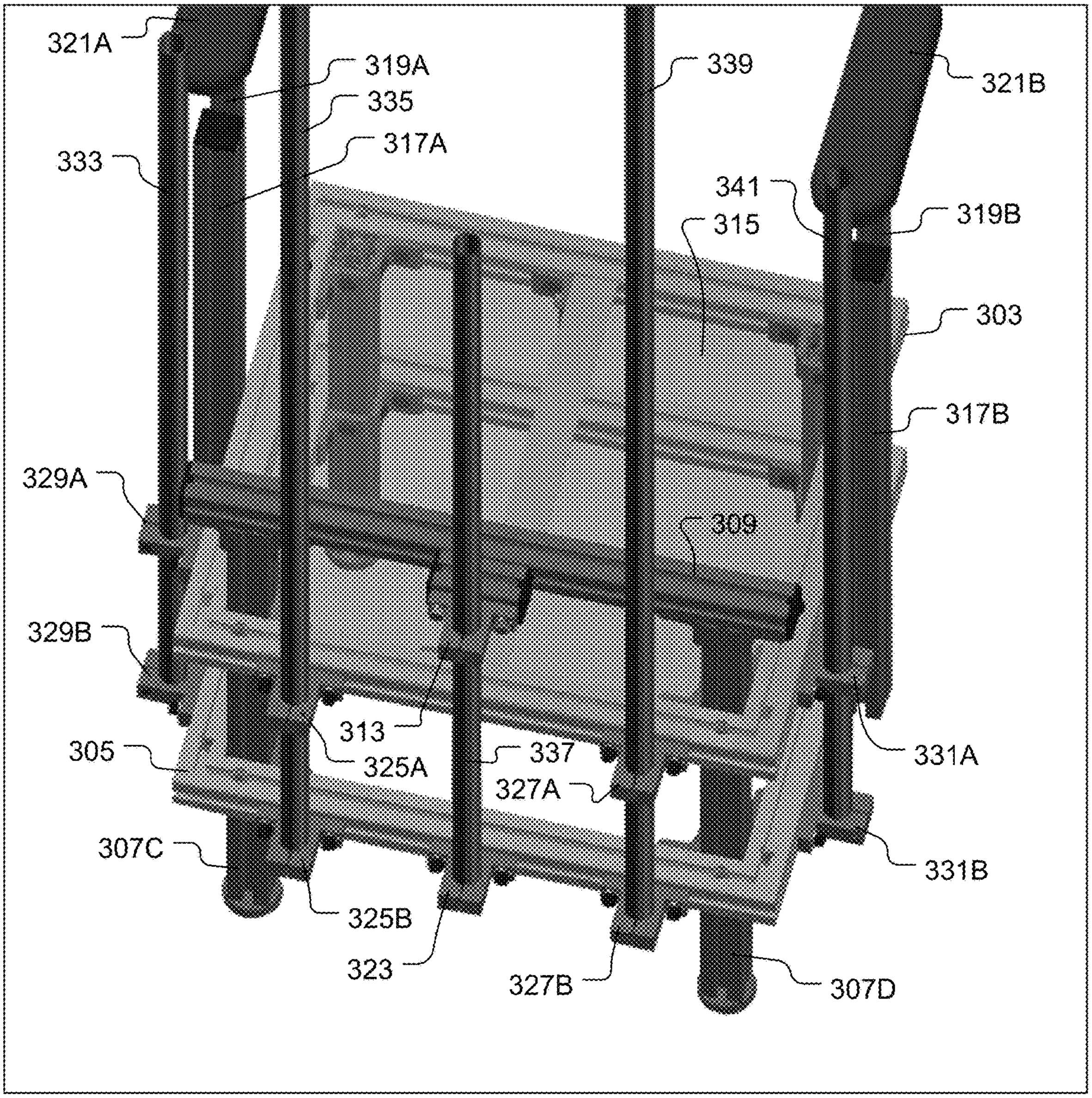
FIG. 14 shows a close-up view of the backside of the chair structure having posts secured to the chair structure, in accordance with some embodiments of the present invention.
Figure 15:
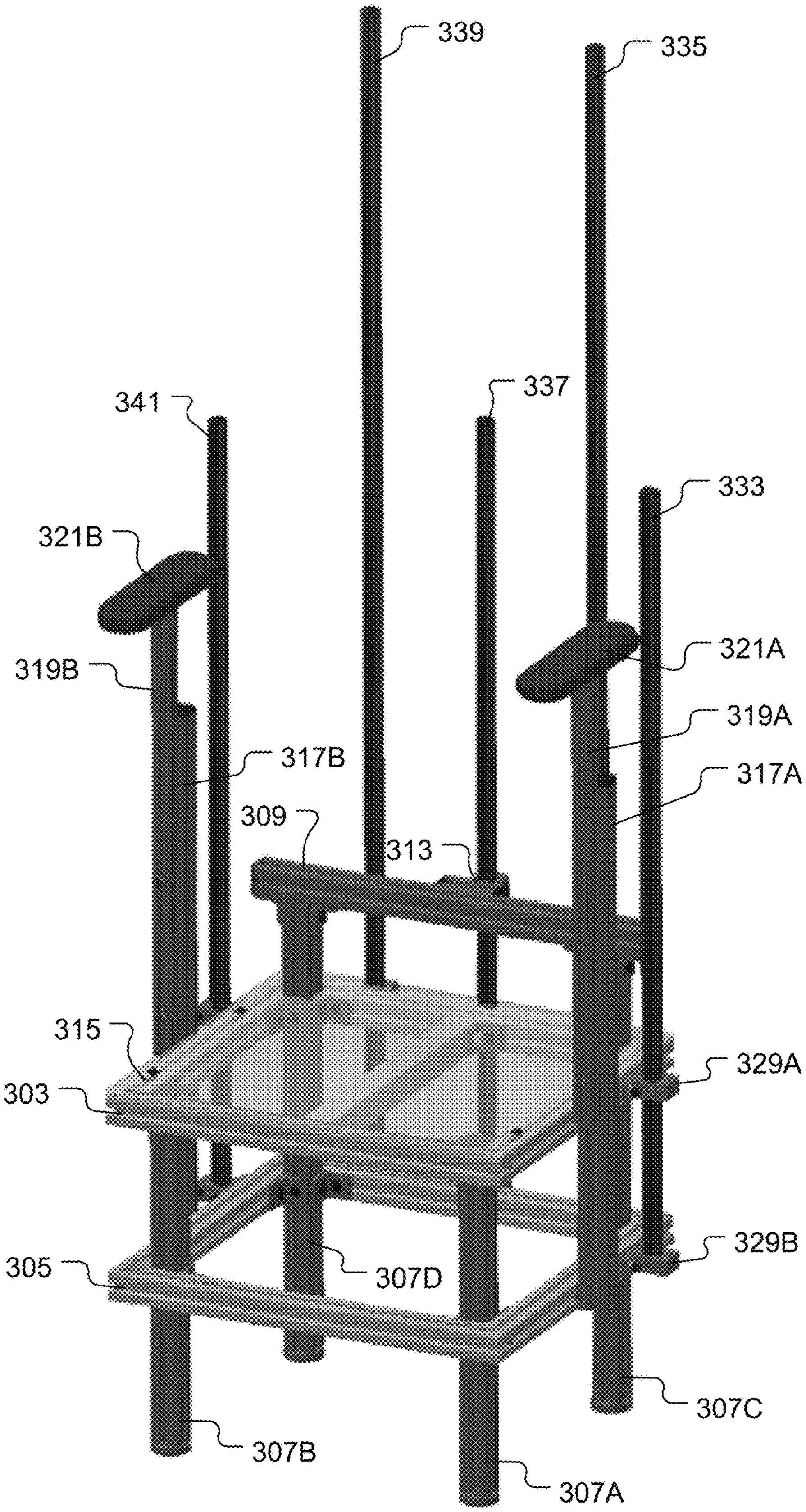
FIG. 15 shows a front view of the chair structure with posts secured to the chair structure, in accordance with some embodiments of the present invention.

FIG. 14 shows a close-up view of the backside of the chair structure 301 having posts 333, 335, 337, 339, and 341 secured to the chair structure 301, in accordance with some embodiments of the present invention. FIG. 15 shows a front view of the chair structure 301 with the posts 333, 335, 337, 339, and 341 secured to the chair structure 301, in accordance with some embodiments of the present invention. The post 333 is inserted through both the post bases 329A and 329B. The post 335 is inserted through both the post bases 325A and 325B. The post 337 is inserted through both the post bases 313 and 323. The post 339 is inserted through both the post bases 327A and 327B. The post 341 is inserted through both the post bases 331A and 331B. The posts 333, 335, 337, 339, and 341 are formed of a material that provides sufficient rigidity to avoid bending and/or substantial flexing when exposed to the forces associated with treating the person 302 within the SFT 300. In some embodiments, posts 333, 335, 337, 339, 341 are formed of one or more of aluminum, aluminum alloy, steel, steel alloy, stainless steel, carbon-fiber, fiberglass, plastic, acrylic, polymer, PVC, wood, or other material of similar mechanical strength and rigidity. In some embodiments, each of the posts 333, 337, and 341 has a length within a range extending from about 25 inches to about 60 inches. In some embodiments, each of the posts 333, 337, and 341 has a length of about 40 inches. In some embodiments, each of the posts 335 and 339 has a length within a range extending from about 40 inches to about 70 inches. In some embodiments, each of the posts 335 and 339 has a length of about 60 inches.

Figure 16:
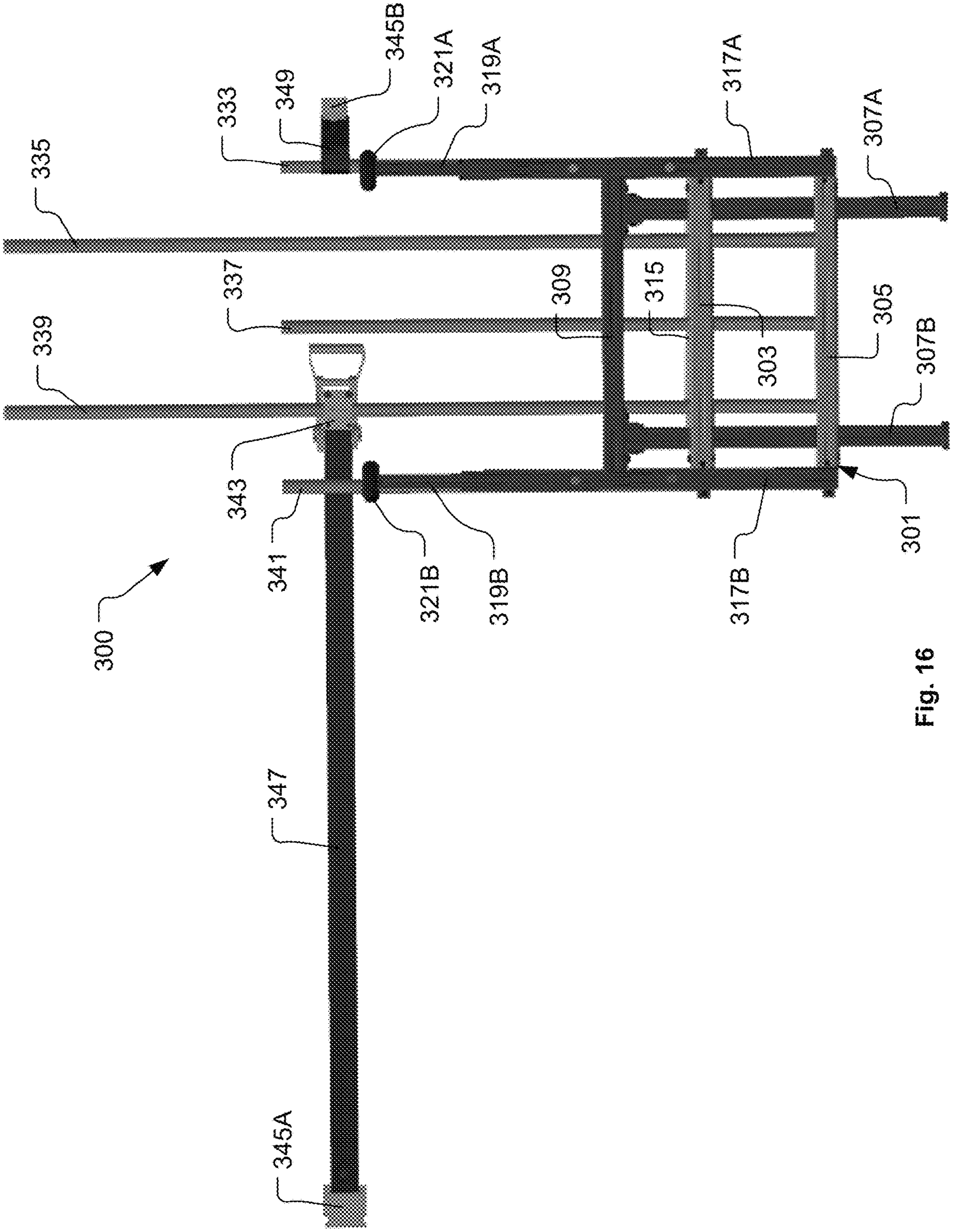
FIG. 16 shows a sternal belt assembly connected to the chair structure, in accordance with some embodiments of the present invention.

FIG. 16 shows a sternal belt assembly connected to the chair structure 301, in accordance with some embodiments of the present invention. In some embodiments, the sternal belt assembly includes a sternal belt ratchet 343, a sternal belt coupling 345A/345B, and a sternal belt 347. A first end of the sternal belt 347 is connected to the sternal belt ratchet 343. A second end of the sternal belt 347 is connected to a first member 345 of the sternal belt coupling 345A/345B. A second member 345B of the sternal belt coupling 345A/345B is connected to the post 333. In some embodiments, the second member 345B of the sternal belt coupling 345A/345B is connected to the post 333 by way of a belt portion 349. In some embodiments, the second member 345B of the sternal belt coupling 345A/345B is connected directly to the post 333. The sternal belt 347 is configured to extend around an upper thoracic region (chest) of the person 302 and under each arm of the person 302 when the person 302 is seated on the seat 315. The sternal belt ratchet 343 is configured to draw the sternal belt 347 tight so as to hold the upper thoracic region of person 302 toward a back of the SFT 300.

In various embodiments, a vertical size of the sternal belt 347 is set based on the physical characteristics of the person

302 so as to effectively interface with the upper thoracic region of the person 302. In some embodiments, the sternal belt 347 is configured to have a width within a range extending from about 2 inches to about 6 inches, or within a range extending from about 2 inches to about 4 inches, or within a range extending from about 2 inches to about 3 inches. In various embodiments, the sternal belt 347 can be configured to have different shapes as needed to effectively interface with the upper thoracic region of the person 302. In some embodiments, the sternal belt 347 can be configured to provide increased comfort to the person 302. For example, in some embodiments, the sternal belt 347 can be formed of a single material, such as rubber, nylon, cotton, vinyl, polypropylene, hemp, among others. Also, in some embodiments, the sternal belt 347 can be formed to have multiple layers of material, with one or more layers of material closer to the person 302 having increased softness relative to one or more other layers of material farther away from the person 302. More specifically, in some embodiments, one or more layers of the sternal belt 347 that are positioned closer to the person 302 can be formed of material having a smaller modulus of elasticity, such as foam, rubber, gel, among others, whereas one or more layers of the sternal belt 347 that are positioned farther from the person 302 can be formed of material having a larger modulus of elasticity, such as nylon, cotton, vinyl, polypropylene, hemp, among others.

Figure 17:
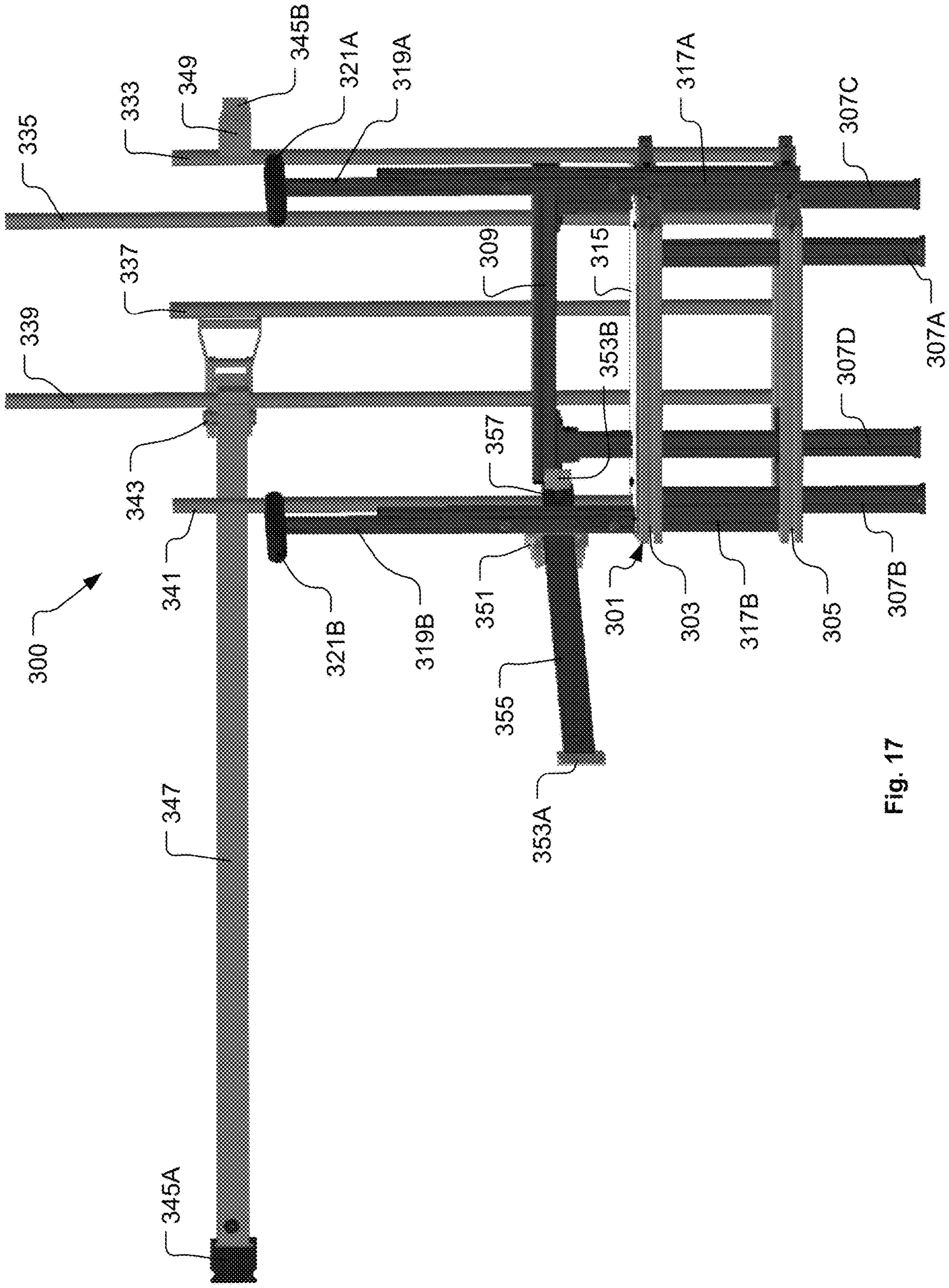
FIG. 17 shows a lumbar belt assembly connected to the chair structure, in accordance with some embodiments of the present invention.

FIG. 17 shows a lumbar belt assembly connected to the chair structure 301, in accordance with some embodiments of the present invention. In some embodiments, the lumbar belt assembly includes a lumbar belt ratchet 351, a lumbar belt coupling 353A/353B, and a lumbar belt 355. In the example embodiment of FIG. 17, the lumbar belt ratchet 351 is attached to the arm rest base 317B. The vertical position of the lumbar belt ratchet 351 is adjustable along the arm rest base 317B. A first end of the lumbar belt 355 is connected to the lumbar belt ratchet 351. A second end of the lumbar belt 355 is connected to a first member 353A of the lumbar belt coupling 353A/353B. In some embodiments, a second member 353B of the lumbar belt coupling 353A/353B is connected to the post 341. In some embodiments, the second member 353B of the lumbar belt coupling 353A/353B is connected to the lumbar belt ratchet 351. In some embodiments, the lumbar belt 355 extends around the post 341 and connects directly to the lumbar belt ratchet 351. In some embodiments, the second member 353B of the lumbar belt coupling 353A/353B is connected to the post 341 by way of a belt portion 357. In some embodiments, the second member 353B of the lumbar belt coupling 353A/353B is connected directly to the post 341. The lumbar belt 355 is configured to extend around the person 302 when the person 302 is seated on the seat 315. More specifically, the lumbar belt 355 is configured to extend around the person 302 and apply force to one or more lower ribs of the person 302, such that the force applied the lower ribs of the person 302 is directed to the lumbar spinal region of the person 302 so as bend the lumbar spinal region of the person 302 in a lateral direction to reverse a scoliotic lumbar curve of the person 302. The lumbar belt ratchet 351 is configured to draw the lumbar belt 355 tight so as to forcibly bend the lumbar spinal region of the person 302 in a direction opposite of the scoliotic lumbar curve of the person 302. In this manner, the lumbar belt 355 assists with stretching of contractures associated with the scoliotic lumbar curve of the person 302.

In various embodiments, a vertical size of the lumbar belt 355 is set based on the physical characteristics of the person 302 so as to effectively interface with the lower ribs of the person 302. In some embodiments, the lumbar belt 355 is configured to have a width within a range extending from about 2 inches to about 6 inches, or within a range extending from about 2 inches to about 4 inches, or within a range extending from about 2 inches to about 3 inches. In various embodiments, the lumbar belt 355 can be configured to have different shapes as needed to effectively interface with the lower ribs of the person 302. In some embodiments, the lumbar belt 355 can be configured to provide increased comfort to the person 302. For example, in some embodiments, the lumbar belt 355 can be formed of a single material, such as rubber, nylon, cotton, vinyl, polypropylene, hemp, among others. Also, in some embodiments, the lumbar belt 355 can be formed to have multiple layers of material, with one or more layers of material closer to the person 302 having increased softness relative to one or more other layers of material farther away from the person 302. More specifically, in some embodiments, one or more layers of the lumbar belt 355 that are positioned closer to the person 302 can be formed of material having a smaller modulus of elasticity, such as foam, rubber, gel, among others, whereas one or more layers of the lumbar belt 355 that are positioned farther from the person 302 can be formed of material having a larger modulus of elasticity, such as nylon, cotton, vinyl, polypropylene, hemp, among others.

Figure 18:
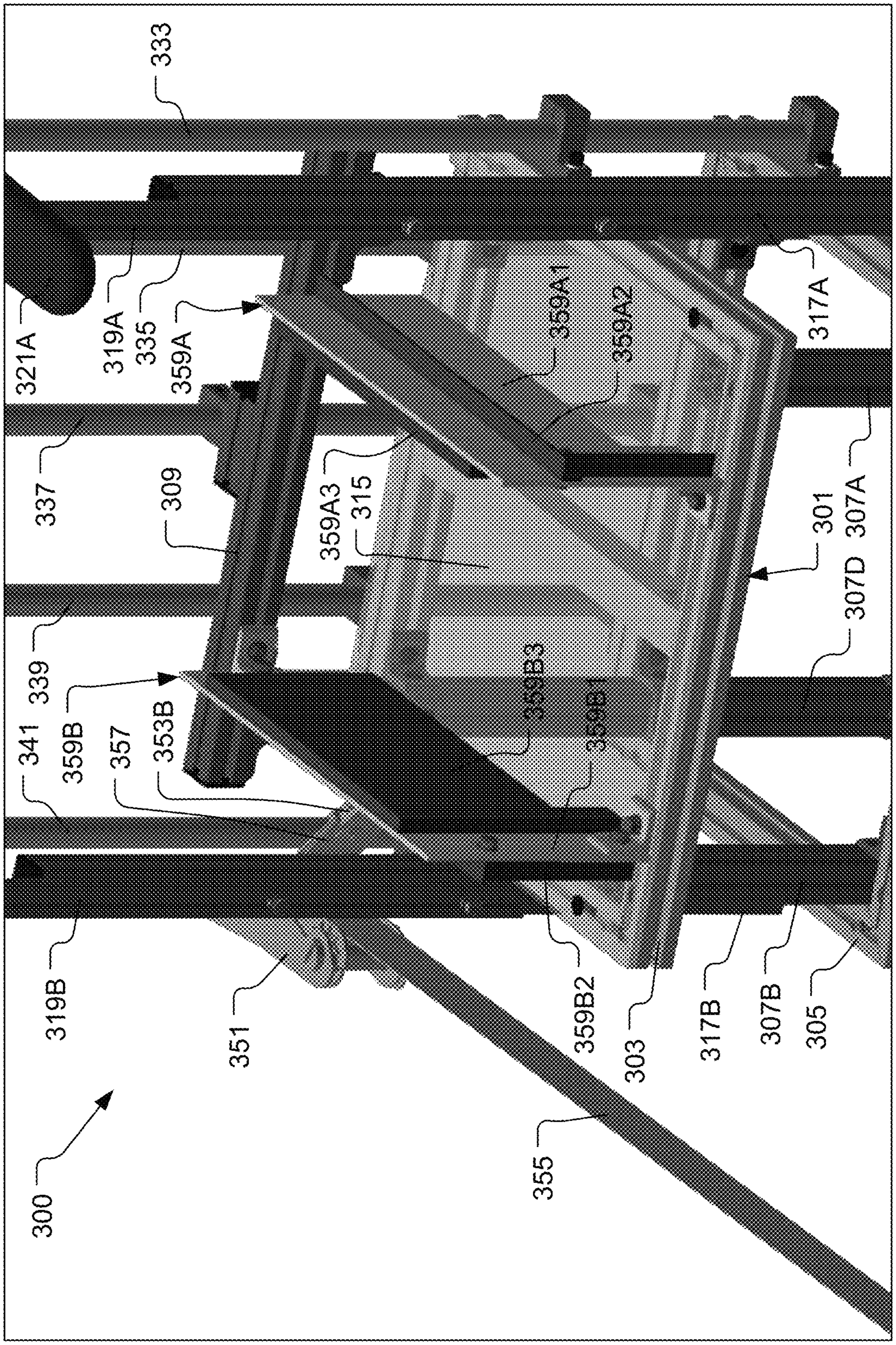
FIG. 18 shows pelvic side restraints connected to the chair structure, in accordance with some embodiments of the present invention.

FIG. 18 shows pelvic side restraints 359A and 359B connected to the chair structure 301, in accordance with some embodiments of the present invention. The pelvic side restraints 359A and 359B are positioned so that the person 302 can sit on the seat 315 between the pelvic side restraints 359A and 359B. The pelvic side restraints 359A and 359B are configured to provide barriers that prevent the person 302 from moving their hips in a sideways manner during treatment in the SFT 300. Therefore, the pelvic side restraints 359A and 359B are configured to maintain a fixed position in the presence of forces associated with treatment of the person 302 in the SFT 300. In the example embodiment of FIG. 18, the pelvic side restraint 359A includes a rigid wall member 359A1, a outside support frame 359A2, and an inside pad 359A3. Similarly, the pelvic side restraint 359B includes a rigid wall member 359B1, a outside support frame 359B2, and an inside pad 359B3. The rigid wall members 359A1 and 359B1 are secured to the chair structure 301. In the example of FIG. 18, each of the rigid wall members 359A1 and 359B1 is secured to both the upper frame 303 and the back bar 309.

In the example embodiment of FIG. 18, the rigid wall members 359A1 and 359B1 are secured to the upper frame 303 and the back bar 309 using machine screws 312. In some embodiments, the machine screws 312 interface with respective threaded receptacles disposed within the upper frame 303 and the back bar 309. And, in some embodiments, the threaded receptacles are slidable along the longitudinal channels 303B, 309A of the upper frame 303 and the back bar 309 to enable positioning of the threaded receptacles as needed to receive the machine screws 312 associated with the rigid wall members 359A1 and 359B1. It should be understood, however, that in other embodiments the rigid wall members 359A1 and 359B1 can be secured to the upper frame 303 and the back bar 309 using essentially any attachment mechanism that provides a mechanically stable connection between the rigid wall members 359A1 and 359B1 and the upper frame 303 and the back bar 309. For example, in some embodiments, the rigid wall members 359A1 and 359B1 can be secured to the upper frame 303 and the back bar 309 using bolts and nuts. In various embodiments, the rigid wall members 359A1 and 359B1 can be formed of one or more of plastic, acrylic, polymer, PVC, wood, aluminum, aluminum alloy, steel, steel alloy, stainless steel, metal, or other material of similar mechanical strength and rigidity.

Figure 19:
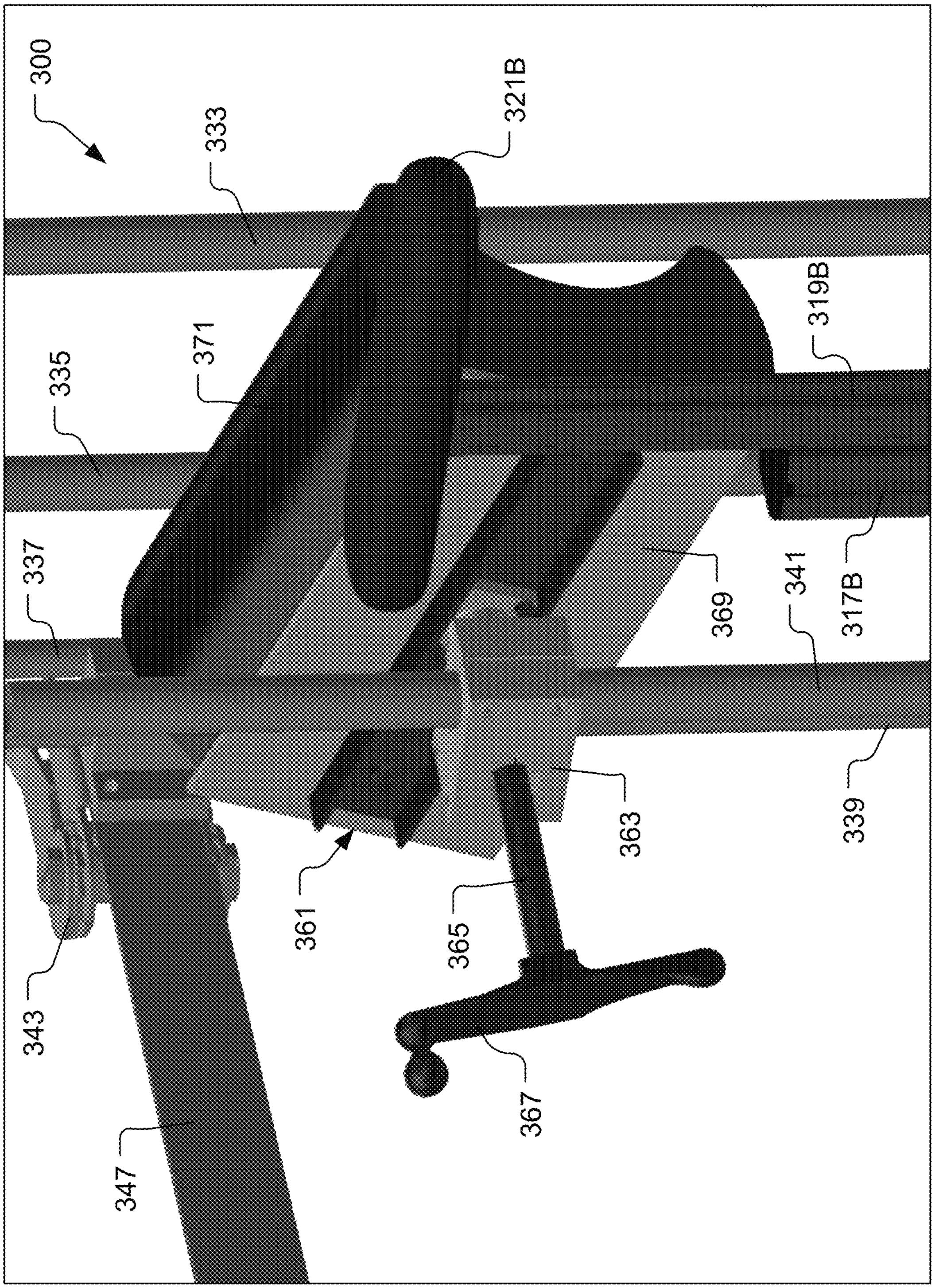
FIG. 19 shows a primary thoracic driver assembly connected to the post, in accordance with some embodiments of the present invention.
Figure 20:
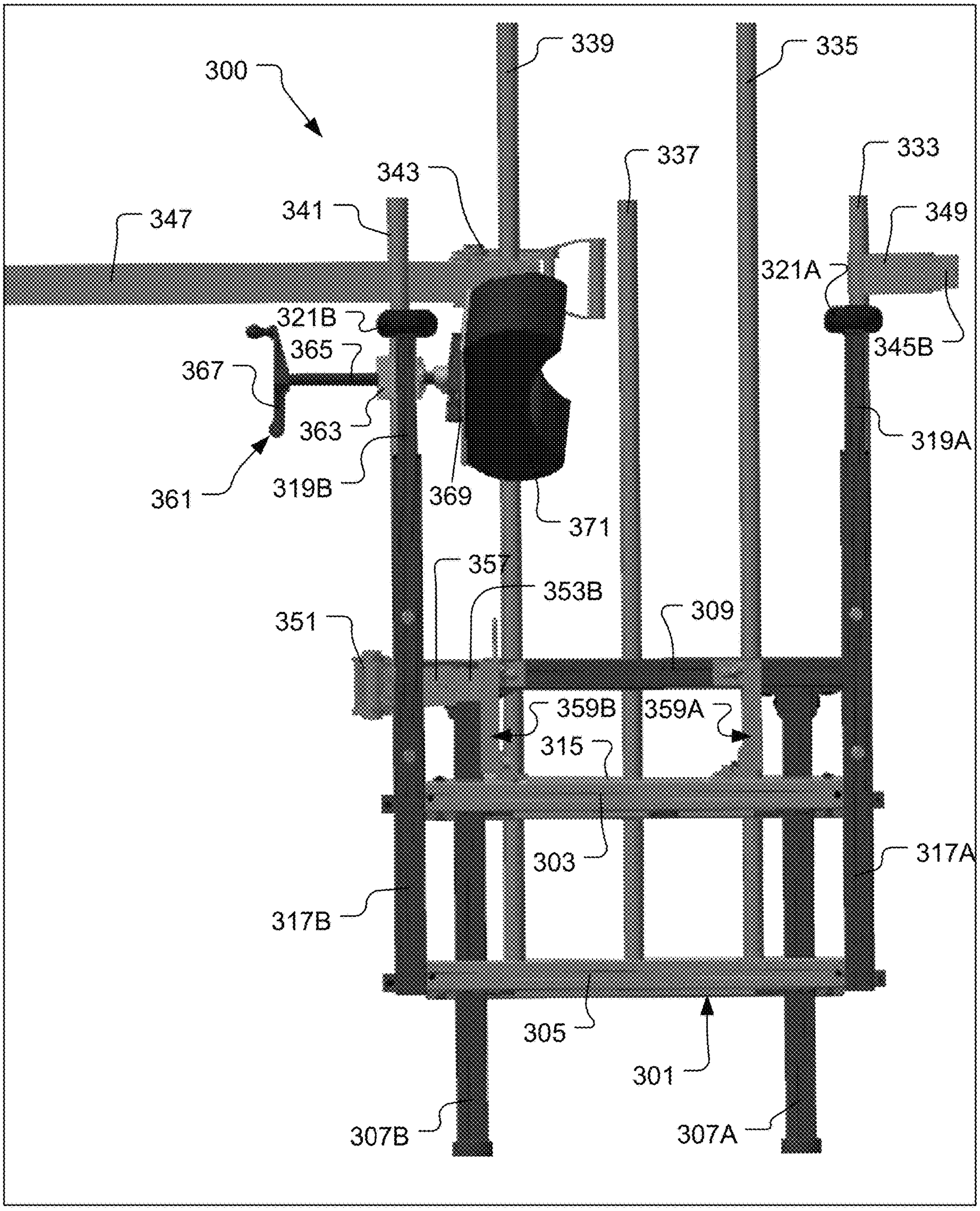
FIG. 20 shows a front view of the chair structure with the primary thoracic driver assembly connected to the post, in accordance with some embodiments of the present invention.

FIG. 19 shows a primary thoracic driver assembly 361 connected to the post 341, in accordance with some embodiments of the present invention. FIG. 20 shows a front view of the chair structure 301 with the primary thoracic driver assembly 361 connected to the post 341, in accordance with some embodiments of the present invention. The primary thoracic driver assembly 361 includes a post coupling 363 configured to secure to the post 341. The vertical position of the post coupling 363 along the post 341 is adjustable. The post coupling 363 is configured to include a threaded receptacle through which a threaded drive bar 365 is positioned. A first end of the threaded drive bar 365 is connected to a handle 367 to provide for turning of the threaded drive bar 365. A second end of the threaded drive bar 365 is connected to a backing member 369. The backing member 369 provides a rigid base for a primary thoracic driver 371. In various embodiments, the components of the primary thoracic driver assembly 361 can be formed of one or more of plastic, acrylic, polymer, PVC, wood, aluminum, aluminum alloy, steel, steel alloy, stainless steel, metal, or other material of similar mechanical strength and rigidity. The primary thoracic driver 371 is configured to engage the thoracic region of the person 302 to apply a prescribed force vector to the thoracic cage of the person 302. The threaded drive bar 365 is turned as needed to move the primary thoracic driver 371 to engage with the person 302 and move the thoracic region of the person 302 to a prescribed therapeutic position when the person 302 is seated on the seat 315. In various embodiments, the post coupling 363 and a connection between the threaded drive bar 365 and the backing member 369 can be configured to provide for positioning of the primary thoracic driver 371 in essentially any required orientation in three-dimensional space.

Figure 21:
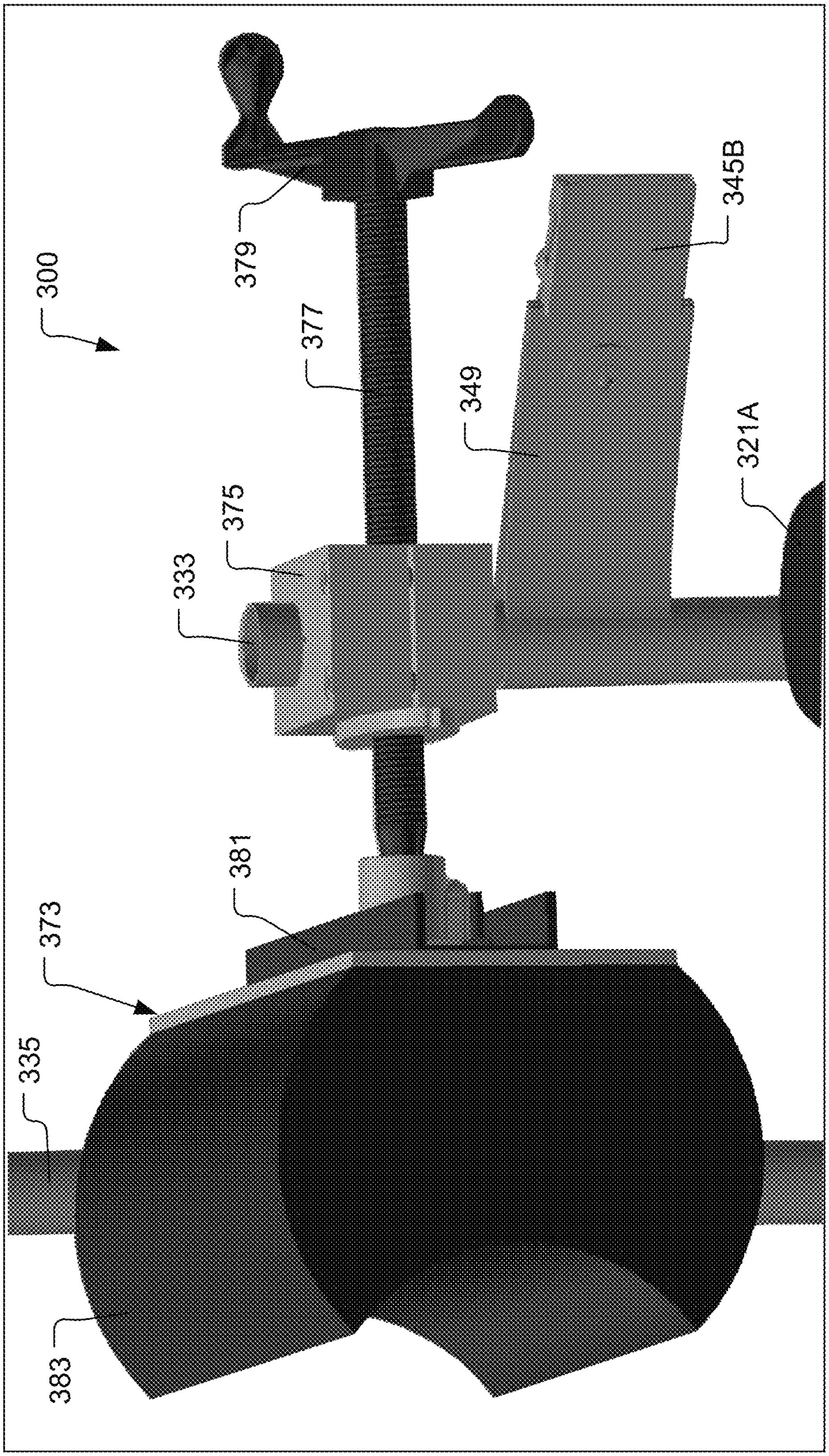
FIG. 21 shows a proximal thoracic driver assembly connected to the post, in accordance with some embodiments of the present invention.
Figure 22:
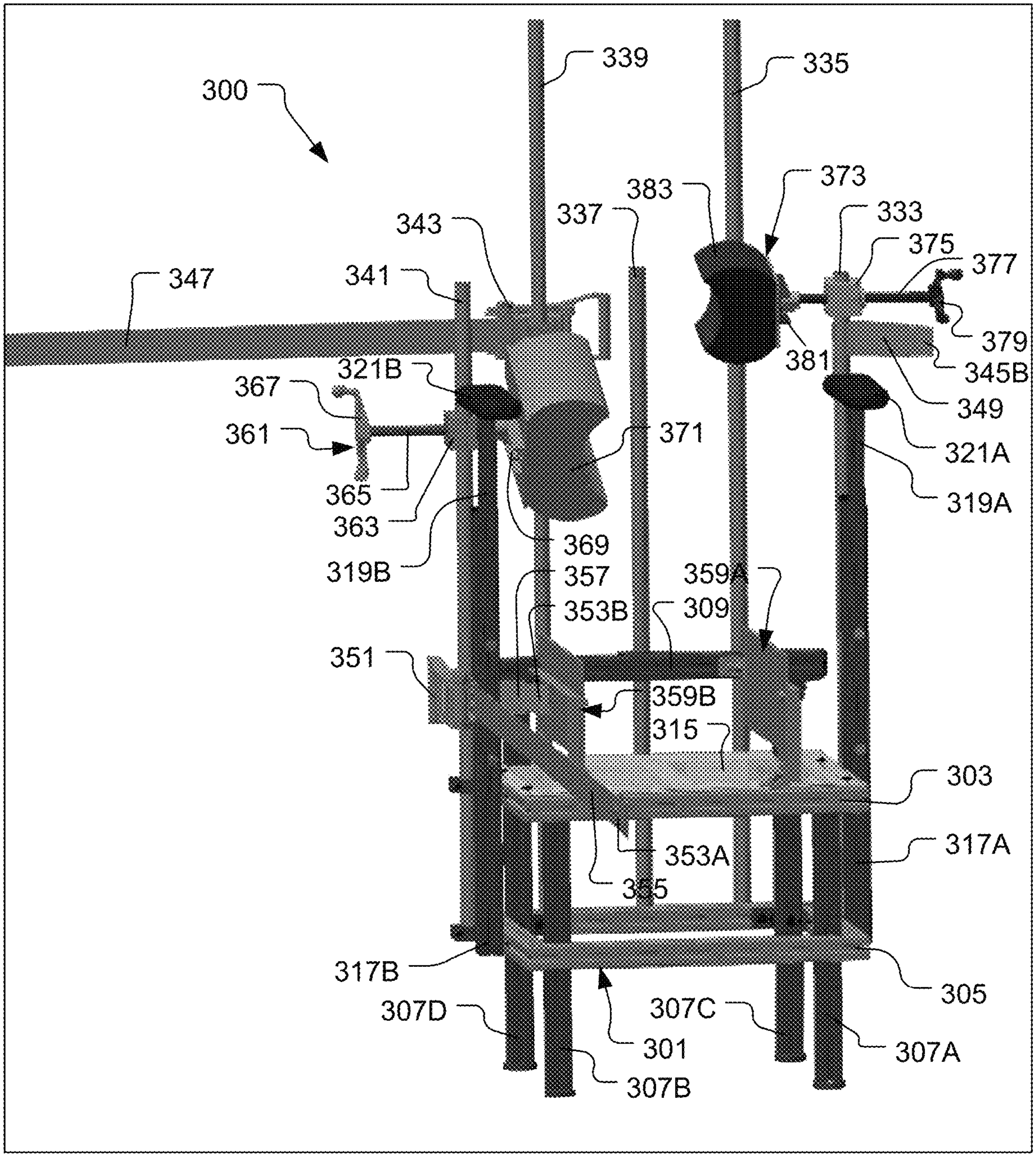
FIG. 22 shows a front view of the chair structure with the proximal thoracic driver assembly connected to the post, in accordance with some embodiments of the present invention.

FIG. 21 shows a proximal thoracic driver assembly 373 connected to the post 333, in accordance with some embodiments of the present invention. FIG. 22 shows a front view of the chair structure 301 with the proximal thoracic driver assembly 373 connected to the post 333, in accordance with some embodiments of the present invention. The proximal thoracic driver assembly 373 includes a post coupling 375 configured to secure to the post 333. The vertical position of the post coupling 375 along the post 333 is adjustable. The post coupling 375 is configured to include a threaded receptacle through which a threaded drive bar 377 is positioned. A first end of the threaded drive bar 377 is connected to a handle 379 to provide for turning of the threaded drive bar 377. A second end of the threaded drive bar 377 is connected to a backing member 381. The backing member 381 provides a rigid base for a proximal thoracic driver 383. In various embodiments, the components of the proximal thoracic driver assembly 373 can be formed of one or more of plastic, acrylic, polymer, PVC, wood, aluminum, aluminum alloy, steel, steel alloy, stainless steel, metal, or other material of similar mechanical strength and rigidity. The proximal thoracic driver 383 is configured to engage an upper thoracic region of the person 302 to apply a prescribed force vector to the upper thoracic cage of the person 302. The threaded drive bar 377 is turned as needed to move the proximal thoracic driver 383 to engage with the person 302 and move the upper thoracic region of the person 302 to a prescribed therapeutic position when the person 302 is seated on the seat 315. In various embodiments, the post coupling 375 and a connection between the threaded drive bar 377 and the backing member 381 can be configured to provide for positioning of the proximal thoracic driver 383 in essentially any required orientation in three-dimensional space.

Figure 23:
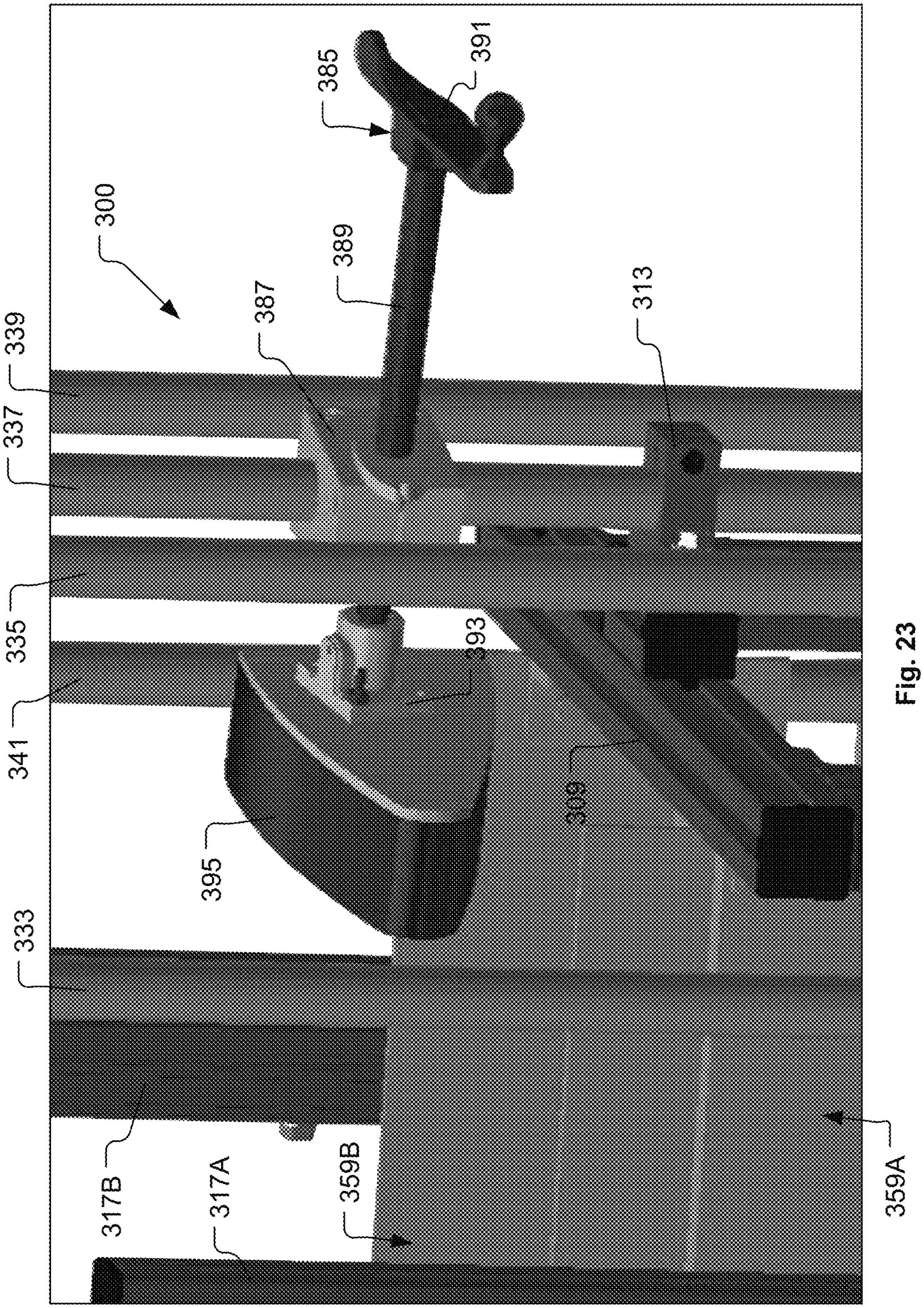
FIG. 23 shows a lumbar derotator driver assembly connected to the post, in accordance with some embodiments of the present invention.
Figure 24:
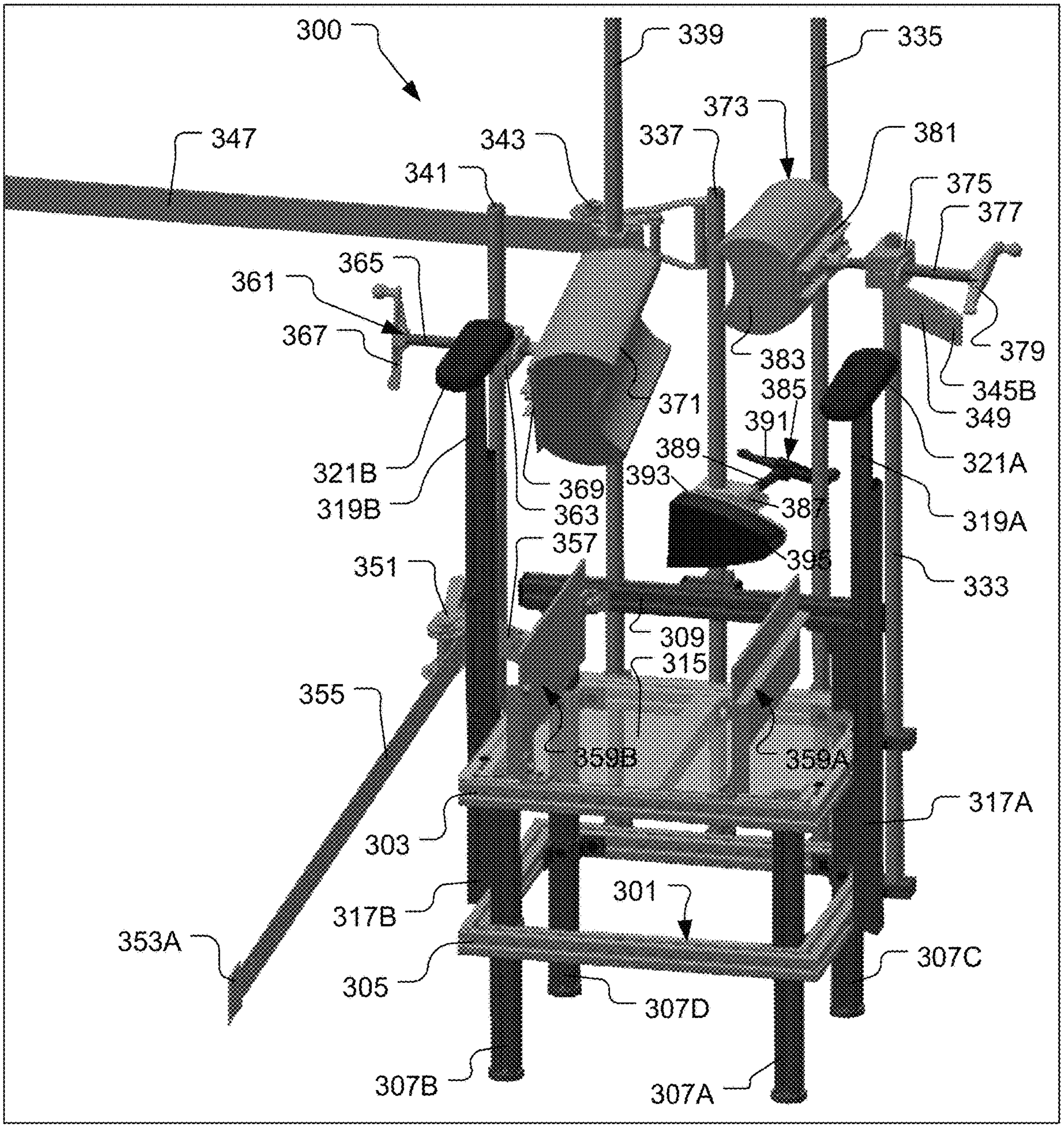
FIG. 24 shows a front view of the chair structure with the lumbar derotator driver assembly connected to the post, in accordance with some embodiments of the present invention.

FIG. 23 shows a lumbar derotator driver assembly 385 connected to the post 337, in accordance with some embodiments of the present invention. FIG. 24 shows a front view of the chair structure 301 with the lumbar derotator driver assembly 385 connected to the post 337, in accordance with some embodiments of the present invention. The lumbar derotator driver assembly 385 includes a post coupling 387 configured to secure to the post 337. The vertical position of the post coupling 387 along the post 337 is adjustable. The post coupling 387 is configured to include a threaded receptacle through which a threaded drive bar 389 is positioned. A first end of the threaded drive bar 389 is connected to a handle 391 to provide for turning of the threaded drive bar 389. A second end of the threaded drive bar 389 is connected to a backing member 393. The backing member 393 provides a rigid base for a lumbar derotator driver 395. In various embodiments, the components of the lumbar derotator driver assembly 385 can be formed of one or more of plastic, acrylic, polymer, PVC, wood, aluminum, aluminum alloy, steel, steel alloy, stainless steel, metal, or other material of similar mechanical strength and rigidity. The lumbar derotator driver 395 is configured to engage one or more vertebrae in the lumbar spinal region of the person 302 to apply a prescribed force vector to the one or more vertebra. In some embodiments, the lumbar derotator driver 395 is configured and positioned to apply a prescribed force vector to lateral posterior portions of the one or more lumbar vertebrae so as to cause derotation of the one or more lumbar vertebrae out of a scoliotic rotated configuration. The threaded drive bar 389 is turned as needed to move the lumbar derotator driver 395 to engage with the person 302 in a prescribed therapeutic position when the person 302 is seated on the seat 315. In various embodiments, the post coupling 387 and a connection between the threaded drive bar 389 and the backing member 393 can be configured to provide for positioning of the lumbar derotator driver 395 in essentially any required orientation in three-dimensional space.

Figure 25:
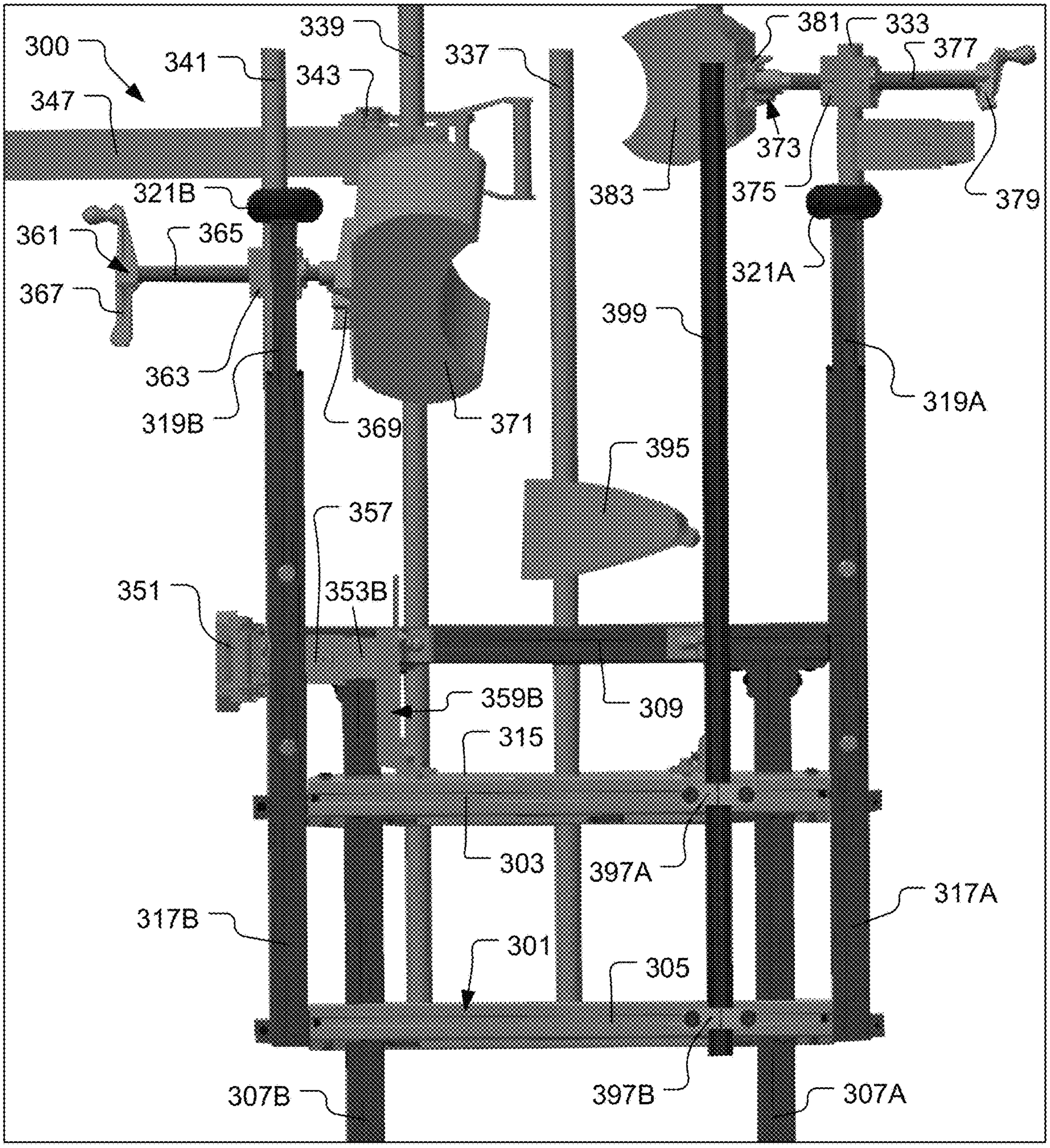
FIG. 25 shows a front view of the chair structure with vertically aligned post bases secured to the chair structure, and with a post is inserted through both of the vertically aligned post bases, in accordance with some embodiments of the present invention.

FIG. 25 shows a front view of the chair structure 301 with post bases 397A and 397B secured to the chair structure 301, and with a post 399 is inserted through both the post bases 397A and 397B, in accordance with some embodiments of the present invention. The post 399 is formed of a material that provides sufficient rigidity to avoid bending and/or substantial flexing when exposed to the forces associated with treating the person 302 within the SFT 300. In some embodiments, the post 399 is formed of one or more of aluminum, aluminum alloy, steel, steel alloy, stainless steel, carbon-fiber, fiberglass, plastic, acrylic, polymer, PVC, wood, or other material of similar mechanical strength and rigidity. In some embodiments, the post 399 has a length within a range extending from about 25 inches to about 60 inches. In some embodiments, the post 399 has a length of about 40 inches.

The post base 397A is secured to the upper frame 303, and the post base 397B is secured to the lower frame 305. The post bases 397A and 397B are configured to have receptacles through which the post 399 is positioned and secured. The receptacles of the post bases 397A and 397B are vertically aligned with each other so that the post 399 can be positioned to extend through both of the post bases 397A and 397B in a vertical orientation. In some embodiments, the post bases 397A and 397B are secured to the upper frame 303 and the lower frame 305, respectively, using machine screws 312. In some embodiments, the machine screws 312 interface with respective threaded receptacles disposed within the upper frame 303 and the lower frame 305. And, in some embodiments, the threaded receptacles are slidable along the longitudinal channels 303B and 305A of the upper frame 303 and the lower frame 305, respectively, to enable positioning of the threaded receptacles as needed to receive the machine screws 312 associated with post bases 397A and 397B, and to enable positioning of the post bases 397A and 397B as needed along the upper frame 303 and the lower frame 305, respectively. It should be understood, however, that in other embodiments the post bases 397A and 397B can be secured to the upper frame 303 and the lower frame 305, respectively, using essentially any attachment mechanism that provides a mechanically stable connection between the post bases 397A and 397B and the upper frame 303 and the lower frame 305, respectively. For example, in some embodiments, the post bases 397A and 397B can be secured to the upper frame 303 and the lower frame 305, respectively, using bolts and nuts. And, in some embodiments, the post bases 397A and 397B can be welded to the upper frame 303 and the lower frame 305, respectively. In various embodiments, the post bases 397A and 397B can be formed of one or more of aluminum, aluminum alloy, steel, steel alloy, stainless steel, brass, zinc, zinc alloy, metal, plastic, acrylic, polymer, PVC, or other material of similar mechanical strength and rigidity.

Figure 26:
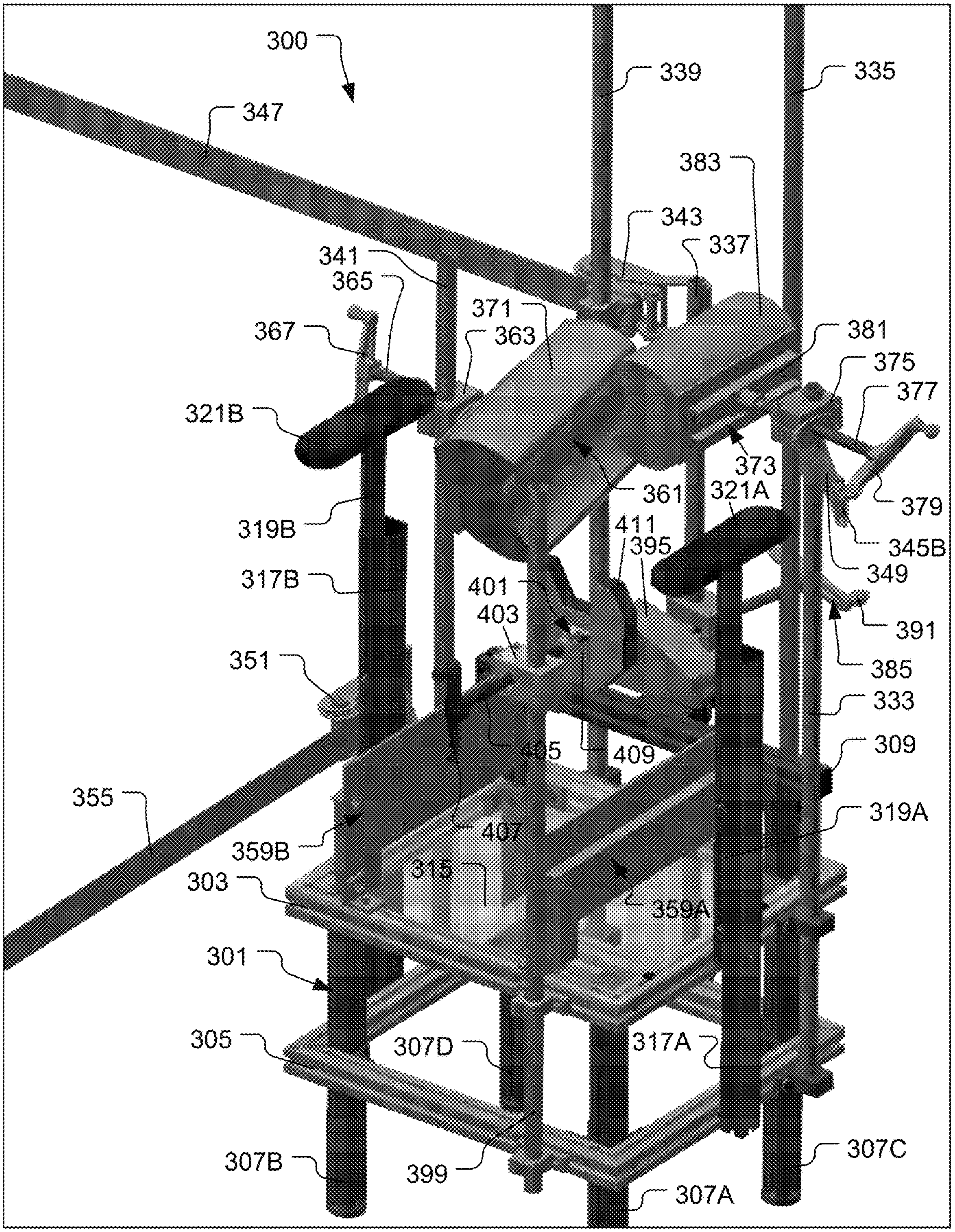
FIG. 26 shows an anterior thoracic driver assembly connected to the post, in accordance with some embodiments of the present invention.

FIG. 26 shows an anterior thoracic driver assembly 401 connected to the post 399, in accordance with some embodiments of the present invention. The anterior thoracic driver assembly 401 includes a post coupling 403 configured to secure to the post 399. The vertical position of the post coupling 403 along the post 399 is adjustable. The post coupling 403 is configured to include a threaded receptacle through which a threaded drive bar 405 is positioned. A first end of the threaded drive bar 405 is connected to a handle 407 to provide for turning of the threaded drive bar 405. A second end of the threaded drive bar 405 is connected to a backing member 409. The backing member 409 provides a rigid base for an anterior thoracic driver 411. In various embodiments, the components of the anterior thoracic driver assembly 401 can be formed of one or more of plastic, acrylic, polymer, PVC, wood, aluminum, aluminum alloy, steel, steel alloy, stainless steel, metal, or other material of similar mechanical strength and rigidity. The anterior thoracic driver 411 is configured to engage an anterior thoracic region of the person 302 to apply a prescribed force vector to the anterior thoracic cage of the person 302. The threaded drive bar 405 is turned as needed to move the anterior thoracic driver 411 to engage with the person 302 in a prescribed therapeutic position when the person 302 is seated on the seat 315. In various embodiments, the post coupling 403 and a connection between the threaded drive bar 405 and the backing member 409 can be configured to provide for positioning of the anterior thoracic driver 411 in essentially any required orientation in three-dimensional space.

Figure 27:
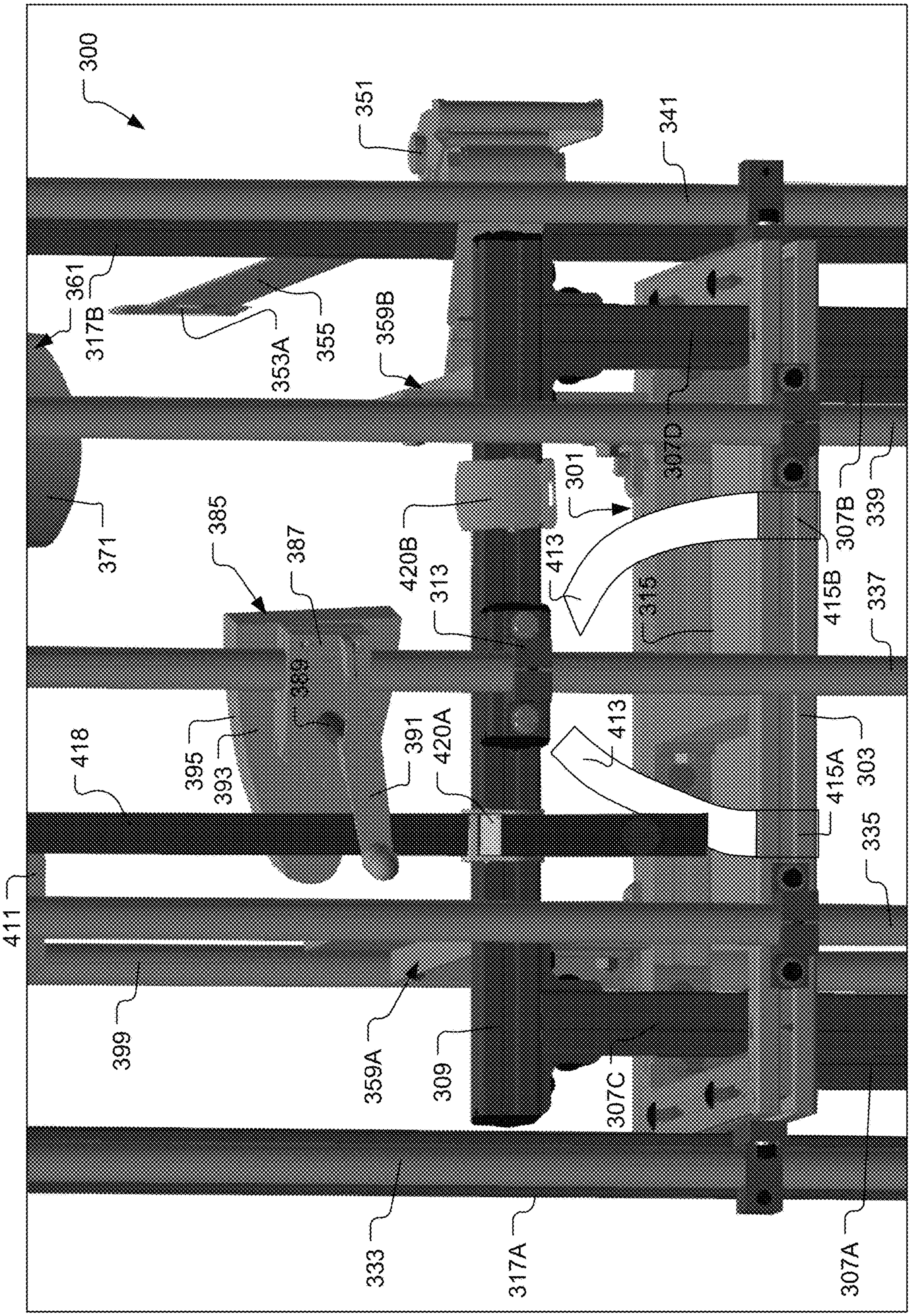
FIG. 27 shows a seat belt assembly connected to the chair structure, in accordance with some embodiments of the present invention.

FIG. 27 shows a seat belt assembly connected to the chair structure 301, in accordance with some embodiments of the present invention. The seat belt assembly includes a seat belt 413 and connectors 415A and 415B. In the example of FIG. 27, the connectors 415A and 415B are secured to the back of the upper frame 303. Each of the connectors 415A and 415B is configured to receive and securely hold the seat belt 413 in a therapeutic position. The seat belt 413 is configured to extend around a pelvis of the person 302 when the person 302 is seated on the seat 315. The seat belt 413 functions to hold a pelvis of the person 302 securely against the seat 315 and toward a back side of the SFT 300. The connectors 415A and 415B can be positioned as needed along the back of the upper frame 303 to accommodate a wait size of the person 302 and a position of the pelvis of the person 302 relative to the chair structure 301 when the person 302 is seated on the seat 315.

In some embodiments, the seat belt 413 is configured to have a width within a range extending from about 1 inches to about 3 inches, or within a range extending from about 2 inches to about 3 inches, or within a range extending from about 2 inches to about 2.5 inches. In some embodiments, the seat belt 413 can be configured to provide increased comfort to the person 302. For example, in some embodiments, the seat belt 413 can be formed of a single material, such as rubber, nylon, cotton, vinyl, polypropylene, hemp, among others. Also, in some embodiments, the seat belt 413 can be formed to have multiple layers of material, with one or more layers of material closer to the person 302 having increased softness relative to one or more other layers of material farther away from the person 302. More specifically, in some embodiments, one or more layers of the seat belt 413 that are positioned closer to the person 302 can be formed of material having a smaller modulus of elasticity, such as foam, rubber, gel, among others, whereas one or more layers of the seat belt 413 that are positioned farther from the person 302 can be formed of material having a larger modulus of elasticity, such as nylon, cotton, vinyl, polypropylene, hemp, among others.

In some embodiments, one or more tethering bands 418 and associated connectors 420A and 420B can be disposed at various location on and around the SFT 300. In various embodiments, the one or more tethering bands 418 are configured, positioned, and oriented to assist with guiding one or more of the lumbar derotator driver 395, the proximal thoracic driver 383, the primary thoracic driver 371, and the anterior thoracic driver 411, so that they correctly mate to the body surfaces of the person in the SFT 300 and apply pressure in the desired areas on the person in the SFT 300. It should be understood that use of the one or more tethering bands 418 is optional, depending on whether or not any guiding of the lumbar derotator driver 395, the proximal thoracic driver 383, the primary thoracic driver 371, and/or the anterior thoracic driver 411 is required.

Figure 28:
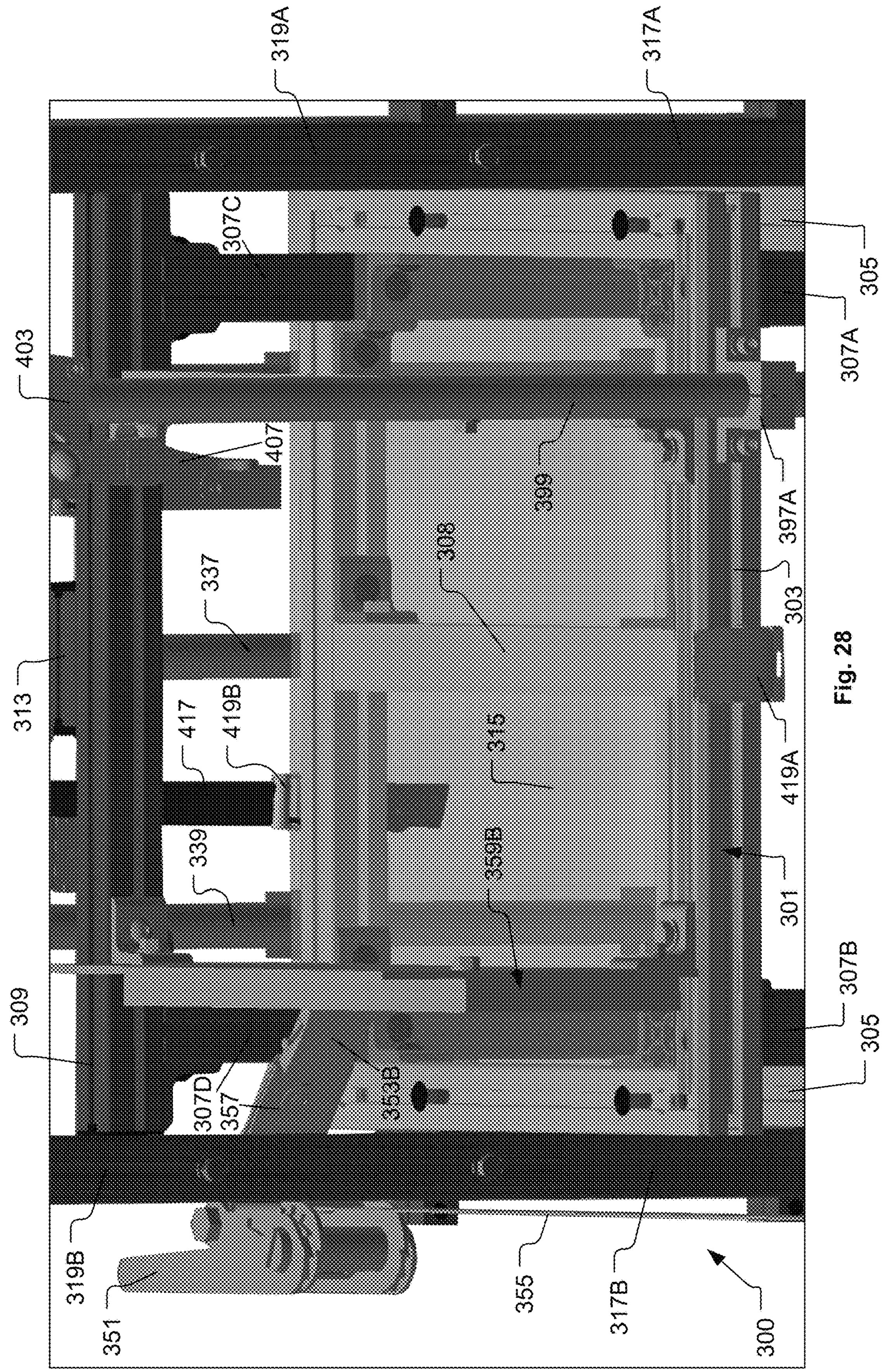
FIG. 28 shows an iliac crest belt assembly connected to the chair structure, in accordance with some embodiments of the present invention.

FIG. 28 shows an iliac crest belt assembly connected to the chair structure 301, in accordance with some embodiments of the present invention. The iliac crest belt assembly includes an iliac crest belt 417 and connectors 419A and 419B. The connector 419A is secured to the upper frame 303 at a position along the front of the chair structure 301. The connector 419B is secured to the upper frame 303 at a position along the back of the chair structure 301. Each of the connectors 419A and 419B is configured to receive and securely hold the iliac crest belt 417 in a therapeutic position. The iliac crest belt 417 is configured to extend over an iliac crest of the person 302 when the person 302 is seated on the seat 315, so as to hold the pelvis of the person 302 downward toward the seat 315 on the side of the person 302 where the iliac crest belt 417 is positioned. The connectors 419A and 419B can be positioned as needed along the front side and back side, respectively, of the upper frame 303 to accommodate the position of the pelvis of the person 302 relative to the chair structure 301 when the person 302 is seated on the seat 315. In some embodiments, the connector 419B on the back side of the upper frame 303 is positioned more toward a centerline of the pelvis of the person 302 than the connector 419A on the front side of the upper frame 303, such that a force applied by the iliac crest belt 417 to the person 302 will include an lateral-to-medial downward angular component to impart a rotational force to the pelvis of the person 302 in combination with the downward force. The iliac crest belt 417 is positioned to extend over the iliac crest of the person 302 on a same side of the person 302 where lateral force is applied to the person 302 by the lumbar belt 355.

In some embodiments, the iliac crest belt 417 is configured to have a width within a range extending from about 1 inches to about 3 inches, or within a range extending from about 2 inches to about 3 inches, or within a range extending from about 2 inches to about 2.5 inches. In some embodiments, the iliac crest belt 417 can be configured to provide increased comfort to the person 302. For example, in some embodiments, the iliac crest belt 417 can be formed of a single material, such as rubber, nylon, cotton, vinyl, polypropylene, hemp, among others. Also, in some embodiments, the iliac crest belt 417 can be formed to have multiple layers of material, with one or more layers of material closer to the person 302 having increased softness relative to one or more other layers of material farther away from the person 302. More specifically, in some embodiments, one or more layers of the iliac crest belt 417 that are positioned closer to the person 302 can be formed of material having a smaller modulus of elasticity, such as foam, rubber, gel, among others, whereas one or more layers of the iliac crest belt 417 that are positioned farther from the person 302 can be formed of material having a larger modulus of elasticity, such as nylon, cotton, vinyl, polypropylene, hemp, among others.

Figure 29:
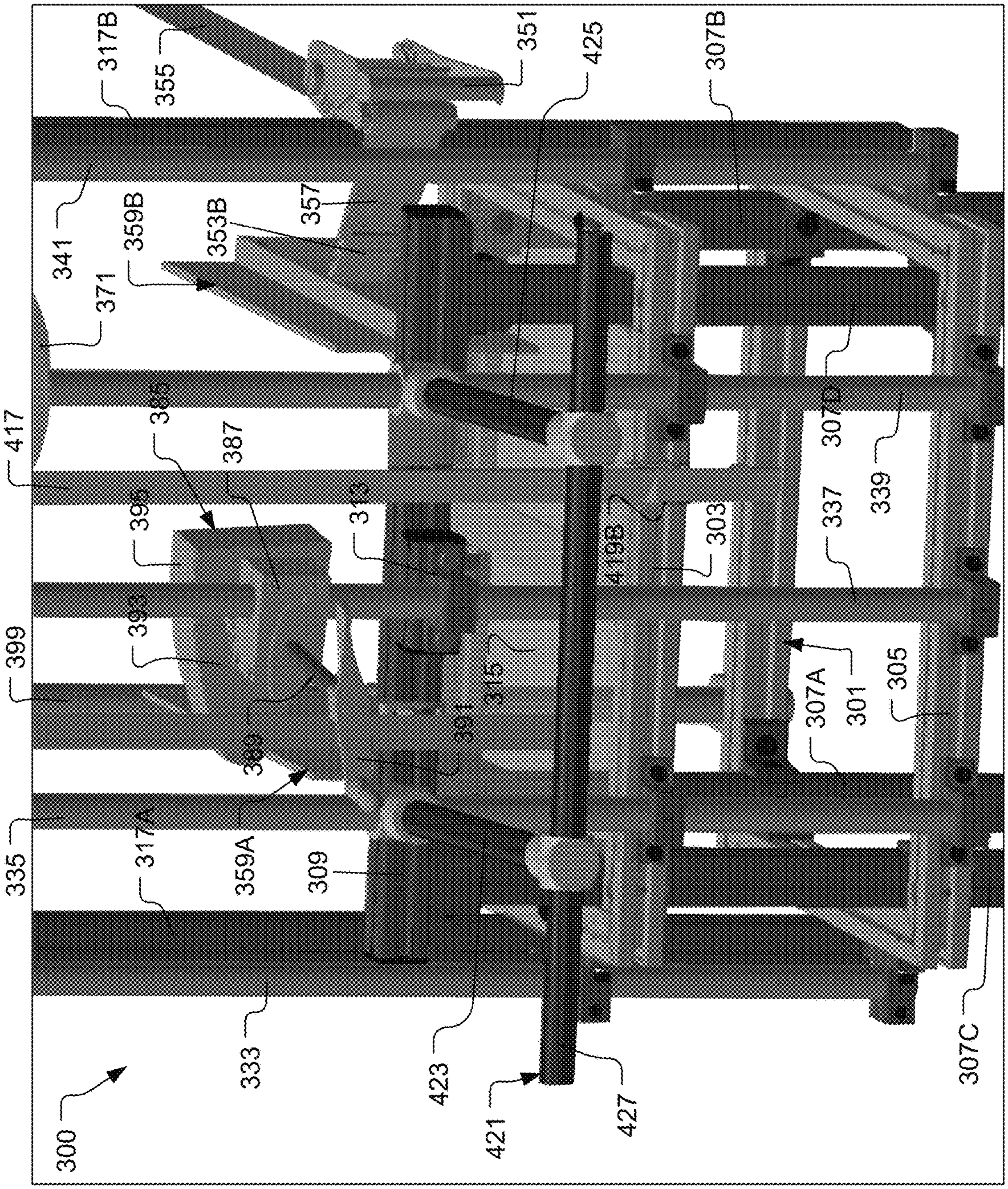
FIG. 29 shows a kickstand assembly connected to the SFT, in accordance with some embodiments of the present invention.

FIG. 29 shows a kickstand assembly 421 connected to the SFT 300, in accordance with some embodiments of the present invention. The kickstand assembly 421 is configured to provide a support upon which the SFT 300 can rest when the SFT 300 is reclined backward after the person 302 is seated and fitted within the SFT 300. In the example of FIG. 29, the kickstand assembly 421 includes support bars 423 and 425 connected to the posts 335 and 339, respectively. The kickstand assembly 421 also includes a crossbar 427 connected to both of the support bars 423 and 425. The vertical position of the kickstand assembly 421 along the posts 335 and 339 can be adjusted as needed. It should be appreciated that in other embodiments, the kickstand assembly 421 can be configured in different ways so long as the kickstand assembly 421 is configured to provide a stable support for the SFT 300 in a reclined position. In various embodiments, components of the kickstand assembly 421 can be formed of one or more of aluminum, aluminum alloy, steel, steel alloy, stainless steel, carbon-fiber, fiberglass, plastic, acrylic, polymer, PVC, wood, or other material of similar mechanical strength and rigidity.

Figure 30:
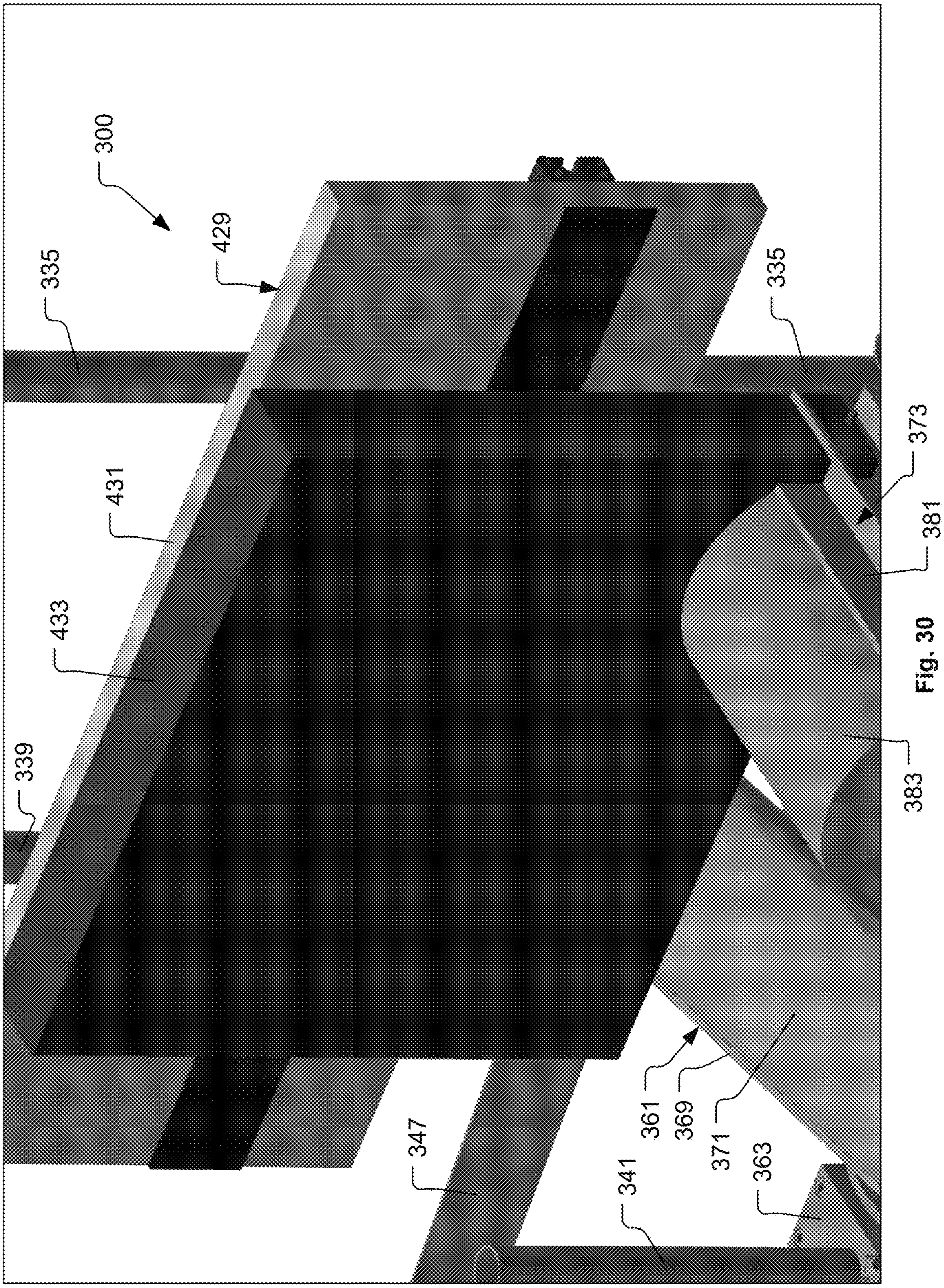
FIG. 30 shows a head rest assembly connected to the SFT, in accordance with some embodiments of the present invention.
Figure 31:
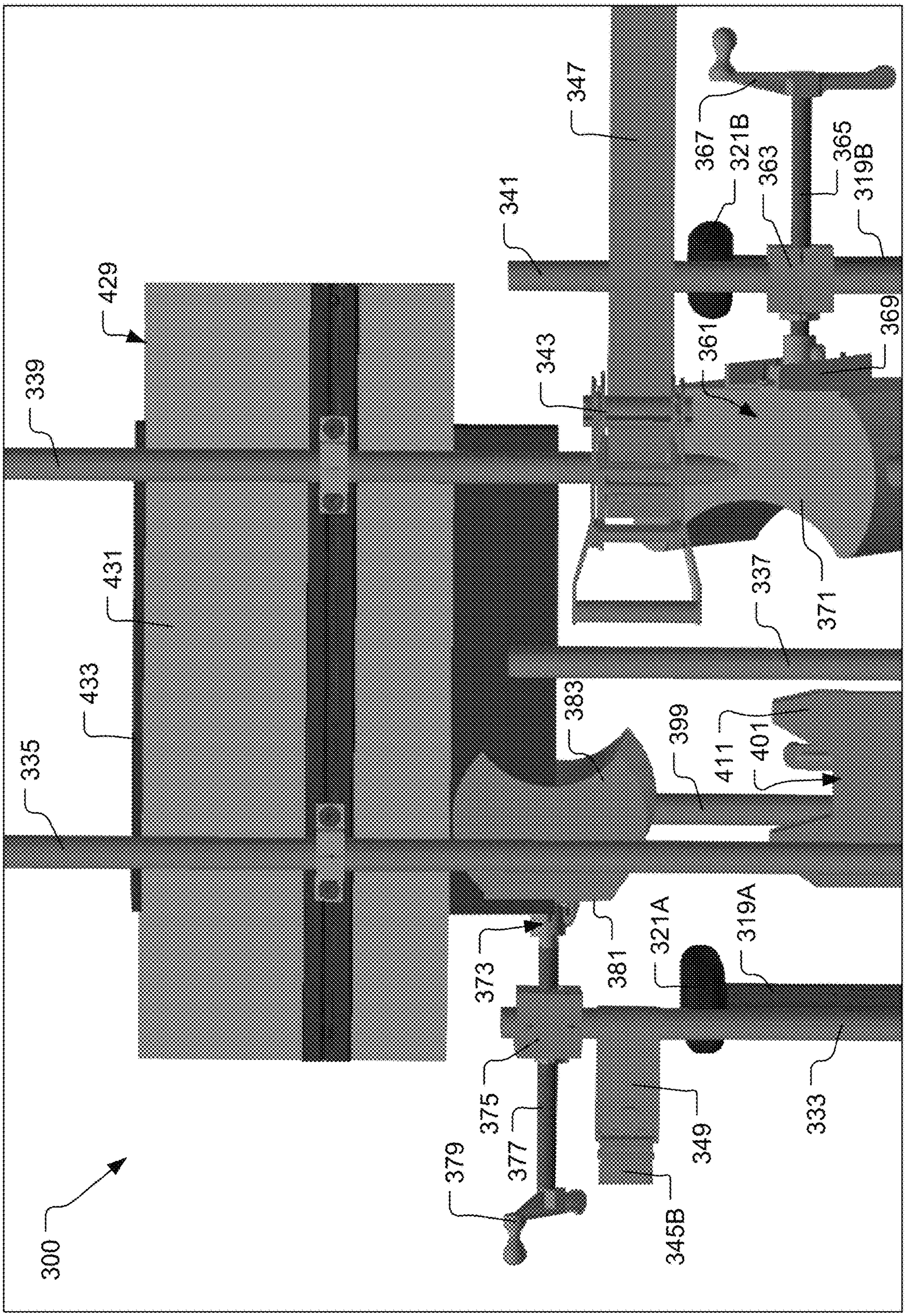
FIG. 31 shows a back view of the head rest assembly, in accordance with some embodiments of the present invention.

In various embodiments, the SFT 300 can be fitted with other components to improve comfort for the person 302. For example, FIG. 30 shows a head rest assembly 429 connected to the SFT 300, in accordance with some embodiments of the present invention. FIG. 31 shows a back view of the head rest assembly 429, in accordance with some embodiments of the present invention. The head rest assembly 429 includes a backing member 431 secured to the posts 335 and 339. The head rest assembly 429 also includes a padding member 433 positioned on a front side of the backing member 431. The head rest assembly 429 can be vertically positioned along the posts 335 and 339 as needed.

Figure 32:
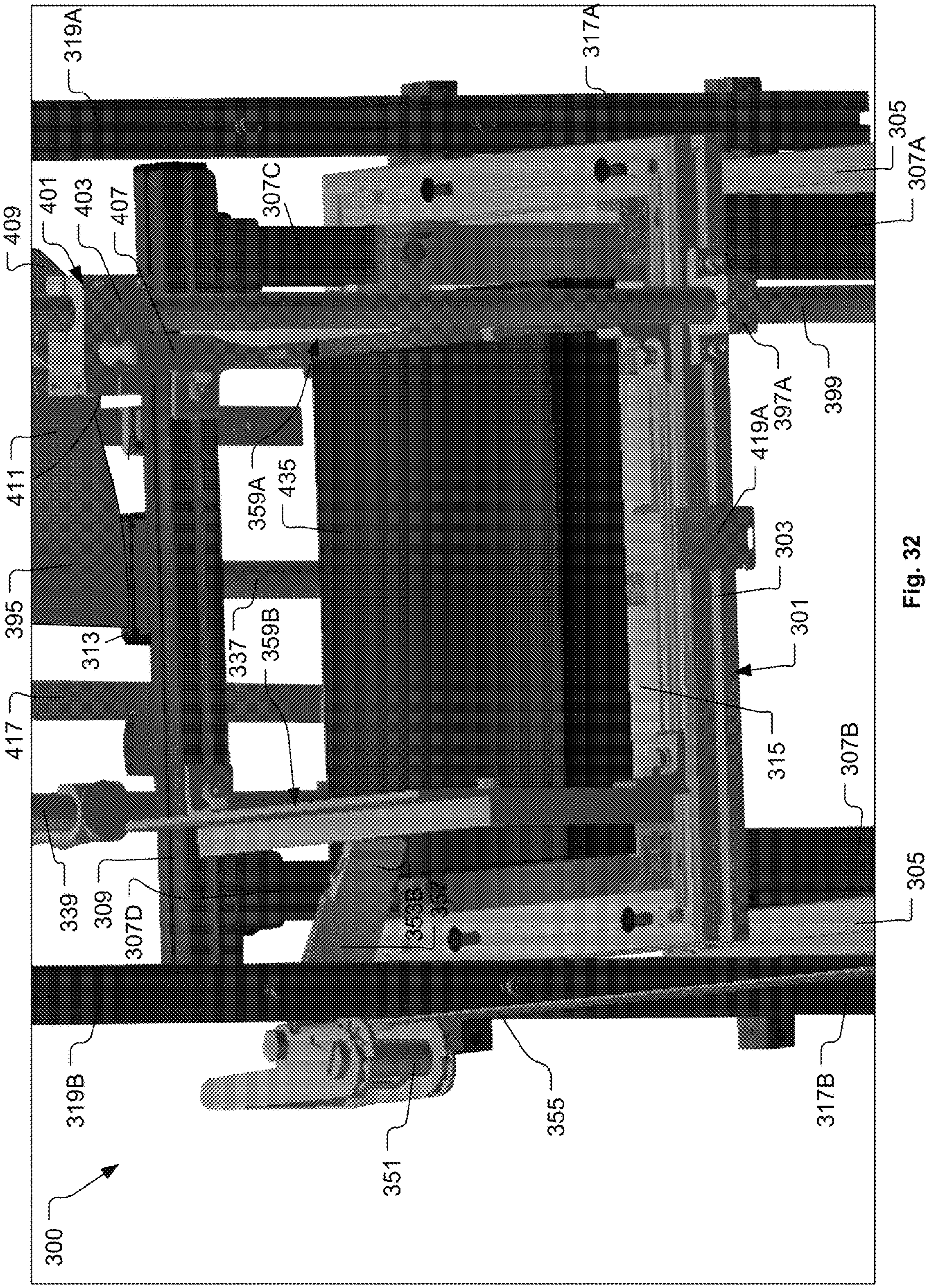
FIG. 32 shows a seat cushion positioned on the seat, in accordance with some embodiments of the present invention.

FIG. 32 shows a seat cushion 435 positioned on the seat 315, in accordance with some embodiments of the present invention.

Figure 33:
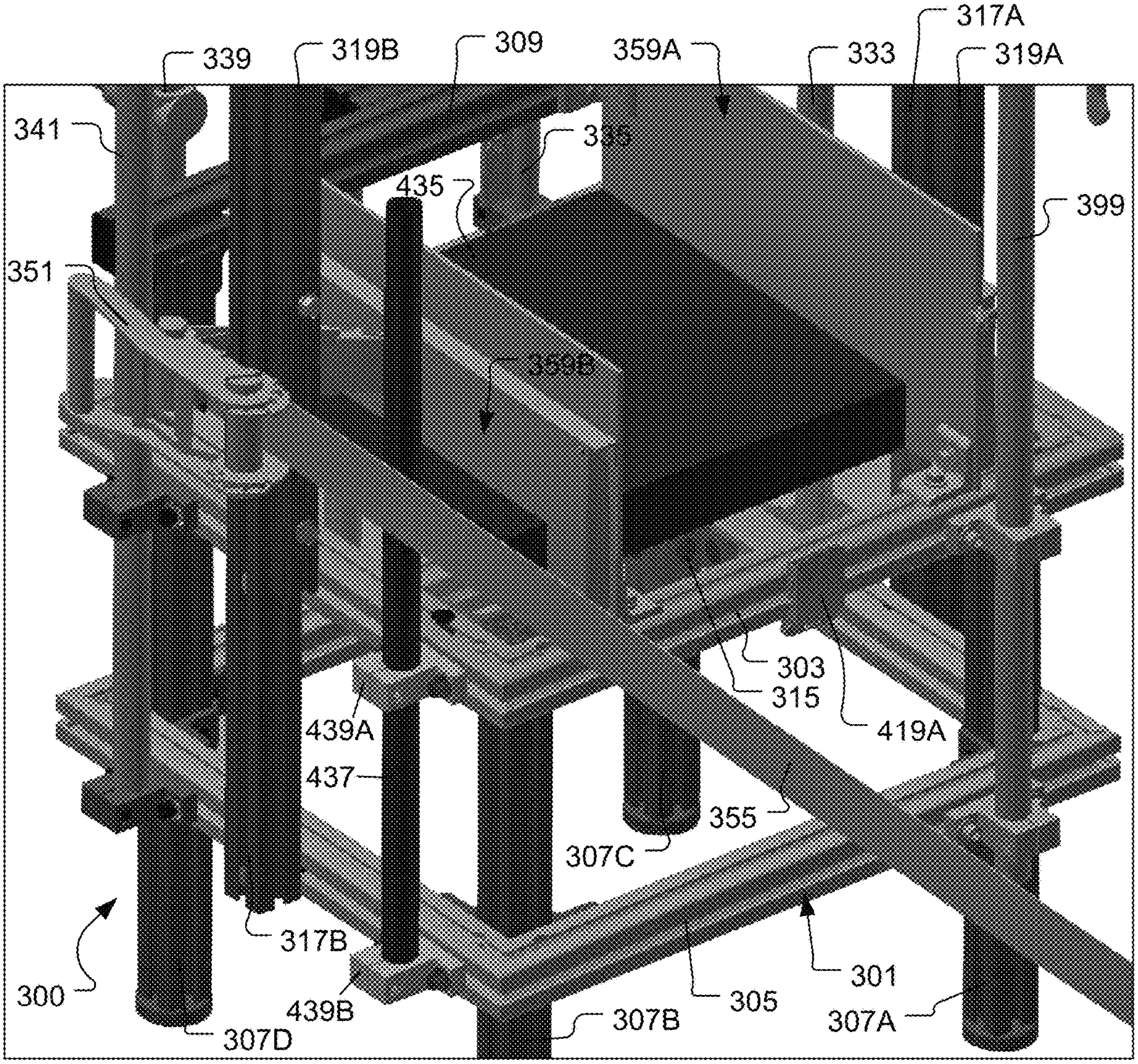
FIG. 33 shows a lumbar belt diversion post connected to the chair structure, in accordance with some embodiments of the present invention.

Also, in various embodiments, the SFT 300 can be fitted with other components to modify and/or improve performance of the SFT 300. For example, FIG. 33 shows a lumbar belt diversion post 437 connected to the chair structure 301, in accordance with some embodiments of the present invention. In various embodiments, the lumbar belt 355 is wrapped around an outer portion of the post 437 relative to the chair structure 301 such that the post 437 extends a front pull location of the lumbar belt 355 to a forward position on the side of the chair structure 301. The post 437 is inserted through post bases 439A and 439B. The post 437 is formed of a material that provides sufficient rigidity to avoid bending and/or substantial flexing when exposed to the forces associated with treating the person 302 within the SFT 300. In some embodiments, the post 437 is formed of one or more of aluminum, aluminum alloy, steel, steel alloy, stainless steel, carbon-fiber, fiberglass, plastic, acrylic, polymer, PVC, wood, or other material of similar mechanical strength and rigidity. In some embodiments, the post 437 has a length within a range extending from about 25 inches to about 60 inches. In some embodiments, the post 399 has a length of about 40 inches.

The post base 439A is secured to the upper frame 303, and the post base 439B is secured to the lower frame 305. The post bases 439A and 439B are configured to have receptacles through which the post 437 is positioned and secured. The receptacles of the post bases 439A and 439B are vertically aligned with each other so that the post 437 can be positioned to extend through both of the post bases 439A and 439B in a vertical orientation. In some embodiments, the post bases 439A and 439B are secured to the upper frame 303 and the lower frame 305, respectively, using machine screws 312. In some embodiments, the machine screws 312 interface with respective threaded receptacles disposed within the upper frame 303 and the lower frame 305. And, in some embodiments, the threaded receptacles are slidable along the longitudinal channels 303B and 305A of the upper frame 303 and the lower frame 305, respectively, to enable positioning of the threaded receptacles as needed to receive the machine screws 312 associated with post bases 439A and 439B, and to enable positioning of the post bases 439A and 439B as needed along the upper frame 303 and the lower frame 305, respectively. It should be understood, however, that in other embodiments the post bases 439A and 439B can be secured to the upper frame 303 and the lower frame 305, respectively, using essentially any attachment mechanism that provides a mechanically stable connection between the post bases 439A and 439B and the upper frame 303 and the lower frame 305, respectively. For example, in some embodiments, the post bases 439A and 439B can be secured to the upper frame 303 and the lower frame 305, respectively, using bolts and nuts. And, in some embodiments, the post bases 439A and 439B can be welded to the upper frame 303 and the lower frame 305, respectively. In various embodiments, the post bases 439A and 439B can be formed of one or more of aluminum, aluminum alloy, steel, steel alloy, stainless steel, brass, zinc, zinc alloy, metal, plastic, acrylic, polymer, PVC, or other material of similar mechanical strength and rigidity.

In some embodiments, the post 437 is positioned along the upper frame 303 and the lower frame 305 to be at a position that is lateral to and substantially aligned with a front side of the abdominal region the person 302, or that is lateral to and forward of the front side of the abdominal region of the person 302, when the person 302 is seated on the seat 315 with the seat belt 413 secured around the pelvis of the person 302. In this manner, the lumbar belt 355 is positioned to extend around an outer portion of the post 437 relative to the chair structure 301 so as to prevent the lumbar belt 355 from pulling into to the front abdominal tissue of the person 302 near the side of the chair structure 301 where the lumbar belt ratchet 351 is located. It should be understood that the position of the post 437 is adjustable to provide for diversion of tension away from the abdomen of the person 302 and assist with providing a posterior-to-anterior force component to the lumbar belt 355. The amount of diversion of tension away from the abdomen of the person 302 and the amount of posterior-to-anterior force provided by the lumbar belt 355 can be adjusted by moving the post bases 439A and 439B along the upper frame 303 and the lower frame 305. Also, in some embodiments, the position of the post 437 along the side of the chair structure 301 is set to apply a prescribed angular component to the force vector that is applied to the person 302 by the lumbar belt 355. It should be understood, however, that use of the post 437 for extending the front pull location of the lumbar belt 355 to a particular position on the side of the chair structure 301 is optional and depends on the size of the person 302, the position and size of the lumbar belt ratchet 351 on the side of the chair structure 301, and the scoliotic configuration of the person 302, and/or other factors.

Figure 34:
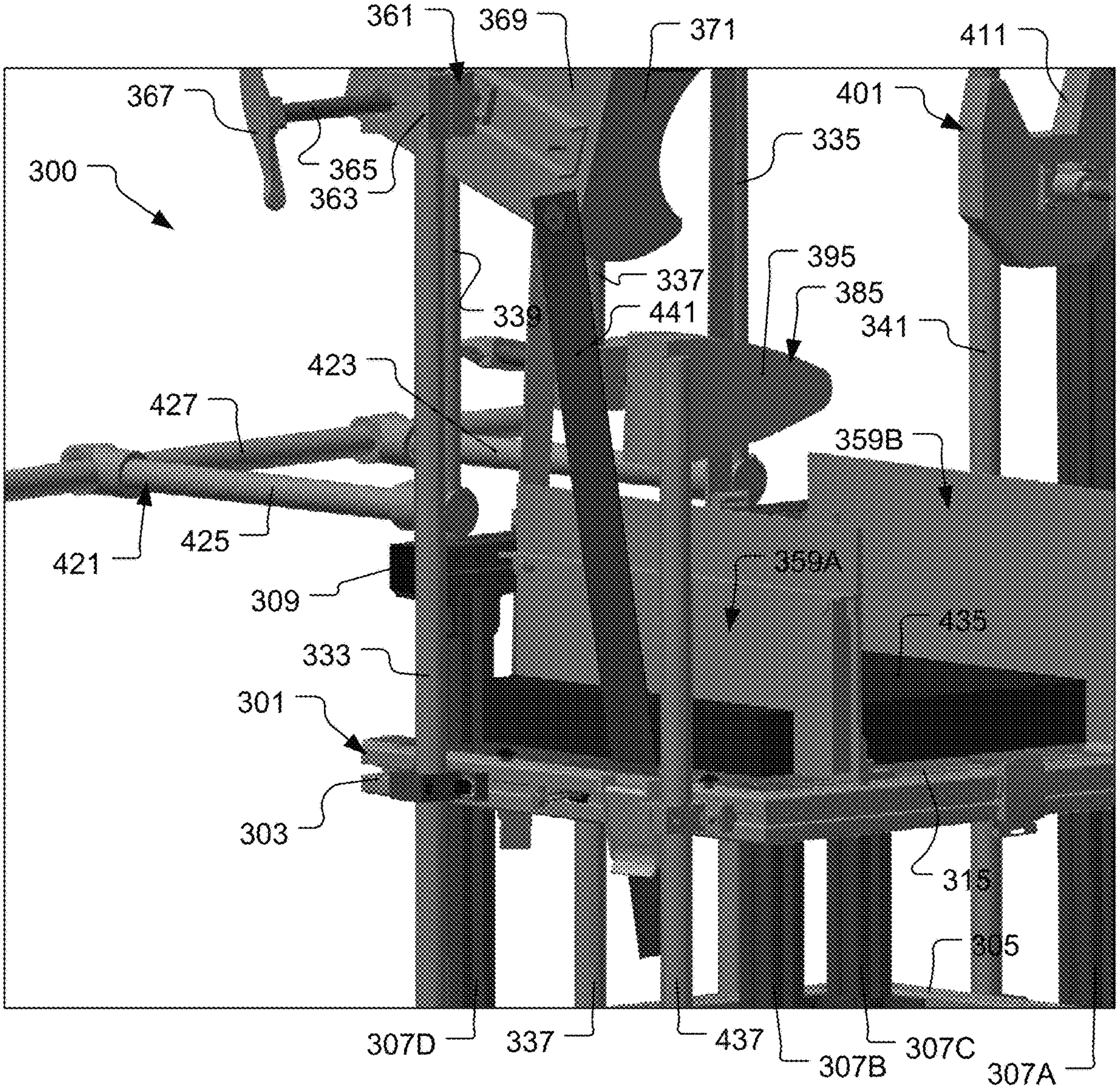
FIG. 34 shows a tether strap connected to the primary thoracic driver assembly and the upper frame on the right side of the chair structure, in accordance with some embodiments of the present invention.

Also, in some embodiments, the SFT 300 can be fitted with one or more tether straps to assist with securing and stabilization of essentially any component of the SFT 300 in a particular spatial position and/or orientation. For example, FIG. 34 shows a tether strap 441 connected to the primary thoracic driver assembly 361 and the upper frame 303 on the right side of the chair structure 301, in accordance with some embodiments of the present invention. The tether strap 441 serves to prevent upward movement of a forward end of the primary thoracic driver 371 relative to the person 302. It should be understood, however, that essentially any tether strap 441 configuration can be used on the SFT 300 and can be applied to extend between any two or more locations on the SFT 300. For example, in various embodiments, one or more tether straps 441 can be connected to extend from essentially location on the SFT 303 structure to any one or more of the proximal thoracic driver assembly 316, the anterior thoracic driver assembly 401, the lumbar derotator driver assembly 385, and the proximal thoracic driver assembly 373. In this manner, one or more tether straps 441 can be used to stabilize any one or more of the proximal thoracic driver assembly 316, the anterior thoracic driver assembly 401, the lumbar derotator driver assembly 385, and the proximal thoracic driver assembly 373 in a prescribed spatial position and/or orientation. In various embodiments, the tether belts 441 can be formed of a one or more materials such as rubber, nylon, cotton, vinyl, polypropylene, hemp, among others.

Figure 35:
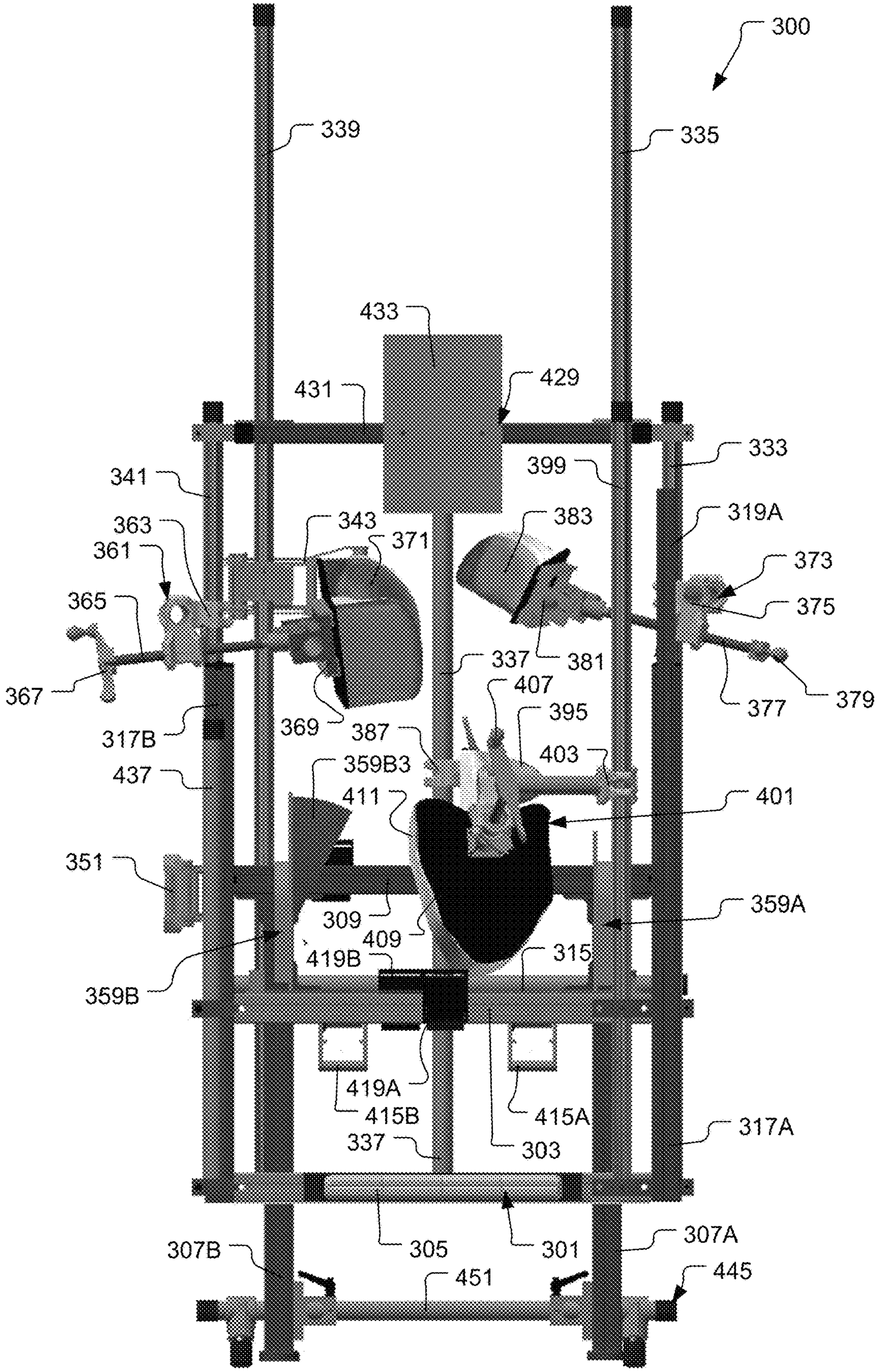
FIG. 35 shows a front view of the SFT, in accordance with some embodiments of the present invention.

FIGS. 35 through 48 show various views of structural components and driver assemblies of the SFT 300 in an example assembled configuration, in accordance with some embodiments of the present invention. To avoid obscuring the structural components and driver assemblies of the SFT 300 in FIGS. 35 through 48, the seat belt 413, the lumbar belt 355, the iliac crest belt 417, the sternal belt 347, the arm rests 321A, 321B, and the seat cushion 435 are not shown in FIGS. 35 through 48. Also, to avoid obscuring the primary thoracic driver 371 and the proximal thoracic driver 383, the anterior thoracic driver 411 is shown at a lowered position in FIGS. 35 through 48. This lowered position of the anterior thoracic driver 411, as shown in FIGS. 35 through 48, is not the therapeutic position of the anterior thoracic driver 411. Depending on the physical structure of the person 302 within the SFT 300, the therapeutic position of the anterior thoracic driver 411 will be at about the same vertical position as the primary thoracic driver 371. An example of the therapeutic position of the anterior thoracic driver 411 is shown in FIGS. 49-52, 54-57, 59-60, 64-70, 71E-71I, and 72E-72G. FIG. 35 shows a front view of the SFT 300, in accordance with some embodiments of the present invention. FIG. 35 also shows an option in which the inside pad 359B3 of the pelvic side restraint 359B has a contoured inner surface profile. The contour of the inner surface profile of the inside pad 359B3 is configured to assist with limiting and/or preventing rotation of the pelvis of the person 302, such as rotation of the pelvis of the person 302 relative to the coronal plane of the person 302. It should be understood that in various embodiments, one or both the inside pads 359A3 and 359B3 of the pelvic side restraints 359A and 359B, respectively, can have a contoured inner surface profile as needed to stabilize the pelvis of the person 302. In some embodiments, the inside pad 359B3 of the pelvic side restraint 359B is shaped to contact the top of the iliac crest and counter pelvic rotation of the person 302.

Figure 36:
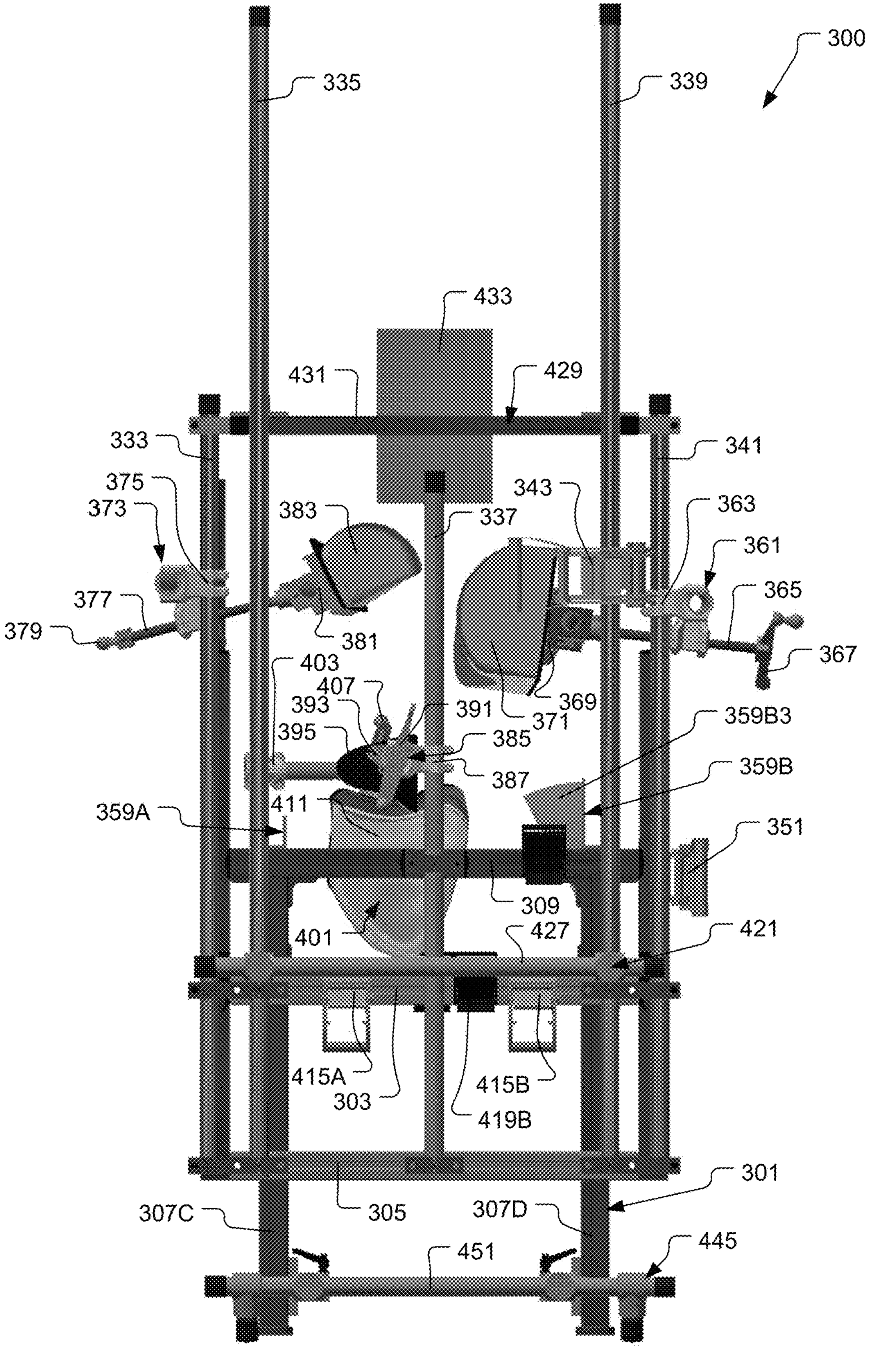
FIG. 36 shows a back view of the SFT, in accordance with some embodiments of the present invention.
Figure 37:
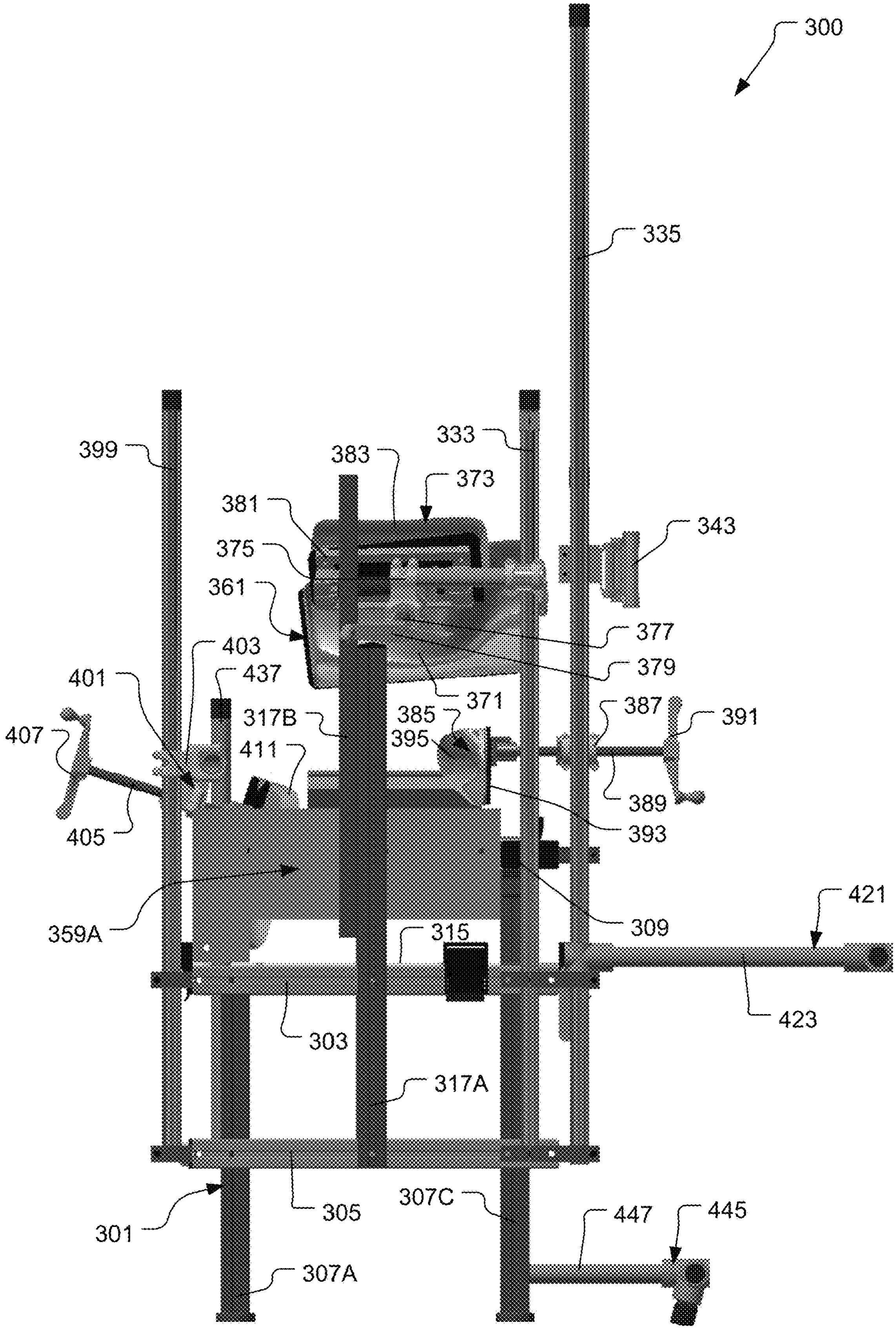
FIG. 37 shows a left side view of the SFT, in accordance with some embodiments of the present invention.
Figure 38:
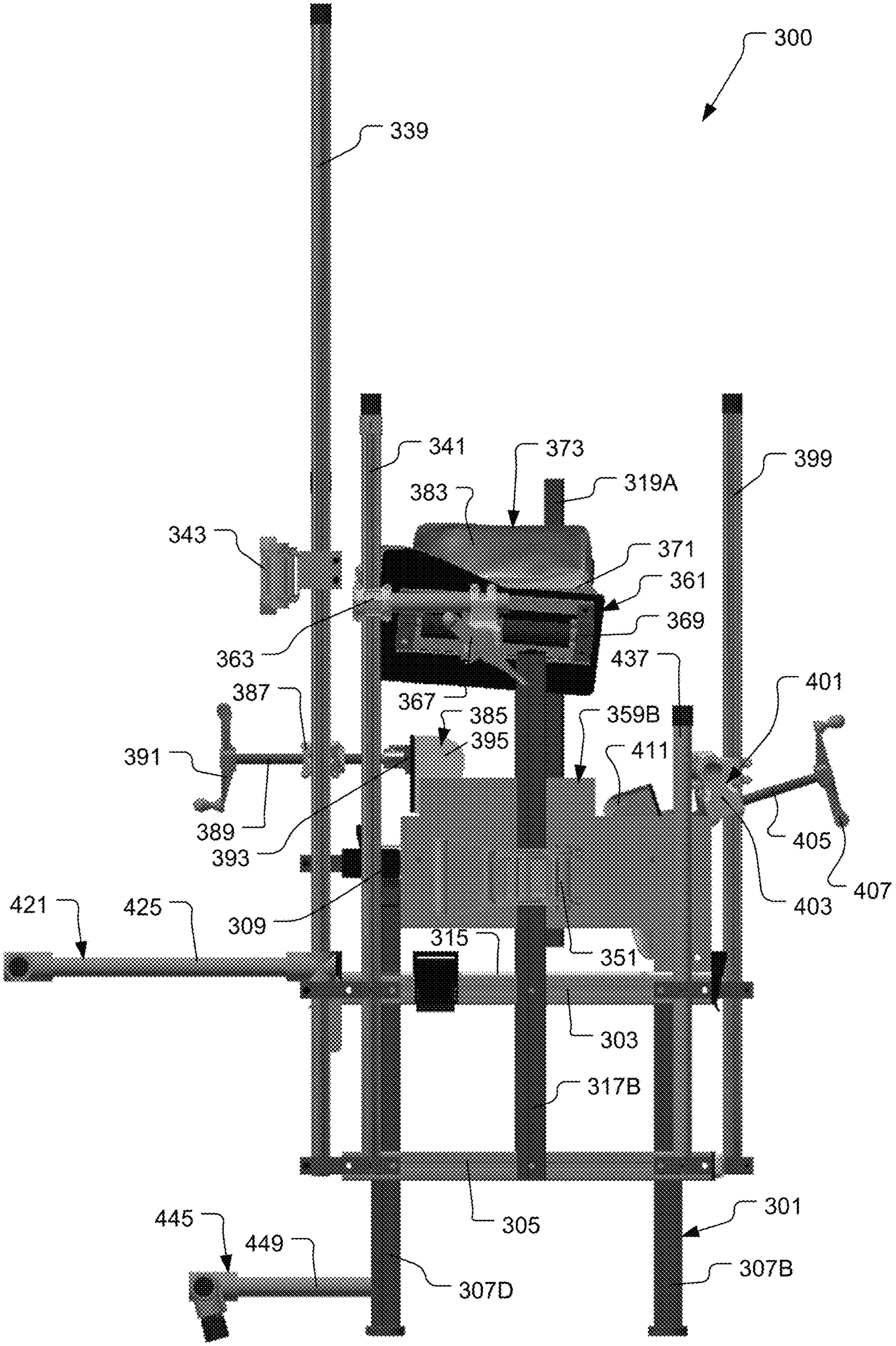
FIG. 38 shows a right side view of the SFT, in accordance with some embodiments of the present invention.
Figure 39:
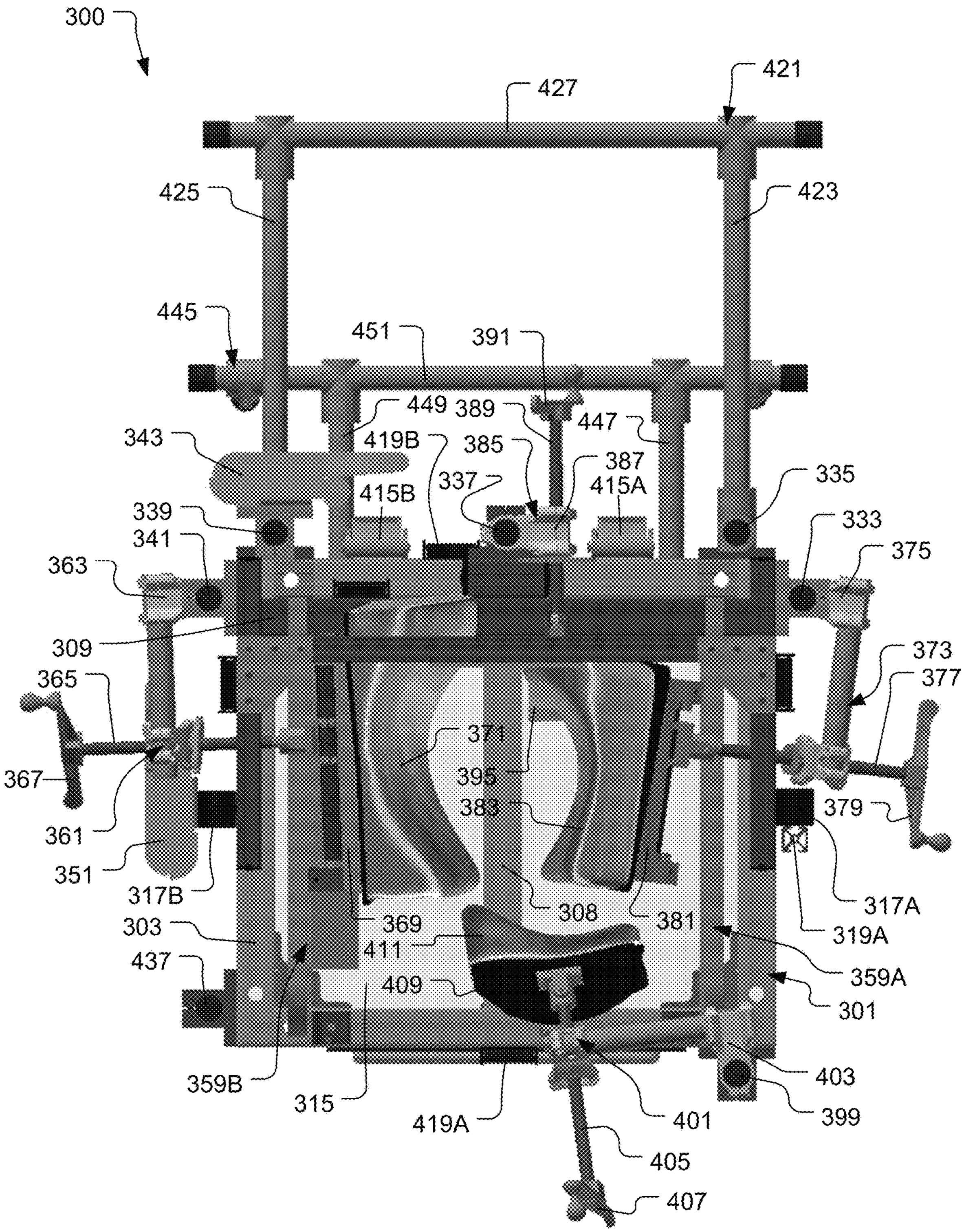
FIG. 39 shows a top view of the SFT, in accordance with some embodiments of the present invention.
Figure 40:
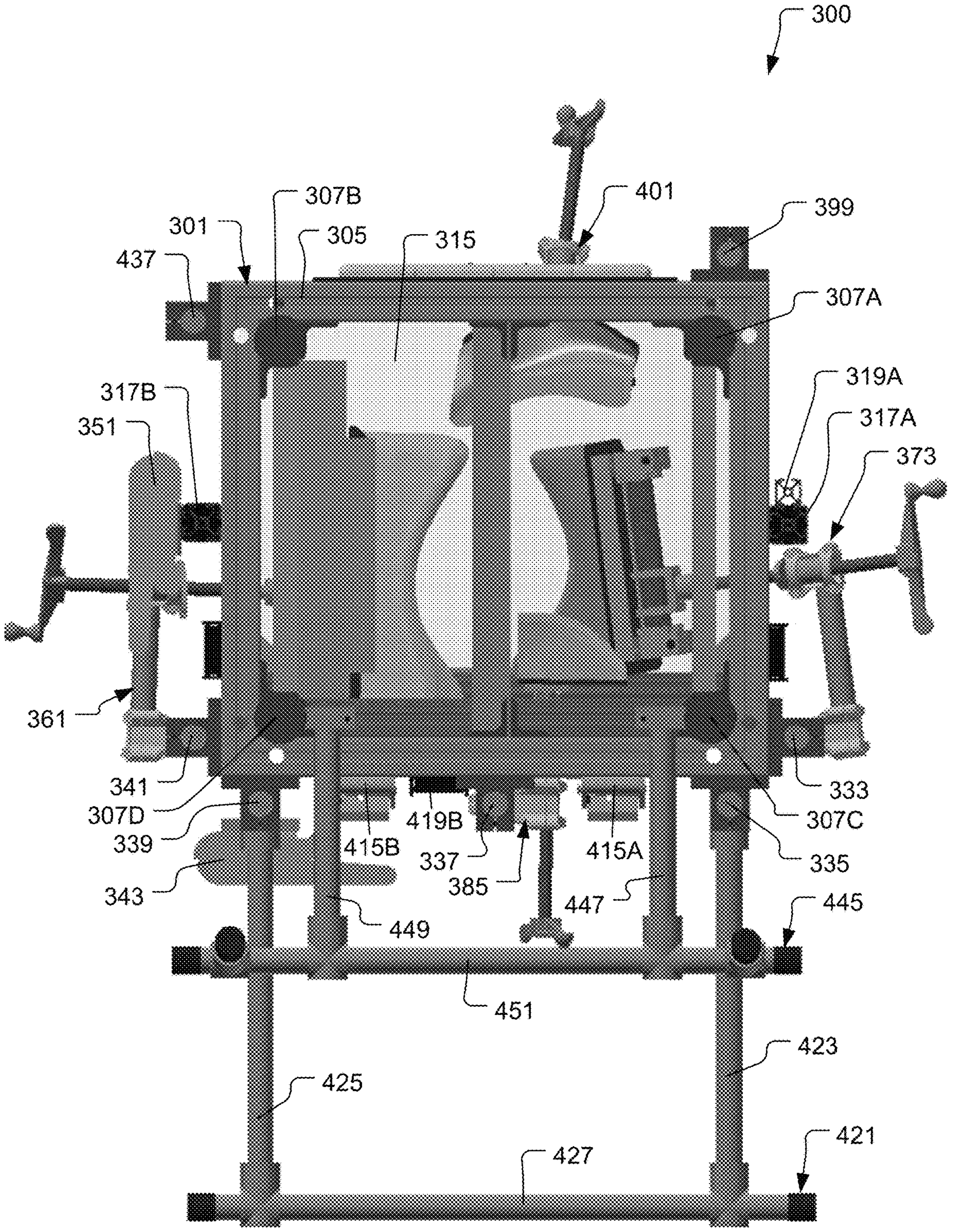
FIG. 40 shows a bottom view of the SFT, in accordance with some embodiments of the present invention.

FIG. 36 shows a back view of the SFT 300, in accordance with some embodiments of the present invention. FIG. 37 shows a left side view of the SFT 300, in accordance with some embodiments of the present invention. FIG. 38 shows a right side view of the SFT 300, in accordance with some embodiments of the present invention. FIG. 39 shows a top view of the SFT 300, in accordance with some embodiments of the present invention. FIG. 40 shows a bottom view of the SFT 300, in accordance with some embodiments of the present invention.

The example SFT 300 shown in FIGS. 35 through 48 also includes a pivot assembly 445 connected near a lower end of the back leg structures 307C and 307D at the back side of the chair structure 301. The pivot assembly 445 is configured to contact the floor and provide a fulcrum about which the SFT 300 can rotate when the SFT 300 is reclined backward after the person 302 is seated and fitted within the SFT 300. In the example SFT 300 configuration of FIGS. 35 through 48, the pivot assembly 445 includes support bars 447 and 449 connected to the back leg structures 307C and 307D, respectively. The pivot assembly 445 also includes a crossbar 451 connected to both of the support bars 447 and 449. The vertical position of the pivot assembly 445 along the back leg structure 307C and 307D can be adjusted as needed. It should be appreciated that in other embodiments, the pivot assembly 445 can be configured in different ways so long as the pivot assembly 445 is configured to provide a stable member about which the SFT 300 can be rotated when the SFT 300 is placed in a reclined position and returned to an upright position. In various embodiments, components of the pivot assembly 445 can be formed of one or more of aluminum, aluminum alloy, steel, steel alloy, stainless steel, carbon-fiber, fiberglass, plastic, acrylic, polymer, PVC, wood, or other material of similar mechanical strength and rigidity.

Figure 41:
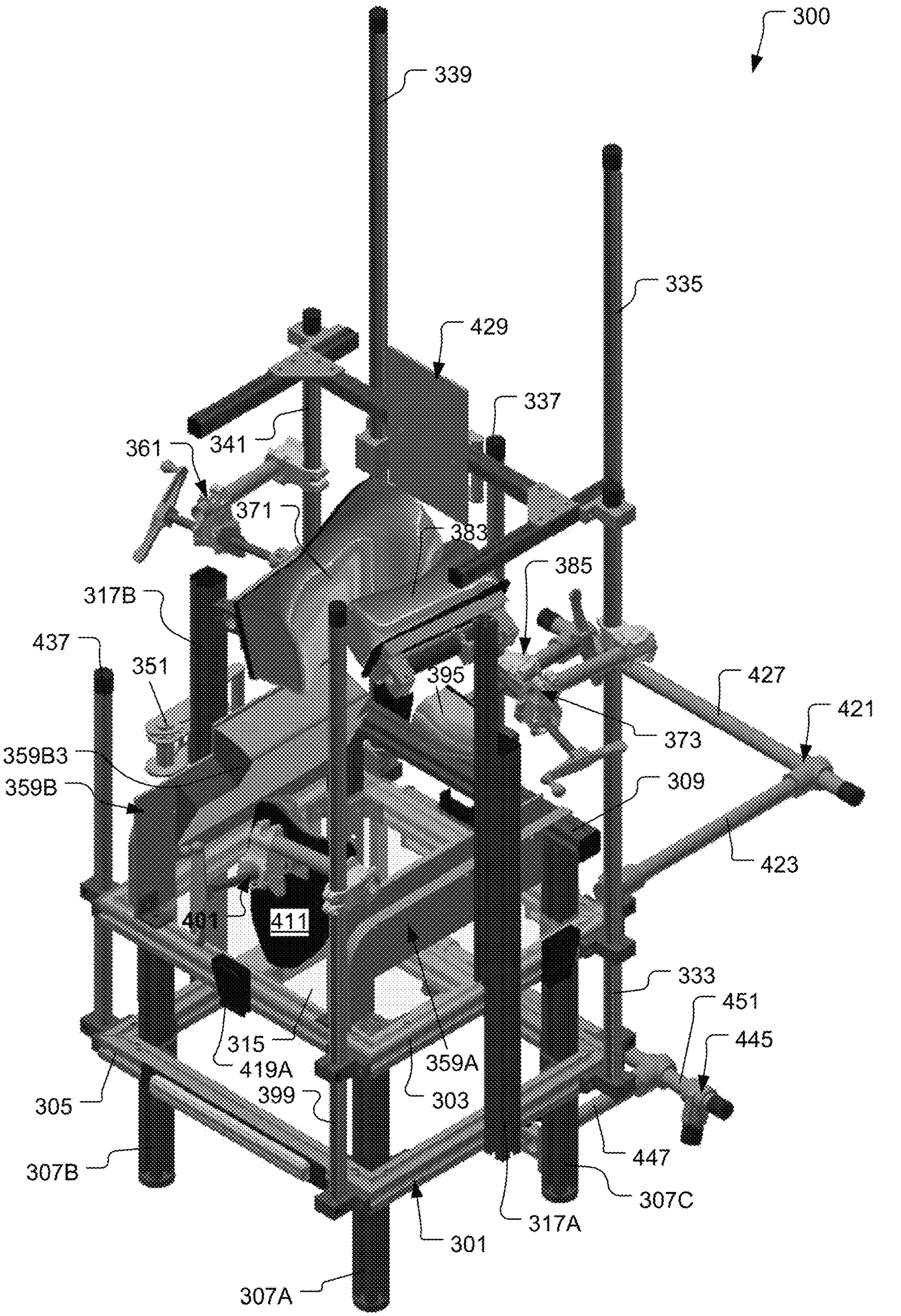
FIG. 41 shows a perspective view of the example SFT from a left, front, upper point of view, in accordance with some embodiments of the present invention.
Figure 42:
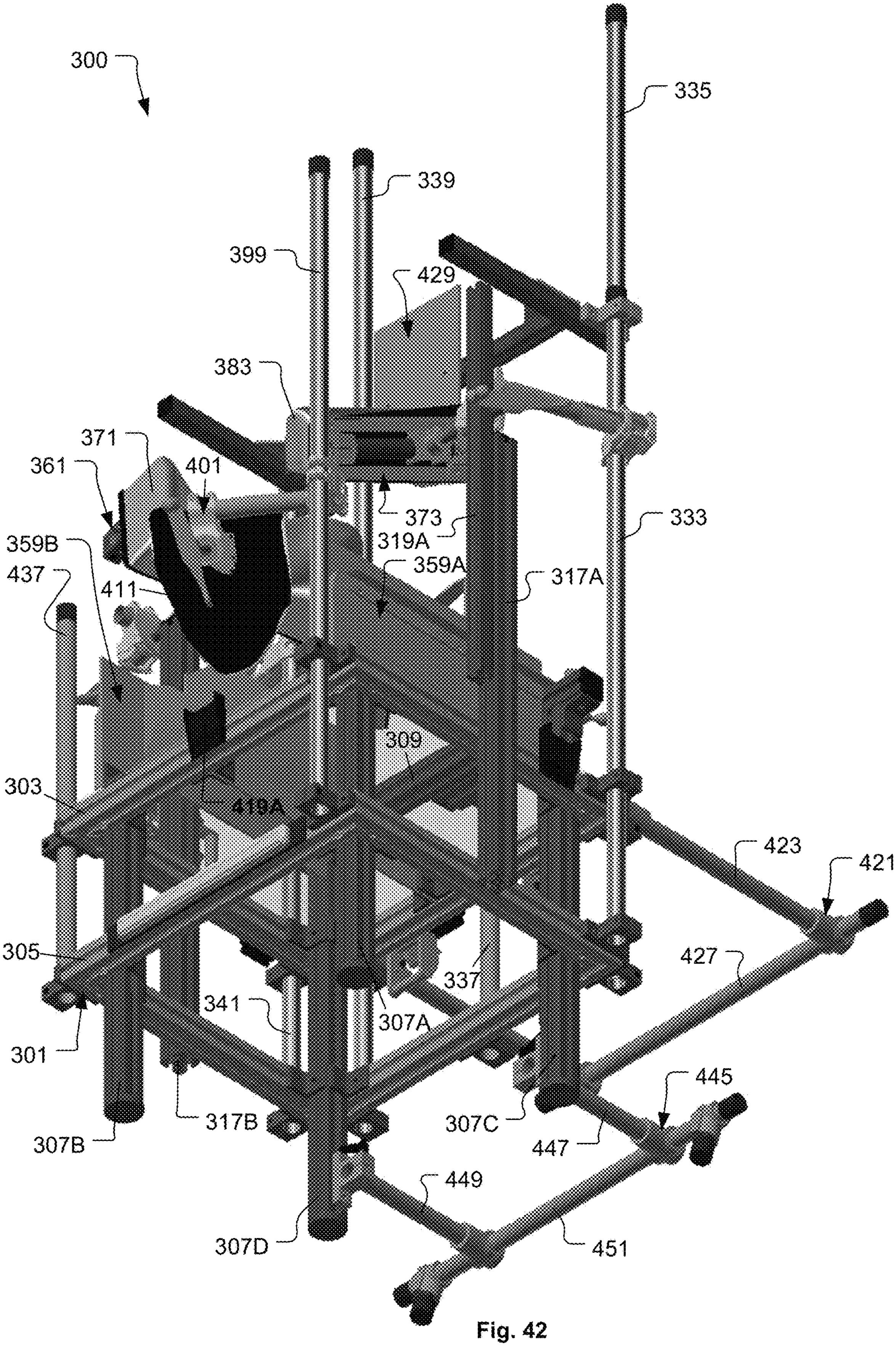
FIG. 42 shows a perspective view of the example SFT from a left, front, lower point of view, in accordance with some embodiments of the present invention.
Figure 43:
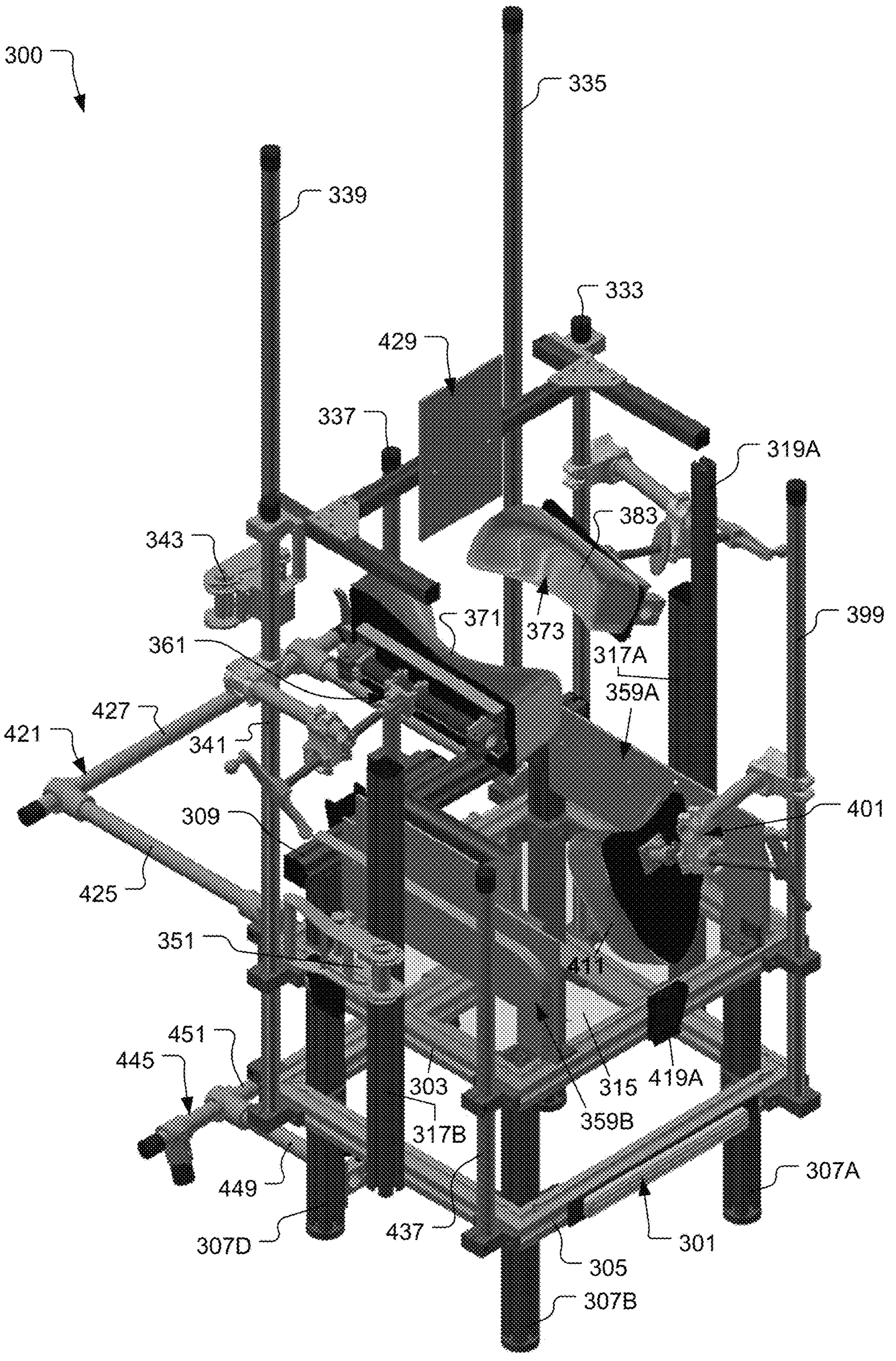
FIG. 43 shows a perspective view of the example SFT from a right, front, upper point of view, in accordance with some embodiments of the present invention.
Figure 44:
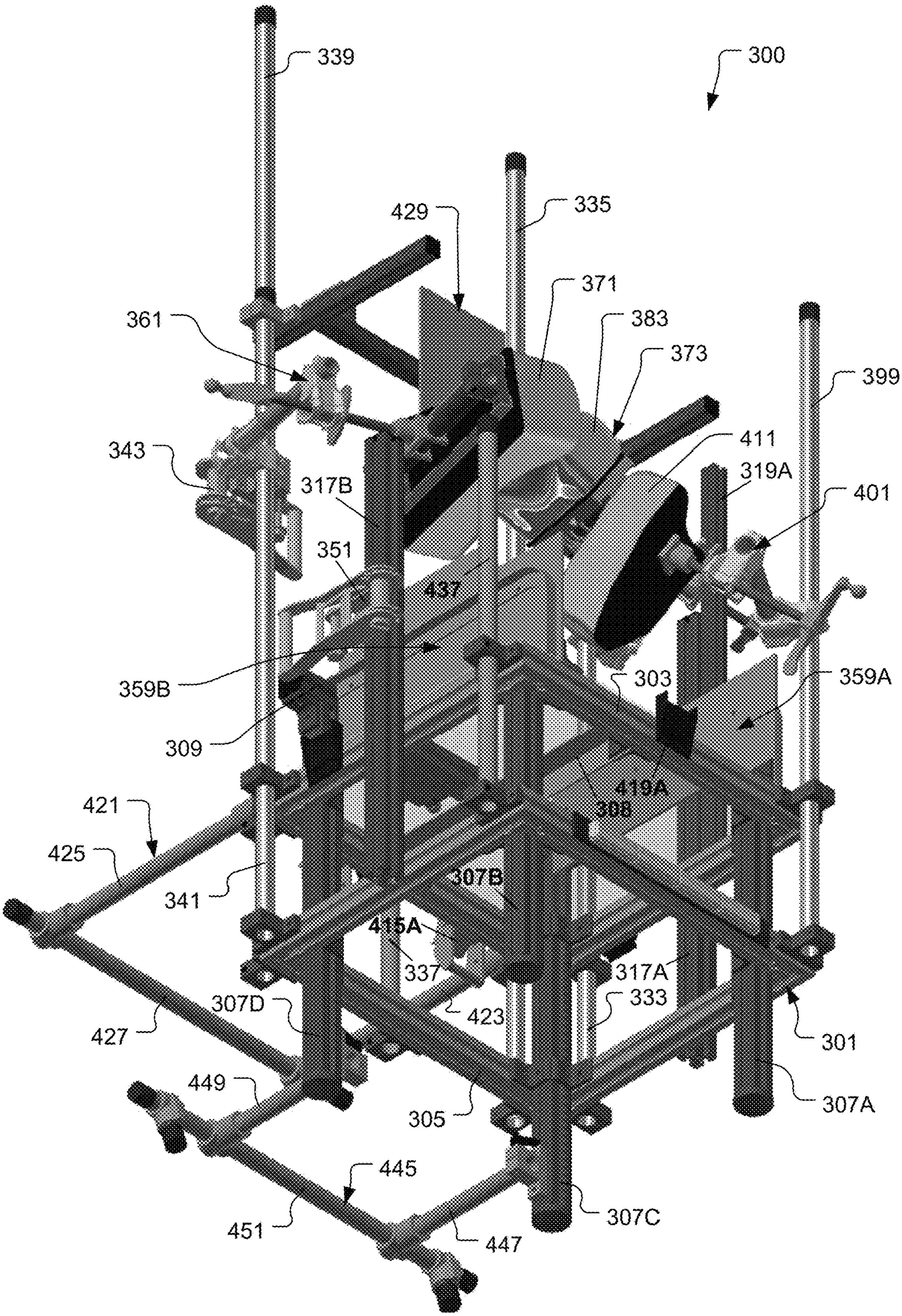
FIG. 44 shows a perspective view of the example SFT from a right, front, lower point of view, in accordance with some embodiments of the present invention.
Figure 45:
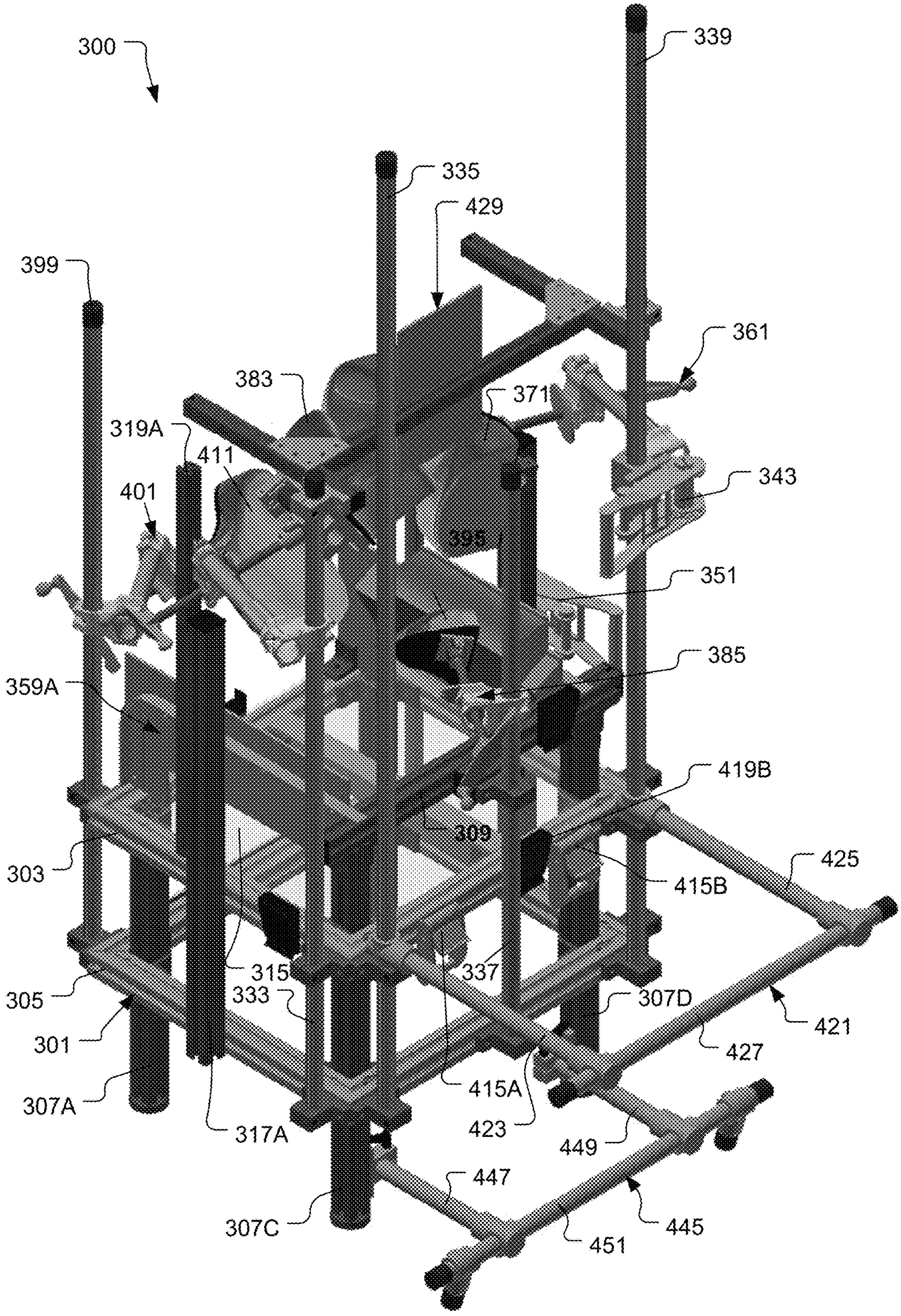
FIG. 45 shows a perspective view of the example SFT from a left, back, upper point of view, in accordance with some embodiments of the present invention.
Figure 46:
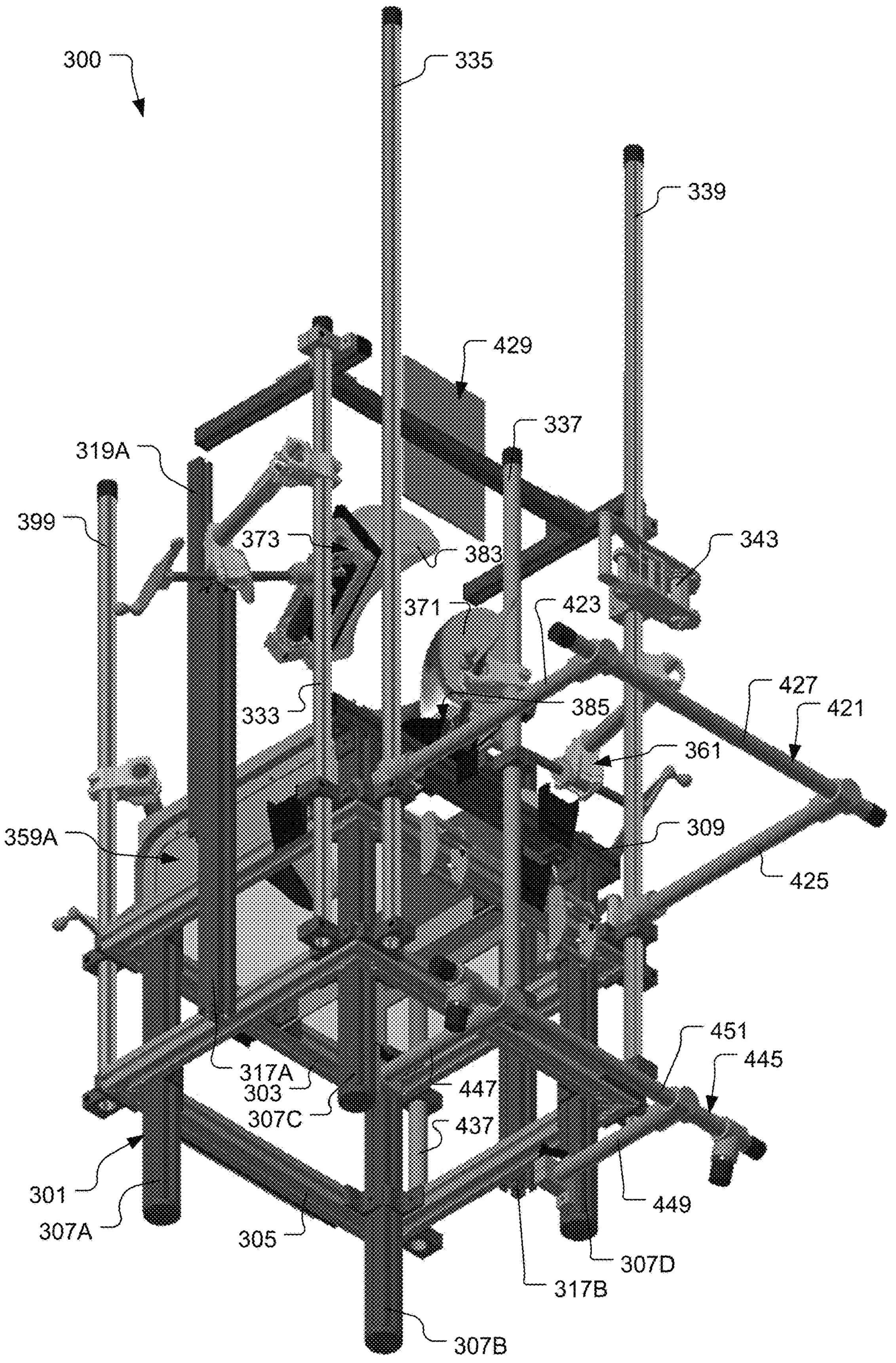
FIG. 46 shows a perspective view of the example SFT from a left, back, lower point of view, in accordance with some embodiments of the present invention.
Figure 47:
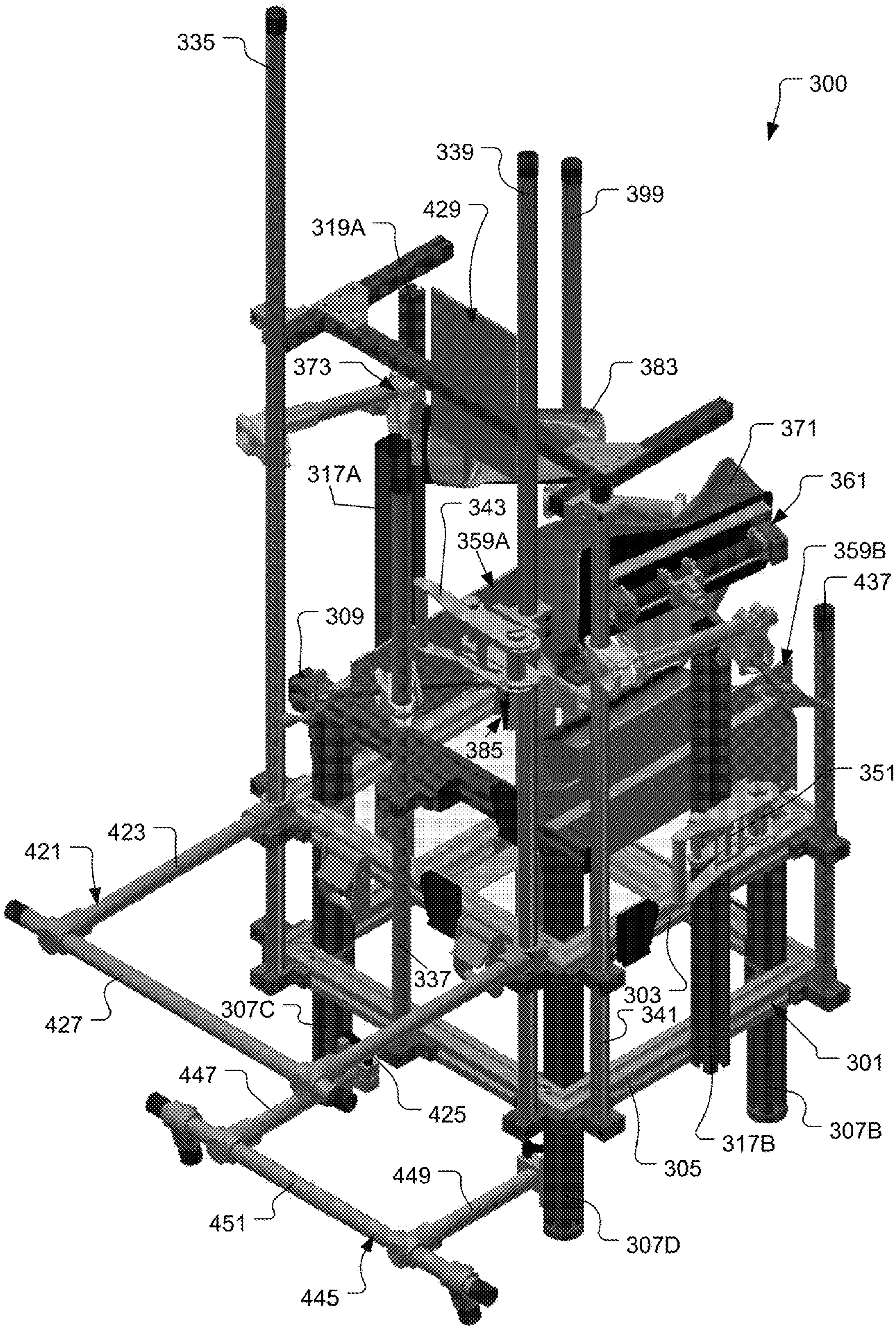
FIG. 47 shows a perspective view of the example SFT from a right, back, upper point of view, in accordance with some embodiments of the present invention.
Figure 48:
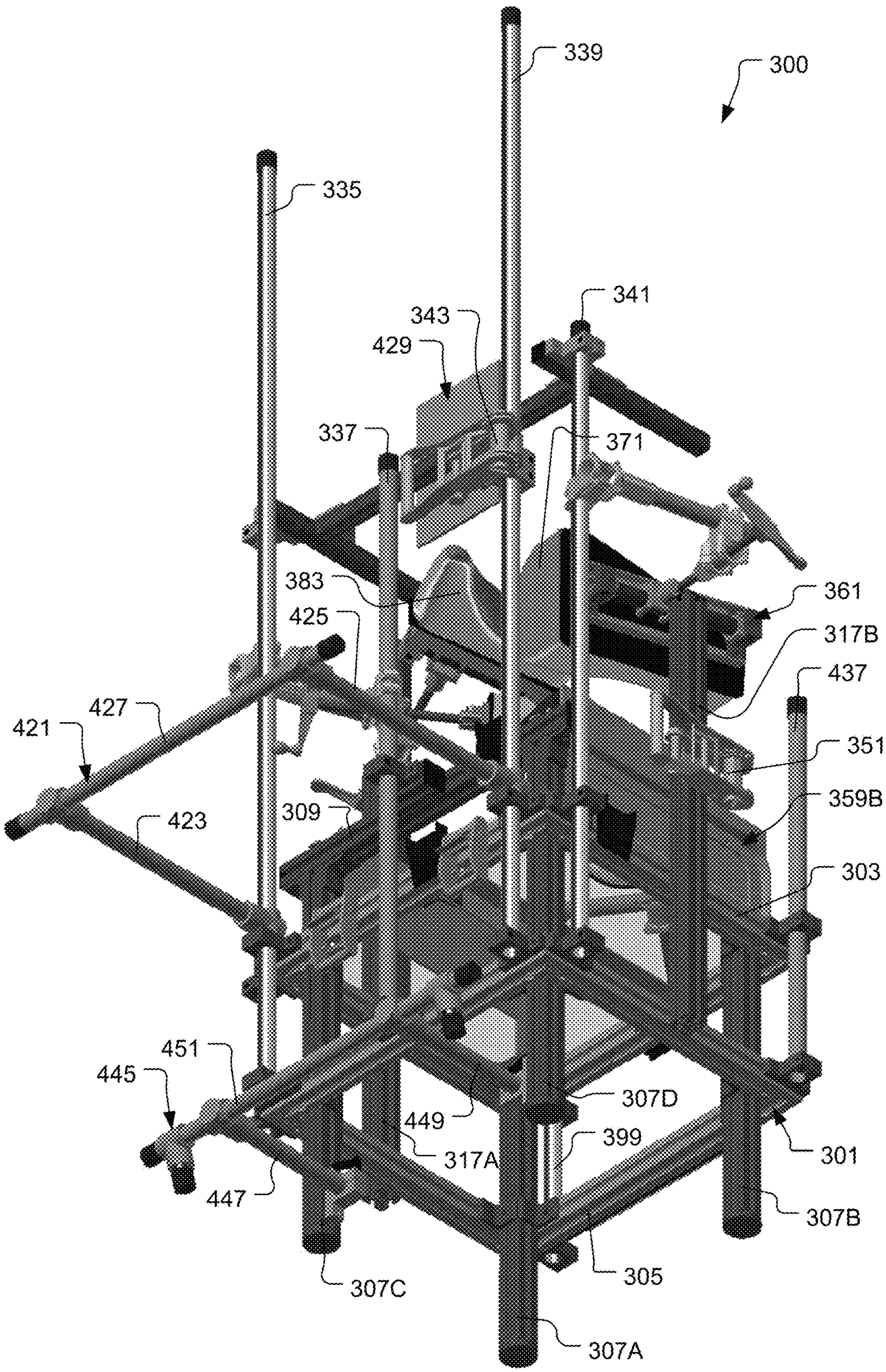
FIG. 48 shows a perspective view of the example SFT from a right, back, lower point of view, in accordance with some embodiments of the present invention.

FIG. 41 shows a perspective view of the example SFT 300 from a left, front, upper point of view, in accordance with some embodiments of the present invention. FIG. 42 shows a perspective view of the example SFT 300 from a left, front, lower point of view, in accordance with some embodiments of the present invention. FIG. 43 shows a perspective view of the example SFT 300 from a right, front, upper point of view, in accordance with some embodiments of the present invention. FIG. 44 shows a perspective view of the example SFT 300 from a right, front, lower point of view, in accordance with some embodiments of the present invention. FIG. 45 shows a perspective view of the example SFT 300 from a left, back, upper point of view, in accordance with some embodiments of the present invention. FIG. 46 shows a perspective view of the example SFT 300 from a left, back, lower point of view, in accordance with some embodiments of the present invention. FIG. 47 shows a perspective view of the example SFT 300 from a right, back, upper point of view, in accordance with some embodiments of the present invention. FIG. 48 shows a perspective view of the example SFT 300 from a right, back, lower point of view, in accordance with some embodiments of the present invention.

It should be understood that the example SFT 300 depicted in FIGS. 3 through 48 is configured to treat the person 302 having a particular scoliotic spinal configuration. However, in various embodiments, the SFT 300 can be configured to treat essentially any scoliotic spinal configuration, whether a given scoliotic curve bends to the left or the right. For example, in some embodiments, the SFT 300 can be re-configured in a laterally mirrored configuration, such that the sternal belt ratchet 343 is connected to the post 335 instead of the post 339, and such that the sternal belt coupling 345B is connected to the post 341 instead of the post 333, and such that the lumbar belt ratchet 351 is connected to the left arm rest base 317A instead of the right arm rest base 317B, and such that the primary thoracic driver assembly 361 is connected to the post 333 instead of the post 341, and such that the proximal thoracic driver assembly 373 is connected to the post 341 instead of the post 333, and such that the lumbar derotator driver 395 is configured and positioned to apply a prescribed force vector to lateral posterior portions of the one or more lumbar vertebrae on an opposite side of the person 302 relative to the sagittal plane of the person 302, and such that the post 399 and the anterior thoracic driver assembly 401 are positioned on an opposite side of the person 302 relative to the sagittal plane of the person 302, and such that the iliac crest belt 417 is positioned on an opposite side of the person 302 relative to the sagittal plane of the person 302, and such that the post 437 (if present) is moved from the right side of the chair structure 301 to the left side of the chair structure 301.

Figure 49:
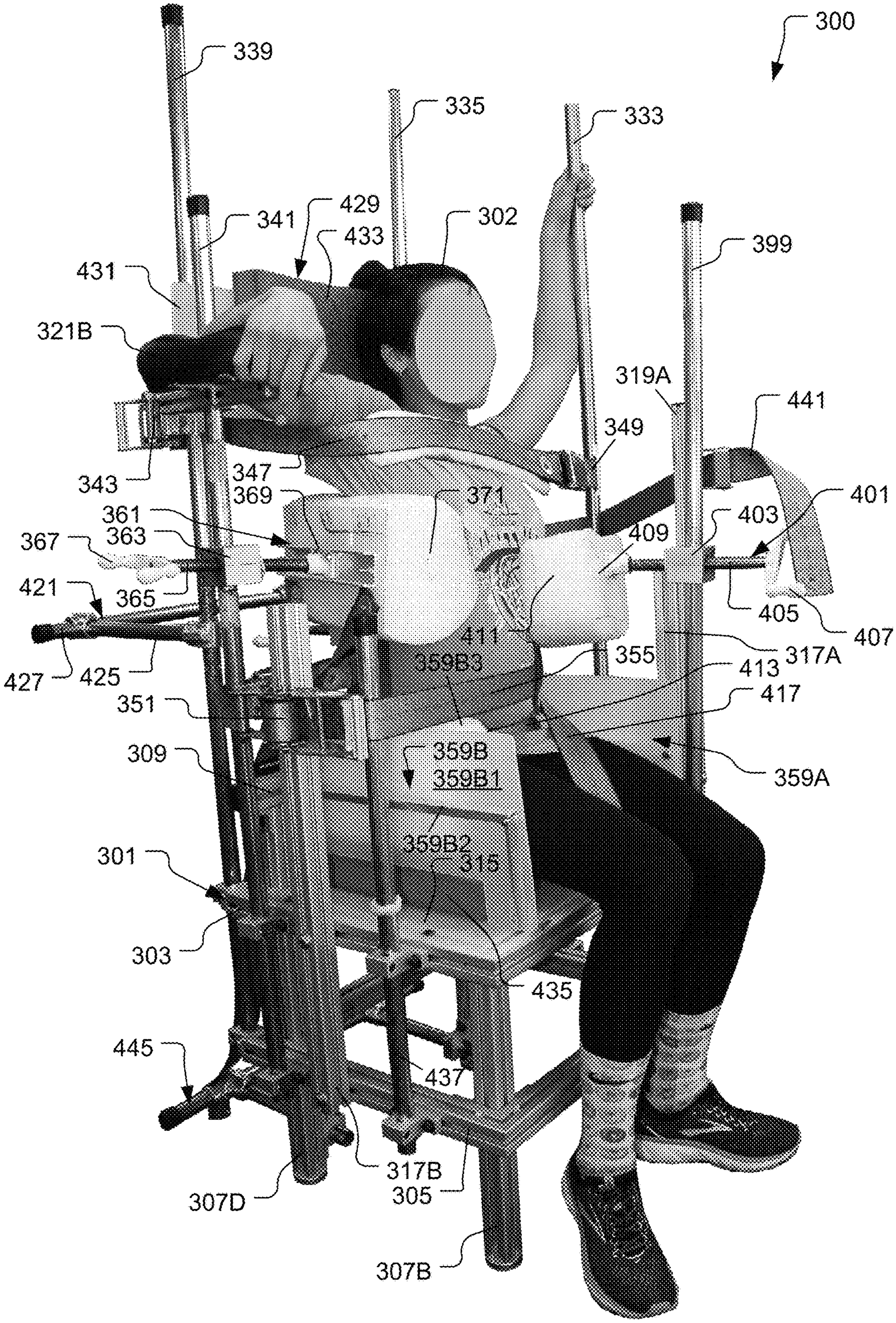
FIG. 49 shows a view of the person fitted within the SFT in the upright position from a right, front point of view, in accordance with some embodiments of the present invention.
Figure 50:
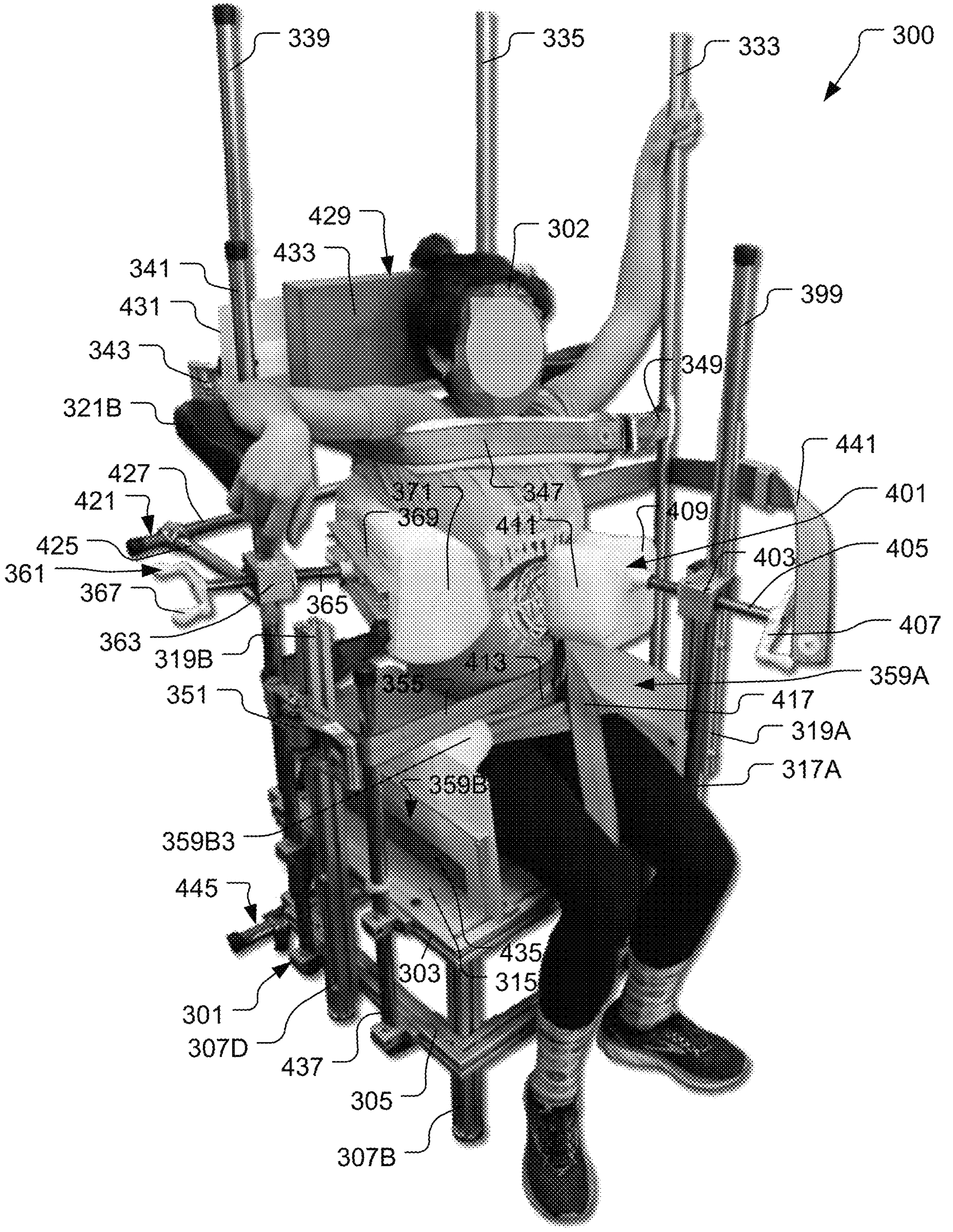
FIG. 50 shows another view of the person fitted within the SFT in the upright position from a right, front point of view, in accordance with some embodiments of the present invention.
Figure 51:
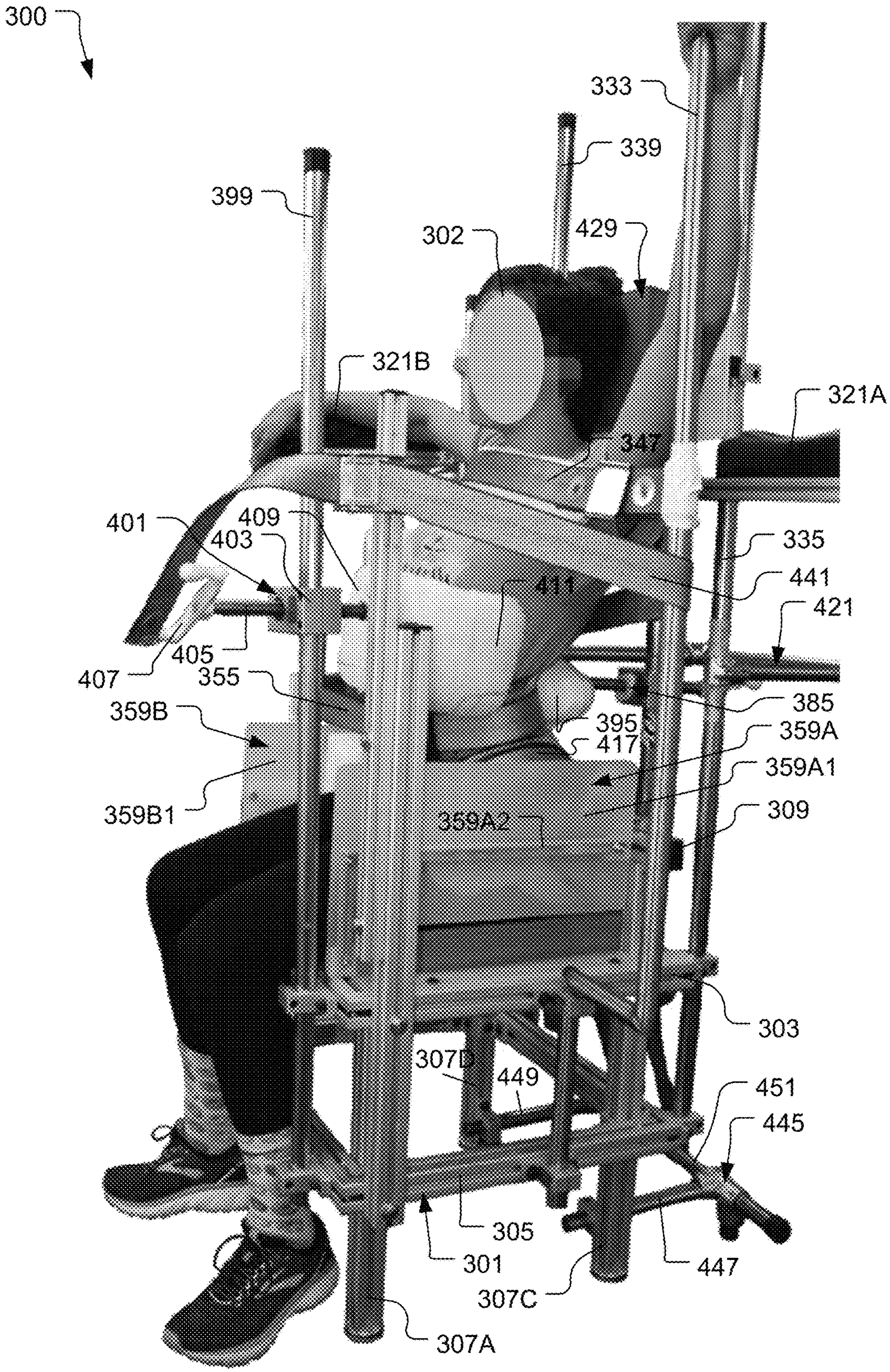
FIG. 51 shows a view of the person fitted within the SFT in the upright position from a left, front point of view, in accordance with some embodiments of the present invention.
Figure 52:
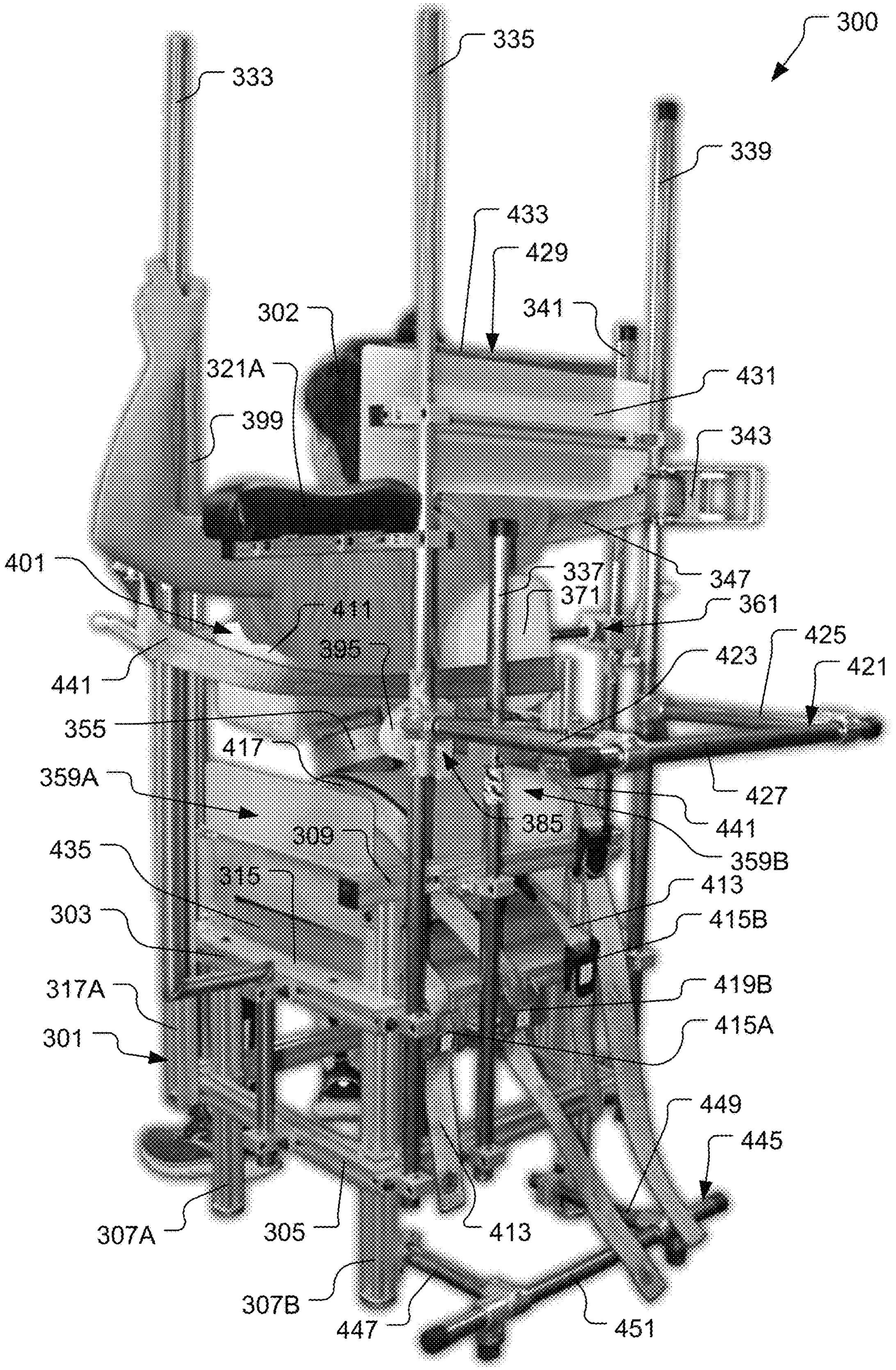
FIG. 52 shows a view of the person fitted within the SFT in the upright position from a left, back point of view, in accordance with some embodiments of the present invention.
Figure 53:
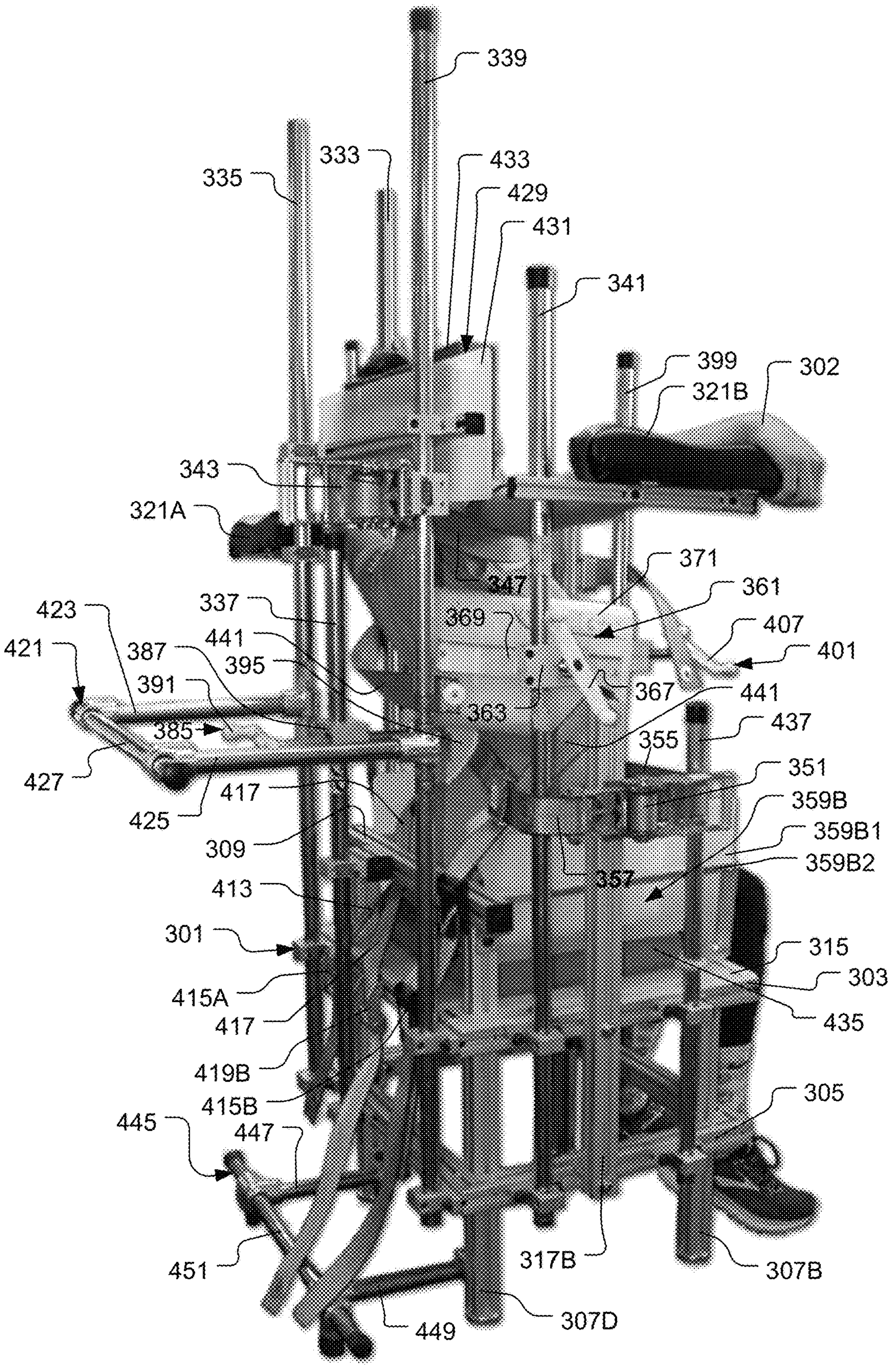
FIG. 53 shows a view of the person fitted within the SFT in the upright position from a right, back point of view, in accordance with some embodiments of the present invention.
Figure 54:
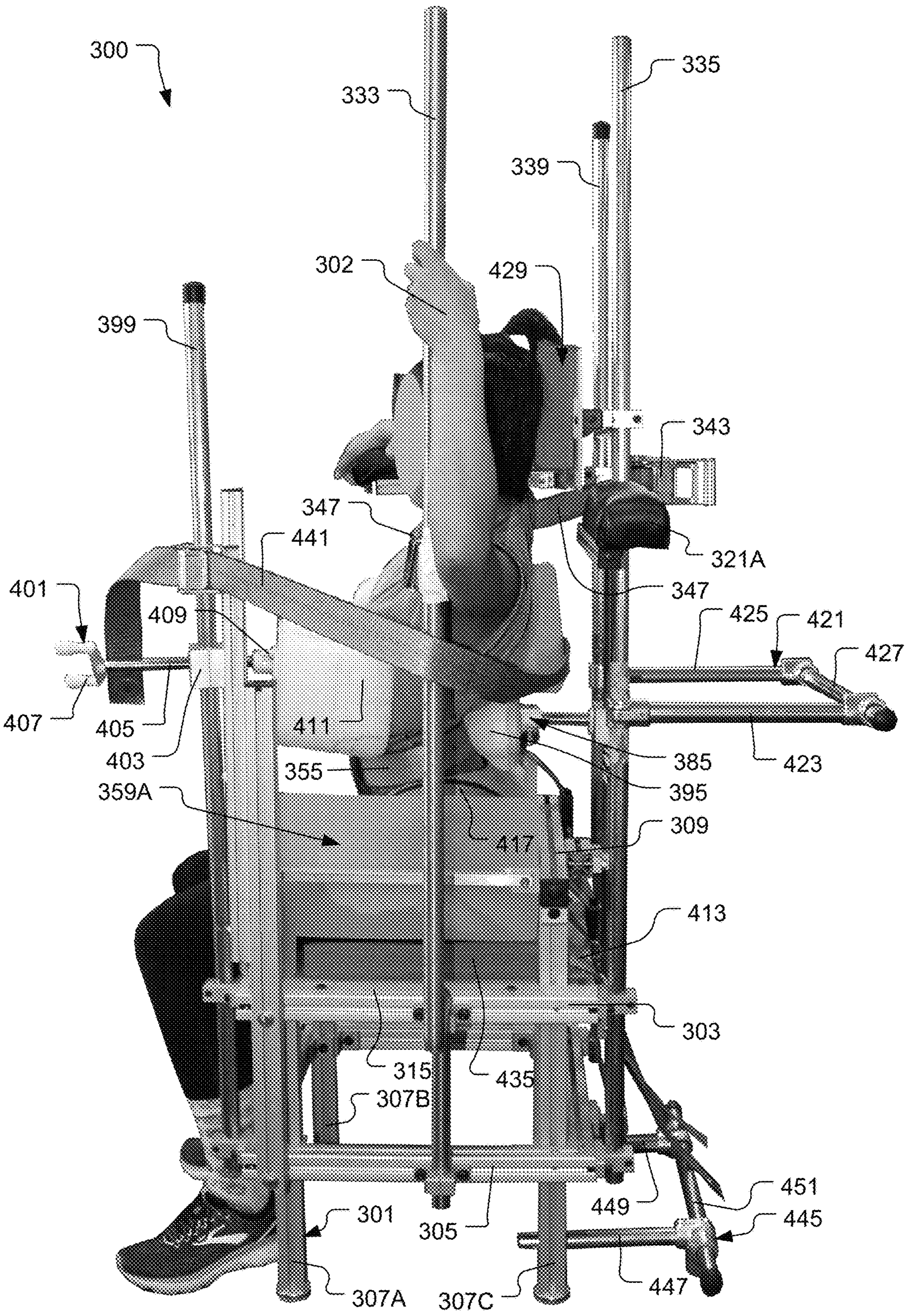
FIG. 54 shows a view of the person fitted within the SFT in the upright position from the left side, in accordance with some embodiments of the present invention.

FIGS. 49 through 63 show the person 302 fitted within the example SFT 300 configuration, with the SFT 300 in an upright position, in accordance with some embodiments of the present invention. FIG. 49 shows a view of the person 302 fitted within the SFT 300 in the upright position from a right, front point of view, in accordance with some embodiments of the present invention. FIG. 50 shows a another view of the person 302 fitted within the SFT 300 in the upright position from a right, front point of view, in accordance with some embodiments of the present invention. FIG. 51 shows a view of the person 302 fitted within the SFT 300 in the upright position from a left, front point of view, in accordance with some embodiments of the present invention. FIG. 52 shows a view of the person 302 fitted within the SFT 300 in the upright position from a left, back point of view, in accordance with some embodiments of the present invention. FIG. 53 shows a view of the person 302 fitted within the SFT 300 in the upright position from a right, back point of view, in accordance with some embodiments of the present invention. FIG. 54 shows a view of the person 302 fitted within the SFT 300 in the upright position from the left side, in accordance with some embodiments of the present invention.

Figure 55:
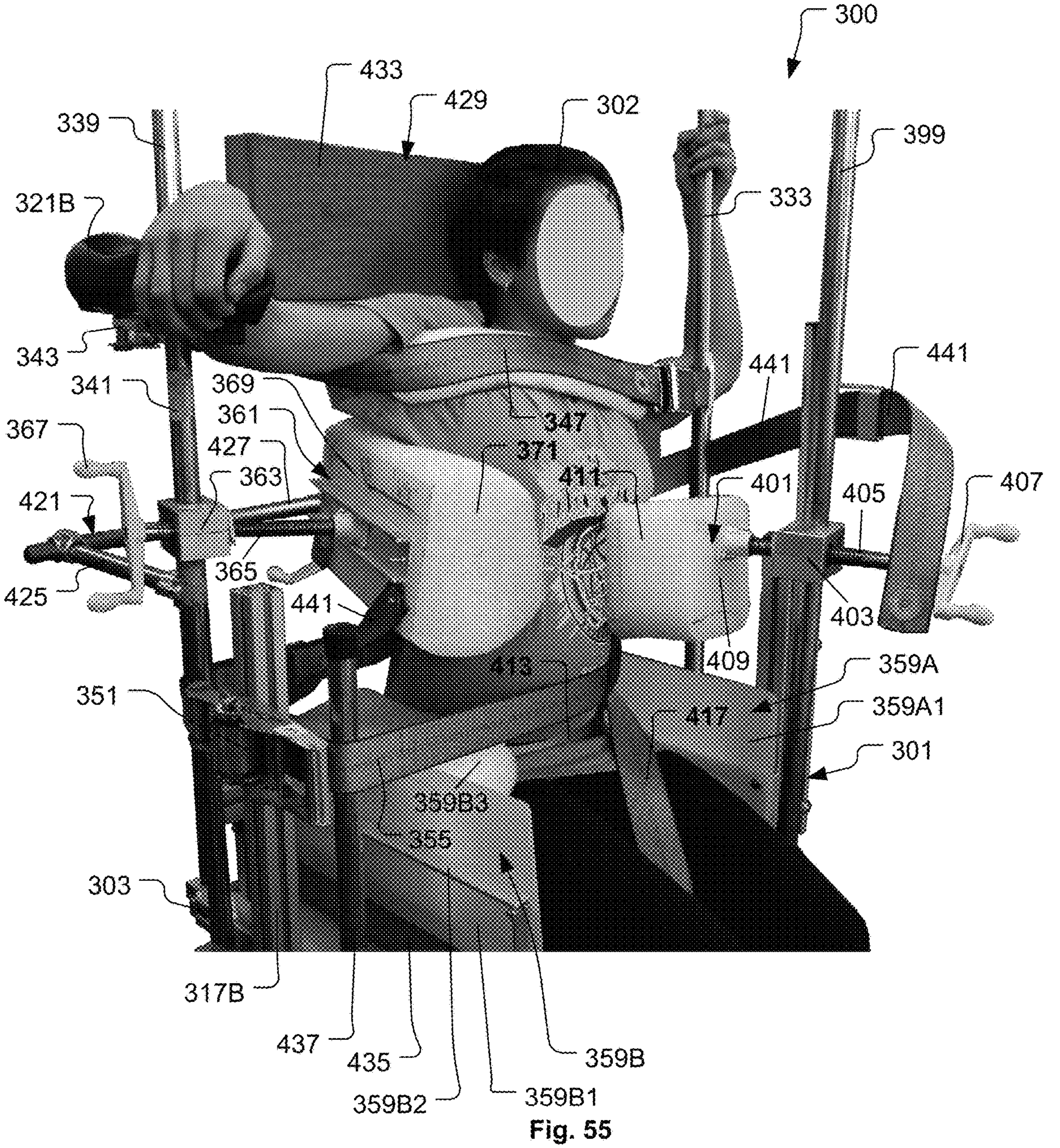
FIG. 55 shows a close-up view of the person fitted within the SFT in the upright position from a right, front point of view, in accordance with some embodiments of the present invention.
Figure 56:
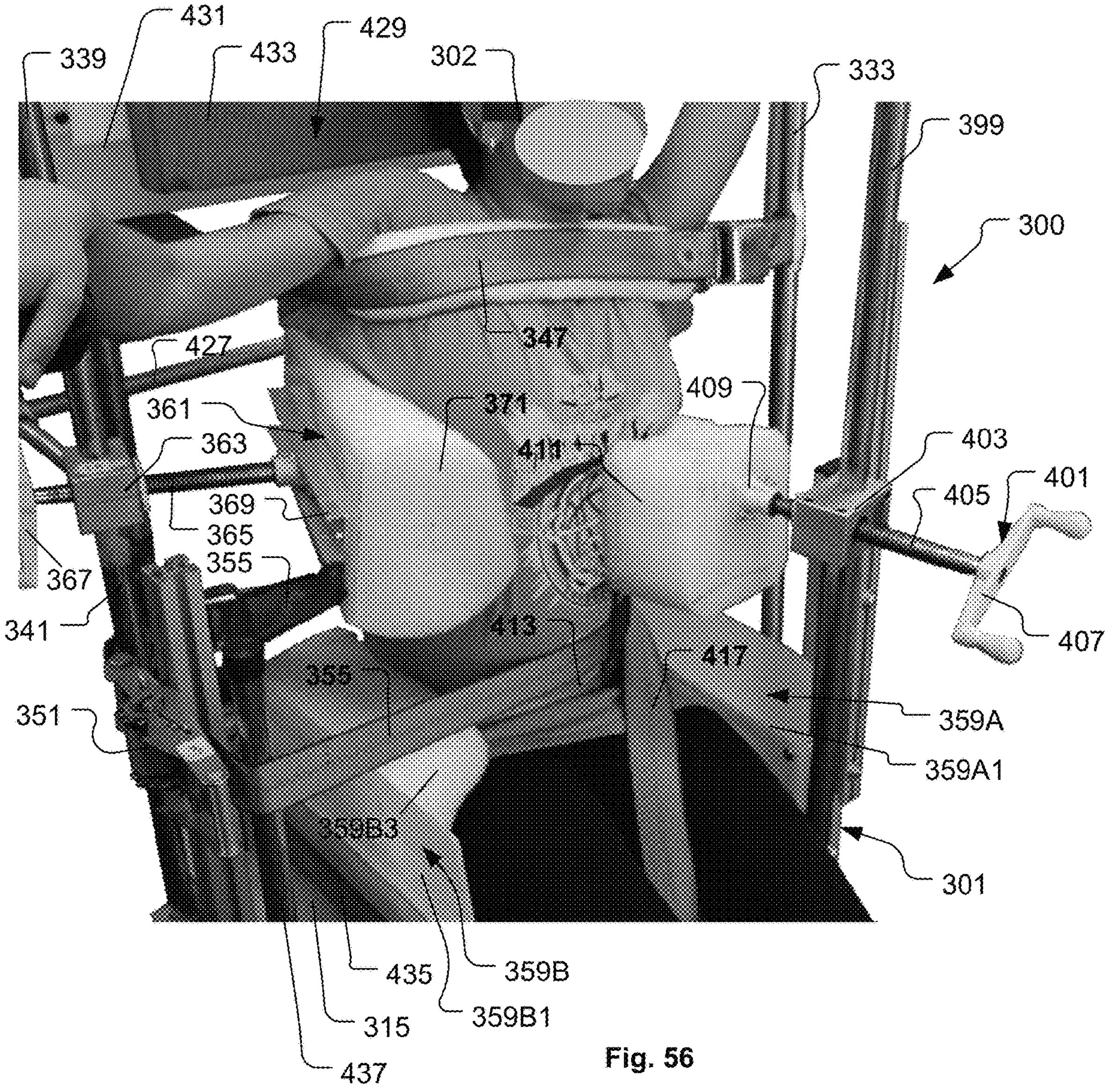
FIG. 56 shows another close-up view of the person fitted within the SFT in the upright position from a right, front point of view, in accordance with some embodiments of the present invention.
Figure 57:
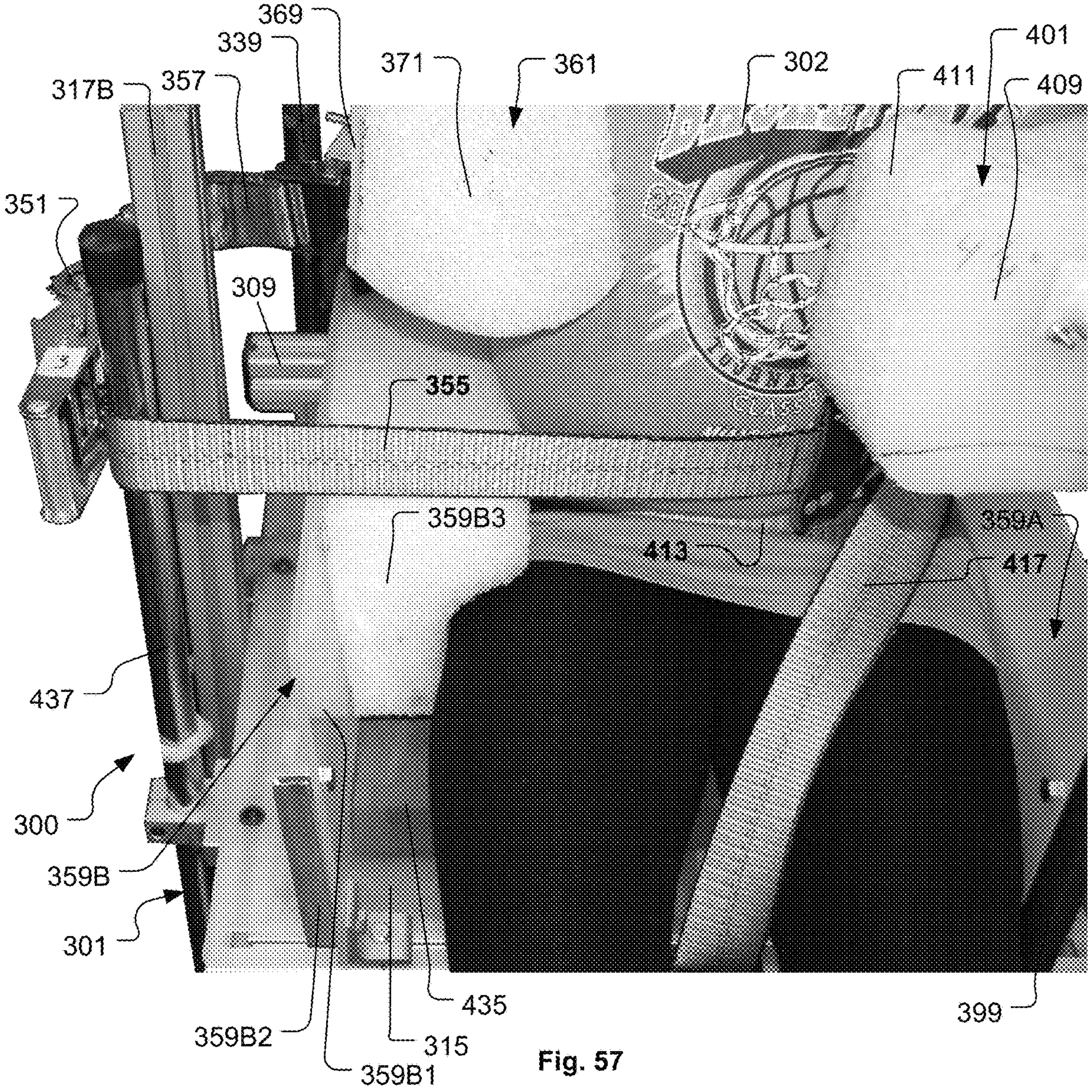
FIG. 57 shows a close-up view of the person fitted within the SFT in the upright position from a front point of view, in accordance with some embodiments of the present invention.
Figure 58:
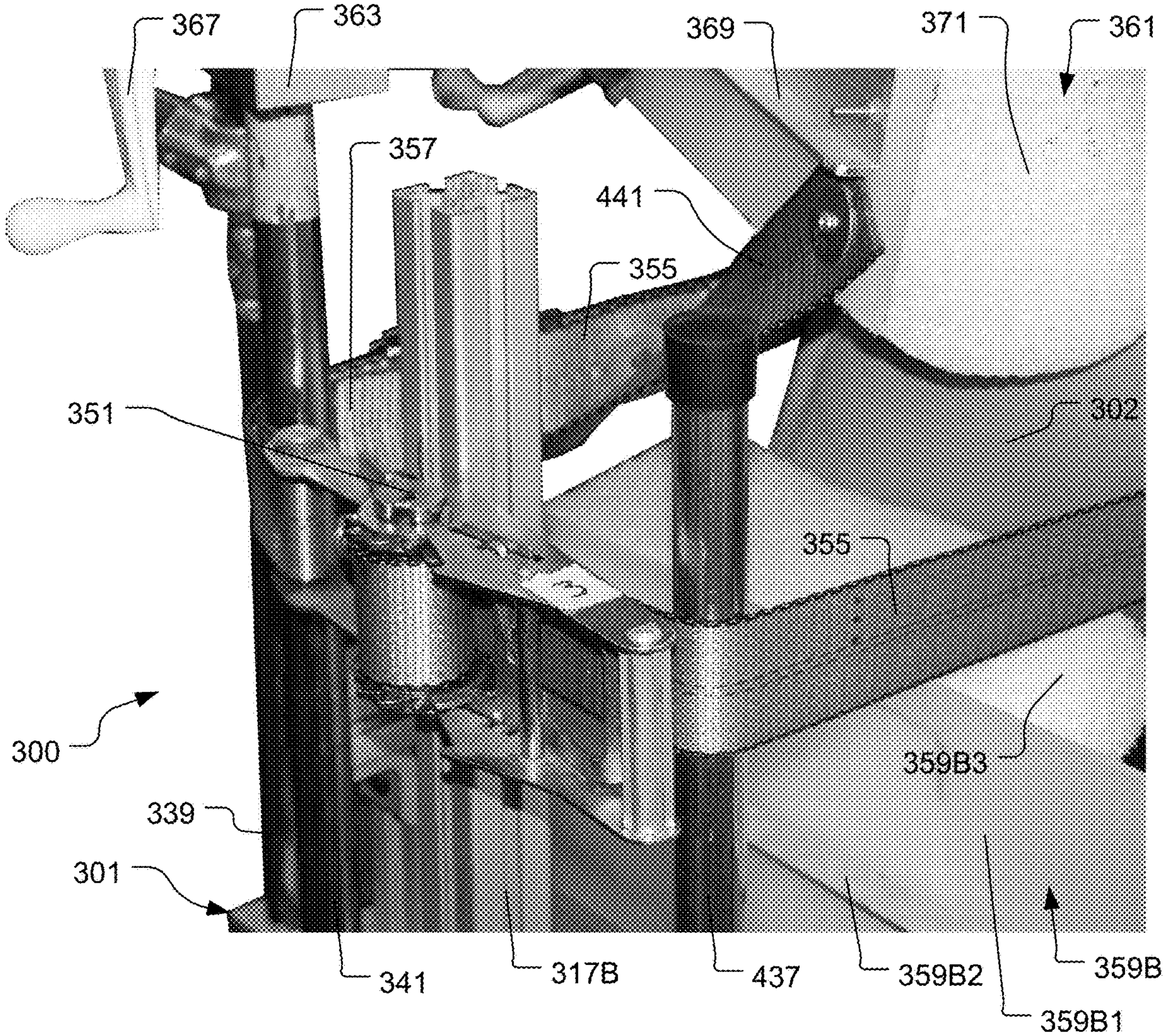
FIG. 58 shows a close-up view of the right side of the SFT that includes the lumbar belt ratchet, in accordance with some embodiments of the present invention.
Figure 59:
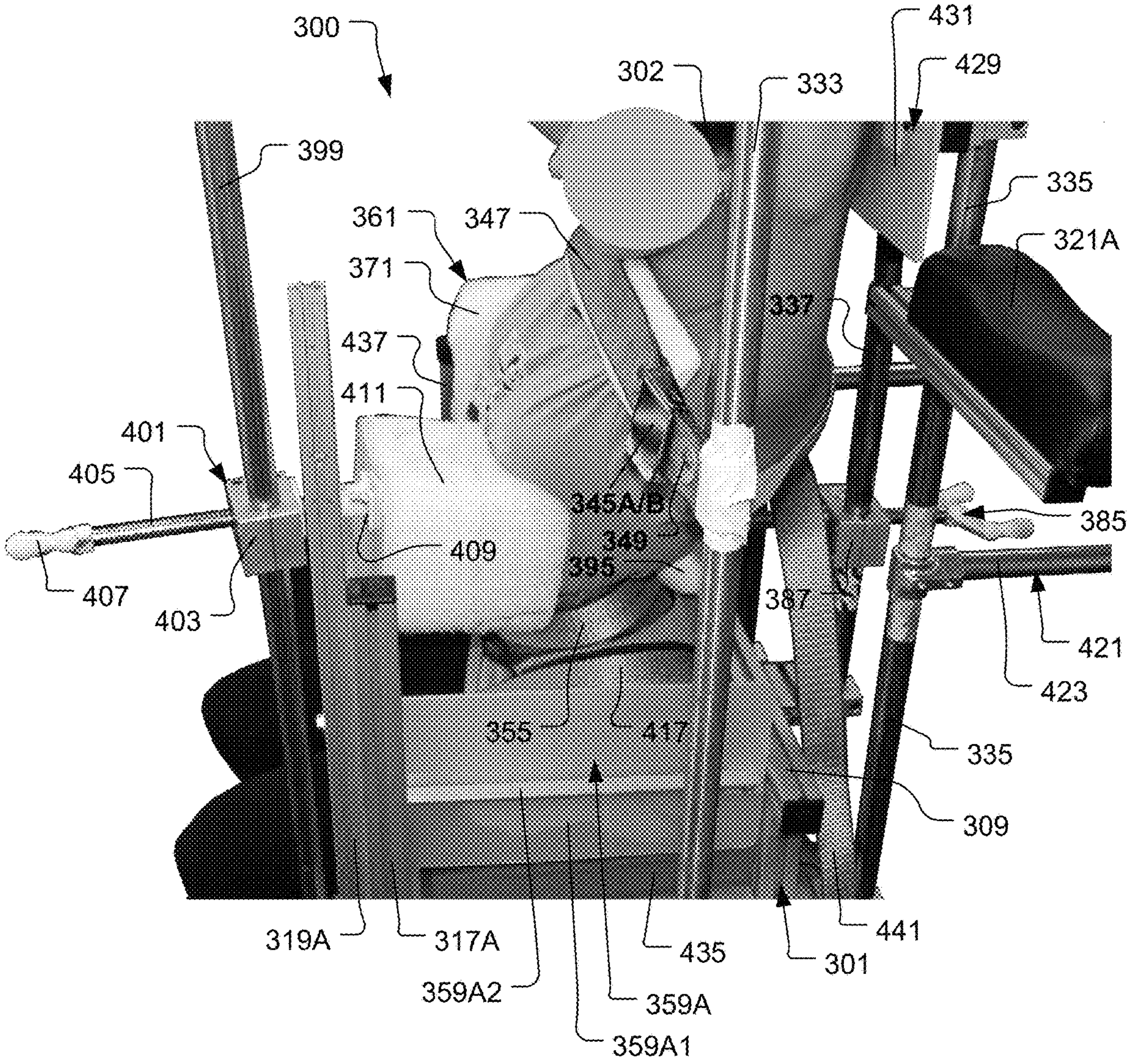
FIG. 59 shows a close-up view of the person fitted within the SFT in the upright position from a left point of view, in accordance with some embodiments of the present invention.
Figure 60:
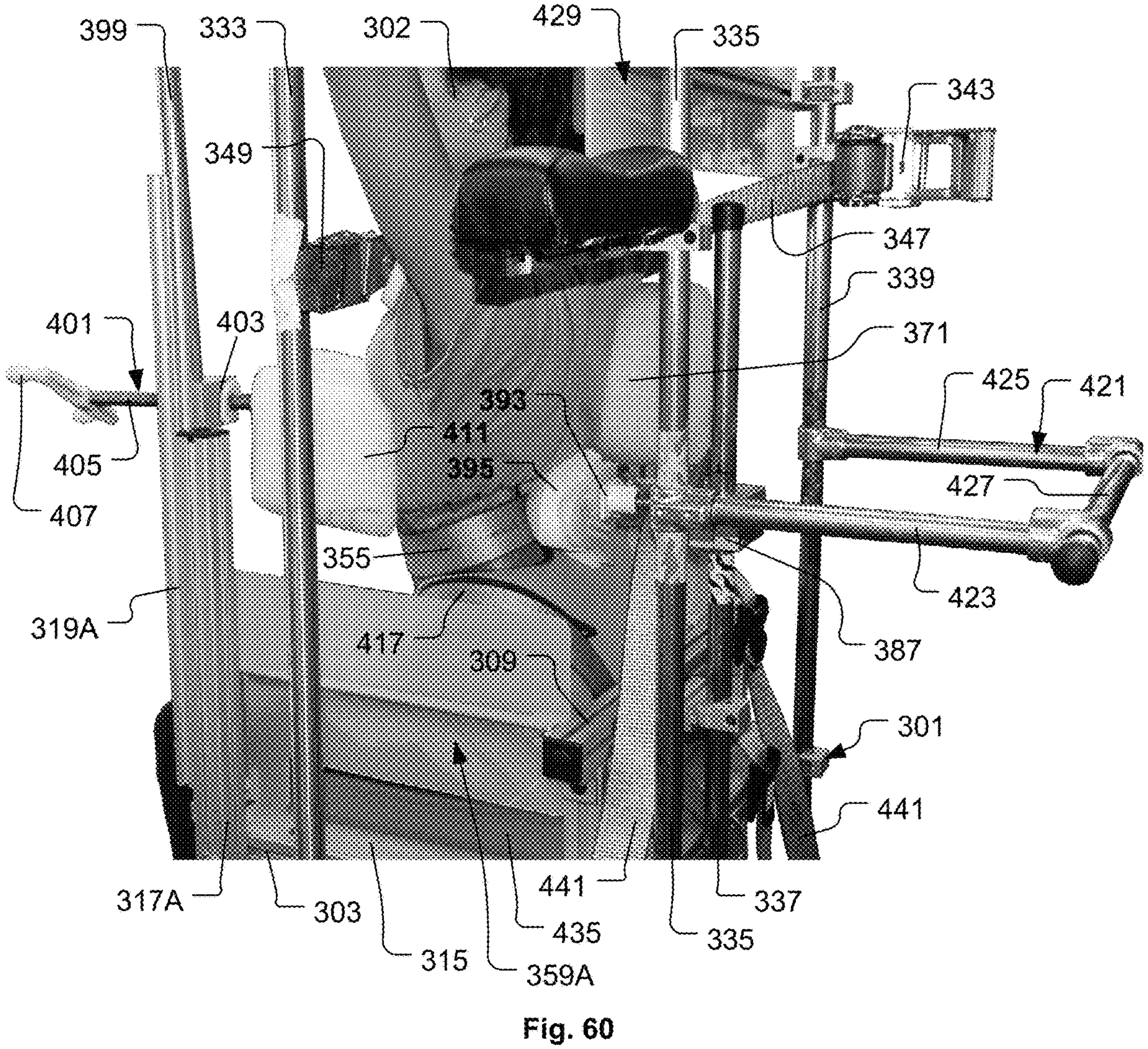
FIG. 60 shows a close-up view of the person fitted within the SFT in the upright position from a left, back point of view, in accordance with some embodiments of the present invention.
Figure 61:
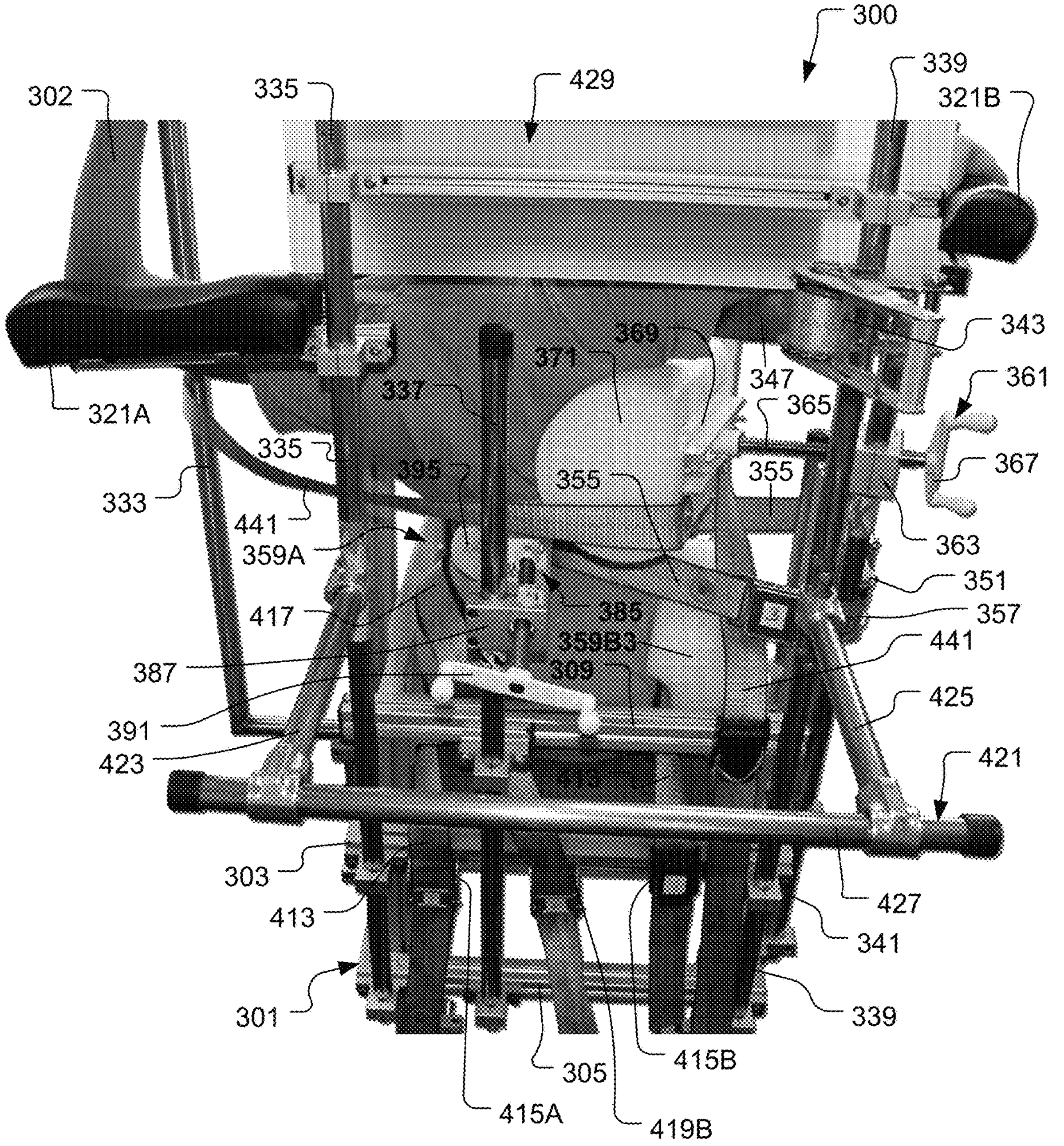
FIG. 61 shows a close-up view of the person fitted within the SFT in the upright position from a back point of view, in accordance with some embodiments of the present invention.
Figure 62:
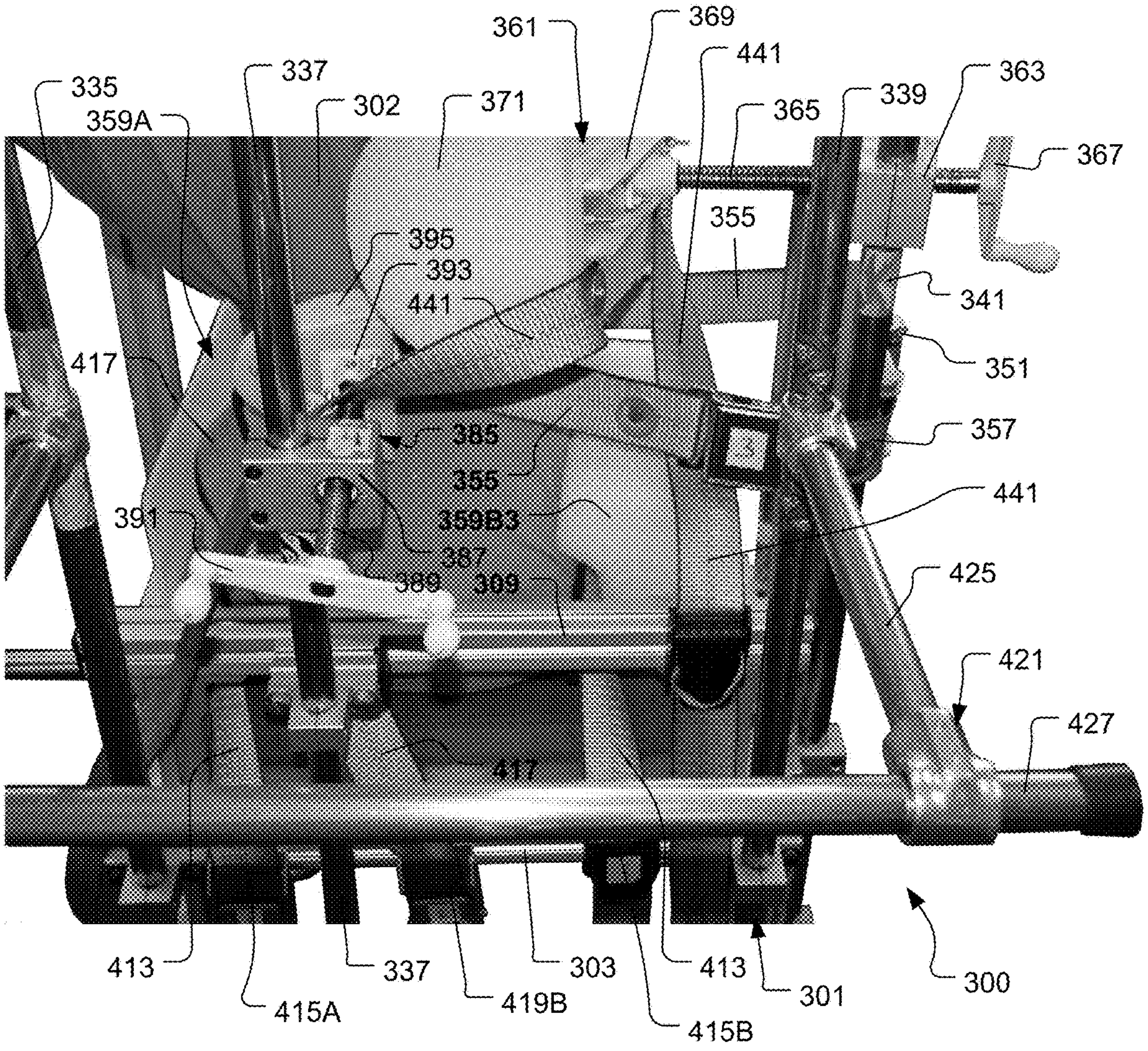
FIG. 62 shows a close-up view of the person fitted within the SFT in the upright position from another back point of view, in accordance with some embodiments of the present invention.
Figure 63:
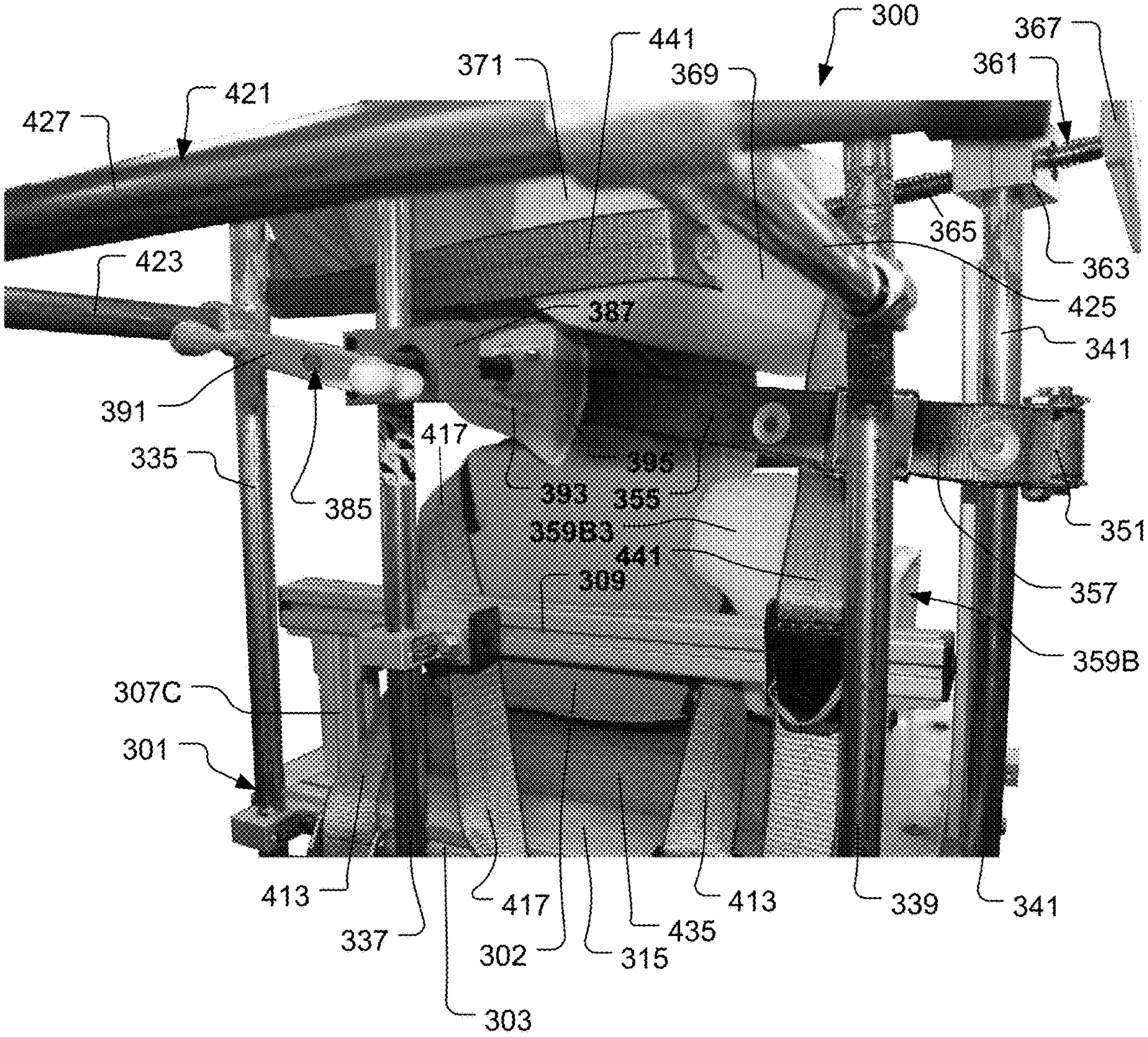
FIG. 63 shows a close-up view of the person fitted within the SFT in the upright position from another back point of view, in accordance with some embodiments of the present invention.

FIG. 55 shows a close-up view of the person 302 fitted within the SFT 300 in the upright position from a right, front point of view, in accordance with some embodiments of the present invention. FIG. 56 shows another close-up view of the person 302 fitted within the SFT 300 in the upright position from a right, front point of view, in accordance with some embodiments of the present invention. FIG. 57 shows a close-up view of the person 302 fitted within the SFT 300 in the upright position from a front point of view, in accordance with some embodiments of the present invention. FIG. 58 shows a close-up view of the right side of the SFT 300 that includes the lumbar belt ratchet 351, in accordance with some embodiments of the present invention. FIG. 59 shows a close-up view of the person 302 fitted within the SFT 300 in the upright position from a left point of view, in accordance with some embodiments of the present invention. FIG. 60 shows a close-up view of the person 302 fitted within the SFT 300 in the upright position from a left, back point of view, in accordance with some embodiments of the present invention. FIG. 61 shows a close-up view of the person 302 fitted within the SFT 300 in the upright position from a back point of view, in accordance with some embodiments of the present invention. FIG. 62 shows a close-up view of the person 302 fitted within the SFT 300 in the upright position from another back point of view, in accordance with some embodiments of the present invention. FIG. 63 shows a close-up view of the person 302 fitted within the SFT 300 in the upright position from another back point of view, in accordance with some embodiments of the present invention.

As shown in FIGS. 49 through 63, the sternal belt 347 is positioned to extend across the upper thoracic region of the person 302 under the arms of the person 302, so as to hold the upper thoracic region of the person 302 toward the back of the SFT 300. The lumbar belt 355 is positioned to extend around the left lower abdominal region of the person 302, so as to apply a lateral-to-medial force to the lower left ribs of the person 302, which in turn applies a lateral-to-medial force to thoracolumbar region of the person 302. The iliac crest belt 417 is positioned to extend from a location on the front of the upper frame 303 between the legs of the person 302, and over the left iliac crest of the person 302, and downward at an angle to a location on the back of the upper frame 303 near a sacral line of the person 302 (see FIG. 61). The angle of the iliac crest belt 417 from the iliac crest of the person 302 downward to the location on the back of the upper frame 303 near the sacral line of the person 302 can be adjusted to apply a prescribed rotational force component to the pelvis of the person 302 relative to the transverse plane of the person 302. For example, in the configuration of FIGS. 49 through 63 the angle of the iliac crest belt 417 from the iliac crest of the person 302 downward to the location on the back of the upper frame 303 near the sacral line of the person 302 applies a counterclockwise (right side-to-left side) rotational force component to the pelvis of the person 302 relative to the transverse plane of the person 302. It should also be understood and appreciated that tightening of the lumbar belt 355 serves to move lower abdominal tissues of the person 302 in a lateral-to-medial direction so as to expose the left iliac crest of the person 302, which enables positioning of the iliac crest belt 417 to extend over an upper portion of the left iliac of the person 302. It should be understood that positioning of the iliac crest belt 417 to extend over the upper portion of the iliac on a given side of the person 302 (whether it be the left side or right side) serves to hold that given side of the pelvis of the person 302 down toward the seat 315 without applying a substantial lateral-to-medial force to the pelvis of the person 302. It should be further understood that application of a substantial lateral-to-medial force to the pelvis of the person 302 by the iliac crest belt 417 could compromise the work of the lumbar belt 355 in releasing contractures in the thoracolumbar spinal region of the person 302.

FIGS. 49 through 63 also show the anterior thoracic driver assembly 401 positioned and oriented so that the anterior thoracic driver 411 engages and applies an anterior-to-posterior force to the left, anterior thoracic cage of the person 302. Also, the primary thoracic driver assembly 361 is positioned and oriented so that the primary thoracic driver 371 engages and applies a substantially right-to-left force to the right, upper thoracic cage of the person 302. In the example of FIGS. 49 through 63, the anterior thoracic driver 411 is formed to curve around a portion of the left side of the thoracic cage of the person 302 so as to apply a left-to-right force component to the left side of the thoracic cage of the person 302. The left-to-right force component applied by the anterior thoracic driver 411 and the right-to-left force applied by the primary thoracic driver 371 oppose each other to straighten the scoliotic spinal configuration of the person 302 and release associated spinal contractures. Also, it should be noted that in the example of FIGS. 49 through 63, the positions, orientations, and shapes of the primary thoracic driver 371 and the anterior thoracic driver 411 impart a counterclockwise (right-to-left) rotational force component to the thoracic region of the person 302 relative to the transverse plane of the person 302.

FIGS. 49 through 63 also show the lumbar derotator driver assembly 385 positioned and oriented so that the lumbar derotator driver 395 engages and applies a posterior-to-anterior force to the left side of the lumbar spinal region of the person 302. In this manner, the lumbar derotator driver 395 causes derotation of the lumbar spinal region of the person 302 in a clockwise (left-to-right) direction relative to the transverse plane of the person 302. The posterior-to-anterior force applied to the lumbar spinal region of the person 302 by the lumbar derotator driver 395 is opposed by a combination of the seat belt 413, the iliac crest belt 417, the sternal belt 347, and the anterior thoracic driver 411. In this manner, the posterior-to-anterior force applied to the lumbar spinal region of the person 302 by the lumbar derotator driver 395 causes reversal of a scoliotic rotation of the lumbar spinal region of the person 302 so as to release spinal contractures associated with the scoliotic rotation of the lumbar spinal region of the person 302.

It should be noted that in the examples of FIGS. 49 through 63, the scoliotic condition of the person 302 does not require use of the proximal thoracic driver assembly 373 and associated proximal thoracic driver 383. This can be in part due to the position and orientation of the anterior thoracic driver assembly 401 and/or the shape of the anterior thoracic driver 411. The absence of the proximal thoracic driver assembly 373 in the examples of FIGS. 49 through 63 demonstrates an example of how the SFT 300 can be arranged in many different configurations to apply forces to the person 302 as needed to release spinal contractures associated with essentially any scoliotic configuration of the person 302.

In some embodiments, once the person 302 is fitted within the SFT 300 in the upright position, the SFT 300 can be reclined in a backward direction so that the kickstand assembly 421 rests on the floor. More specifically, the SFT 300 can be rotated backward about the fulcrum provided by the pivot assembly 445 until the kickstand assembly 421 contacts the floor. It should be understood and appreciated that the lengths of the support bars 447 and 449 of the pivot assembly 445 and the lengths of the support bars 423 and 425 of the kickstand assembly 421 can be configured as needed to provide for reclining of the SFT 300 to essentially any angle of recline as measured between a back plane of the SFT 300 and the floor, where the back plane of the SFT 300 corresponds to a plane coincident with the back of the chair structure 301. In some embodiments, the support bars 447 and 449 of the pivot assembly 445 can be configured to have substantially equal length and the support bars 423 and 425 of the kickstand assembly 421 can be configured to have substantially equal length so that the SFT 300 has essentially zero transverse angle relative to the floor when in the reclined position, where the transverse angle is measured between an axis of the back bar 309 and the floor. However, in some embodiments, the support bars 447 and 449 of the pivot assembly 445 can be configured to have different lengths and the support bars 423 and 425 of the kickstand assembly 421 can be correspondingly configured to have different lengths so that the SFT 300 has a prescribed transverse angle when in the reclined position.

FIGS. 64 through 70 show the person 302 fitted within the SFT 300 with the SFT 300 in the reclined position, in accordance with some embodiments of the present invention. The person 300 is first fitted in the SFT 300 in the upright position. Then, the SFT 300 is reclined backward to the reclined position. Then, with the SFT 300 in the reclined position, fine adjustments can be made to the forces applied by any one or more of the lumbar derotator driver 395, the primary thoracic driver 371, the proximal thoracic driver 369, the anterior thoracic driver 411, the seat belt 413, the iliac crest belt 417, the sternal belt 347, and the lumbar belt 355. With the SFT 300 in the reclined position, the force of gravity serves to pull the person 302 into the lumbar derotator driver 395, which serves to multiply the force applied by the lumbar derotator driver 395 to the lumbar spinal region of the person 302.

Figure 64:
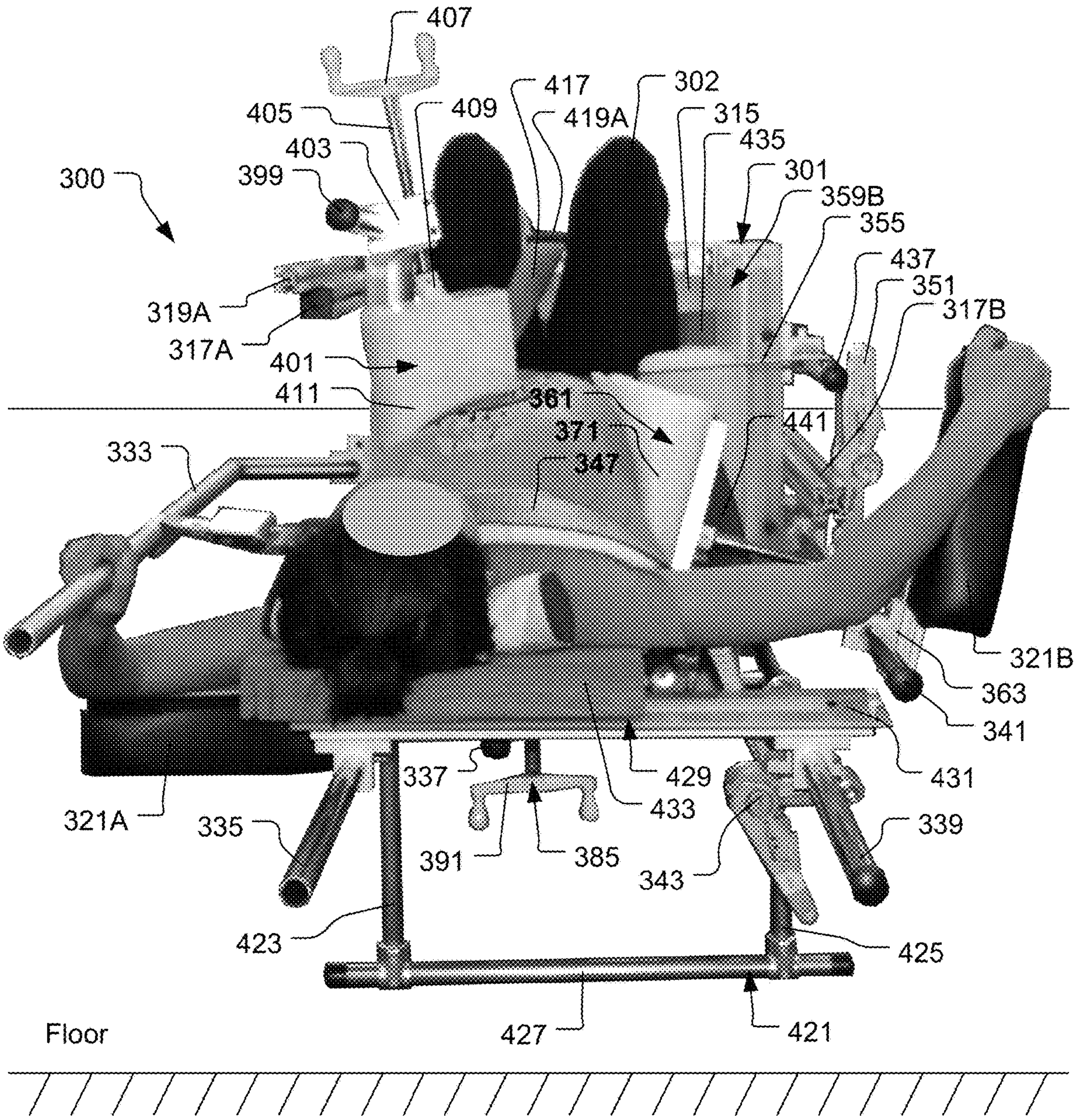
FIG. 64 shows the person fitted within the SFT, with the SFT in the reclined position, from a point of view looking toward the top of the SFT, in accordance with some embodiments of the present invention.
Figure 65:
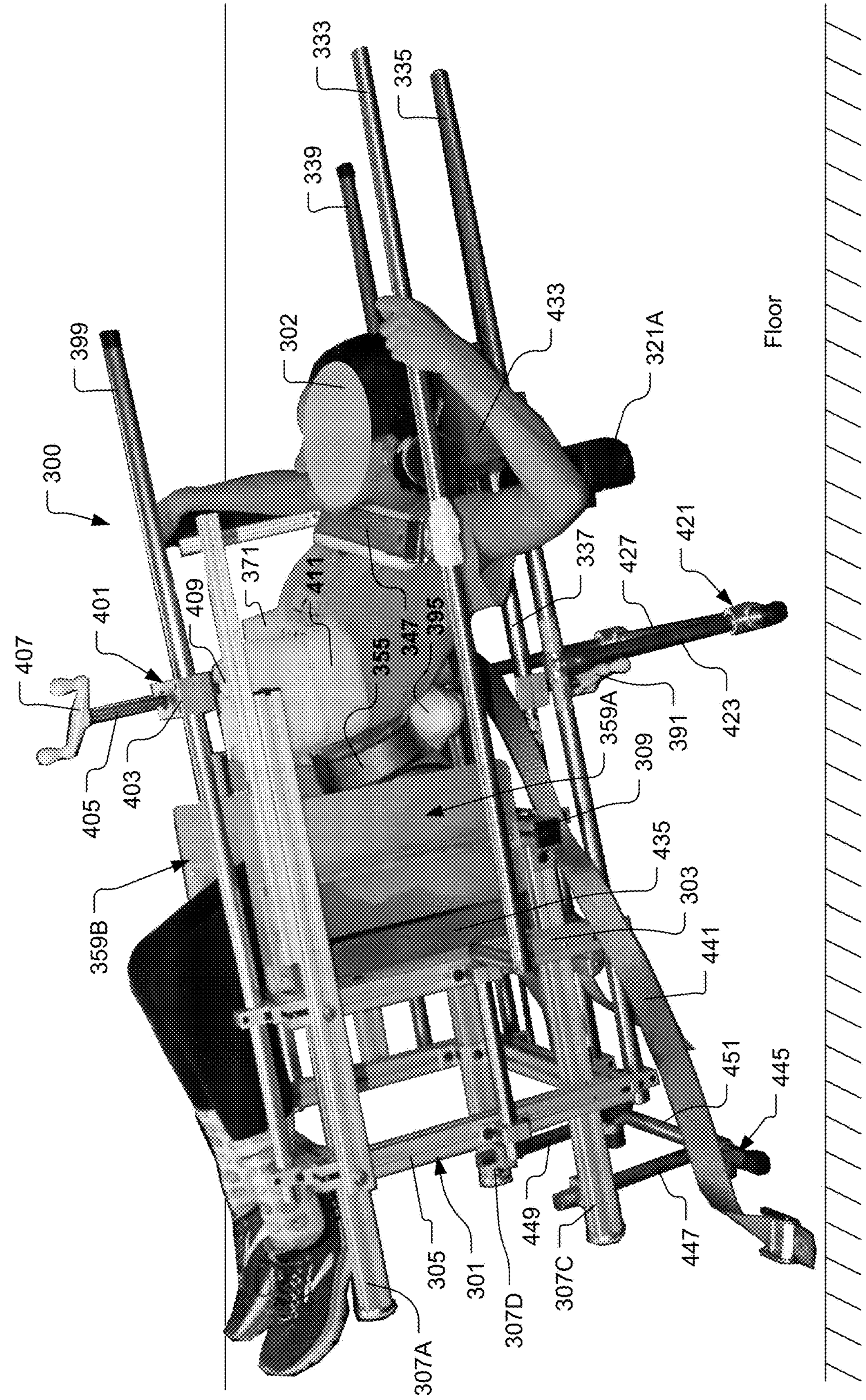
FIG. 65 shows the person fitted within the SFT, with the SFT in the reclined position, from a point of view looking toward the left side of the SFT, in accordance with some embodiments of the present invention.
Figure 66:
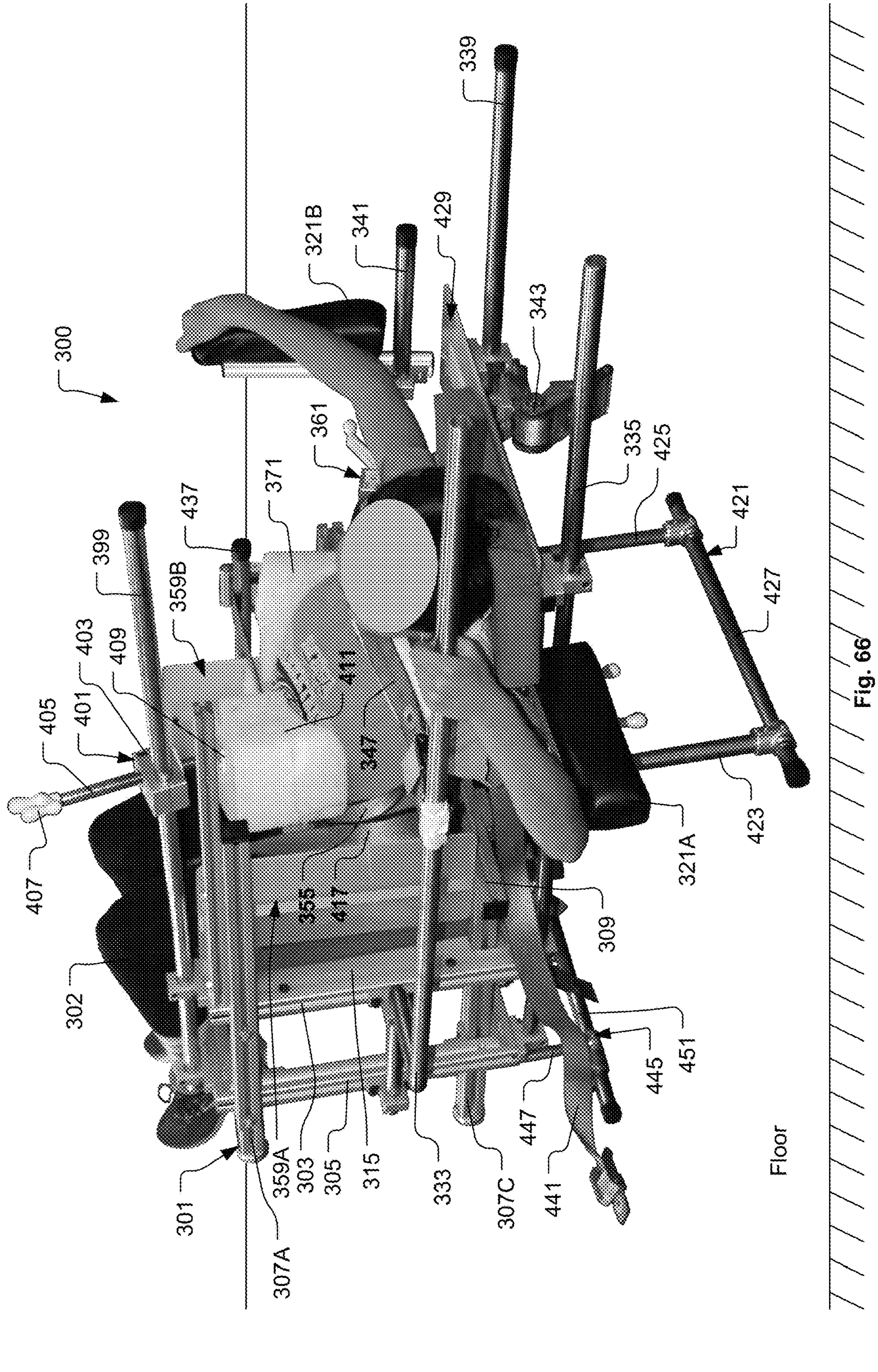
FIG. 66 shows the person fitted within the SFT, with the SFT in the reclined position, from a point of view looking toward the top, left side of the SFT, in accordance with some embodiments of the present invention.
Figure 67:
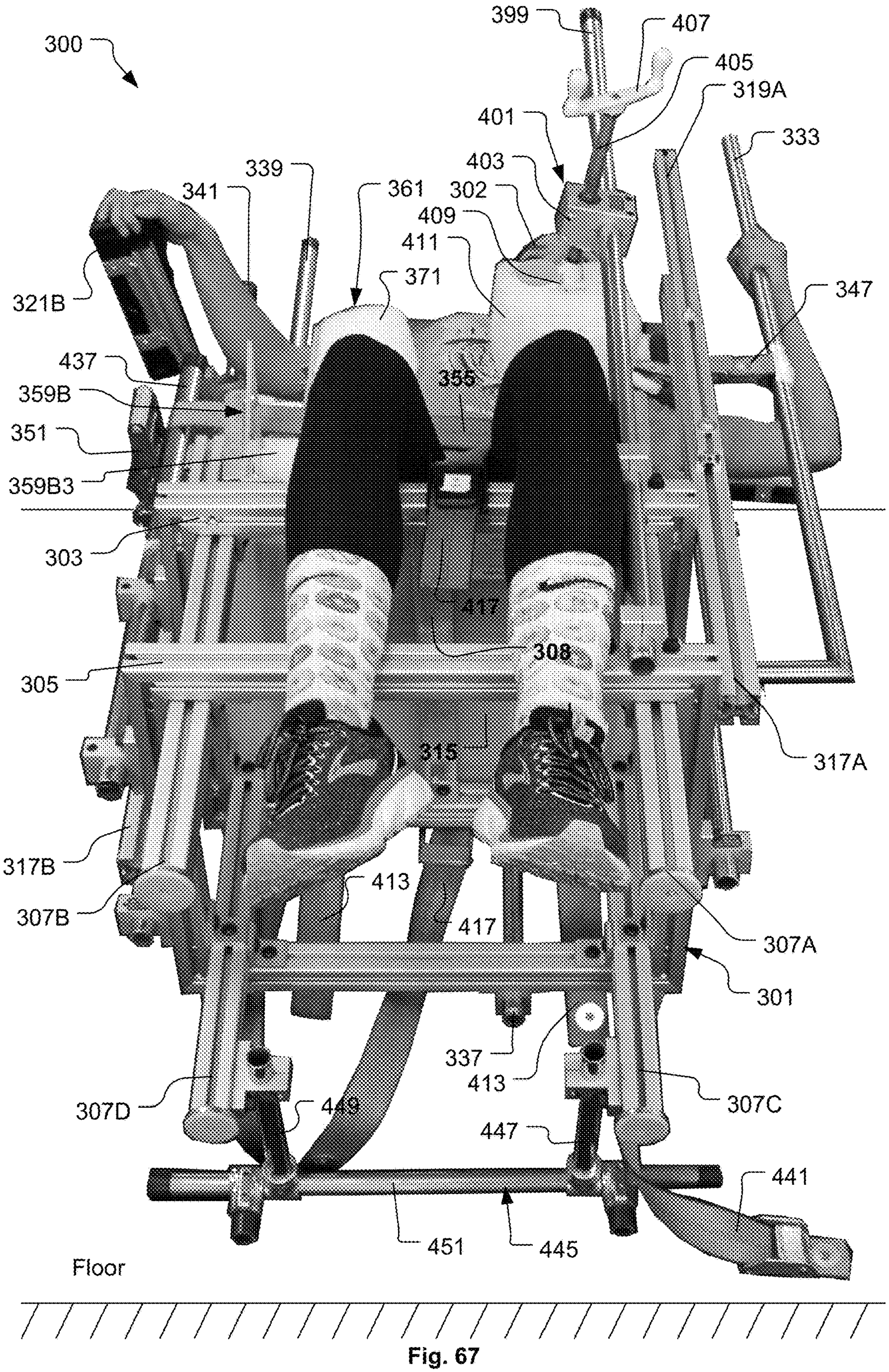
FIG. 67 shows the person fitted within the SFT, with the SFT in the reclined position, from a point of view looking toward the bottom of the SFT, in accordance with some embodiments of the present invention.
Figure 68:
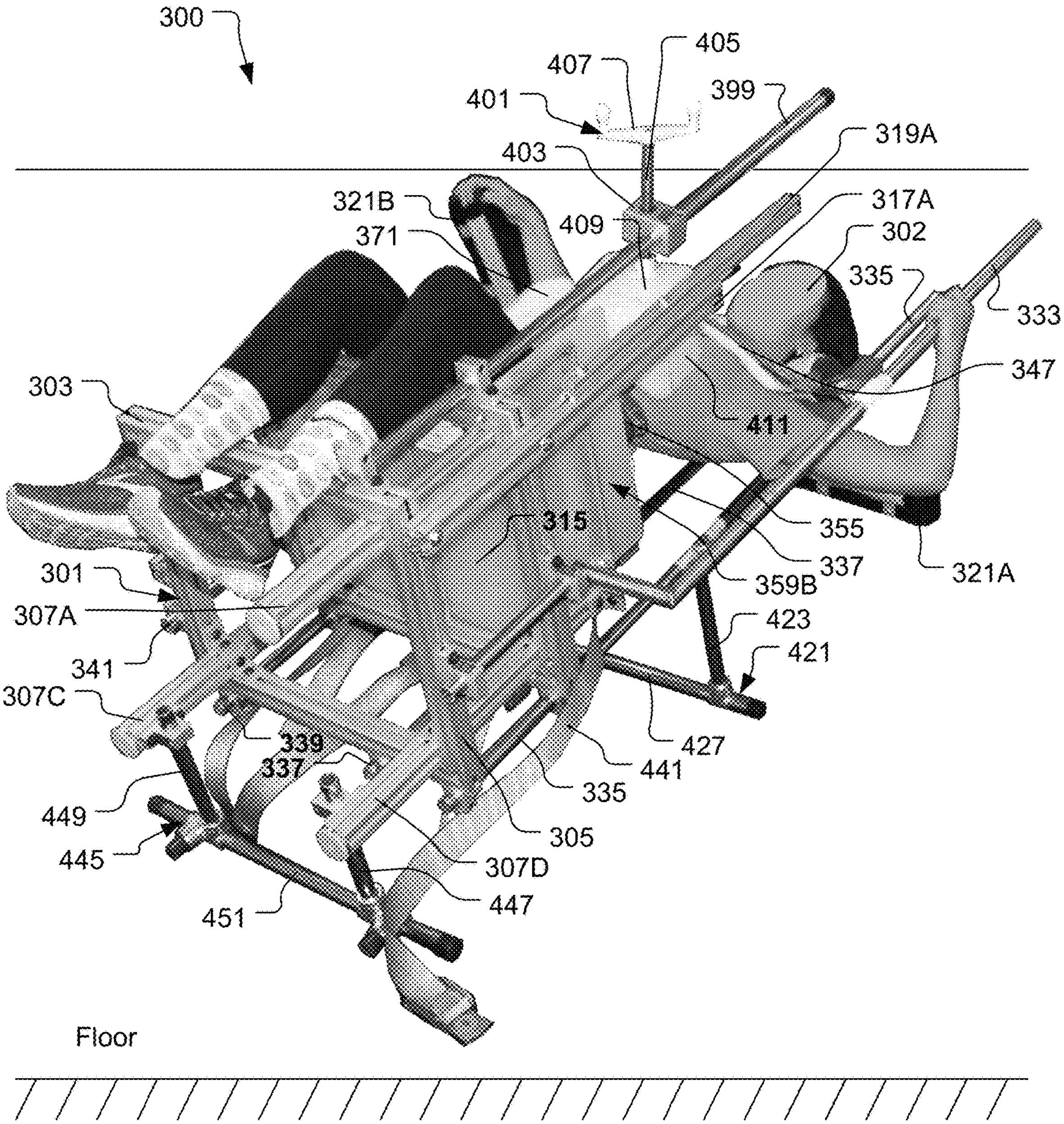
FIG. 68 shows the person fitted within the SFT, with the SFT in the reclined position, from a point of view looking toward the bottom, left side of the SFT, in accordance with some embodiments of the present invention.
Figure 69:
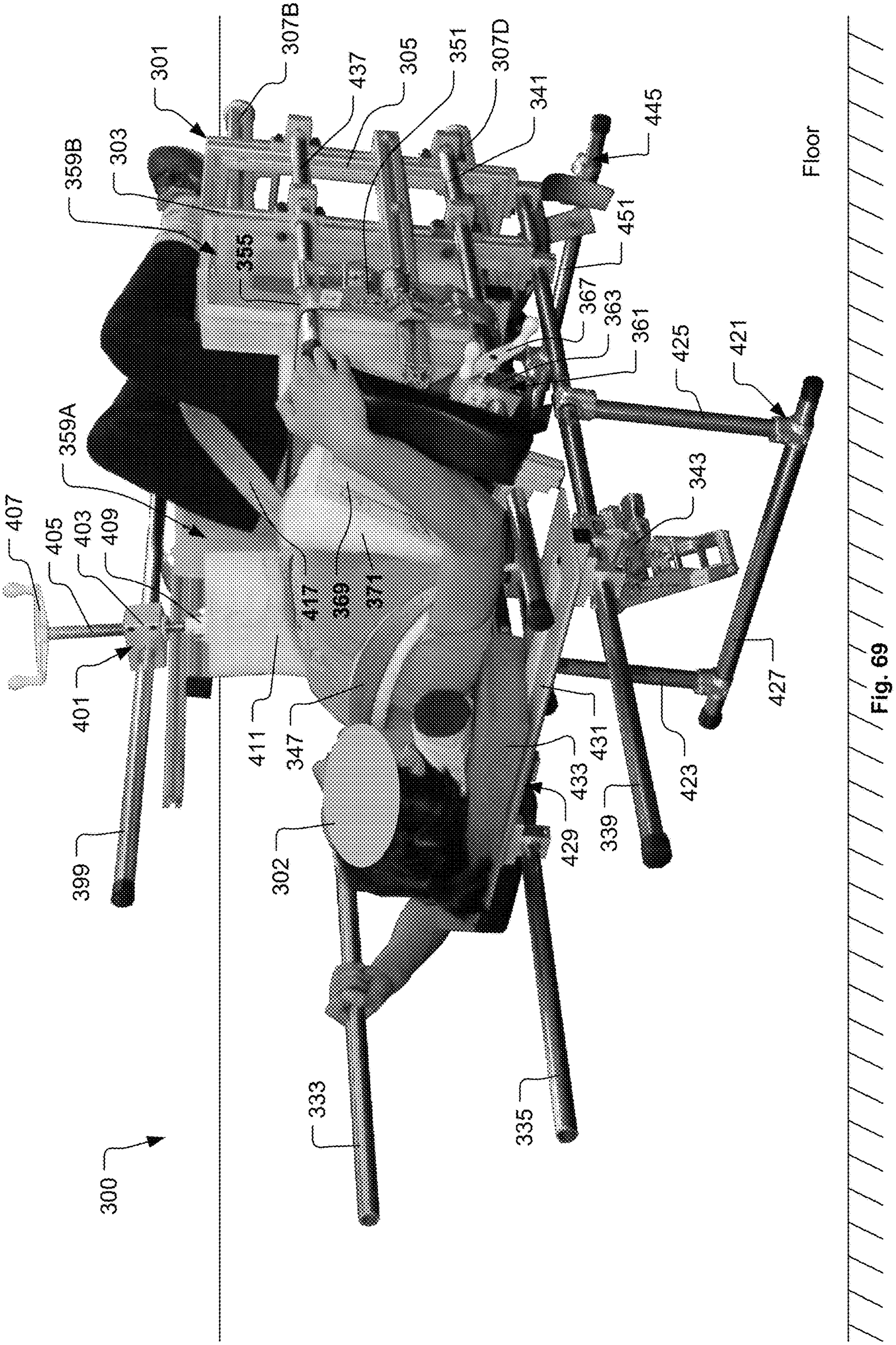
FIG. 69 shows the person fitted within the SFT, with the SFT in the reclined position, from a point of view looking toward the top, right side of the SFT, in accordance with some embodiments of the present invention.
Figure 70:
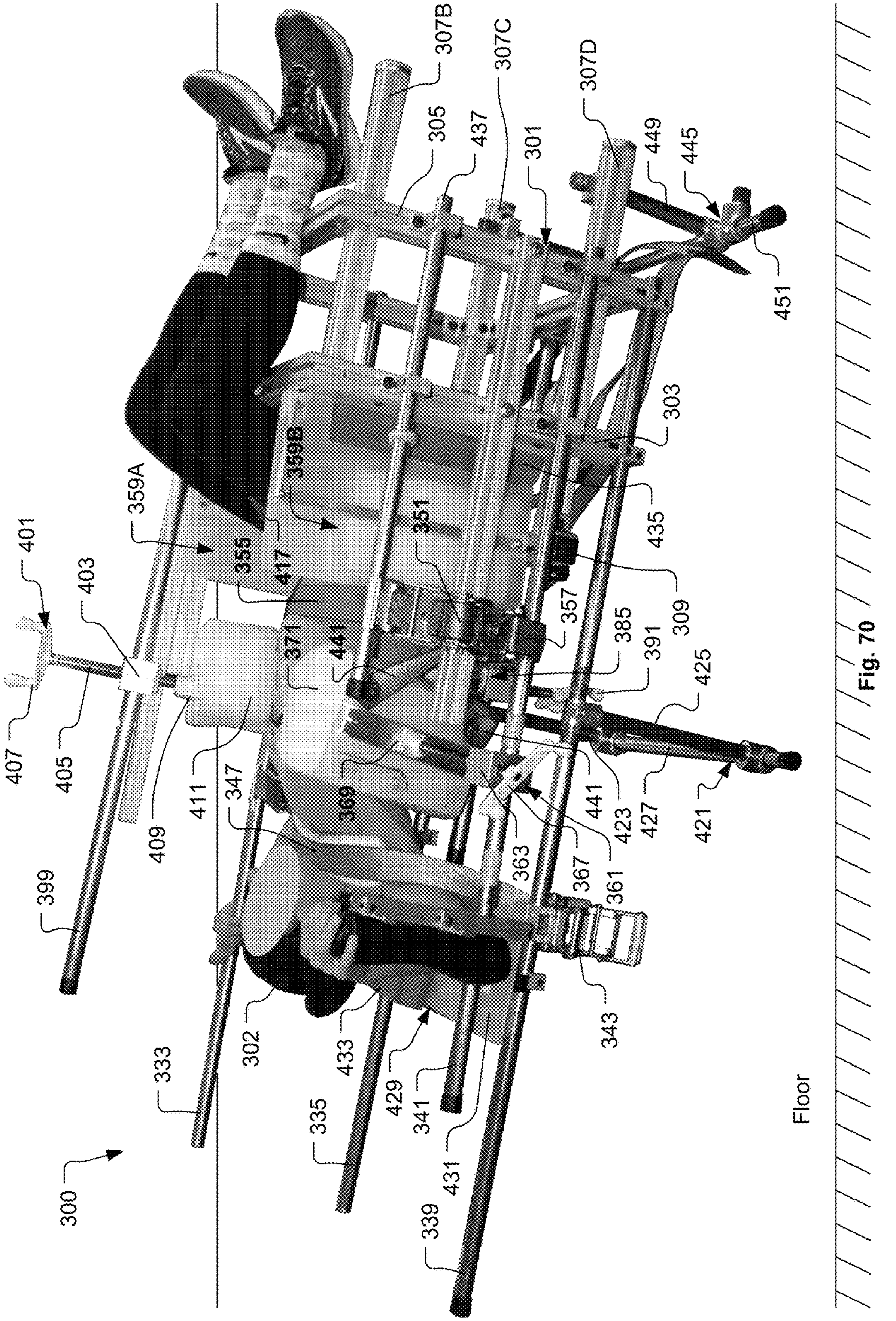
FIG. 70 shows the person fitted within the SFT, with the SFT in the reclined position, from a point of view looking toward the right side of the SFT, in accordance with some embodiments of the present invention.

FIG. 64 shows the person 302 fitted within the SFT 300, with the SFT 300 in the reclined position, from a point of view looking toward the top of the SFT 300, in accordance with some embodiments of the present invention. FIG. 65 shows the person 302 fitted within the SFT 300, with the SFT 300 in the reclined position, from a point of view looking toward the left side of the SFT 300, in accordance with some embodiments of the present invention. FIG. 66 shows the person 302 fitted within the SFT 300, with the SFT 300 in the reclined position, from a point of view looking toward the top, left side of the SFT 300, in accordance with some embodiments of the present invention. FIG. 67 shows the person 302 fitted within the SFT 300, with the SFT 300 in the reclined position, from a point of view looking toward the bottom of the SFT 300, in accordance with some embodiments of the present invention. FIG. 68 shows the person 302 fitted within the SFT 300, with the SFT 300 in the reclined position, from a point of view looking toward the bottom, left side of the SFT 300, in accordance with some embodiments of the present invention. FIG. 69 shows the person 302 fitted within the SFT 300, with the SFT 300 in the reclined position, from a point of view looking toward the top, right side of the SFT 300, in accordance with some embodiments of the present invention. FIG. 70 shows the person 302 fitted within the SFT 300, with the SFT 300 in the reclined position, from a point of view looking toward the right side of the SFT 300, in accordance with some embodiments of the present invention.

Figure 71A:
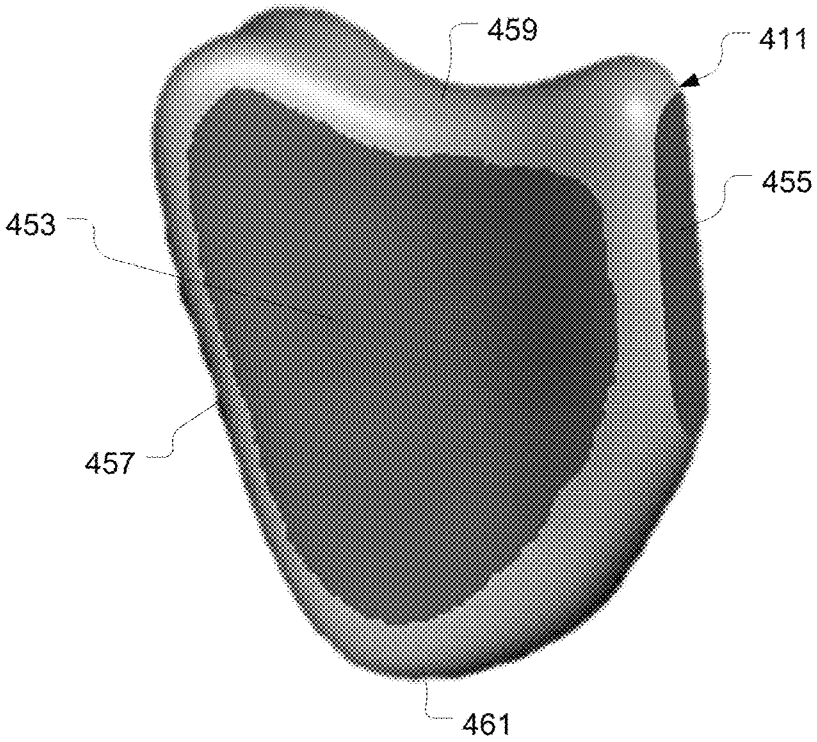
FIG. 71A shows a perspective view of the anterior thoracic driver from a point of view looking toward a contact surface of the anterior thoracic driver, in accordance with some embodiments of the present invention.

FIG. 71A shows a perspective view of the anterior thoracic driver 411 from a point of view looking toward a contact surface 453 of the anterior thoracic driver 411, in accordance with some embodiments of the present invention. The anterior thoracic driver 411 has an inner surface region 455, an outer surface region 457, a top surface region 459, and a bottom surface region 461. The inner surface region 455 is to be positioned closer to the sacral line of the person 302 relative to the outer surface region 457. Also, the top surface region 459 is to be positioned superior to the bottom surface region 461.

Figure 71B:
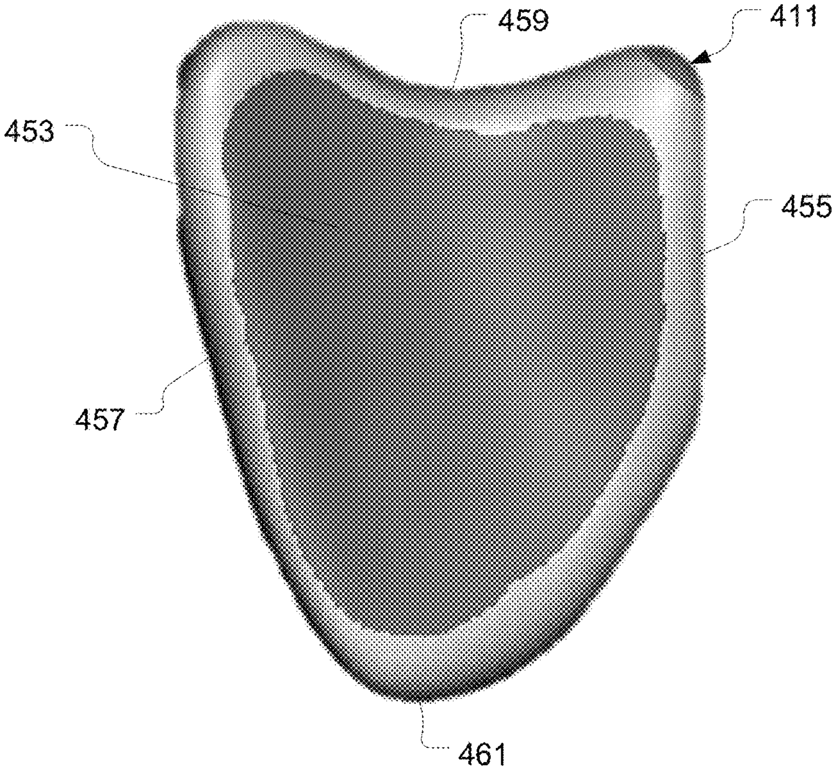
FIG. 71B shows another view of the anterior thoracic driver from a point of view looking more directly toward the contact surface of the anterior thoracic driver, in accordance with some embodiments of the present invention.
Figure 71C:
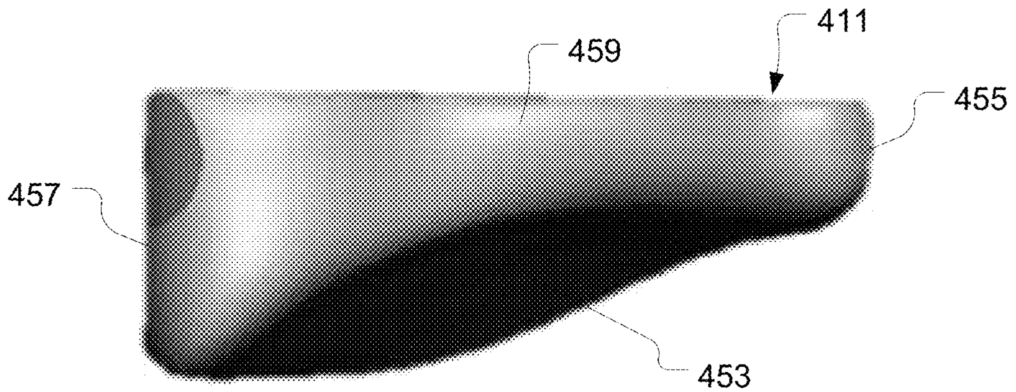
FIG. 71C shows another view of the anterior thoracic driver from a point of view looking downward toward the top surface region of the anterior thoracic driver, in accordance with some embodiments of the present invention.
Figure 71D:
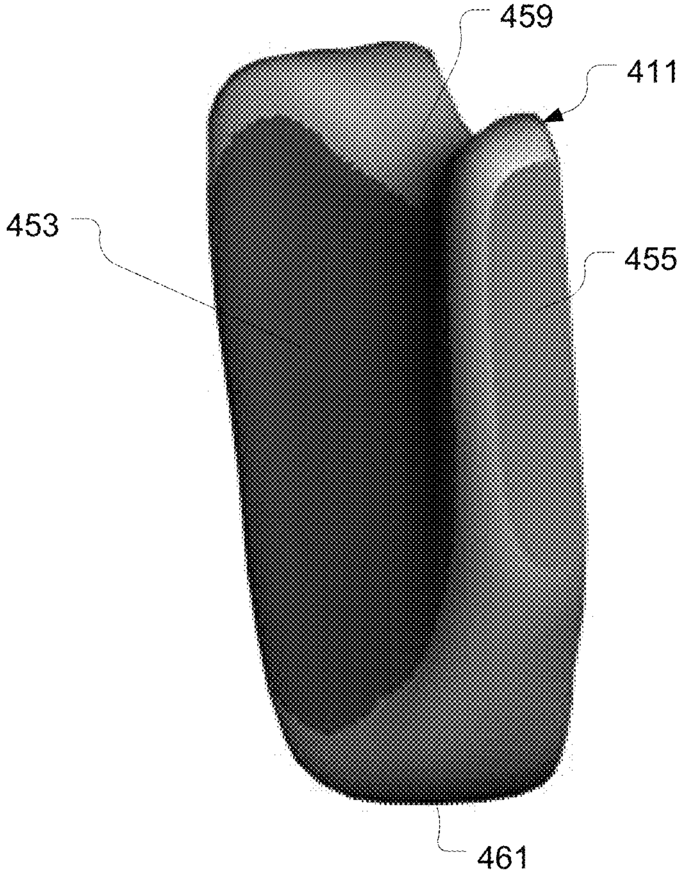
FIG. 71D shows a perspective view of the anterior thoracic driver from a point of view looking toward the inner surface region of the anterior thoracic driver, in accordance with some embodiments of the present invention.

FIG. 71B shows another view of the anterior thoracic driver 411 from a point of view looking more directly toward the contact surface 453 of the anterior thoracic driver 411, in accordance with some embodiments of the present invention. FIG. 71C shows another view of the anterior thoracic driver 411 from a point of view looking downward toward the top surface region 459 of the anterior thoracic driver 411, in accordance with some embodiments of the present invention. FIG. 71D shows a perspective view of the anterior thoracic driver 411 from a point of view looking toward the inner surface region 455 of the anterior thoracic driver 411, in accordance with some embodiments of the present invention.

The anterior thoracic driver 411 is configured and positioned to contact the anterior and lateral rib cage of the person 302. More specifically, in some embodiments, the anterior thoracic driver 411 is configured and positioned to contact the anterior and lateral rib cage of the person 302 at a level of thoracic scoliotic curve apex. The anterior thoracic driver 411 applies an anterior-to-posterior force component to the rib cage of the person 302, in opposition to the posterior-to-anterior force component(s) applied to the person 302 by any one or more of the lumbar derotator driver 395, the proximal thoracic driver 383, and the primary thoracic driver 371.

In some embodiments, the anterior thoracic driver 411 is configured to have a thinner posterior-to-anterior thickness at the inner surface region 455 and a thicker posterior-to-anterior thickness at the outer surface region 457, in combination of with a thinner posterior-to-anterior thickness at the top surface region 459 and a thicker posterior-to-anterior thickness at the bottom surface region 461, and with the contact surface 453 curved to substantially conform to a shape of a portion of the rib cage of the person 302 that is to be contacted by the contact surface 453. Also, in some embodiments, the anterior thoracic driver 411 is configured such that a lateral width of the top surface region 459 is wider than a lateral width of the bottom surface region 461.

Figure 71E:
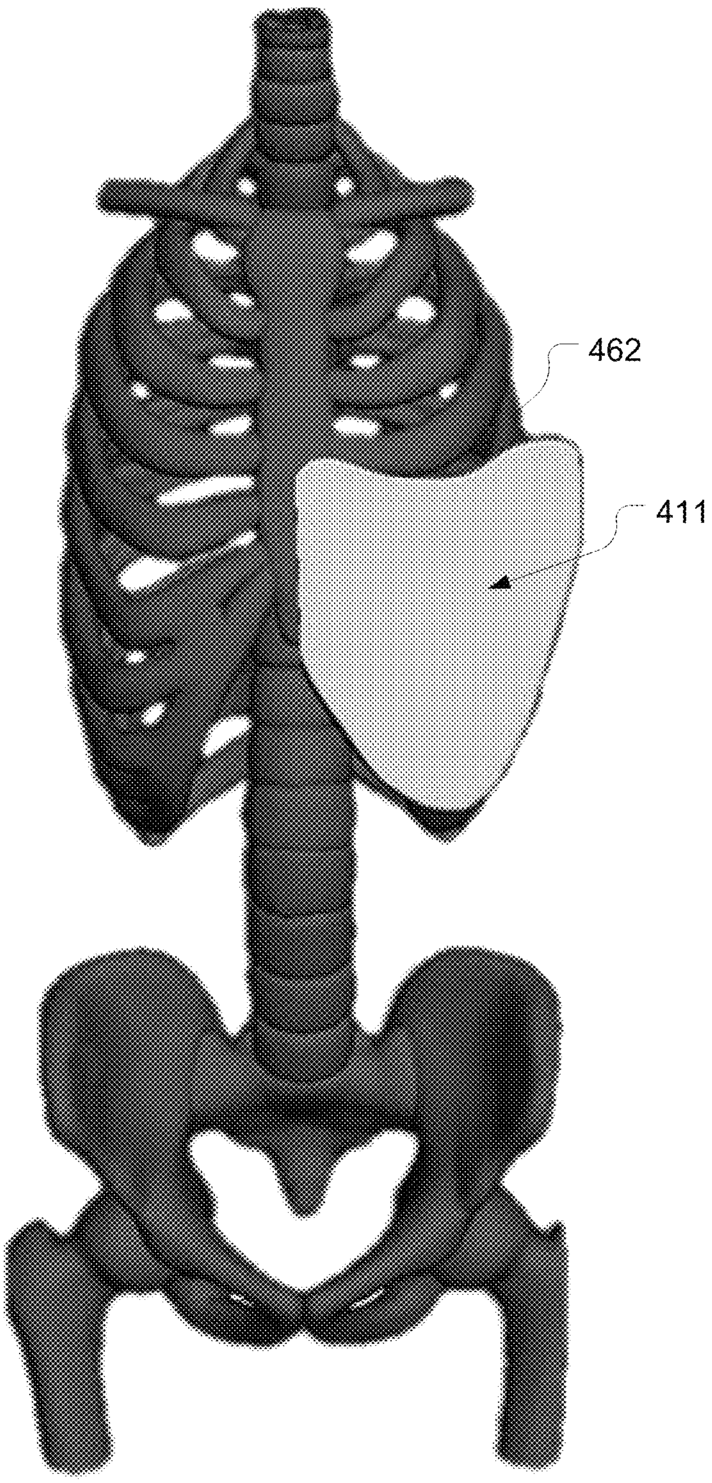
FIG. 71E shows a general position of the anterior thoracic driver relative to a rib cage of the person looking toward the front of the person, in accordance with some embodiments of the present invention.
Figure 71F:
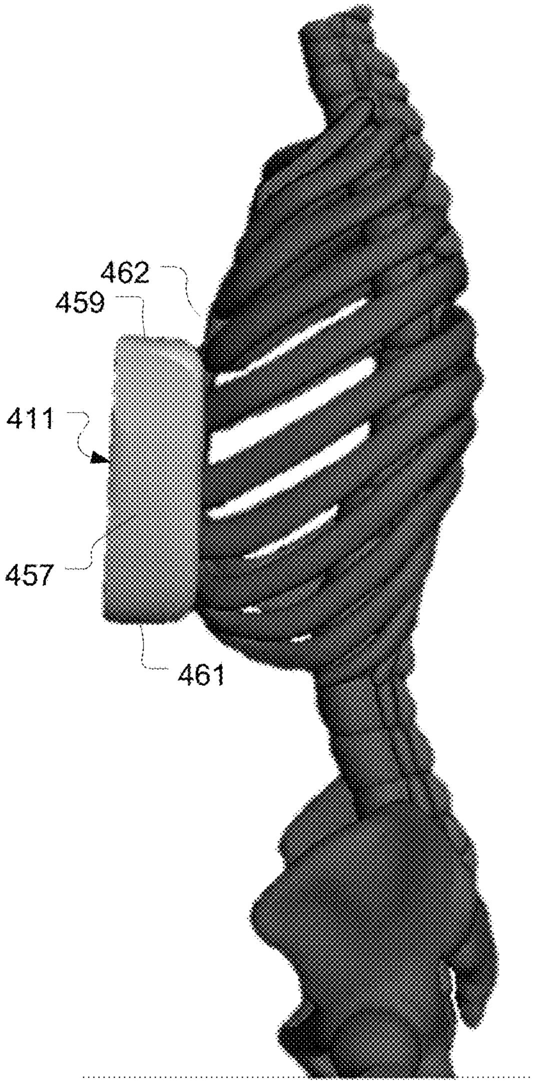
FIG. 71F shows a general position of the anterior thoracic driver relative to the rib cage of the person looking toward the left side of the person, in accordance with some embodiments of the present invention.
Figure 71G:
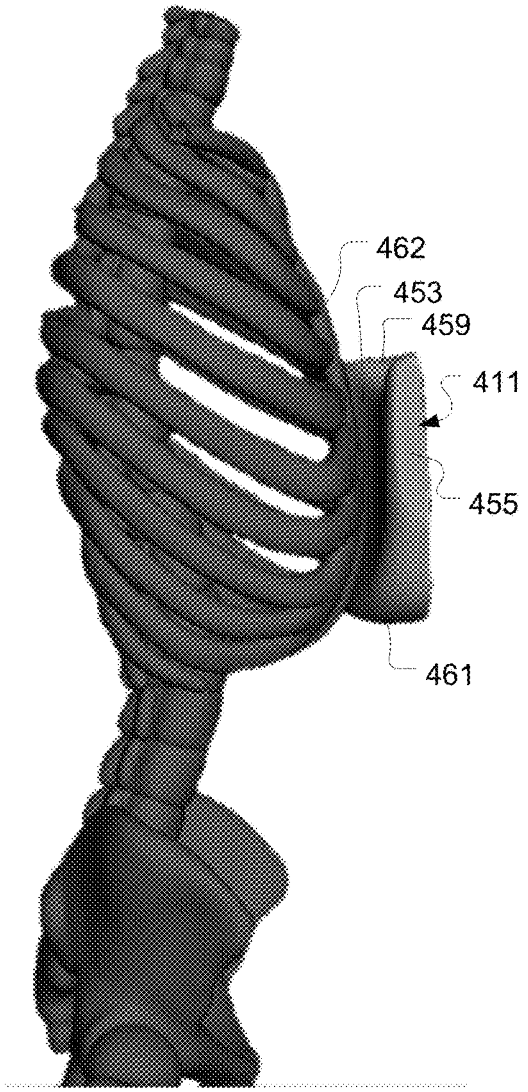
FIG. 71G shows a general position of the anterior thoracic driver relative to the rib cage of the person looking toward the right side of the person, in accordance with some embodiments of the present invention.
Figure 71H:
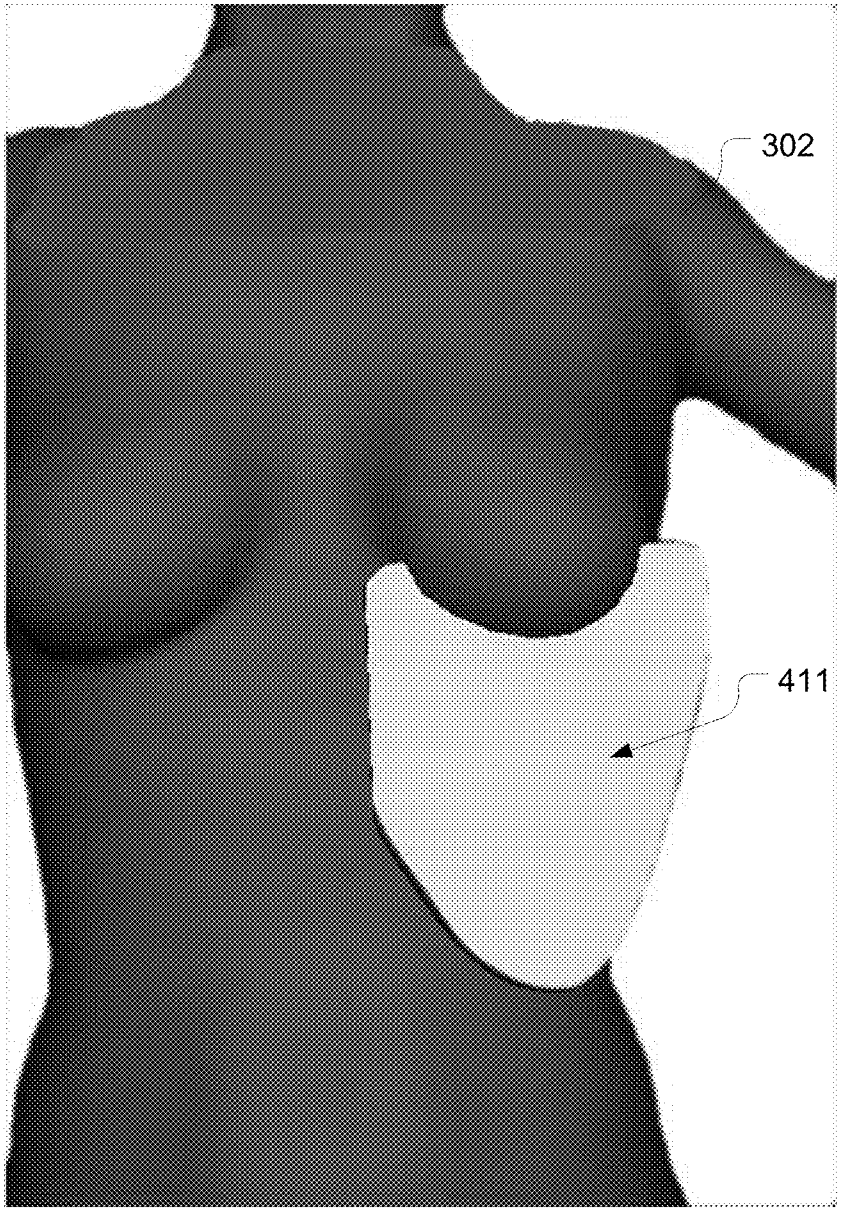
FIG. 71H shows how the breast tissue of the person needs to be moved up to expose a portion of the rib cage of the person that is to be contacted by the contact surface of the anterior thoracic driver, in accordance with some embodiments of the present invention.

FIG. 71E shows a general position of the anterior thoracic driver 411 relative to a rib cage 462 of the person 302 looking toward the front of the person 302, in accordance with some embodiments of the present invention. FIG. 71F shows a general position of the anterior thoracic driver 411 relative to the rib cage 462 of the person 302 looking toward the left side of the person 302, in accordance with some embodiments of the present invention. FIG. 71G shows a general position of the anterior thoracic driver 411 relative to the rib cage 462 of the person 302 looking toward the right side of the person 302, in accordance with some embodiments of the present invention. It should be understood that the position of the anterior thoracic driver 411 relative to the rib cage 462 of the person 302 as shown in FIGS. 71E through 71G is provided by way of example. In various embodiments, the anterior thoracic driver 411 can be positioned to contact essentially any anterior and/or anterior-lateral portion(s) of the rib cage 462 of the person 302 as needed to address a particular scoliotic configuration of the person 302. Additionally, in some embodiments, the top surface region 459 of the anterior thoracic driver 411 includes a superior-to-inferior concaved region to provide for positioning of the anterior thoracic driver 411 around breast tissue of the person 302. FIG. 71H shows how, in some embodiments, the breast tissue of the person 302 needs to be moved up to expose a portion of the rib cage 462 of the person 302 that is to be contacted by the contact surface 453 of the anterior thoracic driver 411. In such embodiments, the top surface region 459 of the anterior thoracic driver 411 is contoured to provide for cupping of the breast tissue of the person 302.

Figure 71I:
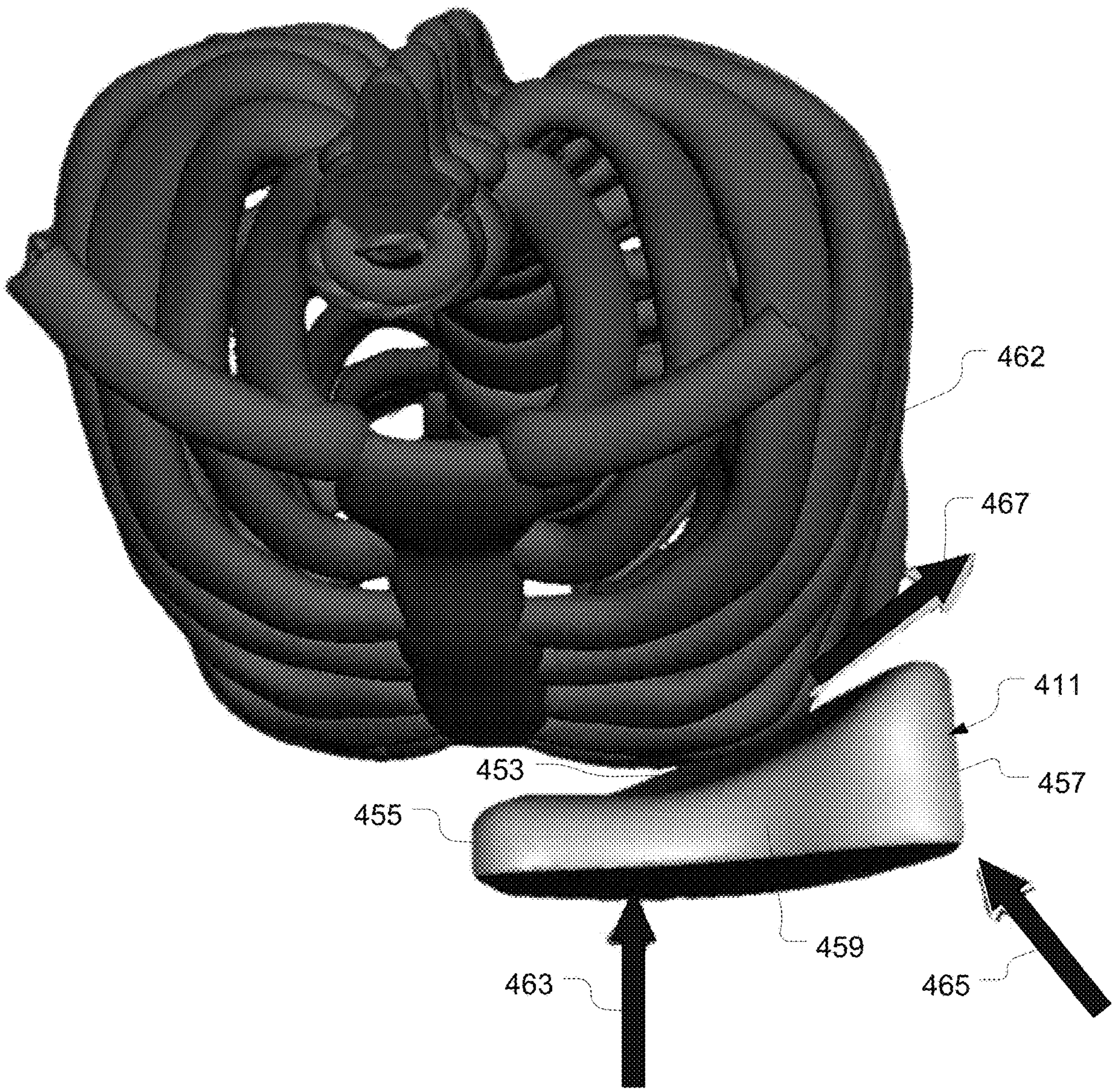
FIG. 71I shows a diagram of force components applied by the anterior thoracic driver to the rib cage of the person, in accordance with some embodiments of the present invention.

FIG. 71I shows a diagram of force components applied by the anterior thoracic driver 411 to the rib cage 462 of the person 302, in accordance with some embodiments of the present invention. The anterior thoracic driver 411 is configured and positioned to provide both an anterior-to-posterior force component 463 and a lateral-to-medial force component 465 to the rib cage 462 of the person 302. In some embodiments, the contact surface 453 of the anterior thoracic driver 411 is configured and positioned to provide for posterior-lateral escape of the rib cage 462 of the person 302, as indicated by arrow 467, in response to lateral-to-medial pressure applied to the rib cage 462 of the person 302 by the primary thoracic driver 371. More specifically, the contact surface 453 of the anterior thoracic driver 411 is contoured so that as a given level of the rib cage 462 of the person 302 shifts laterally past the anterior thoracic driver 411, the given level of the rib cage 462 of the person 302 is simultaneously pushed in the anterior-to-posterior direction. It should also be understood that application of therapeutic forces to the rib cage 462 of the person 302 by the anterior thoracic driver 411 provides for reduction of rib cage deformity and rib hump caused by the scoliotic configuration of the person 302.

The example anterior thoracic driver 411 shown in FIGS. 71A through 71H is configured for treatment of a scoliotic spinal configuration that requires contact of the left anterior portion of the rib cage 462 of the person 302 by the anterior thoracic driver 411. However, it should be understood that for other scoliotic spinal configurations, the anterior thoracic driver 411 can be configured to contact of the right anterior portion of the rib cage 462 of the person 302, as needed. Specifically, in some embodiments, the configuration of the anterior thoracic driver 411 as shown in FIGS. 71A through 71H can be laterally mirrored relative to a vertical center plane that extends through the thickness of the anterior thoracic driver 411.

Figure 72A:
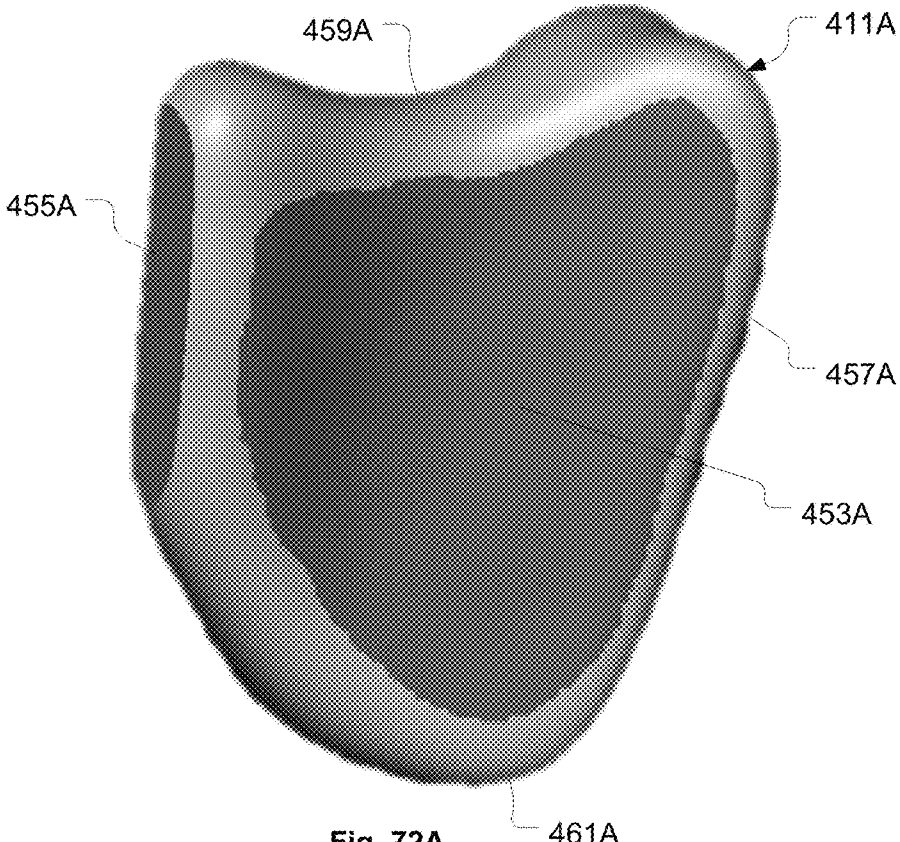
FIG. 72A shows a perspective view of an anterior thoracic driver from a point of view looking toward the contact surface, where the anterior thoracic driver has a laterally mirrored configuration relative to the anterior thoracic driver of FIG. 71A, in accordance with some embodiments of the present invention.
Figure 72B:
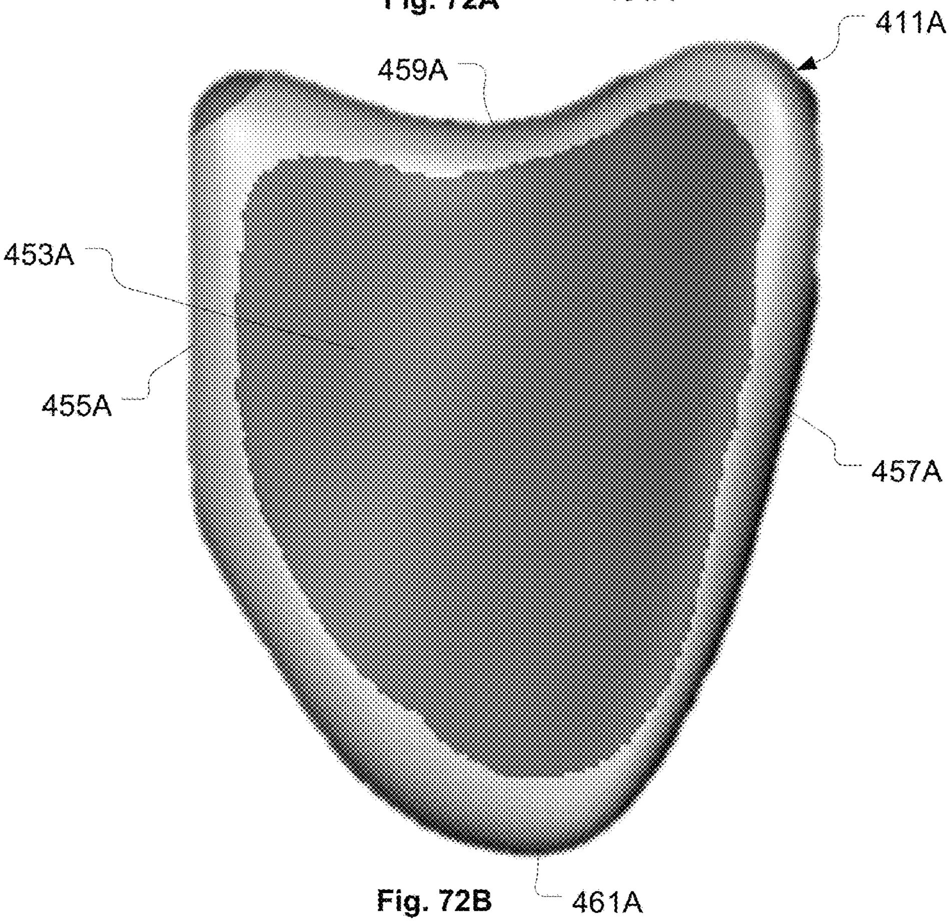
FIG. 72B shows another view of the anterior thoracic driver of FIG. 72A from a point of view looking directly toward the contact surface of the anterior thoracic driver, in accordance with some embodiments of the present invention.
Figure 72C:
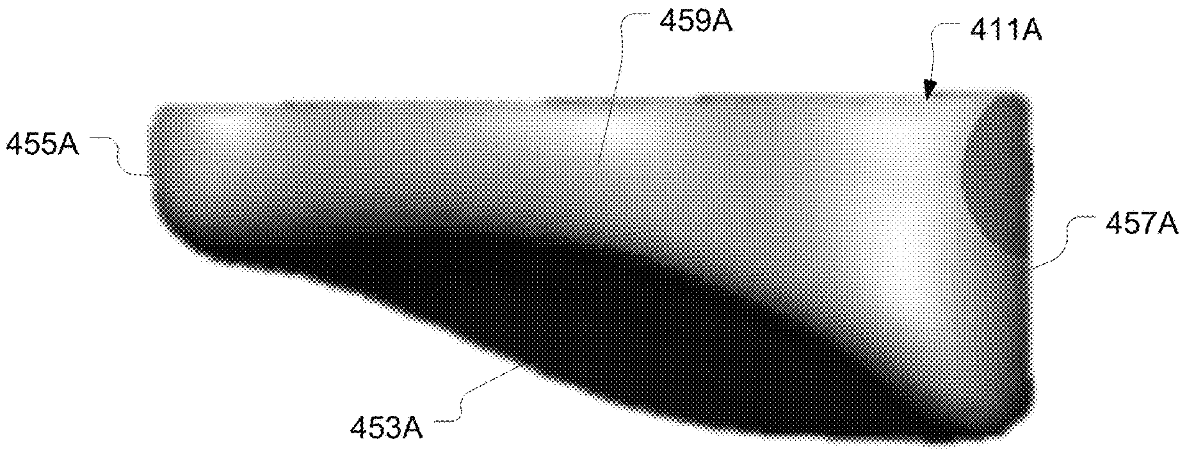
FIG. 72C shows another view of the anterior thoracic driver of FIG. 72A from a point of view looking downward toward the top surface region of the anterior thoracic driver, in accordance with some embodiments of the present invention.
Figure 72D:
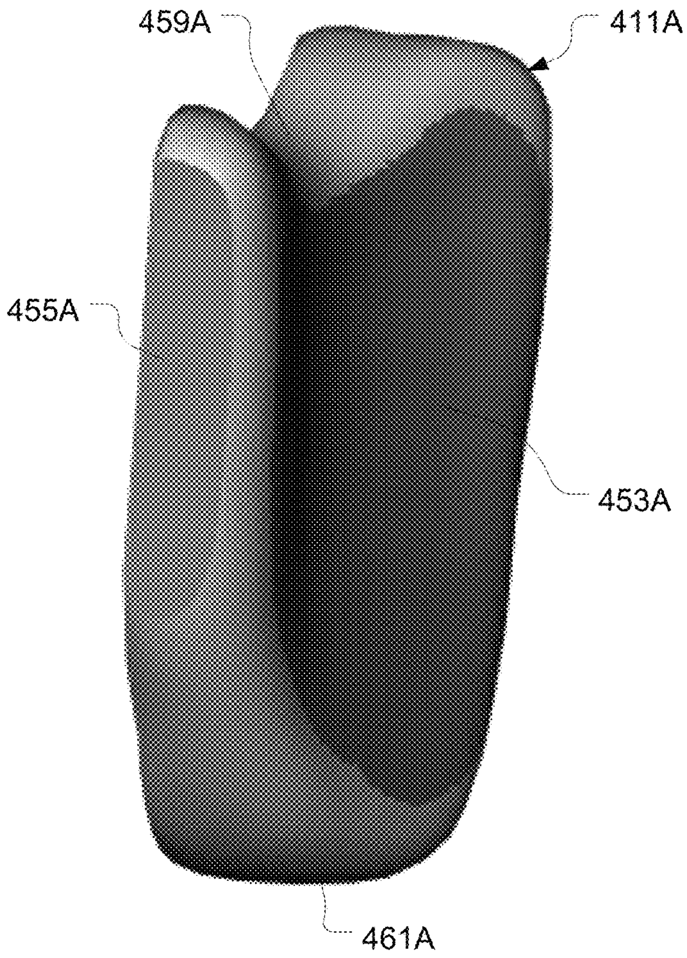
FIG. 72D shows a perspective view of the anterior thoracic driver of FIG. 72A from a point of view looking toward the inner surface region of the anterior thoracic driver, in accordance with some embodiments of the present invention.
Figure 72E:
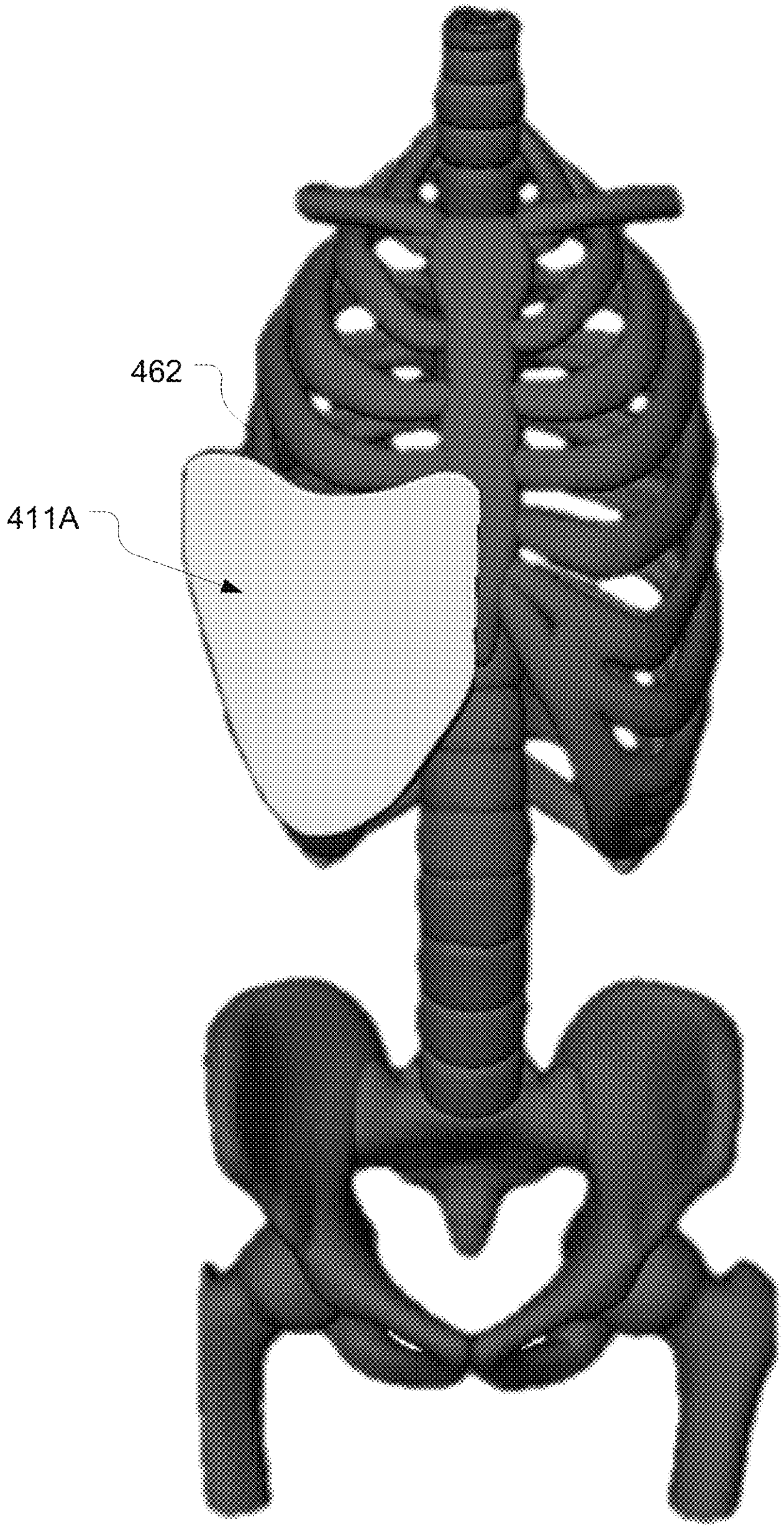
FIG. 72E shows a general position of the anterior thoracic driver of FIG. 72A relative to the rib cage of the person looking toward the front of the person, in accordance with some embodiments of the present invention.
Figure 72F:
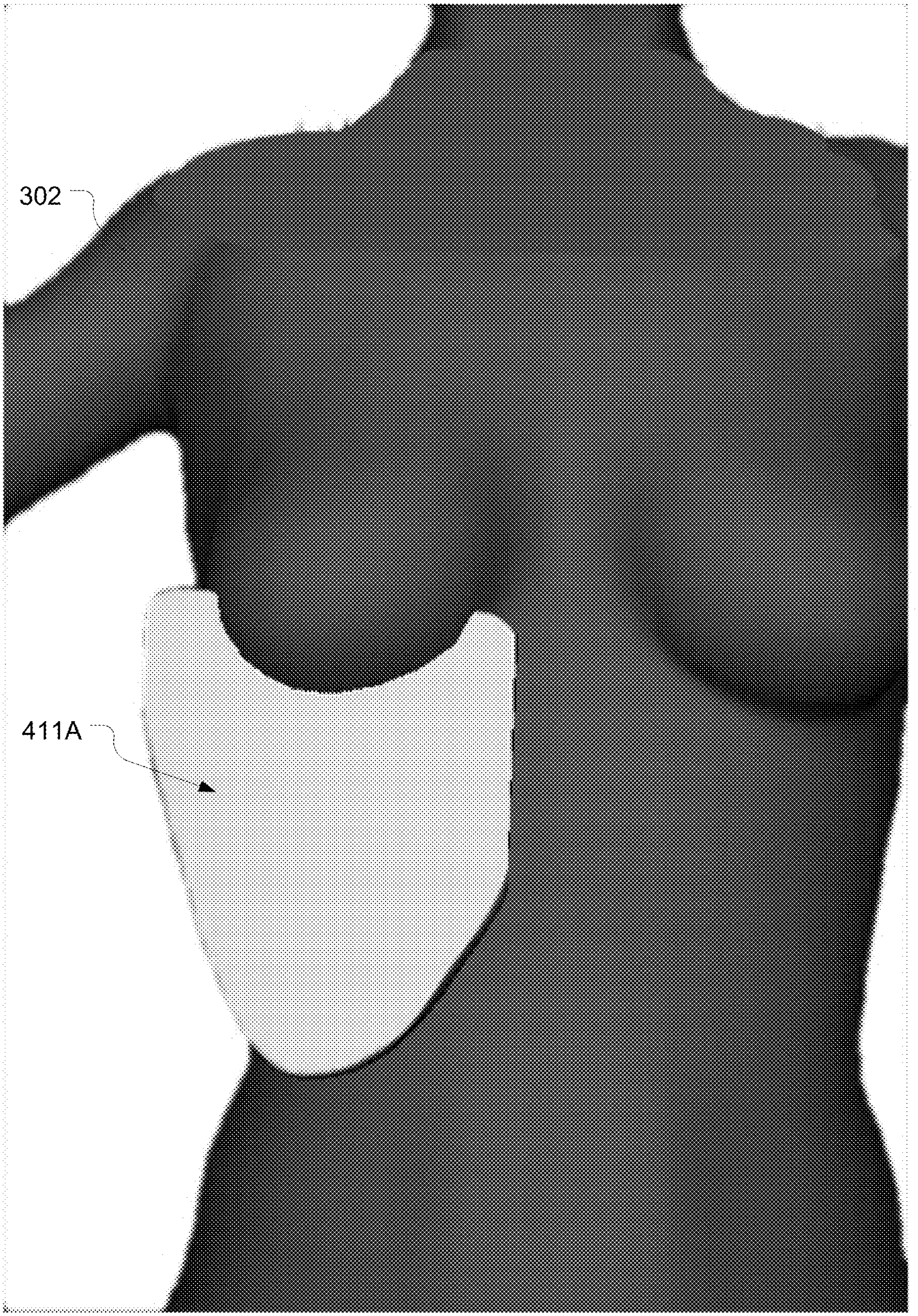
FIG. 72F shows how, in some embodiments, the breast tissue of the person needs to be moved up to expose a portion of the rib cage of the person that is to be contacted by the contact surface of the anterior thoracic driver of FIG. 72A, in accordance with some embodiments of the present invention.

FIG. 72A shows a perspective view of an anterior thoracic driver 411A from a point of view looking toward the contact surface 453, where the anterior thoracic driver 411A has a laterally mirrored configuration relative to the anterior thoracic driver 411, in accordance with some embodiments of the present invention. FIG. 72B shows another view of the anterior thoracic driver 411A from a point of view looking directly toward the contact surface 453 of the anterior thoracic driver 411A, where the anterior thoracic driver 411A has the laterally mirrored configuration relative to the anterior thoracic driver 411, in accordance with some embodiments of the present invention. FIG. 72C shows another view of the anterior thoracic driver 411A from a point of view looking downward toward the top surface region 459, where the anterior thoracic driver 411A has the laterally mirrored configuration relative to the anterior thoracic driver 411, in accordance with some embodiments of the present invention. FIG. 72D shows a perspective view of the anterior thoracic driver 411A from a point of view looking toward the inner surface region 455 of the anterior thoracic driver 411, where the anterior thoracic driver 411A has the laterally mirrored configuration relative to the anterior thoracic driver 411, in accordance with some embodiments of the present invention. FIG. 72E shows a general position of the anterior thoracic driver 411A relative to the rib cage 462 of the person 302 looking toward the front of the person 302, in accordance with some embodiments of the present invention. FIG. 72F shows how, in some embodiments, the breast tissue of the person 302 needs to be moved up to expose a portion of the rib cage 462 of the person 302 that is to be contacted by the contact surface 453 of the anterior thoracic driver 411A.

Figure 72G:
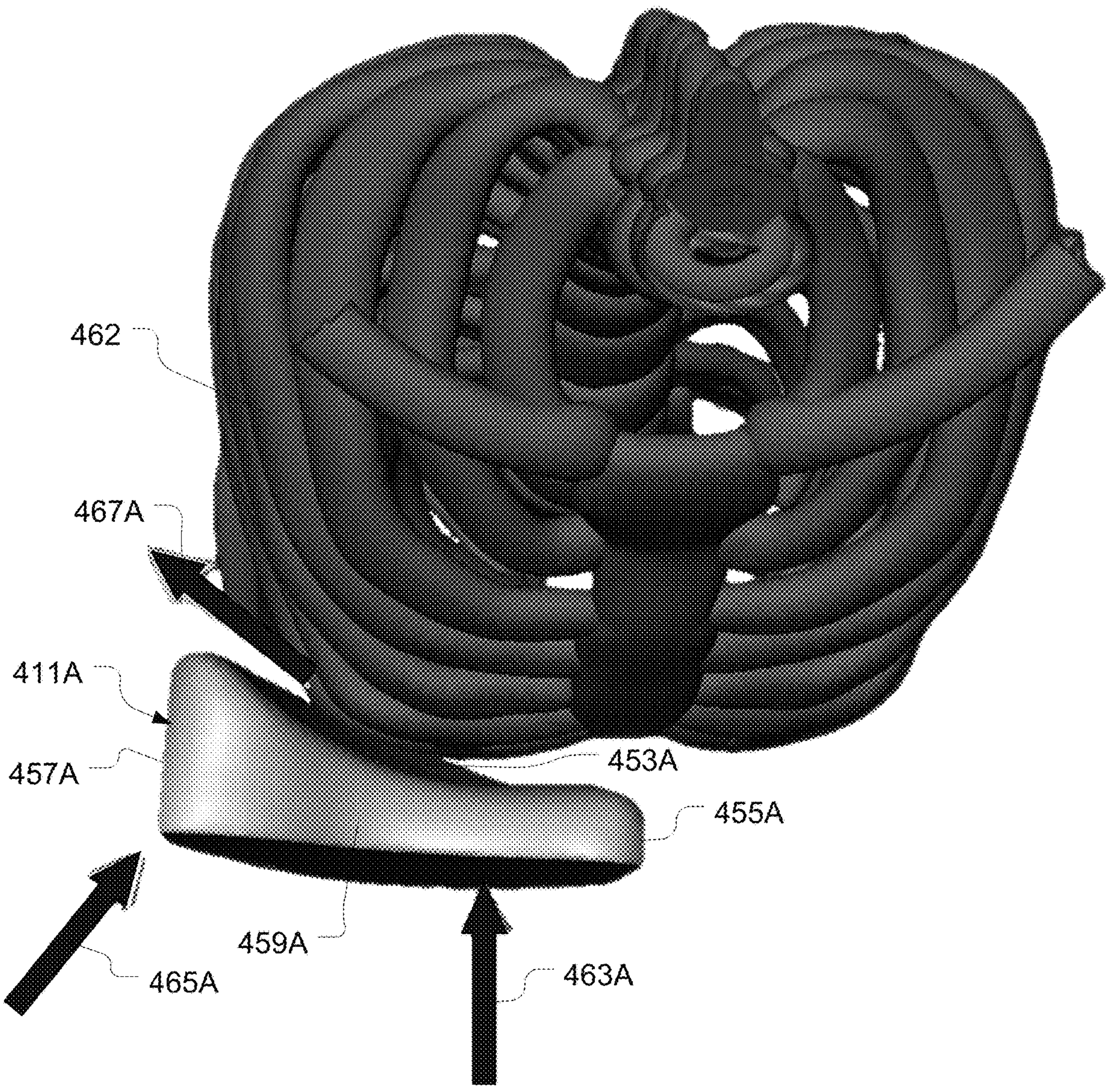
FIG. 72G shows a diagram of force components applied by the anterior thoracic driver of FIG. 72A to the rib cage of the person, in accordance with some embodiments of the present invention.

FIG. 72G shows a diagram of force components applied by the anterior thoracic driver 411A to the rib cage 462 of the person 302, in accordance with some embodiments of the present invention. The anterior thoracic driver 411A is configured and positioned to provide both an anterior-to-posterior force component 463A and a lateral-to-medial force component 465A to the rib cage 462 of the person 302. In some embodiments, the contact surface 453A of the anterior thoracic driver 411A is configured and positioned to provide for posterior-lateral escape of the rib cage 462 of the person 302, as indicated by arrow 467A, in response to lateral-to-medial pressure applied to the rib cage 462 of the person 302 by the primary thoracic driver 371A. More specifically, the contact surface 453A of the anterior thoracic driver 411A is contoured so that as a given level of the rib cage 462 of the person 302 shifts laterally past the anterior thoracic driver 411A, the given level of the rib cage 462 of the person 302 is simultaneously pushed in the anterior-to-posterior direction. It should also be understood that application of therapeutic forces to the rib cage 462 of the person 302 by the anterior thoracic driver 411A provides for reduction of rib cage deformity and rib hump caused by the scoliotic configuration of the person 302.

Figure 73A:
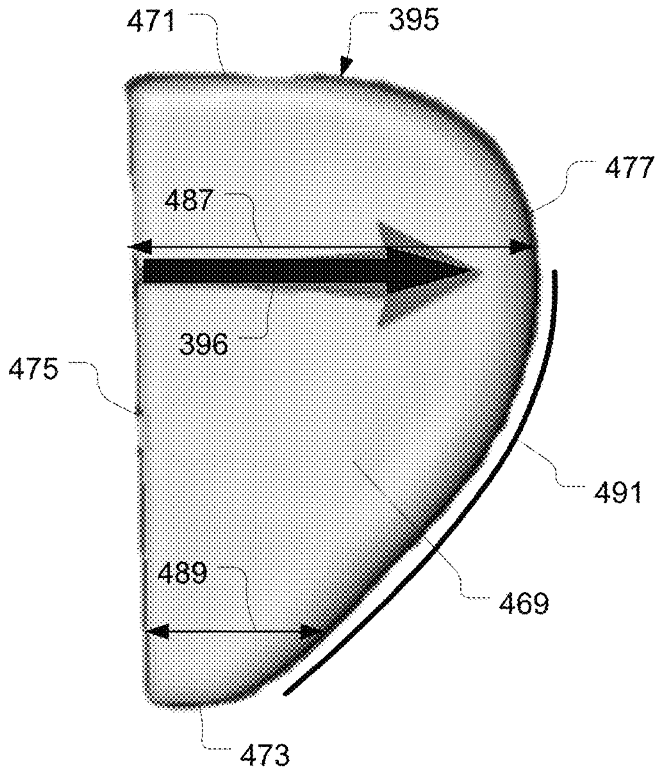
FIG. 73A shows a view of the lumbar derotator driver from a point of view looking toward a medial side of the lumbar derotator driver, in accordance with some embodiments of the present invention.
Figure 73B:
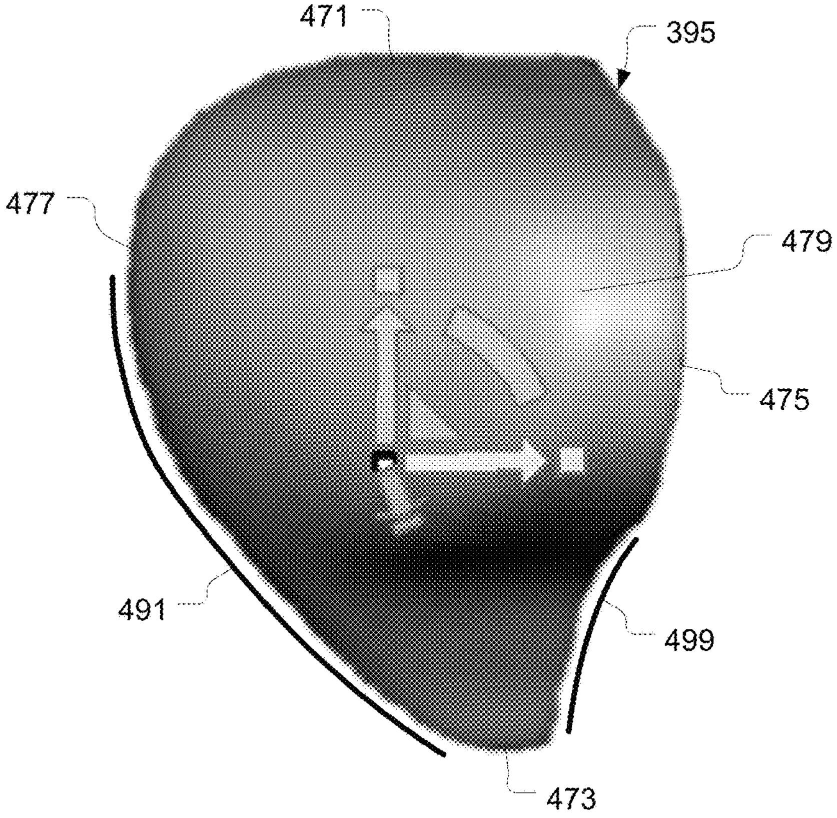
FIG. 73B shows a view of the lumbar derotator driver from a point of view looking toward an outer lateral side of the lumbar derotator driver, in accordance with some embodiments of the present invention.
Figure 73C:
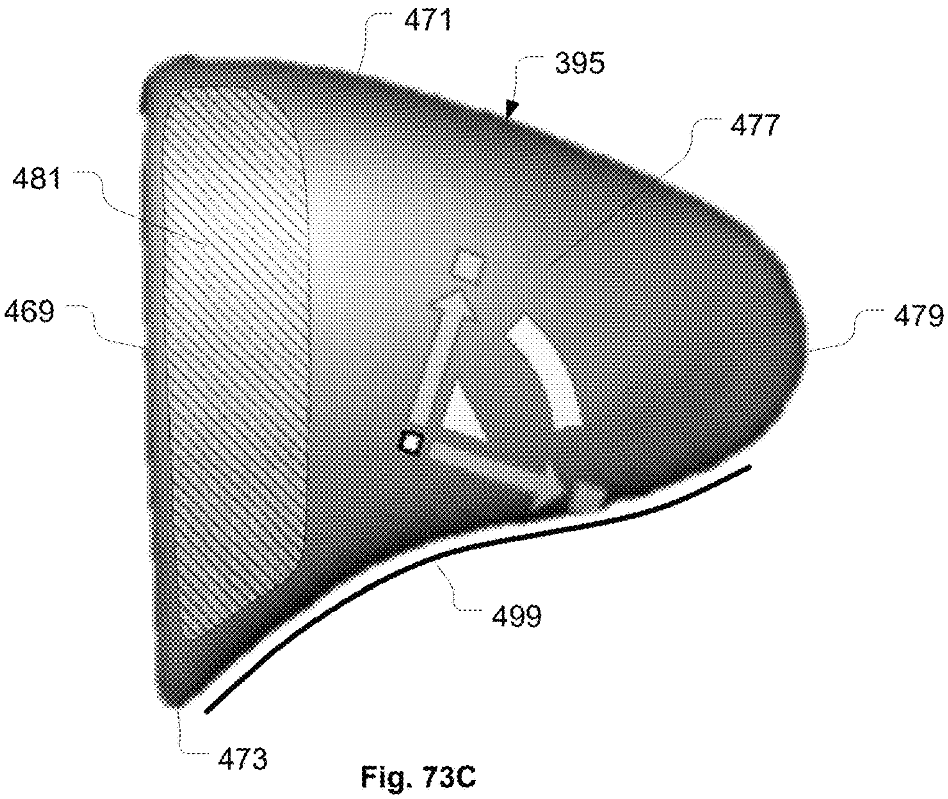
FIG. 73C shows a view of the lumbar derotator driver from a point of view looking directly toward the front surface region of the lumbar derotator driver, in accordance with some embodiments of the present invention.
Figure 73D:
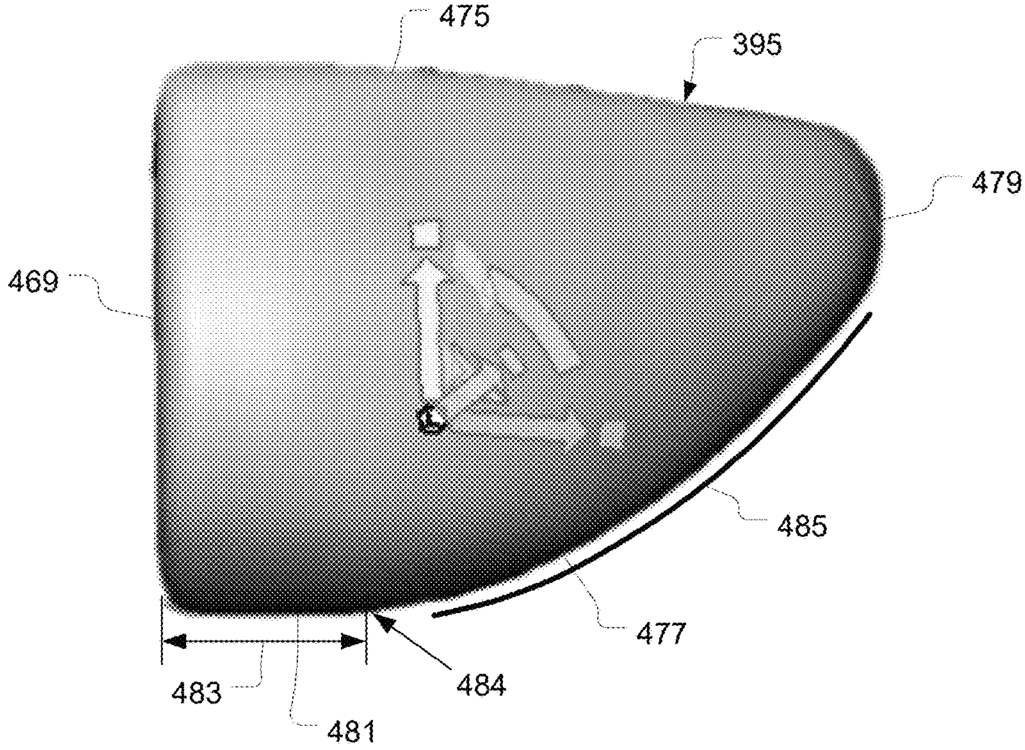
FIG. 73D shows a view of the lumbar derotator driver from a point of view looking downward toward the top surface region of the lumbar derotator driver, in accordance with some embodiments of the present invention.
Figure 73E:
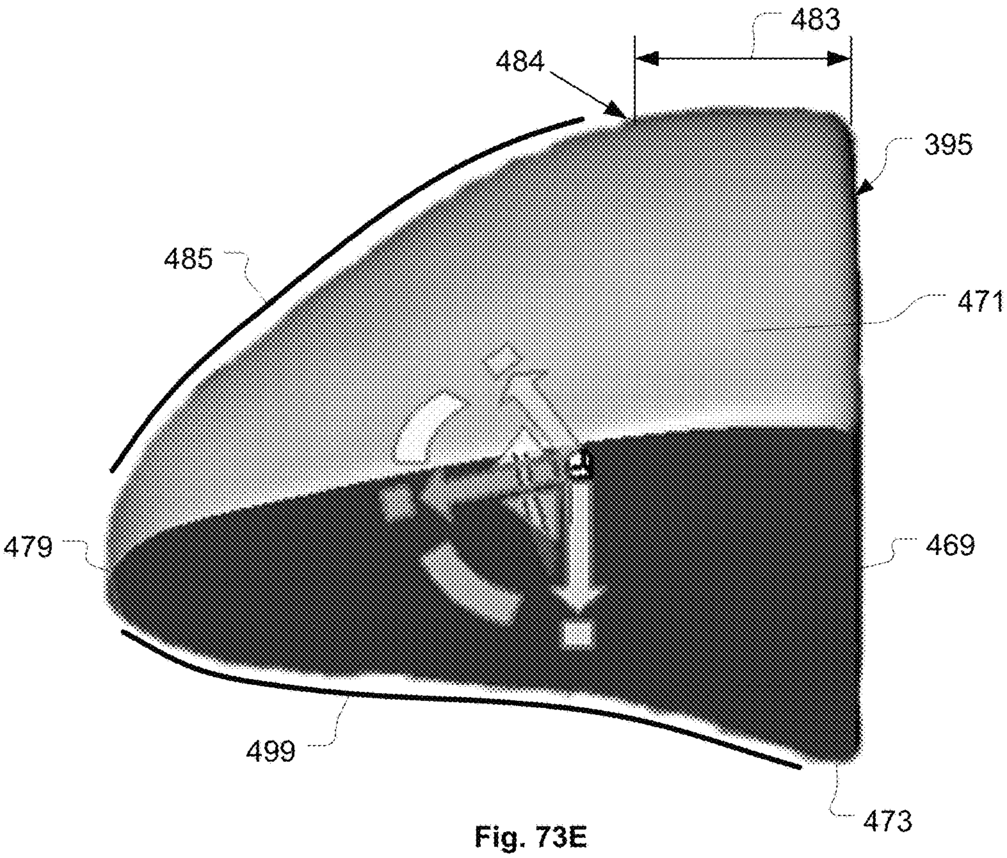
FIG. 73E shows a view of the lumbar derotator driver from a point of view looking downward toward both the top surface region and the back surface region of the lumbar derotator driver, in accordance with some embodiments of the present invention.
Figure 73F:
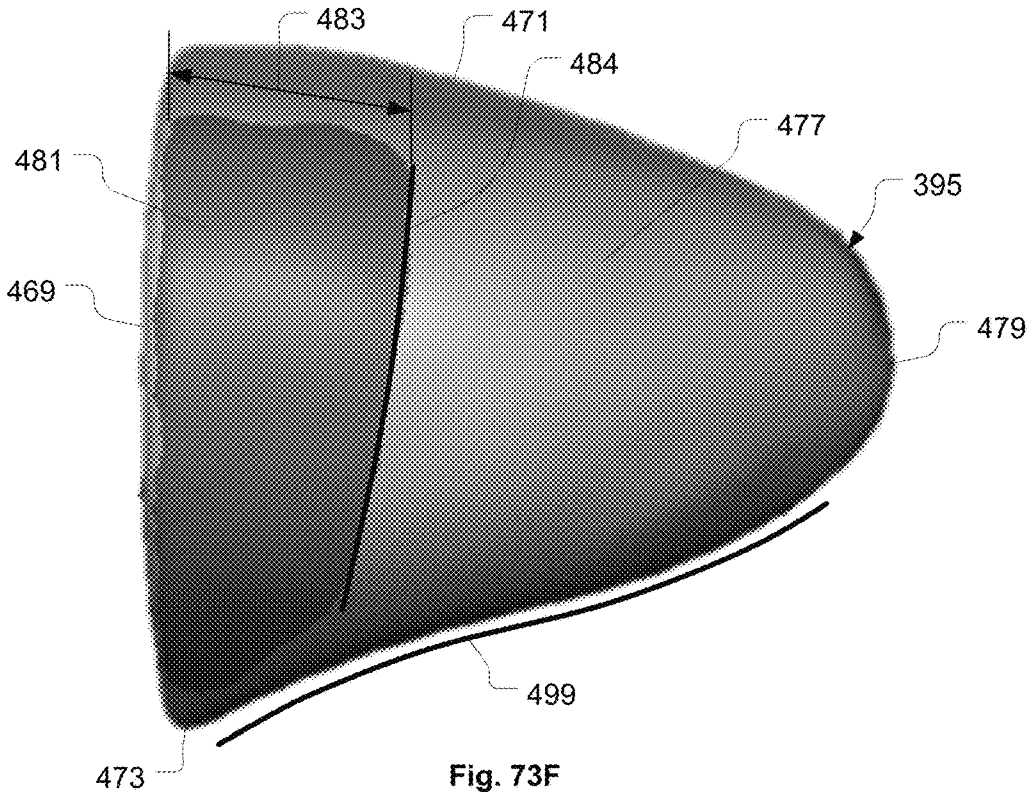
FIG. 73F shows another view of the lumbar derotator driver from a point of view looking directly toward the front surface region of the lumbar derotator driver, in accordance with some embodiments of the present invention.

FIG. 73A shows a view of the lumbar derotator driver 395 from a point of view looking toward a medial side 469 of the lumbar derotator driver 395, in accordance with some embodiments of the present invention. The lumbar derotator driver 395 is configured to contact and apply force to a left side of the lumbar spinal region of the person 302, so as to impart a left-to-right rotational force to the lumbar spinal region of the person 302 relative to the transverse plane of the person 302. The lumbar derotator driver 395 has a top surface region 471, a bottom surface region 473, a back surface region 475, and a front surface region 477. FIG. 73B shows a view of the lumbar derotator driver 395 from a point of view looking toward an outer lateral side 479 of the lumbar derotator driver 395, in accordance with some embodiments of the present invention. FIG. 73C shows a view of the lumbar derotator driver 395 from a point of view looking directly toward the front surface region 477 of the lumbar derotator driver 395, in accordance with some embodiments of the present invention. FIG. 73D shows a view of the lumbar derotator driver 395 from a point of view looking downward toward the top surface region 471 of the lumbar derotator driver 395, in accordance with some embodiments of the present invention. FIG. 73E shows a view of the lumbar derotator driver 395 from a point of view looking downward toward both the top surface region 471 and the back surface region 475 of the lumbar derotator driver 395, in accordance with some embodiments of the present invention. FIG. 73F shows another view of the lumbar derotator driver 395 from a point of view looking directly toward the front surface region 477 of the lumbar derotator driver 395, in accordance with some embodiments of the present invention.

The lumbar derotator driver 395 is configured and positioned to contact and apply pressure to a prescribed side of the lumbar spinal region of the person 302. The front surface region 477 of the lumbar derotator driver 395 includes a contact region 481 that contacts the person 302. The lumbar derotator driver 395 is configured to contact the lumbar or thoracolumbar spinal region of the person 302 on the convex side of the scoliotic lumbar curve, at and below the apex of the scoliotic lumbar curve. As the lumbar derotator driver 395 applies force to the lumbar or thoracolumbar spinal region in a posterior-to-anterior direction, as indicated by the arrow 396, the force applied by the lumbar derotator driver 395 causes derotation of a twisted component of the scoliotic lumbar curve of the person 302, which allows the lumbar or thoracolumbar spinal region to release from the scoliotic configuration and correspondingly allows for release of spinal contractures within the lumbar or thoracolumbar spinal region. The lumbar derotator driver 395 is configured to contact and apply pressure to a left, posterior side of the lumbar or thoracolumbar spinal region of the person 302. However, in other embodiments, the lumbar derotator driver 395 can be configured in a laterally mirrored manner to contact and apply pressure to a right, posterior side of the lumbar or thoracolumbar spinal region of the person 302, such as shown by a lumbar derotator driver 395A in FIGS. 74A through 74H.

As shown in FIGS. 73D, 73E, and 73F, the contact region 481 of the front surface region 477 is configured to have a substantially flat profile over a lateral distance 483. In some embodiments, the flat profile is present over substantially the entire contact region 481. The flat profile of the contact region 481 helps maximize the surface area of the contact region 481 that contacts the person 302, so as to increase the force applied by the lumbar derotator driver 395 to the person 302 and decrease discomfort of the person 302. In some embodiments, the front surface region 477 is contoured in an anterior-to-posterior direction from an outer lateral edge 484 of the contact region 481 to the outer lateral side of the 479 of the lumbar derotator driver 395, as indicated by the contour line 485 in FIG. 73D. In this manner, the lumbar derotator driver 395 has a larger anterior-to-posterior thickness at the outer lateral edge of the contact region 481 and a smaller anterior-to-posterior thickness at the outer lateral side 479. In this manner, the contact region 481 is allowed to push further into the tissue of the person 302 without being held back by premature contact between the outer lateral portion of the lumbar derotator driver 395 and the person 302.

Also, as shown in FIG. 73A, the anterior-to-posterior thickness 487 of the lumbar derotator driver 395 near the top surface region 471 is larger than the anterior-to-posterior thickness 489 of the lumbar derotator driver 395 near the bottom surface region 471. Therefore, the contact region 481 has a profile that curves in an anterior/superior-to-posterior/inferior direction, as indicated by the contour line 491 in FIGS. 73A and 73B. In this manner, the larger anterior-to-posterior thickness 487 near the top surface region 471 enables the lumbar derotator driver 395 to maintain therapeutic pressure on the upper lumbar spinal region as the upper lumbar spinal region moves through a greater posterior-to-anterior distance relative to the lower lumbar spinal region. In other words, the anterior-to-posterior thickness 487 near the top surface region 471 is greater than the anterior-to-posterior thickness 489 near the bottom surface region 473 to accommodate the ability of the top of the lumbar spinal region to translate forward further than the bottom of the lumbar spinal region in trying to escape the pressure applied by the lumbar derotator driver 395. The lower part of the lumbar spinal region is more limited in its ability to escape the pressure applied by the lumbar derotator driver 395 because the lower part of the lumbar spinal region is anchored more firmly to the sacrum and pelvis.

Figure 73G:
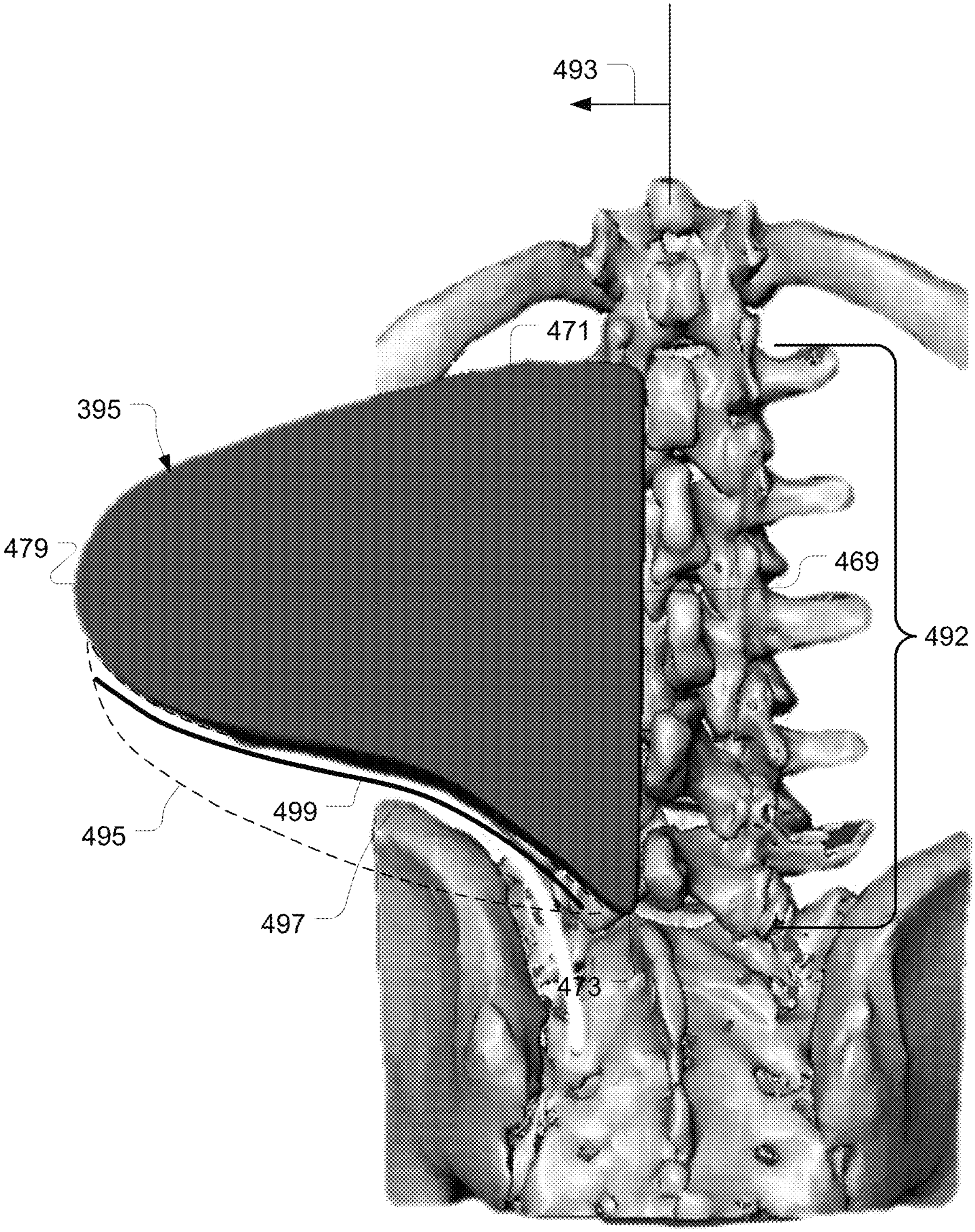
FIG. 73G shows a back view of the lumbar derotator driver applied to the left, posterior side of the lumbar spinal region of the person, in accordance with some embodiments of the present invention.

FIG. 73G shows a back view of the lumbar derotator driver 395 applied to the left, posterior side 493 of the lumbar spinal region 492 of the person 302, in accordance with some embodiments of the present invention. In some embodiments, the bottom surface region 473 of the lumbar derotator driver 395 includes a cutout area 495 to prevent the iliac crest 497 of the person 302 from interfering with application of force from the lumbar derotator driver 395 to the lumbar spinal region 492. In these embodiments, the bottom surface region 473 of the lumbar derotator driver 395 has a profile that curves in an inferior/medial-to-superior/lateral direction, as indicated by the contour line 499 in FIGS. 73B, 73C, 73E, 73F, and 73G.

Figure 73H:
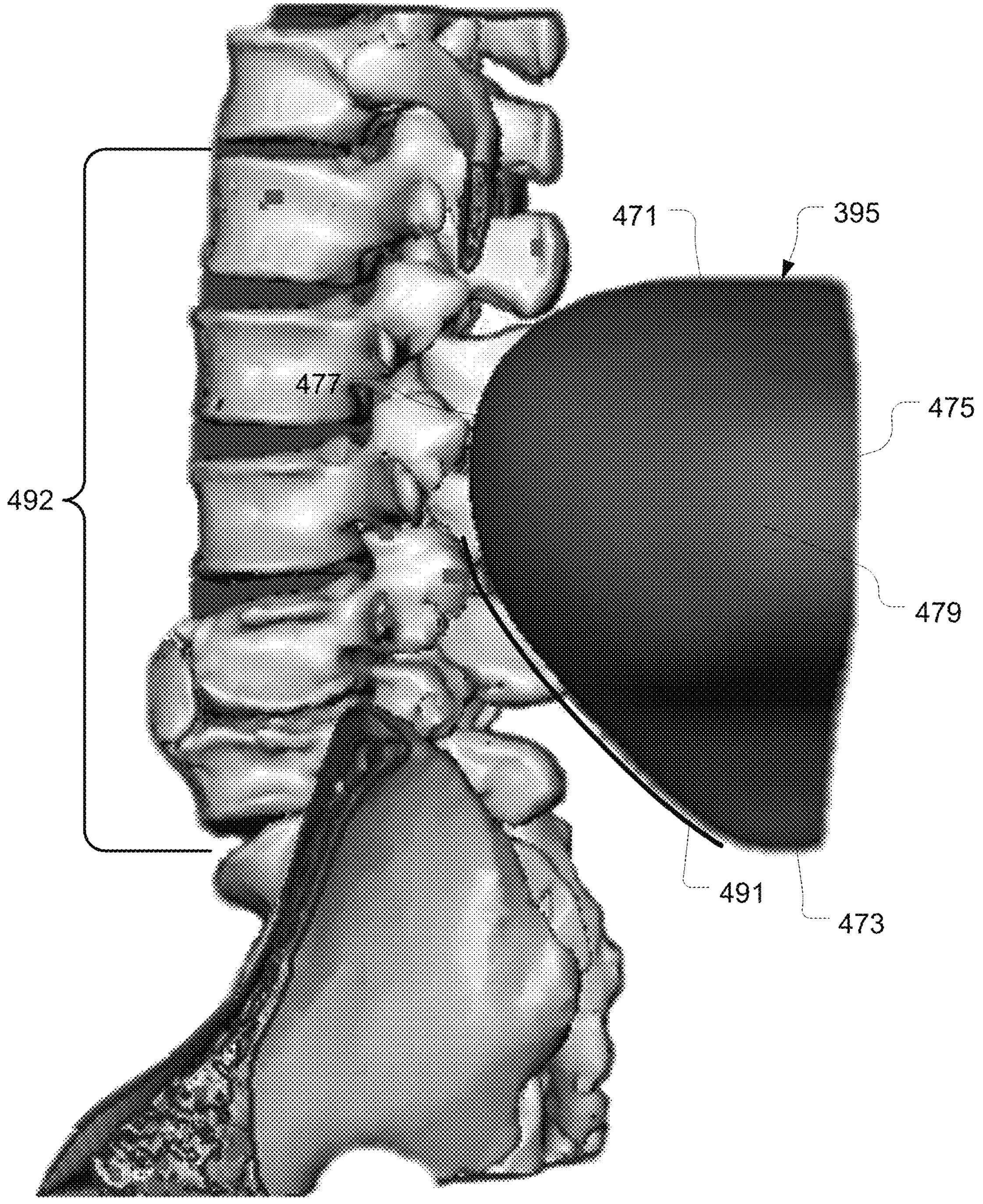

FIG. 73H shows the lumbar derotator driver 395 applied to the left, posterior side 493 of the lumbar spinal region 492 of the person 302, from a point of view looking toward the outer lateral side 479 of the lumbar derotator driver 395, in accordance with some embodiments of the present invention. The profile of the contact region 481 in the anterior/superior-to-posterior/inferior direction, as indicated by the contour line 491 in FIG. 73H, also accommodates posterior curvature of the sacrum and the pelvis of the person 302, so as to prevent the sacrum and the pelvis of the person 302 from interfering with application of force from the lumbar derotator driver 395 to the lumbar spinal region 492.

Figure 74A:
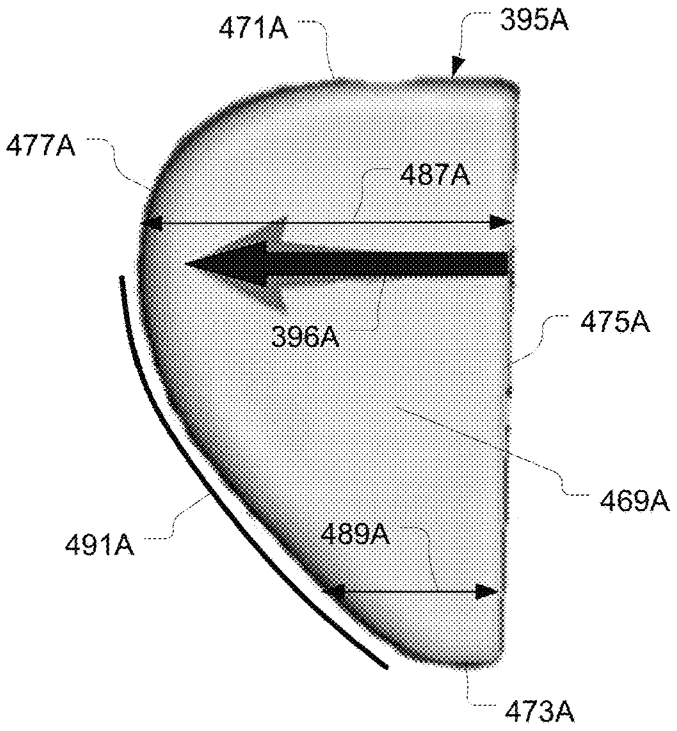
Figure 74B:
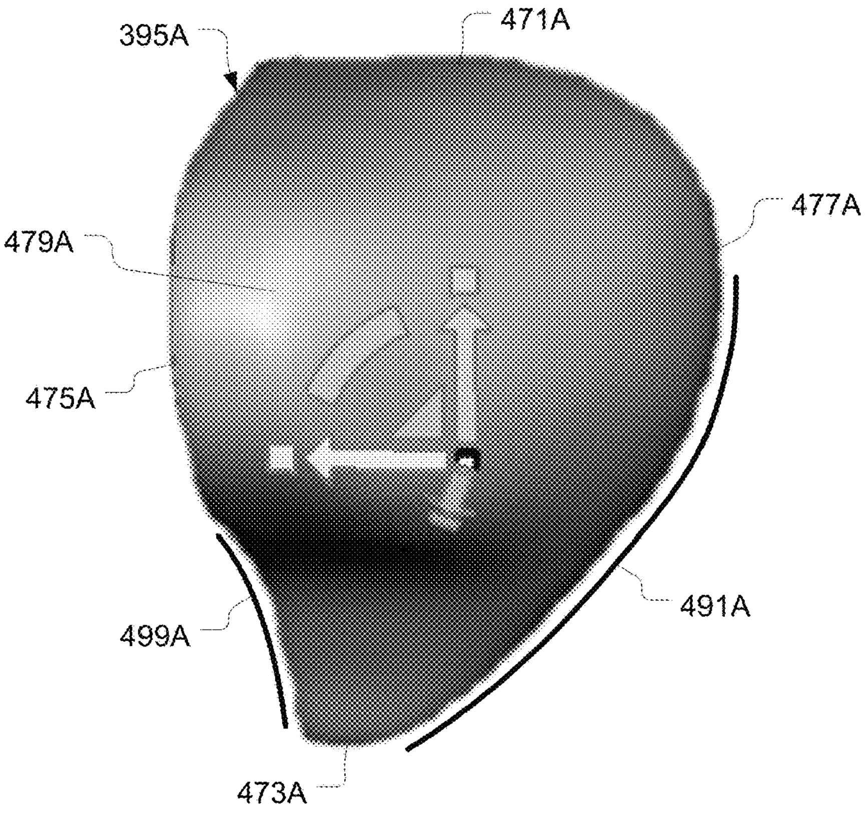
Figure 74C:
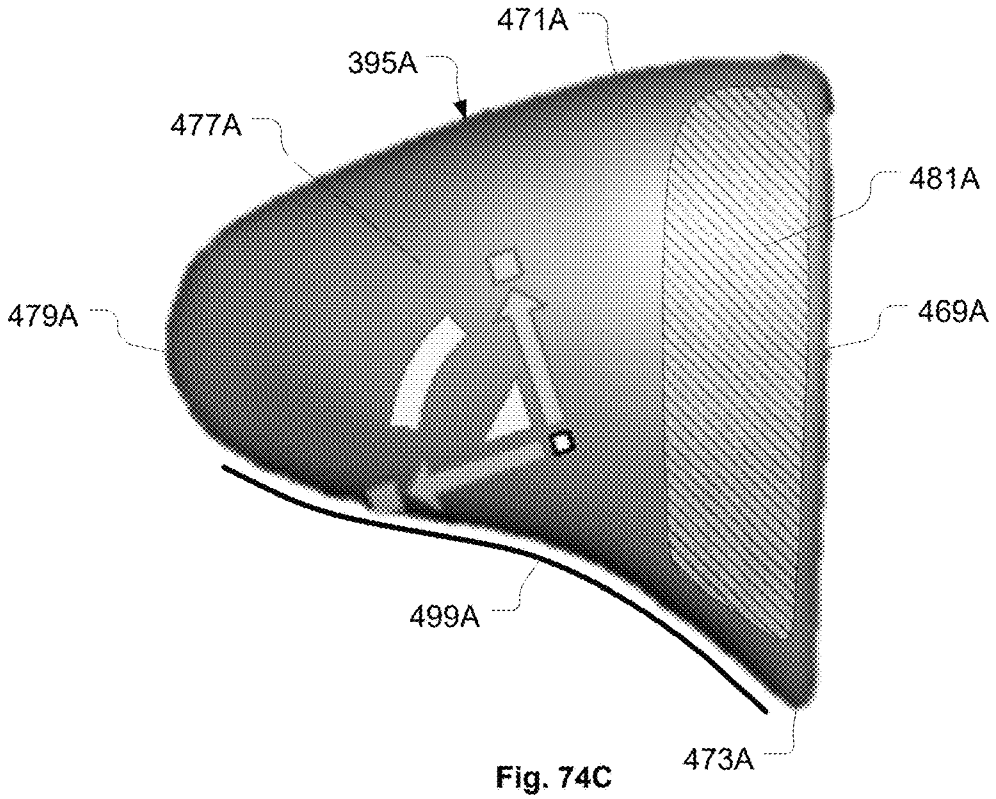
Figure 74D:
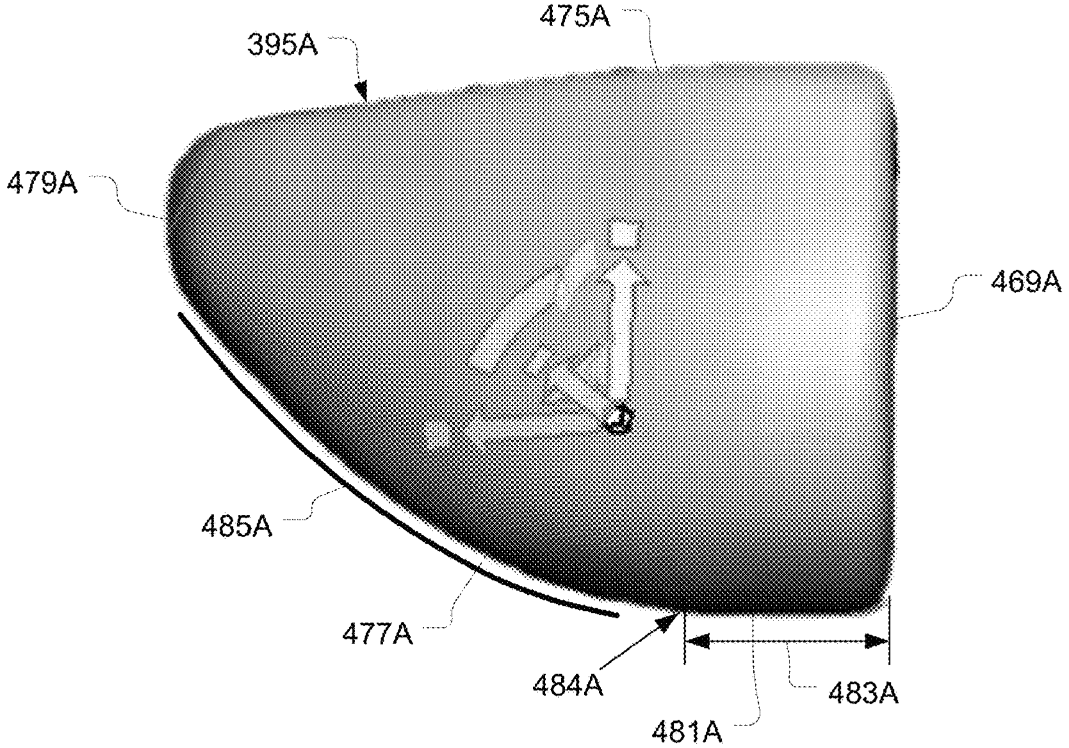
Figure 74E:
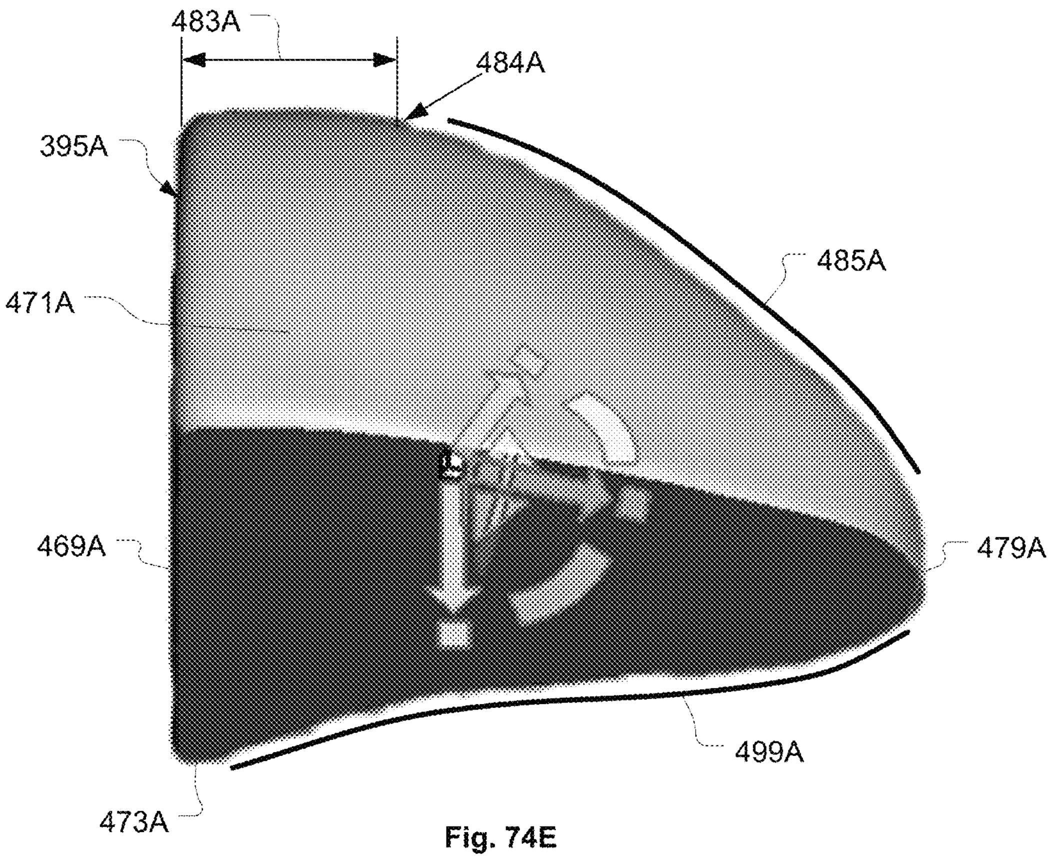
Figure 74F:
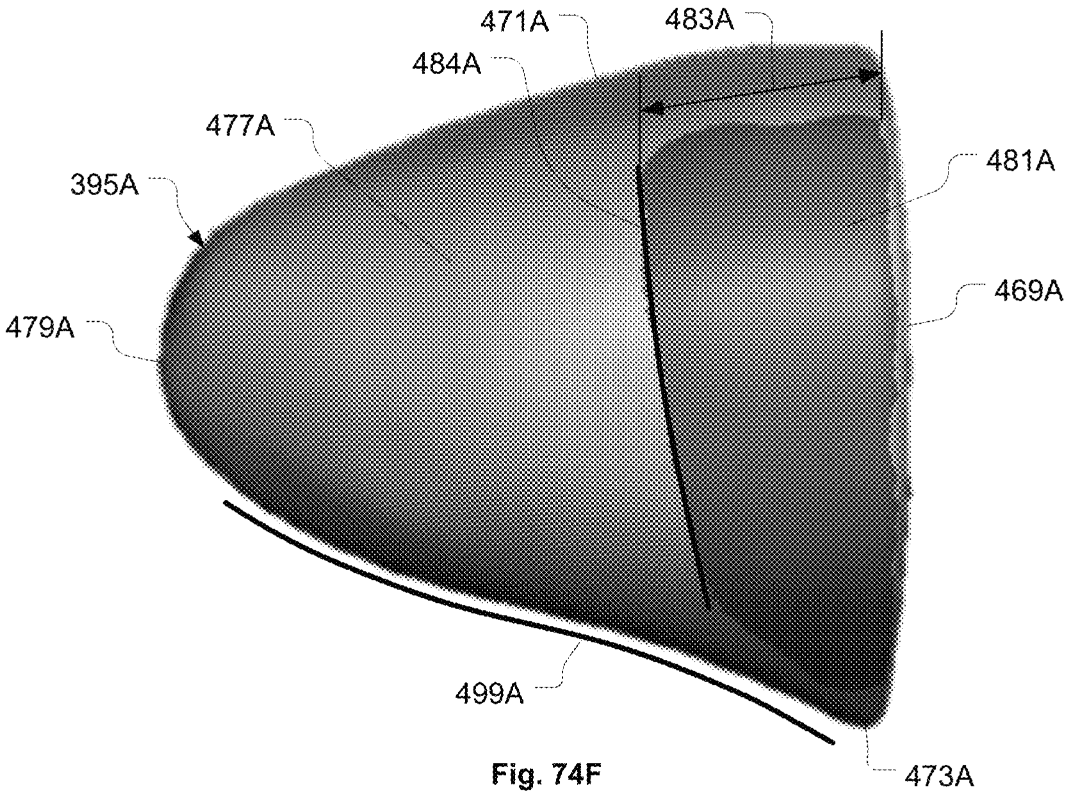

FIG. 74A shows a view of the lumbar derotator driver 395A from a point of view looking toward a medial side 469A of the lumbar derotator driver 395A, in accordance with some embodiments of the present invention. As previously discussed, the lumbar derotator driver 395A is configured in a laterally mirrored manner relative to the lumbar derotator driver 395. Therefore, the lumbar derotator driver 395A is configured to contact and apply pressure to the right, posterior side of the lumbar spinal region 492 of the person 302. The lumbar derotator driver 395A has a top surface region 471A, a bottom surface region 473A, a back surface region 475A, and a front surface region 477A. FIG. 74B shows a view of the lumbar derotator driver 395A from a point of view looking toward an outer lateral side 479A of the lumbar derotator driver 395A, in accordance with some embodiments of the present invention. FIG. 74C shows a view of the lumbar derotator driver 395A from a point of view looking directly toward the front surface region 477A of the lumbar derotator driver 395A, in accordance with some embodiments of the present invention. FIG. 74D shows a view of the lumbar derotator driver 395A from a point of view looking downward toward the top surface region 471A of the lumbar derotator driver 395A, in accordance with some embodiments of the present invention. FIG. 74E shows a view of the lumbar derotator driver 395A from a point of view looking downward toward both the top surface region 471A and the back surface region 475A of the lumbar derotator driver 395A, in accordance with some embodiments of the present invention. FIG. 74F shows another view of the lumbar derotator driver 395A from a point of view looking directly toward the front surface region 477A of the lumbar derotator driver 395A, in accordance with some embodiments of the present invention.

The front surface region 477A of the lumbar derotator driver 395A includes a contact region 481A that contacts the person 302. The lumbar derotator driver 395A is configured to contact the lumbar or thoracolumbar spinal region 492 of the person 302 on the convex side of the scoliotic lumbar curve, at and below the apex of the scoliotic lumbar curve. As the lumbar derotator driver 395A applies force to the lumbar or thoracolumbar spinal region in a posterior-to-anterior direction, as indicated by the arrow 396A, the force applied by the lumbar derotator driver 395A causes derotation of a twisted component of the scoliotic lumbar curve of the person 302, which allows the lumbar or thoracolumbar spinal region to release from the scoliotic configuration and correspondingly allows for release of spinal contractures within the lumbar or thoracolumbar spinal region. The lumbar derotator driver 395A is configured to contact and apply pressure to a right, posterior side of the lumbar or thoracolumbar spinal region 492 of the person 302.

As shown in FIGS. 74D, 74E, and 74F, the contact region 481A of the front surface region 477A is configured to have a substantially flat profile over a lateral distance 483A. In some embodiments, the flat profile is present over substantially the entire contact region 481A. The flat profile of the contact region 481A helps maximize the surface area of the contact region 481A that contacts the person 302, so as to increase the force applied by the lumbar derotator driver 395A to the person 302 and decrease discomfort of the person 302. In some embodiments, the front surface region 477A is contoured in an anterior-to-posterior direction from an outer lateral edge 484A of the contact region 481A to the outer lateral side of the 479A of the lumbar derotator driver 395A, as indicated by the contour line 485A in FIG. 74D. In this manner, the lumbar derotator driver 395A has a larger anterior-to-posterior thickness at the outer lateral edge of the contact region 481A and a smaller anterior-to-posterior thickness at the outer lateral side 479A. In this manner, the contact region 481A is allowed to push further into the tissue of the person 302 without being held back by premature contact between the outer lateral portion of the lumbar derotator driver 395A and the person 302.

Also, as shown in FIG. 74A, the anterior-to-posterior thickness 487A of the lumbar derotator driver 395A near the top surface region 471A is larger than the anterior-to-posterior thickness 489A of the lumbar derotator driver 395A near the bottom surface region 471A. Therefore, the contact region 481A has a profile that curves in an anterior/superior-to-posterior/inferior direction, as indicated by the contour line 491A in FIGS. 74A and 74B. In this manner, the larger anterior-to-posterior thickness 487A near the top surface region 471A enables the lumbar derotator driver 395A to maintain therapeutic pressure on the upper lumbar spinal region as the upper lumbar spinal region moves through a greater posterior-to-anterior distance relative to the lower lumbar spinal region. In other words, the anterior-to-posterior thickness 487A near the top surface region 471A is greater than the anterior-to-posterior thickness 489A near the bottom surface region 473A to accommodate the ability of the top of the lumbar spinal region 492 to translate forward further than the bottom of the lumbar spinal region 492 in trying to escape the pressure applied by the lumbar derotator driver 395A. The lower part of the lumbar spinal region 492 is more limited in its ability to escape the pressure applied by the lumbar derotator driver 395A because the lower part of the lumbar spinal region 492 is anchored more firmly to the sacrum and pelvis.

Figure 74G:
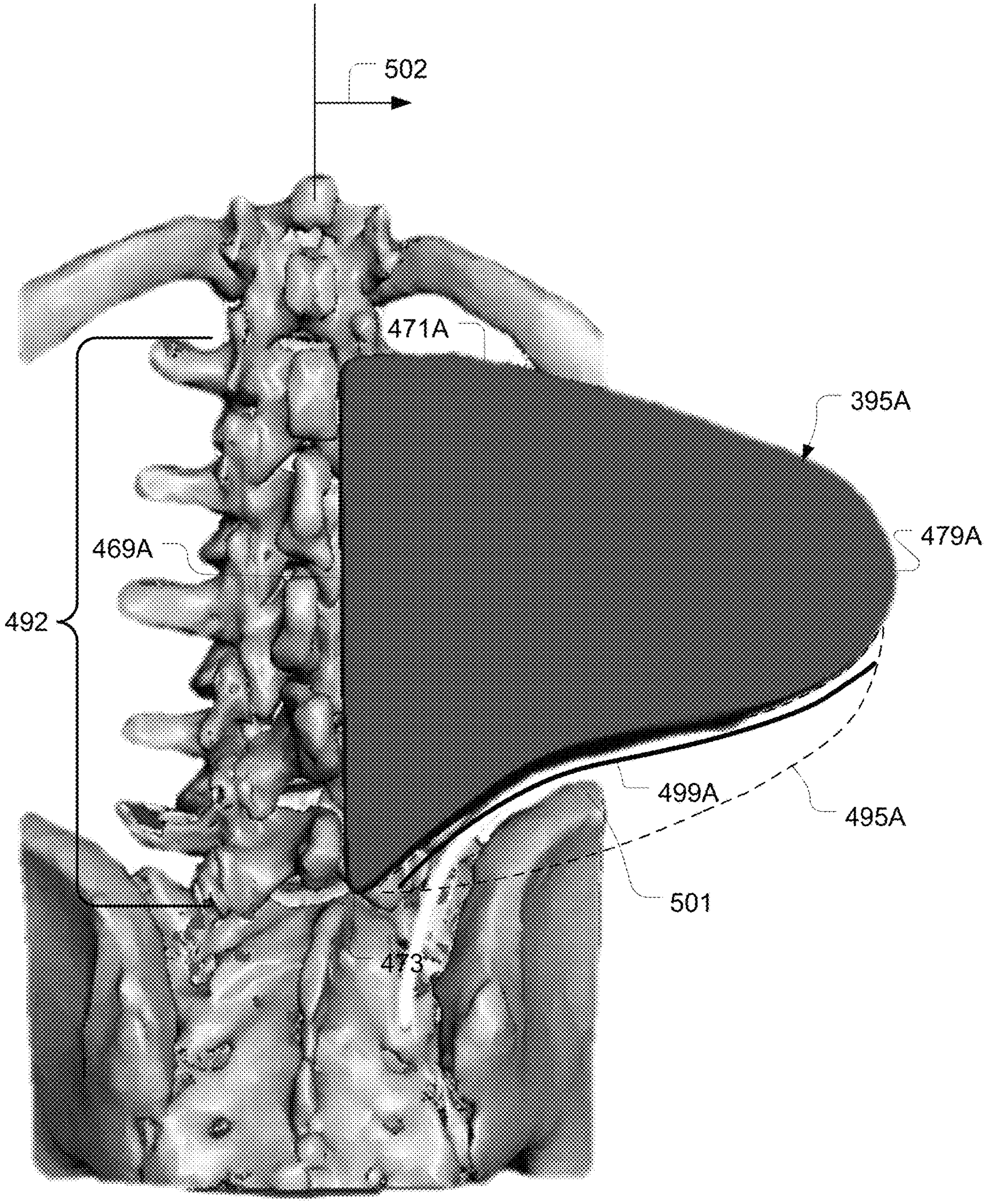

FIG. 74G shows a back view of the lumbar derotator driver 395A applied to the right, posterior side 502 of the lumbar spinal region 492 of the person 302, in accordance with some embodiments of the present invention. In some embodiments, the bottom surface region 473A of the lumbar derotator driver 395A includes a cutout area 495A to prevent the right iliac crest 501 of the person 302 from interfering with application of force from the lumbar derotator driver 395A to the lumbar spinal region 492. In these embodiments, the bottom surface region 473A of the lumbar derotator driver 395A has a profile that curves in an inferior/medial-to-superior/lateral direction, as indicated by the contour line 499A in FIGS. 74B, 74C, 74E, 74F, and 74G.

Figure 74H:
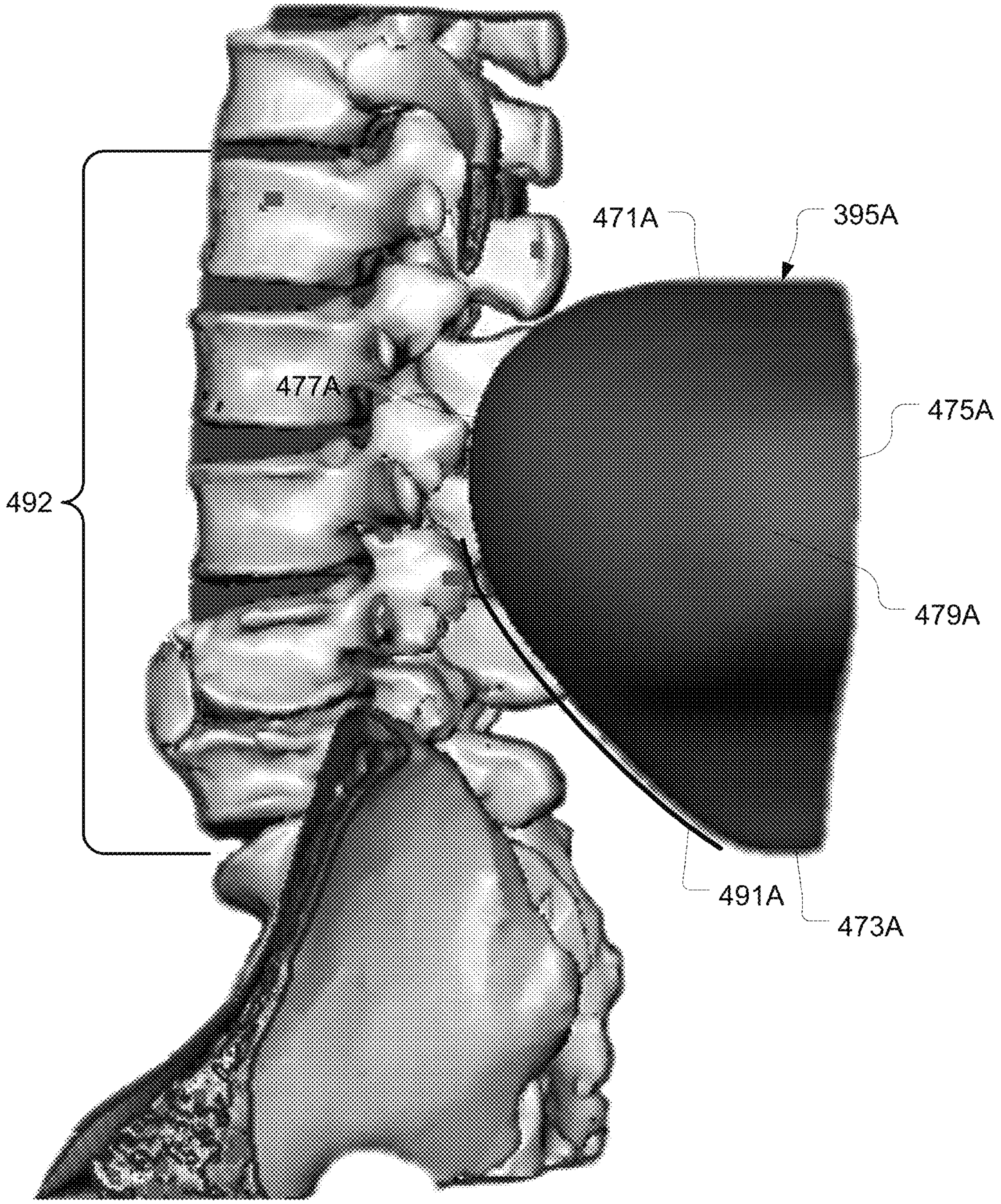

FIG. 74H shows the lumbar derotator driver 395A applied to the right, posterior side 502 of the lumbar spinal region 492 of the person 302, from a point of view looking toward the outer lateral side 479A of the lumbar derotator driver 395A, in accordance with some embodiments of the present invention. The profile of the contact region 481A in the anterior/superior-to-posterior/inferior direction, as indicated by the contour line 491A in FIG. 74H, also accommodates posterior curvature of the sacrum and the pelvis of the person 302, so as to prevent the sacrum and the pelvis of the person 302 from interfering with application of force from the lumbar derotator driver 395A to the lumbar spinal region 492.

FIG. 75A shows a perspective view of the primary thoracic driver 371 from a point of view looking toward a contact surface 503 of the primary thoracic driver 371, in accordance with some embodiments of the present invention. The primary thoracic driver 371 has an inner surface region 505, an outer surface region 507, a top surface region 509, and a bottom surface region 511, an anterior surface region 513, and a posterior surface region 515. The inner surface region 505 is to be positioned closer to the sacral line of the person 302 relative to the outer surface region 507. The contact surface 503 is part of the inner surface region 505. Also, the top surface region 509 is to be positioned superior to the bottom surface region 511. FIG. 75B shows a view of the primary thoracic driver 371 from a point of view looking downward toward the top surface region 509 of the primary thoracic driver 371, in accordance with some embodiments of the present invention. FIG. 75C shows another view of the primary thoracic driver 371 from a point of view looking toward the contact surface 503 of the primary thoracic driver 371, in accordance with some embodiments of the present invention.

The primary thoracic driver 371 is configured and positioned to contact the lateral rib cage of the person 302. More specifically, in some embodiments, the primary thoracic driver 371 is configured and positioned to contact the rib cage on the side of the primary scoliotic thoracic convexity of the person 302. The example primary thoracic driver 371 is configured to contact a right side of the rib cage of the person 302. The primary thoracic driver 371 is configured to provide lateral-to-medial pressure at and below the apex of the scoliotic thoracic curve of the person 302. In some embodiments, the primary thoracic driver 371 has a cutout region 517 on the top surface region 509 that extends in the anterior-to-posterior direction from the anterior surface region 513. Therefore, a vertical height 519 of the primary thoracic driver 371 toward the lateral side of the person 302 is less than a vertical height 521 of the primary thoracic driver 371 toward the posterior side of the person 302. The increased vertical height 521 of the primary thoracic driver 371 near the posterior side of the person 302 enables the contact surface 503 to provide a contact pressure to the posterior rib cage of the person 302 that spans a distance of essentially the entire scoliotic thoracic curve of the person 302. In this manner, the contact surface 503 of the primary thoracic driver 371 provides contact over the scoliotic rib hump associated with the scoliotic thoracic curve of the person 302.

FIG. 75D shows a position and orientation of the primary thoracic driver 371 relative to the rib cage 523 of the person 302, from a point of view looking toward the right side of the person 302, in accordance with some embodiments of the present invention. FIG. 75E shows a position and orientation of the primary thoracic driver 371 relative to the rib cage 523 of the person 302, from a point of view looking toward the back of the person 302, in accordance with some embodiments of the present invention. FIG. 75F shows a position and orientation of the primary thoracic driver 371 relative to the rib cage 523 of the person 302, from a point of view looking downward from a location above the person 302, in accordance with some embodiments of the present invention. FIG. 75G shows a position and orientation of the primary thoracic driver 371 relative to the rib cage 523 of the person 302, from a point of view looking upward from a location below the person 302, in accordance with some embodiments of the present invention. FIG. 75H shows a position and orientation of the primary thoracic driver 371 relative to the rib cage 523 of the person 302, from a point of view looking toward a left-front side of the person 302, in accordance with some embodiments of the present invention.

As shown in FIG. 75D, the cutout region 517 of the primary thoracic driver 371 is configured so that the contact surface 503 of the primary thoracic driver 371 does not contact the lateral rib cage of the person 302 in a significant manner above the apex of the scoliotic thoracic curve of the person 302, as such contact of the primary thoracic driver 371 above the apex of the scoliotic thoracic curve of the person 302 would block an upper part of the scoliotic thoracic curve from correcting/straightening. Also, as shown in FIG. 75D, the primary thoracic driver 371 is positioned in a tilted manner so that the posterior end of the primary thoracic driver 371 is at a vertically higher position than the anterior end of the primary thoracic driver 371. The tilting of the primary thoracic driver 371 in this manner is done because the rib hump contact area spans a greater vertical height than the lateral rib contact area.

FIG. 75E shows an example position of the primary thoracic driver 371 relative to an apex 525 of the right scoliotic thoracic curve, as represented by the curved line 527. Posterior-to-anterior tilting of the primary thoracic driver 371 helps keep the side of the rib cage open so that the top part of the scoliotic thoracic curve can bend back into alignment unhindered by contact with the primary thoracic driver 371. Positioning of the primary thoracic driver 371 too high on the rib cage of the person 302 will hinder the thoracic spinal region from being able to fully correct/straighten. As shown in FIG. 75E, the posterior end of the primary thoracic driver 371 is positioned above the apex 525 of the scoliotic thoracic curve. However, the lateral side of the primary thoracic driver 371 is positioned at or below the apex 525 of the scoliotic thoracic curve, and not substantially above the apex 525 of the scoliotic thoracic curve.

FIG. 75F shows forces applied by the primary thoracic driver 371 to the rib cage of the person 302, in accordance with some embodiments of the present invention. An arrow 529 represents posterior-to-anterior force applied by the primary thoracic driver 371 to the rib cage of the person 302 to correct scoliotic rotational distortions. An arrow 531 represents lateral-to-medial force applied by the primary thoracic driver 371 to the rib cage of the person 302 to correct to correct a Cobb angle of the scoliotic thoracic curve of the person 302. An arrow 533 represents a posterior/lateral-to-anterior/medial force applied by the primary thoracic driver 371 to the rib cage of the person 302. The lateral-to-medial force applied by the primary thoracic driver 371 to the rib cage of the person 302, as indicated by the arrow 531, is opposed by lateral-to-medial forces applied by the lumbar belt 347 and the proximal thoracic driver 383 to the opposite side of the person 302, where the lumbar belt 347 applies lateral-to-medial force to the lumbar spinal region and the proximal thoracic driver 383 applies lateral-to-medial force to the rib cage at a vertical position above the apex 525 of the scoliotic thoracic curve. Also, in some embodiments, the posterior-to-anterior force applied by the primary thoracic driver 371 to the rib cage of the person 302, as indicated by the arrow 529, can be opposed by the anterior-to-posterior force applied to the rib cage by the anterior thoracic driver 411.

FIG. 76A shows a perspective view of a primary thoracic driver 371A from a point of view looking toward a contact surface 503A of the primary thoracic driver 371A, in accordance with some embodiments of the present invention. The primary thoracic driver 371A is configured in a laterally mirrored manner relative to the primary thoracic driver 371. Therefore, the primary thoracic driver 371A is configured to contact and apply pressure to the left side of the rib cage of the person 302. The primary thoracic driver 371A has an inner surface region 505A, an outer surface region 507A, a top surface region 509A, and a bottom surface region 511A, an anterior surface region 513A, and a posterior surface region 515A. The inner surface region 505A is to be positioned closer to the sacral line of the person 302 relative to the outer surface region 507A. The contact surface 503A is part of the inner surface region 505A. Also, the top surface region 509A is to be positioned superior to the bottom surface region 511A. FIG. 76B shows a view of the primary thoracic driver 371A from a point of view looking downward toward the top surface region 509A of the primary thoracic driver 371A, in accordance with some embodiments of the present invention. FIG. 76C shows another view of the primary thoracic driver 371A from a point of view looking toward the contact surface 503A of the primary thoracic driver 371A, in accordance with some embodiments of the present invention.

The primary thoracic driver 371A is configured and positioned to contact the lateral rib cage of the person 302. More specifically, in some embodiments, the primary thoracic driver 371A is configured and positioned to contact the rib cage on the side of the primary scoliotic thoracic convexity of the person 302. The example primary thoracic driver 371A is configured to contact the left side of the rib cage of the person 302. The primary thoracic driver 371A is configured to provide lateral-to-medial pressure at and below the apex of the scoliotic thoracic curve of the person 302. In some embodiments, the primary thoracic driver 371A has a cutout region 517A on the top surface region 509A that extends in the anterior-to-posterior direction from the anterior surface region 513A. Therefore, a vertical height 519A of the primary thoracic driver 371A toward the lateral side of the person 302 is less than a vertical height 521A of the primary thoracic driver 371A toward the posterior side of the person 302. The increased vertical height 521A of the primary thoracic driver 371A near the posterior side of the person 302 enables the contact surface 503A to provide a contact pressure to the posterior rib cage of the person 302 that spans a distance of essentially the entire scoliotic thoracic curve of the person 302. In this manner, the contact surface 503A of the primary thoracic driver 371A provides contact over the scoliotic rib hump associated with the scoliotic thoracic curve of the person 302.

FIG. 76D shows a position and orientation of the primary thoracic driver 371A relative to the rib cage 523 of the person 302, from a point of view looking toward the left side of the person 302, in accordance with some embodiments of the present invention. FIG. 76E shows a position and orientation of the primary thoracic driver 371A relative to the rib cage 523 of the person 302, from a point of view looking toward the back of the person 302, in accordance with some embodiments of the present invention. FIG. 76F shows a position and orientation of the primary thoracic driver 371A relative to the rib cage 523 of the person 302, from a point of view looking downward from a location above the person 302, in accordance with some embodiments of the present invention. FIG. 76G shows a position and orientation of the primary thoracic driver 371A relative to the rib cage 523 of the person 302, from a point of view looking upward from a location below the person 302, in accordance with some embodiments of the present invention. FIG. 76H shows a position and orientation of the primary thoracic driver 371A relative to the rib cage 523 of the person 302, from a point of view looking toward a right-front side of the person 302, in accordance with some embodiments of the present invention.

As shown in FIG. 76D, the cutout region 517A of the primary thoracic driver 371A is configured so that the contact surface 503 of the primary thoracic driver 371A does not contact the lateral rib cage of the person 302 in a significant manner above the apex of the scoliotic thoracic curve of the person 302, as such contact of the primary thoracic driver 371A above the apex of the scoliotic thoracic curve of the person 302 would block an upper part of the scoliotic thoracic curve from correcting/straightening. Also, as shown in FIG. 76D, the primary thoracic driver 371A is positioned in a tilted manner so that the posterior end of the primary thoracic driver 371A is at a vertically higher position than the anterior end of the primary thoracic driver 371A. The tilting of the primary thoracic driver 371A in this manner is done because the rib hump contact area spans a greater vertical height than the lateral rib contact area.

FIG. 76E shows an example position of the primary thoracic driver 371A relative to an apex 535 of the right scoliotic thoracic curve, as represented by the curved line 537. Posterior-to-anterior tilting of the primary thoracic driver 371A helps keep the side of the rib cage open so that the top part of the scoliotic thoracic curve can bend back into alignment unhindered by contact with the primary thoracic driver 371A. Positioning of the primary thoracic driver 371A too high on the rib cage of the person 302 will hinder the thoracic spinal region from being able to fully correct/straighten. As shown in FIG. 76E, the posterior end of the primary thoracic driver 371A is positioned above the apex 535 of the scoliotic thoracic curve. However, the lateral side of the primary thoracic driver 371A is positioned at or below the apex 535 of the scoliotic thoracic curve, and not substantially above the apex 535 of the scoliotic thoracic curve.

FIG. 76F shows forces applied by the primary thoracic driver 371A to the rib cage of the person 302, in accordance with some embodiments of the present invention. An arrow 539 represents posterior-to-anterior force applied by the primary thoracic driver 371A to the rib cage of the person 302 to correct scoliotic rotational distortions. An arrow 541 represents lateral-to-medial force applied by the primary thoracic driver 371A to the rib cage of the person 302 to correct to correct a Cobb angle of the scoliotic thoracic curve of the person 302. An arrow 543 represents a posterior/lateral-to-anterior/medial force applied by the primary thoracic driver 371A to the rib cage of the person 302. The lateral-to-medial force applied by the primary thoracic driver 371A to the rib cage of the person 302, as indicated by the arrow 541, is opposed by lateral-to-medial forces applied by the lumbar belt 347 and the proximal thoracic driver 383 to the opposite side of the person 302, where the lumbar belt 347 applies lateral-to-medial force to the lumbar spinal region and the proximal thoracic driver 383 applies lateral-to-medial force to the rib cage at a vertical position above the apex 535 of the scoliotic thoracic curve. Also, in some embodiments, the posterior-to-anterior force applied by the primary thoracic driver 371A to the rib cage of the person 302, as indicated by the arrow 539, can be opposed by the anterior-to-posterior force applied to the rib cage by the anterior thoracic driver 411A.

FIG. 77A shows a perspective view of the proximal thoracic driver 383 from a point of view looking downward toward an inner side of the proximal thoracic driver 383, in accordance with some embodiments of the present invention. FIG. 77B shows a perspective view of the proximal thoracic driver 383 from a point of view looking upward toward the inner side of the proximal thoracic driver 383, in accordance with some embodiments of the present invention. FIG. 77C shows a top view of the proximal thoracic driver 383, in accordance with some embodiments of the present invention. FIG. 77D shows a view of the proximal thoracic driver 383 from a point of view looking toward the inner side of the proximal thoracic driver 383, in accordance with some embodiments of the present invention. The proximal thoracic driver 383 includes an inner surface region 545, an outer surface region 547, a top surface region 549, a bottom surface region 551, an anterior surface region 553, and a posterior surface region 555. The inner surface region 545 has a contact region 557 that contact the upper rib cage of the person 302. The inner surface region 545 is contoured to substantially match the shape of the portion of the upper rib cage of the person 302 that is to be contacted by the contact region 557.

FIG. 77E shows an example position and orientation of the proximal thoracic driver 383 when applied to the upper rib cage of the person 302, from a point of view looking toward the front of the person 302, in accordance with some embodiments of the present invention. FIG. 77F shows an example position and orientation of the proximal thoracic driver 383 when applied to the upper rib cage of the person 302, from a point of view looking toward the back of the person 302, in accordance with some embodiments of the present invention. The proximal thoracic driver 383 is configured to apply a posterior-to-anterior force to the upper thoracic rib hump, as indicated by arrow 559 in FIG. 77E. In most scoliotic spinal configuration, the upper thoracic rib hump is located laterally opposite and superior to the primary thoracic rib hump. The proximal thoracic driver 383 is also configured to apply a lateral-to-medial force to the lateral rib cage of the person 302, as indicated by arrow 561 in FIG. 77E, to apply corrective pressure to the upper portion of the scoliotic thoracic curve up to an apex of the scoliotic proximal thoracic curve. The proximal thoracic driver 383 also applies a posterior/lateral-to-anterior/medial force to the rib cage of the person 302, as indicated by arrow 563 in FIG. 77E. As shown in FIGS. 77E and 77F, the proximal thoracic driver 383 is applied to the person 302 with a downward tilt in the posterior-to-anterior direction that substantially matches the angle of the ribs contacted by the contact region 557.

The proximal thoracic driver 383 is configured to contact a left side of the upper rib cage of the person 302. However, for scoliotic configurations that require application of force to the right side of the upper rib cage of the person 302, a proximal thoracic driver 383A can be used, as shown in FIGS. 78A through 78F. The proximal thoracic driver 383A is configured in a laterally mirrored manner relative to the proximal thoracic driver 383. FIG. 78A shows a perspective view of the proximal thoracic driver 383A from a point of view looking downward toward an inner side of the proximal thoracic driver 383A, in accordance with some embodiments of the present invention. FIG. 78B shows a perspective view of the proximal thoracic driver 383A from a point of view looking upward toward the inner side of the proximal thoracic driver 383A, in accordance with some embodiments of the present invention. FIG. 78C shows a top view of the proximal thoracic driver 383A, in accordance with some embodiments of the present invention. FIG. 78D shows a view of the proximal thoracic driver 383A from a point of view looking toward the inner side of the proximal thoracic driver 383A, in accordance with some embodiments of the present invention. The proximal thoracic driver 383A includes an inner surface region 545A, an outer surface region 547A, a top surface region 549A, a bottom surface region 551A, an anterior surface region 553A, and a posterior surface region 555A. The inner surface region 545A has a contact region 557A that contact the upper rib cage of the person 302. The inner surface region 545A is contoured to substantially match the shape of the portion of the upper rib cage of the person 302 that is to be contacted by the contact region 557A.

FIG. 78E shows an example position and orientation of the proximal thoracic driver 383A when applied to the upper rib cage of the person 302, from a point of view looking toward the front of the person 302, in accordance with some embodiments of the present invention. FIG. 78F shows an example position and orientation of the proximal thoracic driver 383A when applied to the upper rib cage of the person 302, from a point of view looking toward the back of the person 302, in accordance with some embodiments of the present invention. The proximal thoracic driver 383A is configured to apply a posterior-to-anterior force to the upper thoracic rib hump, as indicated by arrow 559A in FIG. 78E. The proximal thoracic driver 383A is also configured to apply a lateral-to-medial force to the lateral rib cage of the person 302, as indicated by arrow 561A in FIG. 78E, to apply corrective pressure to the upper portion of the scoliotic thoracic curve up to an apex of the scoliotic proximal thoracic curve. The proximal thoracic driver 383A also applies a posterior/lateral-to-anterior/medial force to the rib cage of the person 302, as indicated by arrow 563A in FIG. 78E. As shown in FIGS. 78E and 78F, the proximal thoracic driver 383A is applied to the person 302 with a downward tilt in the posterior-to-anterior direction that substantially matches the angle of the ribs contacted by the contact region 557A.

FIG. 79A shows a back view of the person 302 with a combination of the lumbar derotator driver 395, the primary thoracic driver 371, the anterior thoracic driver 411, and the proximal thoracic driver 383 applied to the person 302, in accordance with some embodiments of the present invention. FIG. 79B shows a front view of the person 302 with the combination of the lumbar derotator driver 395, the primary thoracic driver 371, the anterior thoracic driver 411, and the proximal thoracic driver 383 applied to the person 302, in accordance with some embodiments of the present invention. FIG. 79C shows a left side view of the person 302 with the combination of the lumbar derotator driver 395, the primary thoracic driver 371, the anterior thoracic driver 411, and the proximal thoracic driver 383 applied to the person 302, in accordance with some embodiments of the present invention. It should be understood that for various scoliotic spinal configurations, any one or more of the lumbar derotator driver 395, the primary thoracic driver 371, the anterior thoracic driver 411, and the proximal thoracic driver 383 can be used to apply corrective forces to the spinal column of the person 302 to release spinal contractures associated with the scoliotic spinal configuration of the person 302. Therefore, for some scoliotic spinal configurations, any one or more of the lumbar derotator driver 395, the primary thoracic driver 371, the anterior thoracic driver 411, and the proximal thoracic driver 383 may not be required to apply corrective forces to the spinal column of the person 302 to release spinal contractures associated with the scoliotic spinal configuration of the person 302. For most scoliotic spinal configurations that include a scoliotic curve in the lumbar spinal region, the lumbar derotator driver 395 can be applied. And, for most scoliotic spinal configurations that include at least one thoracic curve, the primary thoracic driver 371 and the anterior thoracic driver 411 can be applied, with the proximal thoracic driver 383 optionally applied as needed.

FIG. 80A shows a back view of the person 302 with a combination of the lumbar derotator driver 395A, the primary thoracic driver 371A, the anterior thoracic driver 411A, and the proximal thoracic driver 383A applied to the person 302, in accordance with some embodiments of the present invention. FIG. 80B shows a front view of the person 302 with the combination of the lumbar derotator driver 395A, the primary thoracic driver 371A, the anterior thoracic driver 411A, and the proximal thoracic driver 383A applied to the person 302, in accordance with some embodiments of the present invention. FIG. 80C shows a right side view of the person 302 with the combination of the lumbar derotator driver 395A, the primary thoracic driver 371A, the anterior thoracic driver 411A, and the proximal thoracic driver 383A applied to the person 302, in accordance with some embodiments of the present invention. It should be understood that for various scoliotic spinal configurations, any one or more of the lumbar derotator driver 395A, the primary thoracic driver 371A, the anterior thoracic driver 411A, and the proximal thoracic driver 383A can be used to apply corrective forces to the spinal column of the person 302 to release spinal contractures associated with the scoliotic spinal configuration of the person 302. Therefore, for some scoliotic spinal configurations, any one or more of the lumbar derotator driver 395A, the primary thoracic driver 371A, the anterior thoracic driver 411A, and the proximal thoracic driver 383A may not be required to apply corrective forces to the spinal column of the person 302 to release spinal contractures associated with the scoliotic spinal configuration of the person 302. For most scoliotic spinal configurations that include a scoliotic curve in the lumbar spinal region, the lumbar derotator driver 395A can be applied. And, for most scoliotic spinal configurations that include at least one thoracic curve, the primary thoracic driver 371A and the anterior thoracic driver 411A can be applied, with the proximal thoracic driver 383A optionally applied as needed.

In order to fully release spinal contractures, it is often necessary to use the SFT 300 to bend the spine in direction(s) opposite of the scoliotic curvature(s) past the point of straightness (alignment to the sacral line) in order to provide enough spinal flexibility to enable correction of the scoliotic configuration using various neuromuscular exercise devices. The SFT 300 can be used to overcorrect spinal contractures so that shortened spinal ligaments are stretched enough to enable the spine to be placed into a corrective posture. In the thoracolumbar spinal region, a healthy spine should be able to bend about 30 degrees laterally in both left and right directions. Therefore, in some embodiments, the SFT 300 is applied to release spinal contractures so that the thoracolumbar region of the spine can bend up to about 30 degrees laterally in both left and right directions. However, for more advanced scoliosis, the vertebrae can grow larger on one side, resulting in a structural scoliosis. In cases of such advanced scoliosis, there may be a limit to how much the spine can be straightened. However, if the scoliosis is caught early enough, particularly while the vertebrae are still growing, the SFT 300 can be used to release spinal contractures so that a corrective device, such as a brace, can be used to hold the spine in a straight or even overcorrected configuration over long periods of time to allow for more normal growth of the vertebrae. But, before the person 302 can be properly fitted into a corrective device, e.g., brace, it must be possible to get the spine of the person 302 straight enough to fit into the corrective device. Straightening of the spine from the scoliotic configuration requires release of spinal contractures that bind the spine. The SFT 300 configurations disclosed herein can be used to release spinal contractures that bind the spine in the scoliotic configuration.

In some embodiments, after the scoliotic configuration of the spine is characterized, an appropriate therapeutic configuration of the SFT 300 is prescribed to work toward straightening of the spine from the characterized scoliotic configuration and provide corresponding release of spinal contractures. The SFT 300 is used to release spinal contractures, e.g., stretch shortened ligaments and muscles on the concave side of the scoliotic curvatures. However, the SFT 300 is used as a part of a broader scoliosis treatment plan. In other words, the SFT 300 is used to make the spine more flexible by releasing spinal contractures, but the SFT 300 alone does not fully correct the scoliosis. In some embodiments, a progression in treatment of scoliosis includes first addressing a root cause of the scoliosis that is making the spinal column want to coil down, which is usually a tight spinal cord. This first part of the scoliosis treatment can include performance of nerve stretching exercises to stretch the nerves of the spinal cord so that the spine can begin to uncoil from the scoliotic configuration. Then, the SFT 300 can be used to release spinal contractures to allow further straightening of the spine out of the scoliotic configuration. Then, once the SFT 300 has been used to enable straightening (or even overcorrecting) of the spine, the person 302 can be fitted into a long-duration brace to allow for contraction of over-elongated spinal ligaments and corrective growth of vertebrae. Also, the patient can begin using spinal training devices to develop neuromuscular function, support, and strength for holding the spine in the straightened configuration. It should be understood that while the progression of treatment may start with nerve stretching and move to release of contractures and then move into spinal bracing and neuromuscular training, the nerve stretching and use of the SFT 300 to release contractures can continue to be done in combination with each other and in combination spinal bracing and neuromuscular training until full reversal of the scoliotic configuration is achieved. In other words, the SFT 300 can continue to be used in conjunction with nerve stretching exercises, spinal bracing, and/or neuromuscular training to keep working on further release of the spinal contractures.

FIG. 81 shows a flowchart of a method for fitting the person 302 into the SFT 300, in accordance with some embodiments of the present invention. The method includes an operation 8101 in which the person 302 is seated on the seat 315 with all belts (seat belt 413, iliac crest belt 417, lumbar belt 355, and sternal belt 347) of the SFT 300 loosened/unconnected and with all drivers (lumbar derotator driver 395, anterior thoracic driver 411, primary thoracic driver 371, and proximal thoracic driver 383) of the SFT 300 withdrawn from contact with the person 302. An operation 8102 is then performed to stabilize the pelvis of the person 302. In some embodiments, the operation 8102 includes wrapping the seat belt 413 around the pelvis of the person 302, and connecting and tightening the seat belt 413 so that the pelvis of the person 302 is strapped down to the seat 315. In some embodiments, the operation 8102 includes application of posterior-to-anterior pressure against the knees of the person 302. In some embodiments, the operation 8102 includes use of a rigid bar and/or pad to stabilize the pelvis of the person 302.

The method also includes an operation 8103 in which the pelvic side restraints 359A and 359B are positioned on the sides of the hips of the person 302 to assist with lateral anchoring of the pelvis of the person 302. In various embodiments, the operation 8103 can be performed either before or in conjunction with operation 8101. In some embodiments, the pelvic side restraint 359A/359B located on the side of the person 302 that is contacted by the lumbar belt 355 has a flat inner surface. Also, in some embodiments, the pelvic side restraint 359A/359B located on the side of the person 302 where the lumbar belt ratchet 351 is located has a contoured inner surface. In some embodiments, the contoured inner surface of the pelvic side restraint 359A/359B is provided by the inside pad 359A3/359B3. The shape of the contoured inner surface of the pelvic side restraint 359A/359B is configured to contact the top of the pelvis of the person 302 more than the bottom of the pelvis. Therefore, the contoured inner surface of the pelvic side restraint 359A/359B can be configured to induce a tilting of the pelvis that helps resist a corrective force applied to the lumbar spinal region of the person 302 by the lumbar belt 355. A example of the contoured inner surface of the pelvic side restraint 359A/359B is shown by the inside pad 359B3 in FIG. 57.

The method continues with an operation 8105 in which the lumbar belt 355 is wrapped around the person 302 and connected to the lumbar belt ratchet 351 and tightened to apply a corrective force to the lumbar spinal region of the person 302. The lumbar belt 355 is positioned to contact the person under the convexity of the lumbar spinal curve of the person 302. The corrective force applied by lumbar belt 355 has two primary effects on the pelvic position of the person 302. First, the corrective force applied by the lumbar belt 355 will make the pelvis of the person 302 want to move laterally (sideways), but the pelvic side restraint 359A/359B stops/resists that pelvic movement. Second, the corrective force applied by the lumbar belt 355 also makes the pelvis want to rotate in the coronal plane of the person 302 (essentially the left side of the pelvis is rotated up while the right side of the pelvis is rotated down, or vice-versa). Rotation of the pelvis in the coronal plane of the person 302 resulting from the force applied by the lumbar belt 355 to the person 302 may prevent correction of the scoliotic lumbar curve. In some embodiments, the contoured inner surface of the pelvic side restraint 359A/359B is configured to contact the iliac crest of the pelvis without substantially contacting the lower portion of the pelvis. This configuration of the contoured inner surface of the pelvic side restraint 359A/359B has a rotational effect on the pelvis that counters the pelvic rotation caused by the force applied by the lumbar belt 355 to the person 302.

The method also includes an operation 8107 in which the iliac crest belt 417 is positioned to extend over the iliac crest of the person 302 on the same side of the person 302 that is contacted by the lumbar belt 355. The operation 8107 also includes tightening of the iliac crest belt 417 to prevent lifting of the pelvis of the person 302 on the side of the person 302 contacted by the lumbar belt 355. In some embodiments, the iliac crest belt 417 extends from a location on the front of the chair structure 301 (usually between the legs of the person 302, but not always), over the iliac crest of the pelvis of the person 302 on the side of the person 302 contacted by the lumbar belt 355 (on the convex side of the scoliotic lumbar curve), and to a location on the back of the chair structure 301. In some embodiments, if the person 302 has a right scoliotic lumbar curve, the left pelvic side restraint 359A has the contoured inner surface, and the iliac crest belt 417 extends over the right iliac crest of the pelvis of the person 302, and the lumbar belt 355 contacts the right side of the person 302 to apply a right-to-left lateral-to-medial force to the lumbar spinal region of the person 302. In some embodiments, if the person 302 has a left scoliotic lumbar curve, the right pelvic side restraint 359B has the contoured inner surface, and the iliac crest belt 417 extends over the left iliac crest of the pelvis of the person 302, and the lumbar belt 355 contacts the left side of the person 302 to apply a left-to-right lateral-to-medial force to the lumbar spinal region of the person 302. In the above-mentioned embodiments, both the contoured inner surface of the pelvic side restraint 359A/359B and the iliac crest belt 417 serve to resist rotational forces applied to the pelvis of the person 302 by the lumbar belt 355.

In some embodiments, to help with getting the iliac crest belt 417 to stay on the iliac crest of the person 302, the lumbar belt 355 can be tightened to move tissues of the person 302 so as to expose the top of the iliac crest of the pelvis. Then, the iliac crest belt 417 can be positioned to extend from the front of the chair structure 301, over the exposed top of the iliac crest of the pelvis, and downward at an angle toward the opposite side of the person 302 to connect to the back of the chair structure 301. In this manner, the iliac crest belt 417 is configured to pull in a superior/lateral-to-inferior/medial direction across the back pelvis of the person 302, which imparts a rotational force to the pelvis relative to the transverse plane of the person 302 that helps resist the force applied by the lumbar derotator driver 395 to the lumbar spinal region of the person 302.

The method proceeds with an operation 8109 in which the lumbar derotator driver 395 is moved to a position to engage with the lumbar or thoracolumbar spinal region of the person 302. The lumbar or thoracolumbar spinal region of the person 302 will align with the lumbar derotator driver 395 when the lumbar belt 355 is tightened into its therapeutic position. The lumbar derotator driver 395 is aligned to contact the lamina of one or more of the lumbar or thoracolumbar vertebrae at location(s) adjacent to the spinous process(es) of the one or more lumbar or thoracolumbar vertebrae, and on the articular pillar(s) of the one or more lumbar or thoracolumbar vertebrae where the facet joints are located, because this is a strong bony structure that can be pushed on. The lumbar derotator driver 395 is positioned to avoid pushing on the spinous process(s) of the one or more lumbar or thoracolumbar vertebrae because they are more fragile structures and could be damaged by the force applied by lumbar derotator driver 395. In some embodiments, the seat belt 413 is configured to pull more on a same lateral side of the person 302 that is contacted by the lumbar derotator driver 395. This extra pull by the seat belt 413 can impart rotational force to the pelvis relative to the transverse plane of the person 302, which assists with counteracting the force applied by the lumbar derotator driver 395 to the lumbar or thoracolumbar region of the spine, such that as the lumbar derotator driver 395 pushes into the tissues of the person 302 in the posterior-to-anterior direction, the pelvis of the person 302 does not move. In some embodiments, a cam buckle is used to tighten the seat belt 413 on the same lateral side of the person 302 that is contacted by the lumbar derotator driver 395.

At this point in the method, SFT 300 is configured to straighten and derotate the scoliotic lumbar curve of the person 302. Now, the thoracolumbar portion of the scoliotic curve needs to be pushed back over by the SFT 300. For this, the method includes an operation 8111 for positioning the primary thoracic driver 371 to engage the ribs of the person 302 and push the thoracolumbar portion of the scoliotic curve back over into a straightened or overcorrected position. In some embodiments, the primary thoracic driver 371 is positioned to apply enough force to the person 302 to reverse (mirror) the scoliotic curve in the thoracolumbar region of the spine. It should be appreciated that the primary thoracic driver assembly 361 is configured so that the primary thoracic driver 371 can be positioned at essentially any required location and orientation to match the contour of the rib cage of the person 302. Also, in some embodiments, the primary thoracic driver assembly 361 is configured so that the forces applied by the primary thoracic driver 371 to the rib cage of the person 302 can include an inferior-to-superior force component or a superior-to-inferior force component, if needed. For a thoracolumbar scoliotic curve, the primary thoracic driver 371 can be applied to push both the upper part of the scoliotic lumbar curve and the lower part of the scoliotic thoracic curve. Also, for a thoracolumbar scoliotic curve, the tipping point vertebra can be made level by the primary thoracic driver 371.

If needed, the method can also include an operation 8113 for positioning the proximal thoracic driver 383 to engage the ribs of the person 302 and push the upper thoracic spine from the side of the person 302 opposite of the primary thoracic driver 371. Also, the method can include an operation 8115 in which the sternal belt 347 is wrapped around the front sternum region of the person 302 and tightened to pull the person 302 toward the back of the SFT 300 to oppose the posterior-to-anterior forces applied by the lumbar derotator driver 395, the primary thoracic driver 371, and the proximal thoracic driver 383. In some embodiments, the sternal belt 347 is positioned to go under the arms of the person 302. Also, in some embodiments, the sternal belt 347 can be positioned to apply a rotational effect to the upper rib cage of the person 302.

In some embodiments, after the person is fitted into the SFT 300, with SFT 300 in the upright position, an operation 1815 is performed to recline the SFT 300 backward. In this manner, the force of gravity is used to assist in derotation of the scoliotic twist of the spine. More specifically, with the SFT 300 in the reclined position, the force of gravity assists in pulling the person 302 into the lumbar derotator driver 395. Also, the force of gravity will pull person 302 into the primary thoracic driver 371 and/or the proximal thoracic driver 383, when the primary thoracic driver 371 and/or proximal thoracic driver 383 is positioned to apply a posterior-to-anterior force component to the rib cage of the person 302. The amount of recline of the SFT 300 is set based on how much gravity assist is desired. In various embodiments, the SFT 300 is configured to recline to essentially any prescribed angle as measured between a back of the chair structure 301 and the floor. Also, for negative angles of SFT 300 recline, attention is paid to ensure the blood pooling the head of the person 302 does not occur. Derotation of the scoliotic twist is a key component of unlocking and reversing the scoliotic configuration of the person 302. Derotation of the scoliotic twist enables significantly more correction in the lateral scoliotic curves.

In some embodiments, the seat 315 of the SFT 300 is flat. However, in some embodiment, the seat 315 of the SFT 300 can be angled to be higher in the back than the front. Such downward angling of the seat 315 allows the knees of the person 302 to be lowered relative to the hips of the person 302, which allows the spine of the person 302 to go into extension easier, which helps with derotation of the scoliotic twist of the spine of the person 302. Also, downward angling of the seat 315 allows the hips of the person 302 to come out of flexion into more extension, which allows the pelvis of the person 302 to move with the hip extension to open up the lumbar spine. In various embodiments, the SFT 300 can be configured to enable downward angling of the seat 315 at essentially any angle within a range extending from zero up to about 90 degrees. In some embodiments, the SFT 300 is configured to provide for downward angling of the seat 315 after the patient is fitted into the SFT 300 in the upright position. And, in some embodiments, the SFT 300 is configured to provide for downward angling of the seat 315 after the SFT 300 is reclined.

Viscoelastic creep of ligaments is expected to occur somewhere in the range of 15 minutes to 20 minutes of stretching of the ligaments. In some embodiments, a treatment session using the SFT 300 includes keeping the person 302 in the therapeutic position within the SFT 300 for a duration within a range extending from about 21 minutes to about 30 minutes. For a more intense treatment session using the SFT 300 (when the scoliotic configuration is straightened/reversed to a greater amount), the duration of the treatment session using the SFT 300 may be more toward the lower end of the range (near about 21 minutes). And, for less intense treatment session using the SFT 300 (when the scoliotic configuration is straightened/reversed to a lesser amount), the duration of the treatment session may be more toward the upper end of the range (30 minutes). However, it should be understood that in various embodiments, the duration of a treatment session using the SFT 300 can be set to essentially any prescribed amount of time. Also, the intensity of a treatment session using the SFT 300 (the amount stretching applied to scoliotic contractures by the SFT 300) can be set based on the tolerance of the person 302.

In some embodiments, any one or more of the lumbar derotator driver 395, the anterior thoracic driver 411, the primary thoracic driver 371, and the proximal thoracic driver 383 can be formed of a polyurethane foam material or of a polyethylene foam material. In some embodiments, the foam material used to form any one or more of the lumbar derotator driver 395, the anterior thoracic driver 411, the primary thoracic driver 371, and the proximal thoracic driver 383 has a density within a range extending from about 3 pounds per cubic foot ($lb/ft^3$) to about 10 $lb/ft^3$, or has a density of about 6 $lb/ft^3$. In some embodiments, any one or more of the lumbar derotator driver 395, the anterior thoracic driver 411, the primary thoracic driver 371, and the proximal thoracic driver 383 can be formed to have a semi-rigid or rigid inner core of foam (such as polyurethane or polyethylene foam) with an outer layer of orthotic material over surface(s) that may come into contact with the person 302. For example, in some embodiments, the outer layer of orthotic material may be formed of a thermoplastic closed-cell foam, such as AliPlast™ 4 E provided by AliMed, Inc., or Volara Type S provided by Sekisui Voltek, LLC, other similar material. Also, in various embodiments, a padding or liner material can be placed on the side of any one or more of the seat belt 413, iliac crest belt 417, lumbar belt 355, and sternal belt 347 that contacts the person 302. For example, in some embodiments, Valeo padding by Valeo Technologies LLC, or Plastazote® foam by Zotefoams plc, or foam rubber padding, or other similar material, can be placed on the side of any one or more of the seat belt 413, iliac crest belt 417, lumbar belt 355, and sternal belt 347 that contacts the person 302.

In various embodiments, the therapeutic positions of any one or more of the pelvic side restraints 359A and 359B, the seat belt 413, the iliac crest belt 417, the lumbar belt 355, and the sternal belt 347 can be marked with reference to a structure of the SFT 300 so that when the person 302 is fitted into the SFT 300 for a treatment session the lumbar derotator driver 395 will contact the correct part of the lumbar spinal region of the person 302. Also, in various embodiments, any one or more of the seat belt 413, the iliac crest belt 417, the lumbar belt 355, the sternal belt 347, the lumbar derotator driver 395, the anterior thoracic driver 411, the primary thoracic driver 371, and the proximal thoracic driver 383 can be equipped with a position measurement device and/or a force measurement device. In some embodiments, the position measurement device can determine and record a position of a given component relative to a reference coordinate system of the SFT 300. In some embodiments, the reference coordinate system of the SFT 300 is indexed to a particular location on the chair structure 301. However, in other embodiments, the reference coordinate system of the SFT 300 can be indexed to essentially any location on the SFT 300 that is intended to remain in a fixed location during fitting of the person 302 into the SFT 300. In some embodiments, the force measurement device can determine and record a force applied to the person 302 by a given component of the SFT 300. In some embodiments, the force measurement device used with a given component can measure the force applied to the person 302 by the given component is multiple directions. In this manner, in various embodiments, the positions and orientations within the reference coordinate system of the SFT 300 of any one or more of the seat belt 413, the iliac crest belt 417, the lumbar belt 355, the sternal belt 347, the lumbar derotator driver 395, the anterior thoracic driver 411, the primary thoracic driver 371, and the proximal thoracic driver 383 can be determined and monitored at any time. Also, in various embodiments, one or more forces applied to the person 302 by any one or more of the seat belt 413, the iliac crest belt 417, the lumbar belt 355, the sternal belt 347, the lumbar derotator driver 395, the anterior thoracic driver 411, the primary thoracic driver 371, and the proximal thoracic driver 383 can be determined and monitored at any time. Also, in some embodiments, the SFT 300 can be equipped with one or more measurement devices to measure and record an amount of recline of the SFT 300. In view of the foregoing, it should be understood that in various embodiments therapeutic usage of the SFT 300 can be accurately measured, recorded, and monitored.

In some embodiments, the various measurement devices used to measure, record, and monitor the position, orientation, and/or applied force associated with any one or more of the seat belt 413, the iliac crest belt 417, the lumbar belt 355, the sternal belt 347, the lumbar derotator driver 395, the anterior thoracic driver 411, the primary thoracic driver 371, and the proximal thoracic driver 383 can be communicated from the SFT 300 to the cloud for essentially real-time access by a prescribing physician or therapy provider. In some embodiments, the SFT 300 is equipped with a data processing system that records all measured/monitored data associated with any one or more of the seat belt 413, the iliac crest belt 417, the lumbar belt 355, the sternal belt 347, the lumbar derotator driver 395, the anterior thoracic driver 411, the primary thoracic driver 371, and the proximal thoracic driver 383. In some embodiments, the SFT 300 is equipped with a data communication system that enables transmission of measured/monitored data associated with any one or more of the seat belt 413, the iliac crest belt 417, the lumbar belt 355, the sternal belt 347, the lumbar derotator driver 395, the anterior thoracic driver 411, the primary thoracic driver 371, and the proximal thoracic driver 383 to the cloud or to a specified server computing system. In various embodiments, the data communication system can be configured to communicate data in a wired and/or wireless manner. In some embodiments, the data communication system can be configured to communicate data using a cellular connection that does not require a connection through a local area network. It should be appreciated that in such embodiments, the prescribing physician or therapy provider will have access the usage data of the SFT 300 without reliance on the operability of a local area network that is out of the control of the prescribing physician or therapy provider. In such embodiments, the integrity of the usage data of the SFT 300 is maintained and the person 302 that is using the SFT 300 does not have to worry about performing an action to communicate data back to the prescribing physician or therapy provider.

It should be understood that the SFT 300 configurations described herein represent examples of many possible configurations of the SFT 300. In other embodiments, various components of the SFT 300 can have different sizes, shapes, configurations, positions, orientations, and/or connection mechanisms than what is shown by way of example herein.

In view of the foregoing, it should be understood and appreciated that the SFT 300, in its various embodiments, is an apparatus that provides for release of spinal contractures associated with scoliosis of the human spine. The SFT 300 includes the chair structure 301 having a front side, a back side, a left side, and a right side. The seat belt 413 is connected to the chair structure 301. The seat belt 413 is configured to wrap around a pelvis of a person when the person is fitted into the SFT 300. The seat belt 413 is configured to connect at each of two ends to the back side of the chair structure 301. The seat belt 413 is configured to assist with anchoring of a pelvis of the person to the chair structure 301. The SFT 300 also includes the lumbar belt 355 connected to the chair structure 301. The lumbar belt 355 is configured to wrap around a lower abdominal region of the person when the person is fitted into the SFT 300. The lumbar belt 355 is configured to pull into a side of the person in a lateral-to-medial direction so as to move a scoliotic curve in a lumbar or thoracolumbar spinal region of the person toward a non-scoliotic lumbar spinal configuration.

The SFT 300 also includes the lumbar derotator driver 395 connected to the chair structure 301. The lumbar derotator driver 395 is configured to apply a therapeutic force to a prescribed posterior/lateral side of vertebrae in the lumbar spinal region of the person when the person is fitted into the SFT 300 and when the lumbar belt 355 is pulled into the side of the person in the lateral-to-medial direction.

In some embodiments, the lumbar belt 355 is connected to one or more vertical posts that are connected to either the right side of the chair structure 301 or the left side of the chair structure 301. In some embodiments, the lumbar belt 355 is connected to a lumbar belt ratchet that is configured to provide for tightening of the lumbar belt 355. In some embodiments, the lumbar belt ratchet is connected to one or more vertical posts that are connected to the chair structure 301. In some embodiments, a lumbar belt extension post is connected to a same side of the chair structure 301 to which the lumbar belt ratchet is connected. The lumbar belt 355 is wrapped around an outer portion of the lumbar belt extension post. The lumbar belt extension post is positioned to extend forward a front pull location of the lumbar belt 355 to prevent the lumbar belt 355 from pulling into an anterior abdominal portion of the person when the person is fitted into the SFT 300 and/or to provide a posterior-to-anterior corrective force to the lumbar or thoracolumbar spinal region of the person.

In some embodiments, the lumbar derotator driver 395 is connected to a vertical post that is connected to the back side of the chair structure 301. In some embodiments, the lumbar derotator driver 395 includes a front surface region that includes a contact region that is substantially flat. In some embodiments, the front surface region of the lumbar derotator driver 395 is configured to contour in an anterior/medial-to-posterior/lateral direction away from the contact region. In some embodiments, a lower surface region of the lumbar derotator driver 395 is configured to have a concave curvature to avoid interference with the lumbar derotator driver 395 by the pelvis of the person as the lumbar derotator driver 395 pushes into the tissues of the person in a posterior-to-anterior direction when the person is fitted into the SFT 300. In some embodiments, a position of the lumbar derotator driver 395 relative to the chair structure 301 is adjustable to provide for positioning of the lumbar derotator driver 395 to contact the lumbar or thoracolumbar spinal region of the person on the convex side of the scoliotic curve in the lumbar or thoracolumbar spinal region, at and below an apex of the scoliotic lumbar curve in the lumbar or thoracolumbar spinal region, when the person is fitted into the SFT 300.

In some embodiments, the SFT 300 includes the iliac crest belt 417 connected to the chair structure 301. The iliac crest belt 417 is configured to extend over an iliac crest of the person on the side of the person that the lumbar belt 355 is pulled into when the person is fitted into the SFT 300. The iliac crest belt 417 is configured to have a first end connected to the front side of the chair structure 301 and a second end connected to the back side of the chair structure 301. The iliac crest belt 417 is configured to assist with anchoring of the pelvis of the person to the chair structure 301. In some embodiments, the first end of the iliac crest belt 417 is connected to the front side of the chair structure 301 at a location between the legs of the person, and the second end of the iliac crest belt 417 is connected to the back side of the chair structure 301 at a location near a sacral line of the person when the person is fitted into the SFT 300. In some embodiments, the iliac crest belt 417 is configured and positioned to apply a rotational force component to the pelvis of the person that opposes the therapeutic force applied to the person by the lumbar belt 355 and/or the primary thoracic driver 371 and/or other driver when the person is fitted into the SFT 300. More specifically, the iliac crest belt 417 applies a rotational force to the pelvis of the person that opposes the rotation induced into the pelvis when the lumbar belt 355 and/or primary thoracic driver 371 induces lateral translation of the torso relative to the pelvis.

In some embodiments, the SFT 300 includes the primary thoracic driver 371 connected to the chair structure 301. The primary thoracic driver 371 has a contact surface configured to apply a therapeutic force to a lateral side of a rib cage of the person on a side of a primary scoliotic thoracic convexity of the person when the person is fitted into the SFT 300. In some embodiments, the primary thoracic driver 371 is connected to a vertical post that is connected to either the right side of the chair structure 301 or the left side of the chair structure 301. In some embodiments, a position of the primary thoracic driver 371 relative to the chair structure 301 is adjustable to provide for positioning of the primary thoracic driver 371 to apply a spinal de-rotational force and/or apply a lateral-to-medial force to the rib cage of the person, at and below an apex of the primary scoliotic thoracic convexity of the person, when the person is fitted into the SFT 300. In some embodiments, the primary thoracic driver 371 has a top surface region that includes a cutout region, where the cutout region is configured so that the contact surface of the primary thoracic driver 371 does not substantially contact the lateral side of the rib cage of the person above the apex of the primary scoliotic thoracic convexity of the person when the person is fitted into the SFT 300. In some embodiments, the primary thoracic driver 371 is positioned in a tilted manner so that a posterior end of the primary thoracic driver 371 is at a vertically higher position than an anterior end of the primary thoracic driver 371 relative to the person when the person is fitted into the SFT 300.

In some embodiments, the SFT 300 includes the proximal thoracic driver 383 connected to the chair structure 301. The proximal thoracic driver 383 has a contact surface configured to apply a therapeutic force to a lateral side of the rib cage of the person on a side of the chair structure 301 opposite from where the primary thoracic driver 371 is positioned. In some embodiments, the contact surface of the proximal thoracic driver 383 is contoured to substantially match a shape of the rib cage of the person that is to be contacted by the contact surface of the proximal thoracic driver 383. In some embodiments, the proximal thoracic driver 383 is configured to apply a lateral-to-medial force to the rib cage of the person. In some embodiments, the proximal thoracic driver 383 is configured to apply a posterior-to-anterior force in combination with the lateral-to-medial force to the rib cage of the person. In some embodiments, the proximal thoracic driver 383 is positioned in a tilted manner so that a posterior end of the proximal thoracic driver 383 is at a vertically higher position than an anterior end of the proximal thoracic driver 383 relative to the person when the person is fitted into the SFT 300.

In some embodiments, the SFT 300 includes the anterior thoracic driver 411 connected to the chair structure 301. The anterior thoracic driver 411 has a contact surface configured to apply a therapeutic force to an anterior-lateral side of the rib cage of the person on when the person is fitted into the SFT 300. In some embodiments, a position of the anterior thoracic driver 411 elative to the chair structure 301 is adjustable to provide for positioning of the anterior thoracic driver 411 to apply an anterior-to-posterior force to the rib cage of the person at a vertical level of an apex of a scoliotic thoracic curve of the person when the person is fitted into the SFT 300. In some embodiments, the anterior thoracic driver 411 is configured to have a thinner posterior-to-anterior thickness at the inner surface region of the anterior thoracic driver 411 and a thicker posterior-to-anterior thickness at an outer surface region of the anterior thoracic driver 411, in combination with a thinner posterior-to-anterior thickness at a top surface region of the anterior thoracic driver 411 and a thicker posterior-to-anterior thickness at a bottom surface region of the anterior thoracic driver 411. One significant aspect of the thicker posterior-to-anterior thickness at the bottom surface region of the anterior thoracic driver 411 is that the rib cage is more flexible toward the bottom than the top. Therefore, deeper pressures are necessary and allowed at the bottom of the rib cage relative to the top of the rib cage. In some embodiments, the anterior thoracic driver 411 is configured such that a lateral width of the top surface region of the anterior thoracic driver 411 is wider than a lateral width of the bottom surface region of the anterior thoracic driver 411. In some embodiments, the contact surface of the anterior thoracic driver 411 is contoured to substantially match a shape of the rib cage of the person that is to be contacted by the contact surface of the anterior thoracic driver 411. In some embodiments, a top surface region of the anterior thoracic driver 411 includes a superior-to-inferior concaved region to provide for positioning of the anterior thoracic driver 411 around breast tissue of the person when the person is fitted into the SFT 300. In some embodiments, the contact surface of the anterior thoracic driver 411 is contoured to substantially match both the shape and the pliability of the rib cage, such that the anterior thoracic driver 411 pushes harder where the rib cage is more flexible and pushes softer where the rib cage is more rigid.

In some embodiments, the SFT 300 includes a sternal belt 347 connected to the chair structure 301. The sternal belt 347 is configured to wrap around an upper thoracic region of the person and under each arm of the person when the person is fitted into the SFT 300. The sternal belt 347 is configured to hold the upper thoracic region of the person toward a back of the SFT 300. In some embodiments, the sternal belt 347 is connected to vertical posts that are connected to either the right side of the chair structure 301, or the left side of the chair structure 301, or the back side of the chair structure 301. In some embodiments, the sternal belt 347 is connected to a sternal belt ratchet that is configured to provide for tightening of the sternal belt 347, where the sternal belt ratchet is connected to vertical posts that are connected to the chair structure 301.

In some embodiments, the SFT 300 includes one or more tether straps configured and positioned to assist with securing a component of the SFT 300 in a particular spatial position, spatial orientation, or combination of spatial position and orientation relative to the chair structure 301. In some embodiments, the SFT 300 includes a kickstand assembly connected to the back of the SFT 300. The kickstand assembly is configured to provide a support upon which the SFT 300 rests when the SFT 300 is placed in a reclined position. Also, in some embodiments, the SFT 300 includes one or more armrests connected to the chair structure 301 by way of one or more corresponding arm rest supports.

FIG. 82 shows a flowchart of a method for treating a person having a scoliotic spinal configuration, in accordance with some embodiments of the present invention. The method includes an operation 8201 for anchoring a pelvis of the person to a chair structure, such as the chair structure of the SFT 300. The method also includes an operation 8203 for applying a first therapeutic force to a lumbar spinal region of the person to move the lumbar spinal region of the person in a lateral-to-medial direction of correction of a scoliotic lumbar spinal curve of the person. The method also includes an operation 8205 for applying a second therapeutic force in a posterior-to-anterior direction to a posterior-lateral portion of the lumbar spinal region of the person to derotate the lumbar spinal region of the person in a direction of correction of the scoliotic lumbar spinal curve of the person. In some embodiments, the method can also include an operation for reclining the chair structure such that a force of gravity increases the second therapeutic force.

In some embodiments, anchoring of the pelvis in operation 8201 includes preventing the pelvis from moving in a posterior-to-anterior direction on the chair structure when the first and second therapeutic forces are simultaneously applied. In some embodiments, anchoring of the pelvis in operation 8201 includes preventing the pelvis from moving in a lateral direction on the chair structure when the first and second therapeutic forces are simultaneously applied. In some embodiments, anchoring of the pelvis in operation 8201 includes preventing the pelvis from substantially rotating in a coronal plane of the person when the first and second therapeutic forces are simultaneously applied. In some embodiments, anchoring of the pelvis in operation 8201 includes preventing the pelvis from substantially rotating in a transverse plane of the person when the first and second therapeutic forces are simultaneously applied.

In some embodiments, the method further includes an operation for applying a third therapeutic force in a lateral-to-medial direction to a lateral side of a rib cage of the person at and below an apex of a primary scoliotic thoracic convexity of the person so as to move the spine of the person a direction of correction of a scoliotic curvature of the person. The third therapeutic force is applied in combination with both the first and second therapeutic forces. In some embodiments, the method further includes an operation for applying a fourth therapeutic force in an anterior-to-posterior direction to an anterior-lateral side of the rib cage of the person at a vertical level of an apex of a scoliotic thoracic curve of the person. In some embodiments, the fourth therapeutic force is also applied in a posterior-to-anterior direction. The fourth therapeutic force is applied in combination with the first, second, and third therapeutic forces.

In some embodiments, the method further includes an operation for applying a fifth therapeutic force in a lateral-to-medial direction to a lateral side of the rib cage of the person, at and above an apex of a primary scoliotic thoracic concavity of the person, so as to move the spine of the person a direction of correction of a scoliotic curvature of the person. The fifth therapeutic force is applied in combination with each of the first, second, third, and fourth therapeutic forces. In some embodiments, the method further includes an operation for pulling an upper thoracic region of the person in an anterior-to-posterior direction in combination with the first and second therapeutic forces, or in combination with the first, second, and third therapeutic forces, or in combination with the first, second, third, and fourth therapeutic forces, or in combination with the first, second, third, fourth, and fifth therapeutic forces.

It should also be appreciated that the SFT 300 provides for a multi-positional therapeutic treatment regime relative to gravity. In various embodiments, the SFT 300 can be positioned in any way that allows gravity to assist in the application of corrective forces to the spine by way of the SFT 300 drivers and belts. For example, in various embodiments, once the person is fitted in the SFT 300, the SFT 300 can be positioned in a recumbent position, or a supine position, or an inverted position, or a side-lying position, or a combination of recumbent/supine/inverted and side-lying position. It should be understood that the SFT 300 provides for the use of gravity to assist in the correction of the scoliosis, both in the lateral bending coronal plane, the rotatory transverse planes, as well as the sagittal plane. Also, in some embodiments, once the person is fitted within the SFT 300, the position of the legs of the person is adjusted to rotate femurs and pelvis in opposition to the rotation caused by translation of the body of the person. For example, in some embodiments, anterior-to-posterior axial pressure along the long-axis of the femur is applied at the knee, toward the pelvis, to stabilize the pelvis against the posterior-to-anterior forces of the lumbar spine.

Unlike prior scoliosis treatment devices, the SFT 300 disclosed herein provides the ability to have localized user-adjustable pressures, all of which can be individually adjusted. Also, the SFT 300 does not require tightening of all the localized user-adjustable pressures in synchrony. This ability afforded by the SFT 300 gives several advantages over a scoliosis treatment brace. For example, with the SFT 300 it is possible to apply a greater amount of force, such as a force that the patient may only be able to tolerate for 20-30 minutes, rather than 23 hours a day in a brace, which by nature requires a much lighter load. Also, with the SFT 300 it is possible to focus hyper-correction to the more "stuck" or contractured segments of the scoliosis, without having to apply the same increase of pressure to parts of the spine that do not need it. Also, with the SFT 300 it is possible to apply a much greater amount of de-rotation pressure than can be achieved in a brace (due to the adjustable forces and supine posture provided by the SFT 300), resulting in greater "unlocking" of the spine, and resulting in greater correction of the structural scoliosis curves. Also, with some embodiments of the SFT 300 it is possible to isolate rotational contractures that exist between apexes of scoliotic curves by actively moving the body of the person in the SFT 300.

The SFT 300 also provides for dynamic hyper-corrective lateral bending of the spine. In some embodiments, the dynamic hyper-corrective lateral bending of the spine is focused on an apical curve. An example of the dynamic hyper-corrective lateral bending of the spine is when the person is fitted in the SFT 300 with applied therapeutic pressures such that a right apex (left bent) thoracic scoliotic curve is hyper-corrected by being bent to the right. In some embodiments, the SFT 300 can include a mechanical rotational axis (a hinge point in the chair) in the coronal plane at any selected apex to enhance hyper-correction of coronal plane contractures.

The SFT 300 can also be used to provide for dynamic, hyper-correcting of a rotational vertebral deformity within various regions of the spinal column, including within a region between a lumbar curve apex and the pelvis, and/or within a region between a thoracic curve apex and a lumbar curve apex, and/or within a region between a proximal thoracic curve apex and a thoracic curve apex. In some embodiments, the SFT 300 can include a mechanical rotational axis (a hinge point in the chair) in the transverse plane between apexes of scoliotic curves to hypercorrect rotational contracture.

It should be understood that the SFT 300 provides for the hyper-correction of a structural scoliosis. In various embodiments, the SFT 300 can be used to progressively reduce the contractures of a scoliotic spine. For example, the SFT 300 can be used to initially reduce the scoliotic curve an amount approaching zero degrees temporarily (about 20 minutes). Then, the SFT 300 can be used to reduce the scoliotic curve to zero degrees temporarily (about 20 minutes). Then, the SFT 300 can be used to hyper-correct the scoliotic curve in the opposite direction of the scoliotic curve temporarily (about 20 minutes). By using the SFT 300 to hyper-correct the scoliotic curve, it is possible to achieve the greatest release of spinal contractures and correspondingly achieve the maximum most lasting return of the spinal column to a normal straight configuration at the end of treatment.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. An apparatus for release of spinal contractures associated with scoliosis of the human spine, comprising:

a chair structure;

a lumbar belt connected to the chair structure, the lumbar belt configured to wrap around a lower abdominal region of a person when the person is seated within the apparatus, the lumbar belt configured to pull into a first side of the person in a first lateral-to-medial direction without pulling into a second side of the person in a second lateral-to-medial direction, wherein the second side of the person is opposite the first side of the person relative to a sagittal plane of the person; and a lumbar derotator driver connected to the chair structure, the lumbar derotator driver configured to apply a therapeutic posterior-to-anterior force to a vertebrae in a lumbar spinal region of the person on a first posterior half of the vertebrae without applying a posterior-to-anterior force to a second posterior half of the vertebrae that is opposite of the first posterior half of the vertebrae when the person is seated on the chair structure, the first posterior half of the vertebrae being on the first side of the person, the second posterior half of the vertebrae being on the second side of the person, wherein the lumbar derotator driver includes a front surface region that includes a contact region that contacts the person when the person is seated on the chair structure, wherein the front surface region of the lumbar derotator driver is configured to contour in an anterior-to-posterior direction away from the contact region within a reference plane oriented parallel to a transverse plane of the person when the person is seated on the chair structure.

2. The apparatus as recited in claim 1, wherein the lumbar belt is connected to a lumbar belt ratchet that is configured to provide for tightening of the lumbar belt, and wherein the lumbar belt ratchet is connected to one or more vertical posts that are connected to the chair structure.

3. The apparatus as recited in claim 2, further comprising:

a lumbar belt extension post connected to a same side of the chair structure to which the lumbar belt ratchet is connected, wherein the lumbar belt is wrapped around an outer portion of the lumbar belt extension post, the lumbar belt extension post positioned to extend forward a front pull location of the lumbar belt.

4. The apparatus as recited in claim 1, wherein the lumbar derotator driver is connected to a vertical post that is connected to the chair structure.

5. The apparatus as recited in claim 4, wherein the contact region of the lumbar derotator driver is substantially flat.

6. The apparatus as recited in claim 5, wherein a lower surface region of the lumbar derotator driver is configured to have a concave curvature that avoids interference with the lumbar derotator driver by a pelvis of the person as the lumbar derotator driver pushes into the tissues of the person in a posterior-to-anterior direction when the person is seated on the chair structure.

7. The apparatus as recited in claim 1, wherein a position of the lumbar derotator driver relative to the chair structure is adjustable in both horizontal and vertical directions.

8. The apparatus as recited in claim 1, further comprising:

an iliac crest belt connected to the chair structure, the iliac crest belt configured to extend over an iliac crest of the person on the first side of the person that the lumbar belt is pulled into when the person is seated on the chair structure, the iliac crest belt having a first end connected to a front side of the chair structure and a second end connected to a back side of the chair structure.

9. The apparatus as recited in claim 8, wherein the first end of the iliac crest belt is connected to the front side of the chair structure at a location between the legs of the person when the person is seated on the chair structure, and wherein the second end of the iliac crest belt is connected to the back side of the chair structure at a location near a sacral line of the person when the person is seated on the chair structure.

10. The apparatus as recited in claim 8, wherein the iliac crest belt is configured and positioned to apply a rotational force component to a pelvis of the person when the person is seated on the chair structure.

11. The apparatus as recited in claim 1, further comprising:

a primary thoracic driver connected to the chair structure, the primary thoracic driver having a contact surface configured to apply a therapeutic force to a lateral side of a rib cage of the person when the person is seated on the chair structure.

12. The apparatus as recited in claim 11, wherein the primary thoracic driver is connected to a vertical post that is connected to either a right side of the chair structure or a left side of the chair structure.

13. The apparatus as recited in claim 12, wherein a position of the primary thoracic driver relative to the chair structure is adjustable.

14. The apparatus as recited in claim 13, wherein the primary thoracic driver has a top surface region that includes a cutout region, wherein the cutout region is configured so that the contact surface of the primary thoracic driver does not substantially contact the lateral side of the rib cage of the person above an apex of a primary scoliotic thoracic convexity of the person when the person is seated on the chair structure.

15. The apparatus as recited in claim 11, further comprising:

a proximal thoracic driver connected to the chair structure, the proximal thoracic driver having a contact surface configured to apply a therapeutic force to another lateral side of the rib cage of the person on an opposite side of the chair structure relative to a side of the chair structure at which the primary thoracic driver is positioned when the person is seated on the chair structure.

16. The apparatus as recited in claim 15, wherein the contact surface of the proximal thoracic driver is contoured to substantially match a shape of the rib cage of the person that is to be contacted by the contact surface of the proximal thoracic driver.

17. The apparatus as recited in claim 15, wherein the proximal thoracic driver is configured to apply a lateral-to-medial force to the rib cage of the person when the person is seated on the chair structure.

18. The apparatus as recited in claim 17, wherein the proximal thoracic driver is configured to apply a posterior-to-anterior force in combination with the lateral-to-medial force to the rib cage of the person when the person is seated on the chair structure.

19. The apparatus as recited in claim 1, wherein the front surface region of the lumbar derotator driver is configured to contour from a lateral side of the contact region to a lateral edge of the lumbar derotator driver, such that the front surface region curves posteriorly away from the contact region.

20. The apparatus as recited in claim 1, wherein the lumbar derotator driver is positioned substantially proximate to the sagittal plane of the person when the person is seated on the chair structure.

21. A method for fitting a person into an apparatus for release of spinal contractures associated with scoliosis of a spine of the person, comprising:

seating the person on a chair structure of the apparatus;

securing a pelvis of the person to the chair structure;

positioning and securing pelvic side restraints to the chair structure on each side of hips of the person;

wrapping a lumbar belt around a first side of the person so as to contact the first side of the person at or below a convexity of a scoliotic lumbar or thoracolumbar spinal curve of the person;

tightening the lumbar belt to apply a therapeutic force to the first side of the person at a lumbar spinal region of the person in a lateral-to-medial direction, wherein the therapeutic force serves to move the lumbar spinal region of the person in a direction of correction of the scoliotic lumbar or thoracolumbar spinal curve of the person, wherein tightening the lumbar belt to apply the therapeutic force to the first side of the person does not cause the lumbar belt to apply a force to a second side of the person that is opposite the first side of the person relative to a sagittal plane of the person;

positioning a lumbar derotator driver to engage with the lumbar spinal region of the person; and moving the lumbar derotator driver in a posterior-to-anterior direction to apply a therapeutic posterior-to-anterior force to a vertebrae in the lumbar spinal region on a first posterior half of the vertebrae without applying a posterior-to-anterior force to a second posterior half of the vertebrae that is opposite of the first posterior half of the vertebrae, the first posterior half of the vertebrae being on the first side of the person, the second posterior half of the vertebrae being on the second side of the person, wherein the therapeutic posterior-to-anterior force is directed substantially perpendicular to a coronal plane of the person, wherein the therapeutic posterior-to-anterior force causes derotation of the lumbar spinal region of the person in the direction of correction of the scoliotic lumbar or thoracolumbar spinal curve of the person.

22. The method as recited in claim 21, further comprising: wrapping the lumbar belt around a lumbar belt extension post connected to the chair structure at a location next to the second side of the person opposite from the first side of the person, such that the lumbar belt extension post extends forward a front pull location of the lumbar belt to prevent the lumbar belt from pulling into an anterior abdominal portion of the person when the person is seated within the apparatus and/or to provide a posterior-to-anterior corrective force to the lumbar spinal region of the person or a thoracolumbar spinal region of the person.

23. The method as recited in claim 21, wherein the lumbar derotator driver includes a front surface region that includes a contact region that is substantially flat, wherein the front surface region of the lumbar derotator driver is also configured to contour in an anterior-to-posterior direction away from the contact region within a reference plane oriented parallel to a transverse plane of the person.

24. The method as recited in claim 23, wherein a lower surface region of the lumbar derotator driver is configured to have a concave curvature to avoid interference with the lumbar derotator driver by the pelvis of the person as the lumbar derotator driver pushes into the tissues of the person in a posterior-to-anterior direction.

25. The method as recited in claim 21, further comprising: positioning of the lumbar derotator driver to contact the lumbar or thoracolumbar spinal region of the person on a convex side of the scoliotic lumbar or thoracolumbar spinal curve of the person at and below an apex of the scoliotic lumbar or thoracolumbar spinal curve of the person.

26. The method as recited in claim 21, further comprising: positioning an iliac crest belt to extend over an iliac crest of the person on the first side of the person, such that the iliac crest belt assists with anchoring of the pelvis of the person to the chair structure.

27. The method as recited in claim 26, further comprising: positioning the iliac crest belt to apply a rotational force component to the pelvis of the person that opposes the therapeutic force applied to the first side of the person by the lumbar belt.

28. The method as recited in claim 21, further comprising: positioning a primary thoracic driver to apply a therapeutic force to a lateral side of a rib cage of the person on a side of a primary scoliotic thoracic convexity of the person.

29. The method as recited in claim 28, further comprising: positioning the primary thoracic driver to apply a spinal de-rotational force and/or a lateral-to-medial force to the rib cage of the person at and below an apex of the primary scoliotic thoracic convexity of the person.

30. The method as recited in claim 28, further comprising: positioning a proximal thoracic driver to apply a lateral-to-medial therapeutic force to a lateral side of the rib cage of the person on a side of the chair structure opposite from where the primary thoracic driver is positioned.

31. The method as recited in claim 30, further comprising: positioning the proximal thoracic driver to apply a posterior-to-anterior therapeutic force to the rib cage of the person in combination with the lateral-to-medial force.

32. A method for treating a person having a scoliotic spinal configuration, comprising:

anchoring a pelvis of the person to a chair structure;

applying a first therapeutic force to a first side of the person at a lumbar spinal region of the person to move the lumbar spinal region of the person in a lateral-to-medial direction of correction of a scoliotic lumbar spinal curve of the person, wherein applying the first therapeutic force to the first side of the person does not cause application of a force to a second side of the person that is opposite the first side of the person relative to a sagittal plane of the person;

applying a second therapeutic force in a posterior-to-anterior direction to a first posterior half of a vertebrae in the lumbar spinal region of the person without applying a posterior-to-anterior force to a second posterior half of the vertebrae that is opposite of the first posterior half of the vertebrae, the first posterior half of the vertebrae being on the first side of the person, the second posterior half of the vertebrae being on the second side of the person, wherein the second therapeutic force is directed substantially perpendicular to a coronal plane of the person, wherein the second therapeutic force causes derotation of the lumbar spinal region of the person in a direction of correction of the scoliotic lumbar spinal curve of the person.

33. The method as recited in claim 32, further comprising: reclining the chair structure so that the second therapeutic force is amplified by a body weight of the person.

34. The method as recited in claim 32, wherein the first therapeutic force is applied to the first side of the person by a lumbar belt.

35. The method as recited in claim 34, further comprising: wrapping the lumbar belt around an extension post to extend forward a front pull location of the lumbar belt to prevent the lumbar belt from pulling into an anterior abdominal portion of the person and/or to provide a posterior-to-anterior corrective force to the lumbar or thoracolumbar spinal region of the person.

36. The method as recited in claim 32, wherein anchoring the pelvis of the person to the chair structure includes extending and tightening an iliac crest belt over an iliac crest of a pelvis of the person on the first side of the person, wherein the iliac crest belt has a first end connected to a front side of the chair structure between legs of the person and a second end connected to a back side of the chair structure near a sacral line of the person, wherein the iliac crest belt is positioned and tightened to apply a rotational force component to the pelvis of the person in opposition to the first therapeutic force applied to the first side of the person.

37. The method as recited in claim 32, further comprising: applying a third therapeutic force to a lateral side of a rib cage of the person on a side of a primary scoliotic thoracic convexity of the person, the third therapeutic force being one or more of a spinal de-rotational force and a lateral-to-medial force applied at and/or below an apex of the primary scoliotic thoracic convexity of the person.

38. The method as recited in claim 37, further comprising: applying a fourth therapeutic force to another lateral side of the rib cage of the person that is opposite of the lateral side of the rib cage to which the third therapeutic force is applied, the fourth therapeutic force being one or more of a posterior-to-anterior force and a lateral-to-medial force applied to the rib cage of the person.

* * * * *